US005201057A

United States Patent [19]

Uht

[11] Patent Number: 5,201,057

[45] Date of Patent: Apr. 6, 1993

[54] SYSTEM FOR EXTRACTING LOW LEVEL CONCURRENCY FROM SERIAL INSTRUCTION STREAMS

[76] Inventor: Augustus K. Uht, 44 Torrey Rd., Cumberland, R.I. 02864

[21] Appl. No.: 474,247

[22] Filed: Feb. 5, 1990

Related U.S. Application Data

[63] Continuation-in-part of Ser. No. 104,723, Oct. 2, 1987, abandoned, which is a continuation-in-part of Ser. No. 6,052, Jan. 22, 1987, abandoned.

[51] Int. Cl.[5] .................... G06F 7/04

[52] U.S. Cl. .................... 395/800; 364/253; 364/230; 364/244.3; 364/254.5; 364/DIG. 1; 395/650; 395/375

[58] Field of Search .................... 395/800, 560, 375

[56] References Cited

U.S. PATENT DOCUMENTS

| | | | |
|---|---|---|---|
| 4,153,932 | 5/1979 | Dennis et al. | 364/200 |
| 4,229,790 | 10/1980 | Gilliland | 364/200 |
| 4,379,326 | 4/1983 | Anastas et al. | 364/200 |

OTHER PUBLICATIONS

R. M. Tomasulo, "An Efficient Algorithm for Expoiting Multiple Arithmetic Units", *IBM Journal* pp. 25-33, Jan. 1967.

G. S. Tjaden and M. J. Flynn, "Detection and Parallel Execution of Independent Instructions". *IEEE Transactions on Computers* C-19 (10) pp. 889-895, Oct. 1970.

G. S. Tjaden, "Representation of Concurrency with Ordering Matrices", PhD Thesis, The Johns Hopkins University, 1972.

G. S. Tjaden and M. J. Flynn, "Representation of Concurrency with Ordering Matrices", *IEEE Transactions on Computers*, C-22(8) pp. 752-761, Aug., 1973.

E. M. Riseman and C. C. Foster, "The Inhibition of Potential Parallelism by Conditional Jumps", *IEEE Transactions on Computers*, pp. 1405-1411, Dec., 1972.

R. M. Keller, "Look-Ahead Processors", *ACM Computing Surveys*, 7(4) pp. 177-195, Dec., 1975.

J. A. Fisher, "Trace Scheduling: A Technique for Global Microcode Compaction", *IEEE Transactions on Computers*, C-30(7), Jul., 1981.

R. P. Colwell, R. P. Nix, J. J. O'Donnell, D. B. Papworth and P. K. Rodman, "A VLIW Architecture for a Trace Scheduling Compiler", In Proceedings of the Second International Conference Architectural Support for Programming Languages and Operating Systems, (ASLOS II), pp. 180-192. ACM-IEEE, Sep. 1987.

J. E. Smith, "A Study of Branch Prediction Strategies", In Proceedings of the 8th Annual Symposium on Computer Architecture, pp. 135-148, ACM-IEEE, 1981.

J. K. F. Lee and A. J. Smith, "Branch Prediction Strategies and Branch Target Buffer Design", Computer, IEEE Computer Society 17(1) pp. 6-22, Jan., 1984.

J. E. Thornton, "Design of a Computer System: The Control Data 6600", pp. 125-140. Scott Foresman & Co., 1970.

(List continued on next page.)

*Primary Examiner*—Thomas C. Lee
*Assistant Examiner*—Eric Coleman
*Attorney, Agent, or Firm*—Townsend and Townsend

[57] ABSTRACT

An architecture for a central processing unit (cpu) provides for the extraction of low-level concurrency from sequential instruction streams. The cpu includes an instruction queue, a plurality of processing elements, a sink storage matrix for temporary storage of data elements, and relational matrixes storing dependencies between instructions in the queue. An execution matrix stores the dynamic execution state of the instructions in the queue. An executable independence calculator determines which instructions are eligible for execution and the location of source data elements. New techniques are disclosed for determining data independence of instructions, for branch prediction without state restoration or backtracking, and for the decoupling of instruction execution from memory updating.

33 Claims, 9 Drawing Sheets

OTHER PUBLICATIONS

S. Weiss and J. E. Smith, "Instruction Issue Logic in Pipelined Supercomputers", IEEE Transactions on Computers c-33(11), Nov., 1984.

Y. Patt, W. Hwu and M. Shebanow, "HPS, a New Microarchitecture: Rationale and Introduction", In Proceedings of MICRO-18, pp. 100-108. ACM, Dec., 1985.

R. D. Acosta, J. Kjelstrup and H. C. Torng, "An Instruction Issuing Approach to Enhancing Performance in Multiple Functional Unit Processors". IEEE Transactions on Computers C-35 pp. 815-828, Sep., 1986.

S. McFarling and J. Hennessay, "Reducing in Cost of Branches", In Proceedings of the 13th Annual Symposium on Computer Architecture, pp. 396-403. ACM-IEEE, Jun. 1986.

R. G. Wedig, "Detection of Concurrency in Directly Executed Language Instruction Streams", PhD Thesis, Stanford University, Jun., 1982.

R. Perron and C. Mundie, "The Architecture of the Alliant FX/8 Computer", In Proceedings of COMPCON 86, pp. 390-393. IEEE, Mar., 1986.

Cydrome, Inc., "CYDRA 5 Directed Dataflow Architecture", Technical Report, Cydrome, Inc. 1589 Centre Pointe Drive, Milpitas, Calif 95035, 1987.

B = BRANCH
SD = SUPER DOMAIN

B = BRANCH
SD = SUPER DOMAIN

| CONDITIONS | | TA |
|---|---|---|
| $C_1$ | $C_2$ | |
| T | T | 1 |
| T | F | 1 |
| T | ALE | 1 |
| T | NYE | 1 |
| F | T | 2 |
| F | F | F |
| F | ALE | F |
| F | NYE | F |
| ALE | T | 2 |
| ALE | F | F |
| ALE | ALE | F |
| ALE | NYE | F |
| NYE | (T) | (F) (SEE NOTE) |
| NYE | F | F |
| NYE | ALE | F |
| NYE | NYE | F |

NOTE: IN THIS CASE BRANCH 2's EXECUTION IS NOT UPDATED, SO THAT IT MAY EXECUTE AGAIN, AND NO JUMP IS TAKEN, SINCE BRANCH 1 HAS YET TO EXECUTE.

SYSTEM FOR EXTRACTING LOW LEVEL CONCURRENCY FROM SERIAL INSTRUCTION STREAMS

CROSS-REFERENCE TO RELATED APPLICATION

This application is a continuation-in-part of patent application Ser. No. 104,723, filed Oct. 2, 1987, now abandoned. That application is a continuation-in-part of patent application Ser. No. 006,052, filed Jan. 22, 1987, and now abandoned.

BACKGROUND OF THE INVENTION

This invention relates to an improved architecture for a central processing unit in a general purpose computer, and, specifically, it relates to a method and apparatus for extracting low-level concurrency from sequential instruction streams.

A timeless problem in computer science and engineering is how to increase processor performance while keeping costs within reasonable bounds. There are three fundamental techniques known in the art for improving processor performance. First, the algorithms may be re-formulated; this approach is limited because faster algorithms may not be apparent or achievable. Second, the basic signal propagation delay of the logic gates may be reduced, thereby reducing cycle time and consequent execution time. This approach is subject not only to physical limits (e.g., the speed of light), but also to developmental limits, in that a significant improvement in propagation delay can take years to realize. Third, the architecture and/or the implementation of a computer can be reorganized to more efficiently utilize the hardware, such as by exploiting the opportunities for concurrent execution of program instructions at one or more levels.

High-level concurrency is exploited by systems using two or more processors operating in parallel and executing relatively large subsections of the overall program. Low-level (or semantic) concurrency extraction exploits the parallelism between two or more individual instructions by simultaneously executing independent instructions, i.e., those instructions whose execution will not interfere with each other. Low-level concurrency extraction uses a single central processor, with multiple functional units or processing elements operating in parallel; it can also be applied to the individual processors in a multiprocessor architecture.

Extraction of low-level concurrency starts with dependency detection. Two instructions are dependent if their execution must be ordered, due to either semantic dependencies or resource dependencies. A semantic dependency exists between two instructions if their execution must be serialized to ensure correct operation of the code. This type of dependency arises due to ordering relationships occurring in the code itself.

There are two forms of semantic dependencies, data and procedural. Procedural dependencies arise from branches in the input code. Data dependencies arise due to instructions sharing sources (input) and sinks (results) in certain combinations. Three types of data dependencies are possible, as illustrated in Table I. In the first type, a data dependency exists between instructions 1 and 2 because instruction 1 modifies A, a source of instruction 2. Therefore instruction 2 cannot execute in a given iteration until instruction 1 has executed in that iteration. In the second type, instruction 1 uses as a source variable A, which is also a sink for instruction 2. If instruction 2 executes before instruction 1 in a given iteration, then it may modify A and instruction 1 may use the wrong input value when it executes. In the third type, both instructions write variable A (a common sink). If instruction 1 executes last, an unintended value may be written to variable A and used by subsequent instructions.

TABLE I

| | Type 1 | Type 2 | Type 3 |
|---|---|---|---|
| Instruction 1: | A = B + 1 | C = A * 2 | A = B + 1 |
| Instruction 2: | C = A * 2 | A = B + 1 | A = C * 2 |

In the prior art, all three types of data dependencies have generally been enforced. Although the effects of the first type of data dependency can never be avoided, the effects of the second and third types can be reduced if multiple copies of a variable exist. However, prior art efforts to reduce or eliminate the effects of type 2 and type 3 data dependencies suffer from undesirable implementation features. The algorithms for instruction execution are essentially sequential, requiring many steps per cycle, thereby negating any performance gain from concurrency extraction. The prior techniques also only allow one iteration of an instruction to execute per cycle and are potentially very costly.

Further, in the prior art, branch prediction techniques have been used to reduce the effects of procedural dependencies by conditionally executing code beyond branches before the conditions of the branch have been evaluated. Since such execution is conditional, some code-backtracking or state restoration has heretofore been necessary if the branch prediction turns out to be wrong. This complicates the hardware of machines using such techniques, and can reduce performance in branch-intensive situations. Also, such techniques have usually been limited to conditionally executing one branch at a time.

SUMMARY OF THE INVENTION

The present invention provides a system for concurrency extraction, and particularly for reduction of data dependencies, which exploits a nearly maximal amount of concurrency at high speed and reasonable cost. The concurrency extraction calculations can be performed in parallel, so as not to negate the effects of increased concurrency. The system can be implemented at reasonable cost in hardware with low critical path gate delays.

Accordingly, the invention provides a central processing unit for executing a series of instructions in a computer. The central processing unit includes an instruction queue for storing a series of instructions, a plurality of processing elements for executing instructions, a loader for loading instructions into the instruction queue, a sink storage matrix for storing the results of the execution of multiple iterations of instructions, and an interconnect switch for transmitting data elements to and from the processing elements. As instructions are loaded into the instruction queue, a set of relational matrices are updated to indicate data and domain relationships between pairs of instructions in the queue. As instructions are executed, execution matrices are updated to indicate the dynamic execution state of the instructions in the queue. The execution matrices distinguish between real (actual) execution of instruction iterations and virtual execution (the disabling of instruction iterations as a result of branch execution). The relational matrices include data dependency matrices indicating source-sink (type 1) data dependencies separately for each source element in each instruction in the queue.

According to the invention, an executable independence calculator uses the information in the relational matrices and the execution matrices to select a set of instructions for execution and to determine the location of source data elements to be supplied to the processing elements for executing the executably independent instructions. Data executable independence exists when all source elements needed for execution of an instruction iteration are present in either sink storage or memory. The central processing unit thus achieves data-flow execution of sequential code. The code executed by the invention consists of assignment statements and branches, as those terms are understood in the art.

The invention provides for the decoupling of instruction execution from memory updates, by temporarily storing results in the sink storage matrix and copying data elements from sink storage to memory as a separate process. This decoupling improves performance in two ways: a) by itself, in that it has been established in the prior art that decoupled memory accesses and instruction executions may be performed concurrently; and b) by allowing branch prediction, in which it is possible to conditionally execute multiple branches, and instructions past the branches, with no state restoration or backtracking required if the branch prediction turns out to be wrong.

DESCRIPTION OF THE PREFERRED EMBODIMENT

Figure 1:
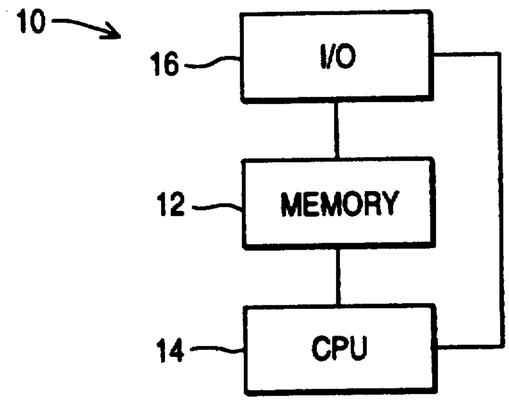
FIG. 1 is a block diagram of a computer system for practicing the invention.

FIG. 1 is a block diagram of a computer system 10 for practicing the invention. At a high level, as seen by the user and the user's application programs, computer system 10 comprises a main memory 12 for temporarily storing data and instructions, a central processing unit (cpu) 14 for fetching instructions and data from memory 12, for executing the instructions, and for storing the results in memory 12, and an I/O subsystem 16, for permanent storage of data and instructions and for communicating with external devices and users. I/O subsystem 16 is connected to memory 12 and/or directly to CPU 14. Memory 12 may include data and instruction caches in addition to main storage.

Figure 2:
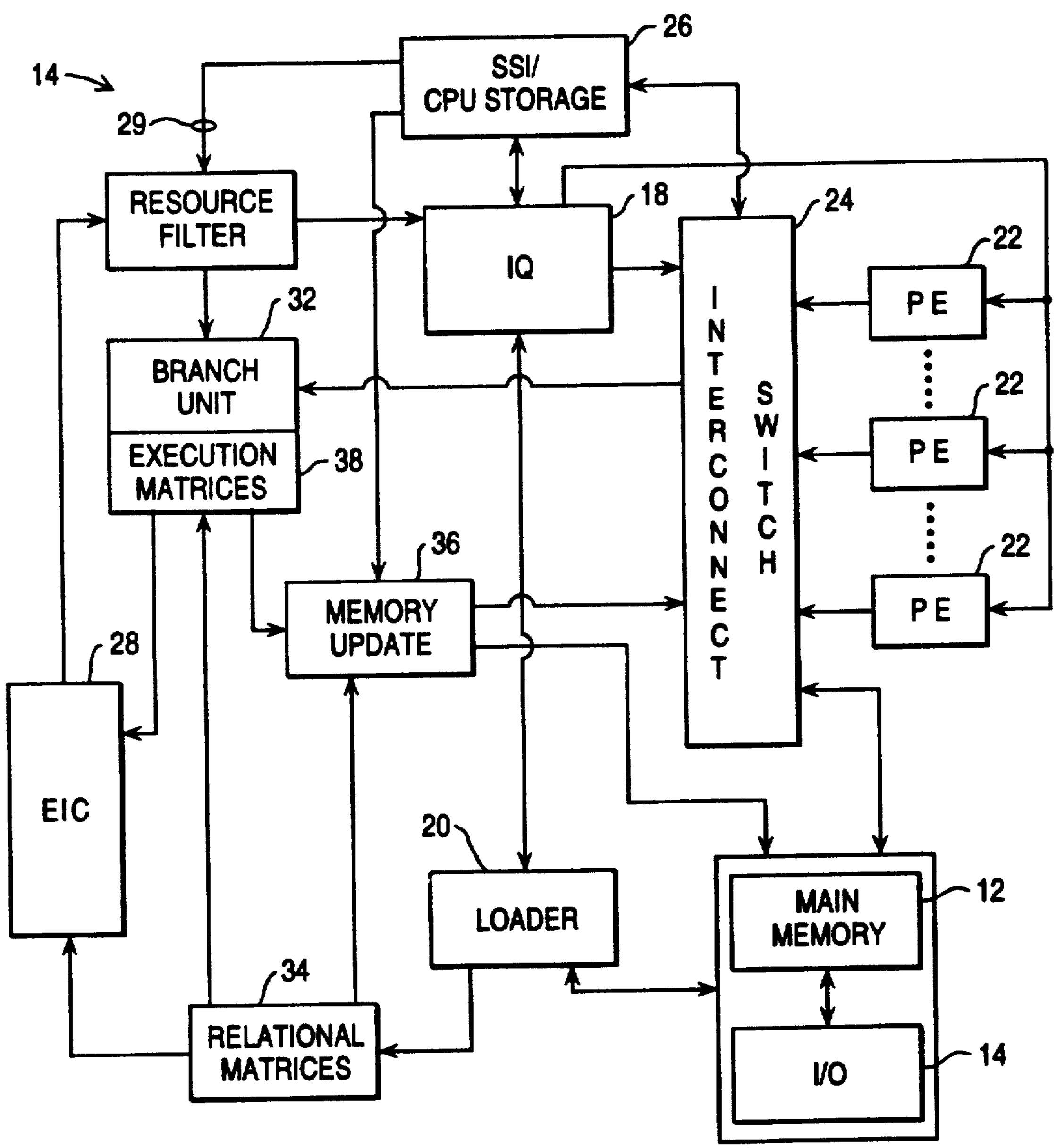
FIG. 2 is a block diagram of the central processing unit of FIG. 1.

FIG. 2 is a block diagram illustrating central processing unit 14 at a more detailed level (transparent to user applications). CPU 14 includes an instruction queue (IQ) 18 for storing a sequential stream of instructions, a loader 20 for decoding instructions from memory 12 and loading them into IQ 18, and a plurality of processing elements (PEs) 22. The CPU of the present invention executes all code consisting of assignment statements and/or branches. One or more instructions in IQ 18 are issued and executed (concurrently, when possible) by processing elements 22. Each processing element has the functionality of an Arithmetic Logic Unit (ALU) in that it may perform some instruction interpretation and executes any non-branch instruction. Processing elements 22 receive instruction operation codes directly from IQ 18.

CPU 14 further comprises an interconnect switch 24 (typically a crossbar) and an internal data buffer (shadow sink matrix) 26. Interconnect switch 24 receives operand addresses and immediate operands from IQ 18 and couples data from the appropriate location to a processing element. Instruction operand (source) data may come from instruction contents (immediate operands), from memory 12, or from a buffer storage location in internal cpu buffer 26. Instruction output (sink) data is written into buffer 26 via interconnect 24.

CPU 14 further comprises an executable independence calculator (EIC) 28, a resource dependency filter 30, a branch execution unit 32, relational matrices 34, and memory update logic 36. Branch execution unit 32 includes execution matrices 38 for storing the dynamic execution state of the instructions in IQ 18. Relational matrices 34 are updated by the loader 20 whenever new instructions are loaded, to indicate data dependencies, procedural dependencies, and procedural (domain) relationships between instructions in IQ 18. Each execution cycle, executable independence calculator (EIC) 28 determines which instructions in IQ 18 are semantically executably independent (and thus eligible for execution), using the information contained in the relational matrices 34 and execution matrices 38. EIC 28 also determines the location of source data (memory 12 or internal cpu storage 26) for eligible instructions. The vector of semantically independent instructions eligible for execution is passed to the resource dependency filter 30, which reduces the vector according to the resources available to produce a vector of executably independent instructions. The vector of executably independent instructions is sent to IQ 18, gating the instructions to the processing elements, and to branch execution unit 32. Resource dependency filter 30 updates execution matrices 38 to reflect the execution of the executably independent instructions. The execution of branch instructions by branch execution unit 32 also updates execution matrices 38. Memory update logic 36 controls the updating of memory 12 from internal CPU buffer 26, based on information from relational matrices 34 and execution matrices 38.

An instruction is semantically executably independent if all of the instructions on which it is semantically dependent have executed, so as to allow the instruction to execute and produce correct results. Semantic dependence includes data dependence and procedural dependence. Data dependencies arise due to instructions sharing source (input) and sink (result) names (addresses) in certain combinations. Procedural dependencies arise as a result of branch instructions in the code. Data dependencies are the principal concern of the present invention.

A system for determining procedural independence is described in applicant's co-pending commonly assigned U.S. patent application "Improved Concurrent Computer," Ser. No. 807,941 filed Dec. 11, 1985, now abandoned, the disclosure of which is hereby incorporated by reference. That system is modified as described below for use in the preferred embodiment of the present invention.

The equation determining semantically executable independence is the same as in the original system except, as modified, independence is calculated for each iteration of every instruction. The component executable independence equations are somewhat different, however. The procedurally executable independence calculations require new but similar hardware to that used before; however, the IE (iteration enabled) logic array is no longer used. Note that if $IQ_i$ is procedurally dependent on $IQ_j$, $IQ_j$ is a BB, and iteration i of $IQ_i$ is being considered for execution, then $AE_{j,i}$ through $AE_{j,k}$ must equal one (be virtually or really executed) before $IQ_i$ may execute in iteration k. In other words, all iterations of the BB prior to and including that of $IQ_i$ eligible for execution, must have executed. This is to ensure that the BB has fully executed before dependent instructions execute; otherwise, the dependent instructions may execute while iterations of the BB are pending, leading to erroneous results.

If $IQ_j$ is a FB, with the other conditions the same, then only $AE_{j,k}$ must equal one before $IQ_i$ may execute in iteration k. The latter requires that the overlapped FB procedural dependencies be separated from PBDE for maximal concurrency. Therefore assume that an OFBDE (overlapped forward branch dependency) matrix (like the other dependency matrices) holds the overlapped FB procedural dependencies, in the same elements as they were held in in PBDE. The matrix PBDE holds the remaining dependencies originally kept in PBDE; these procedural dependencies are only on backward branches.

For the BBEI calculation, take:

$$AES_{i,j}=\pi_{k=1}^{j} AE_{i,k}$$

indicating if all instruction i iterations to the left of and including column j have been executed.

The, for i=row(u):

For all $u \mid 1 \leqq u \leqq nm$, $$BBEI_u=(AES_{i,(col(u)-1)}+\sim BBDO_{i,i})\cdot\pi_{j=1}^{i-1}(AES_{j,col(u)}+\sim PBBDE_{j,i})$$

and $$FBEI_u=[FBD_{j,i}+\pi_{j=1}^{i-1}(AE_{j,col(u)}+\sim FBD_{j,i})]\cdot[\pi_{j=1}^{i-1}(AE_{j,col(u)}+\sim OFBDE_{j,i})]$$

In words, an instruction is backward branch executably independent when: if it is BB, all previous iterations have been executed; and regardless when: all BB procedural dependencies have been resolved; any BB on which the instruction is dependent must have executed in all iterations up to and including that of u. An instruction is forward branch executably independent when the FB procedural dependencies indicated by both the forward branch domain matrix and the overlapped forward branch dependency matrix are resolved; any FB on which the instruction is dependent must only have executed in the iteration of u(col(u)).

Execution of instructions in the preferred embodiment of the present invention is complicated by the presence of array accesses. Referring to Table II, not that $I_3$ is data dependent on $I_2$, and thus will not execute until $I_2$ executes serially previously. But what if A(H) and A(B) refer to the same location (or similarly A(F) is the same as A(B)))? As presently formulated, the hardware will not necessarily cause $I_3$ to source from $I_2$, since only array base addresses and array indices are compared; the actual locations (the sum of the contents of an array base address and an index) are not compared (this is primarily a hardware cost constraint, although timing is also important).

TABLE II

1. D←A(F)
2. A(B)←C
3. G←A(H)

Therefore logic to maintain the proper dependencies and allow the writing of shadow sink contents to memory at the right time is now developed. First, array accesses (and in particular array writes) are considered; at the end of the derivation the logic is generalized to include all sink writes. All array reads are made from memory. This can be avoided if $0(n^2m^2)$ address comparators are provided to match array sources with array sinks, the addresses of which are not known until execute time; in this case the dependencies with previous array read instructions need not be made. The technique uses much less hardware and is more practical; no comparators are used (for a similar execute-time function).

The logic for write array sink enable (WASE) is now derived. There is one WASE element for each AE element. During each cycle, if $WASE_u=1$, then $SSI_u$ is to be written into memory. The WASE logic checks for the appropriate data dependencies (real or potential, as described above) amongst array accesses. Note that for a given $WASE_u$, the serially previous array reads that must be checked for resolved data dependencies are those for which serially later data dependencies hold. Therefore the following data dependency matrix is needed:

$$DD^4=[DD^1+DD^2]^T$$

The "T" superscript indicates the normal matrix transpose operation. Its purpose here is to convert the normally serially data dependencies to serially later data dependencies.

Now, for $1 \leqq u \leqq nm$, $WASE_u=1$ iff [instruction u has been really executed and has not yet been stored ]   [for all previous $ARWI_s$ instructions that are dependent on instruction u, $WASE_s=1$ (their sinks are being written in the current cycle) or $AST_s=1$ (their sinks have effectively been written)]   [for all previous $ARRI_s$ instructions that are data dependent on instruction u, $AE_s=1$ (they have effectively been executed)].

Take A, B, and C to be defined as follows (in the above definition of WASE, A corresponds to the first two terms, B corresponds to most of the second term, and C corresponds to the last term):

$$A_u = \sim AST_u \cdot RE_u, \text{ (note } RE_u = AE_u \cdot \sim VE_u)$$

$$B_s = \sim ARWI_s + \sim DD^3_{row(s),row(u)} + AST_s,$$

$$C_s = \sim ARRI_s + \sim DD^4_{row(s),row(u)} + AE_s.$$

Then:

$$\begin{aligned} WASE_u &= A_u \cdot \pi_{s=1}^{u-1}\{[B_s + WASE_s] \cdot C_s\} \\ &= A_u \cdot \pi_{s=1}^{u-1}\{B_sC_s + WASE_sC_s\} \end{aligned}$$

It is desired to make $WASE_u$ independent of serially previous values, i.e., $WASE_s$. Therefore various WASE values are not computed to derive $WASE_u$ logic independent of $WASE_s$ ($s<u$). Briefly, a form of $WASE_u$ independent of $WASE_s$ is inductively proven to be valid.

The induction is anchored as follows:

$$\begin{aligned} WASE_1 &= A_1 \\ WASE_2 &= A_2(B_1C_1 + A_1C_1) = A_2C_1(B_1 + A_1) \\ WASE_3 &= A_3(B_1C_1 + A_1C_1)[B_2C_2 + (A_2(B_1C_1 + A_1C_1)C_2)] \\ &= A_3\{B_1B_2C_1C_2 + A_2B_1C_1C_2 + B_1A_2A_1C_1C_2 + \\ &\quad A_1B_2C_1C_2 + A_1A_2B_1C_1C_2 + A_1A_2C_1C_2\} \\ &= A_3C_1C_2\{B_1B_2 + B_1A_2 + A_1A_2B_1 + A_1B_2 + \\ &\quad A_1A_2B_1 + A_1A_2\} \\ &= A_3C_1C_2\{B_1B_2 + B_1A_2 + B_2A_1 + A_1A_2\} \\ &= A_3C_1C_2(A_1 + B_1)(A_2 + B_2) \end{aligned}$$

The inductive premise is now asserted:

$$WASE_s = A_s \cdot \pi_{i=1}^{s-1}[C_i(A_i + B_i)]$$

Using the original logic for $WASE_u$, it is not shown that the premise implies a similar relation for $u>s$.

$$\begin{aligned} WASE_u &= A_u \cdot \pi_{s=1}^{u-1}\{[B_s + WASE_s] \cdot C_s\} \\ &= A_u \cdot \pi_{s=1}^{u-1}\{[B_s + (A_s \cdot \pi_{r=1}^{s-1}\{C_r(A_r + B_r)\})] \cdot C_s\} \\ &= A_u \cdot \pi_{s=1}^{u-1}\{[(B_s + \end{aligned}$$

-continued $$A_s)(B_s + \pi_{r=1}^{s-1}\{C_r(A_r + B_r)\})] \cdot C_s\}$$

Expanding the product series terms gives:

$$\begin{aligned} WASE_u = A_u \cdot C_{u-1}(B_{u-1} + A_{u-1})(B_{u-1} + \\ [C_{u-2}(A_{u-2} + B_{u-2})]\{C_{u-3}(A_{u-3} + \\ B_{u-3}) \ldots \}) \cdot [C_{u-2}(B_{u-2} + A_{u-2})](B_{u-2} + \\ C_{u-3}(A_{u-3} + B_{u-3})C_{u-4}(A_{u-4} + \\ B_{u-4}) \ldots ) \cdot \ldots \end{aligned}$$

The $B_{u-1}$ term and the terms in [ ] and { } are now combined. Calling $B_{u-1}$ "d", the terms in [ ] "a", the term in { } "c", gives an equation of the form:

$$WASE_u = \ldots \cdot (d+ac)a \cdot \ldots$$

which reduces to:

$$WASE_u = a(d+c) \cdot \ldots$$

Substituting, this is:

$$\begin{aligned} WASE_u = A_u \cdot C_{u-1}(B_{u-1} + A_{u-1})[C_{u-2}(B_{u-2} + \\ A_{u-2})](B_{u-1} + \{C_{u-3}(A_{u-3} + \\ B_{u-3}) \ldots \}) \cdot (B_{u-2} + C_{u-3}(A_{u-3} + \\ B_{u-3})C_{u-4}(A_{u-4} + B_{u-4}) \ldots ) \cdot \\ C_{u-3}(B_{u-3} + A_{u-3})(B_{u-3}) + \\ C_{u-4}( \ldots )) \cdot \ldots \ldots \end{aligned}$$

Combining the remaining terms similarly gives logic of the form:

$$WASE_u = A_u \cdot [\pi_{s=1}{}^{u-1}C_s(A_s + B_s)][\pi_{s=1}{}^{u-1}B_s]$$

but the last product series is covered by the first series; therefore:

$$WASE_u = A_u \cdot [\pi_{s-1}{}^{u-1}C_s(A_s + B_s)]$$

and the induction is proven.

Substituting for A, B, and C and simplifying gives:

For all $u \mid 1 \leqq u \leqq nm$, $$\begin{aligned} WASE_u = \sim AST_u \cdot RE_u \cdot \pi_{s=1}{}^{u-1}\{[\sim ARRI_s + \sim D\text{-} \\ D_{row(s),row(u)}{}^4 + E_s] \cdot \\ [RE_s + \sim ARWI_s + \sim DD_{row(s),row(u)}{}^3 + AST_s]\} \end{aligned}$$

A slight digression is now made to introduce a new vector, BV, derived from the b-element, determined as follows:

$$dim(BV) = m$$

$$b = 2 \Delta BV = 1\ 1\ 0\ 0\ 0\ 0\ 0\ 0\ 0$$

$$b = \# \rightarrow BV = (\#1\text{'s})0\ 0\ 0\ 0\ 0$$

This may be implemented easily with a shift register, shifting right or left as the b-element is incremented or decremented (respectively).

The WASE logic is now generalized to accommodate all sink writes, not only array writes. The new logic is called write sink enable (WSE), and is given by:

For all $u/1 \leqq u \leqq nm$, $$\begin{aligned} WSE_u = \sim AST_u \cdot AE_u \cdot \sim VE_u \cdot BV_{col(u)} \cdot \pi_{s=1}{}^{u-} \\ {}^{-1}\{[\sim DD_{row(s),row(u)}{}^4 + AE_s] \cdot [AE_s + \sim DD_{row(s)\text{-}} \\ {}_{,row(u)}{}^3 + AST_s]\} \end{aligned}$$

The BV term in the above equation allows only valid sinks to be written, not those to the right of the column indicated by the b-element.

Array accesses are restrictive in the modified system, but not to the same degree as in the original system. In the implementation of the modified system, data dependency relation 3 (common sink) type array accesses may be executed concurrently, due to the presence of multiple sink copies (shadow sinks). However, since all array reads must be of necessity be made from memory, relation 1 and 2 type array accesses may not execute concurrently. In other words, any array accesses involving one or more array reads must be sequentialized; otherwise (with only array writes taking place) the accesses may proceed concurrently.

Figure 3:
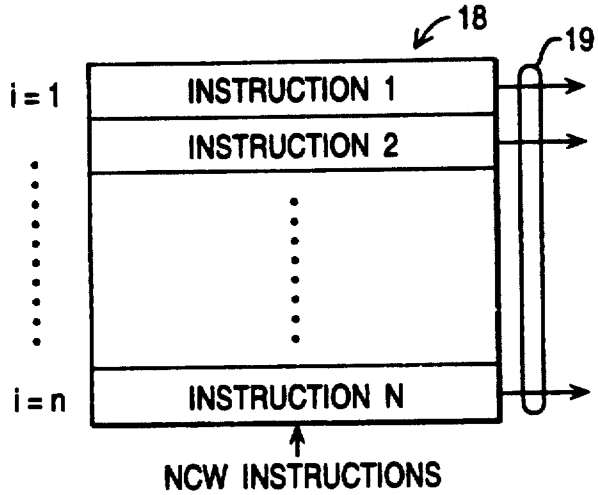
FIG. 3 is a diagram of the instruction queue of FIG. 2.

Referring to FIG. 3, a diagram of instruction queue (IQ) 18 is shown. IQ 18 comprises a plurality of shift registers. Instructions enter at the bottom and are shifted up, into lower numbered rows, as new instructions are shifted in and the upper instructions are shifted out. The order of instructions in the queue (from lower numbered rows to higher numbered rows) corresponds to the statically-ordered program sequence, e.g., the order of the code as exists in memory. The static order is independent of the control-flow of the code, i.e., it does not change when a branch is taken. Any necessary decoding of instructions is performed relatively statically, one instruction at a time, as an instruction is loaded. Each row i of IQ 18 holds the code data corresponding to instruction i, including the operation code-(opcode) and operand identifiers, and the jump destination address if the instruction is a branch. IQ 18 holds n instructions; it may be large enough to hold an entire program, or it may hold a portion of a program. The instructions in IQ 18 are accessed in parallel via lines 19.

Figure 4:
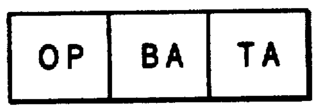
FIG. 4 is a diagram of the branch format in memory.
Figure 5:
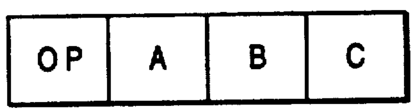
FIG. 5 is a diagram of the assignment instruction format in memory.

The formats of branch and assignment instructions are shown in FIG. 4 and FIG. 5. The fields are: OP (opcode); TA (target address); A (sink name); B (variable name which describes the condition for branches or source 1 for assignment instructions); and C (source 2 name). The addresses need only be partially specified in the memory, e.g., the TA field may actually contain a relative offset to the actual target address.

An actual instruction set may contain more information in a given machine instruction format, such as more sources or sinks. This is feasible as long as the extra hardware needed to perform the more complex data dependency checks is included in the semantic dependency calculator. The above formats are proposed as an example of a typical encoding only.

Figure 6:
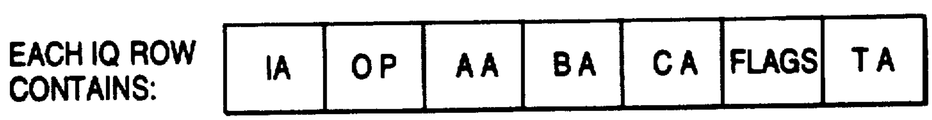
FIG. 6 is a diagram of the instruction format in the IQ.

The format of all instructions in the IQ is shown in FIG. 6. The fields are: IA (instruction address); OP (opcode, possibly decoded); AA (sink address); BA (source 1 address); CA (source 2 address); flags (AF, valid sink address flag; BF, valid source 1 address flag; CF, valid source 2 address flag); and TA (target address). All addresses are assumed to be absolute addresses. The flags need only be one bit indicators, when equal to 1 implying a valid address. Their primary use is to allow either addresses or immediate operands to be held in the same storage; they are also set when an address field is not used, e.g., in branch instructions. One or more fields may not be relevant to a particular instruction; in this case they contain 0.

Returning to FIG. 2, loader 20 includes logic circuitry capable of constructing the relational matrices 34 concurrently with the loading of instructions into IQ 18. As an instruction is loaded into IQ 18, the instruction is compared (concurrently) with each instruction ahead of it in IQ 18, and the results are signalled to the relational matrices.

Each relational matrix is an array of storage elements containing binary values indicating the existence or non-existence of a data dependency, a procedural dependency or a domain relation between each of the n instructions in IQ 18. Each relational matrix can be triangular in shape, because the relationships are either unidirectional or reflexive. A seen in FIG. 7, each relational matrix preferably comprises n diagonal shift registers. This implementation aids loading of the matrices in that every time a new instruction is loaded into IQ 18, the new column of relationships is shifted in from the right and the existing columns shift one column to the left and one row upward, into proper position for future accesses. The top row, corresponding to the top instruction in IQ, is retired.

After the initial loading of the IQ and the relational matrices, loads can occur simultaneous with execution cycles. (The basic machine cycle of the preferred embodiment is described in detail in Table III.

TABLE III 1. loading the IQ
   a. determination of absolute addresses
   b. calculation of semantic dependencies and branch domains
   c. partial or full decoding of machine instructions
2. Concurrency determination
   a. determination of a set of instructions eligible for issuing (execution) in the current cycle, assuming infinite resources (e.g., processing element); this is the semantically executable independent instructions' calculation
   b. if necessary, reducing the said set of instructions to a subset to match the resources available; this is the executably independent instrutions' calculation
3. parallel execution of said subset of instructions
4. AE, b update
5. GOTO 1.

Note that actions 2 and 4 may be overlapped with action 3. Action 1 may be pipelined, and in many cases will not need to be performed every cycle, e.g., when entire loop(s) are held in the IQ. Actions 2 and 4 must be performed sequentially to keep the hardware cost down. Hence their delays contribute to a probable critical path, and should therefore be minimized. See FIG. 8 for typical timing diagrams of the basic cycle, both with and without IQ loads.

Figure 8:
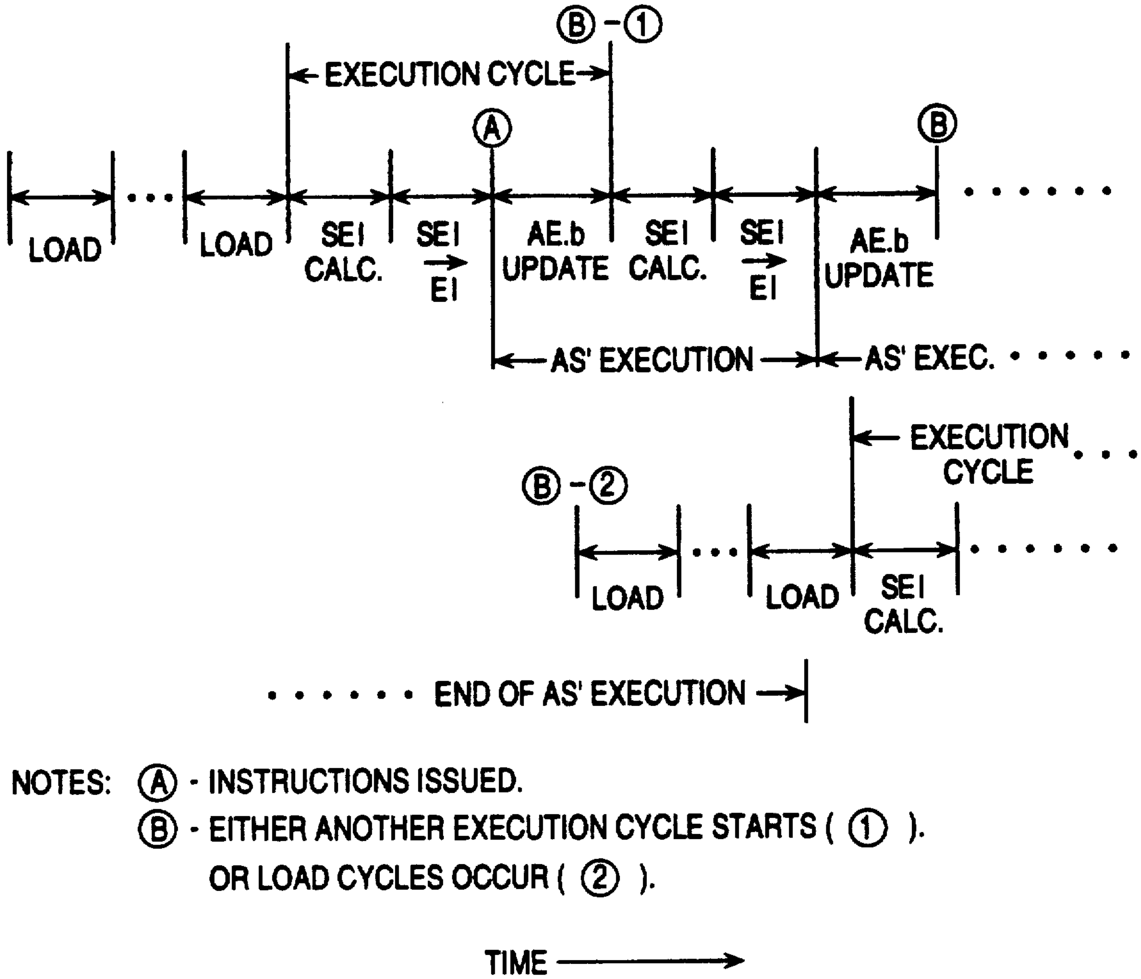
FIG. 8 is a diagram of the basic machine cycle.

In FIG. 8, each LOAD time corresponds to loading one instruction into the IQ, accomplishing the operations in action 1 (see Table III). Each EXECUTION CYCLE consists of the following sequential actions: 2a, 2b, 4. The assignment instructions found to be executably independent after action 2b are sent to processing elements at time A. The assignment instructions' executions are overlapped both with action 4 of the current execution cycle, and either actions 2a and 2b of the next execution cycle or, alternatively, following load cycles, if they occur. At time B either another execution cycle begins (see the top time-line in FIG. 8), or new instructions are loaded into the IQ (see the bottom time-line). The basic cycle repeats indefinitely.

Figure 9:
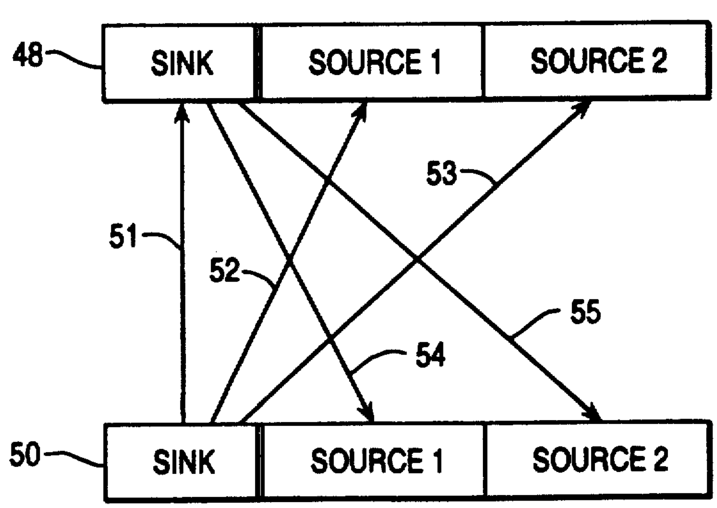
FIG. 9 is a diagram of two instructions and their data dependency relationships.
Figure 9A:
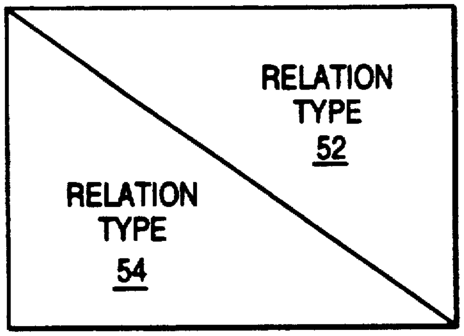
FIGS. 9A–9C illustrate the conceptual arrangement of dependency matrices.
Figure 9B:
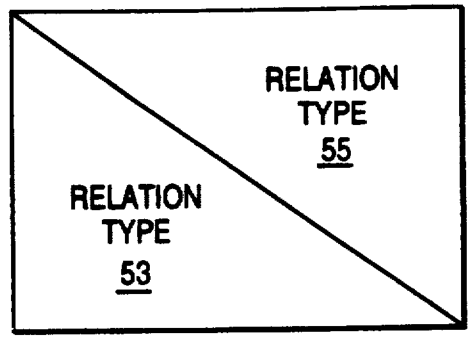
Figure 9C:
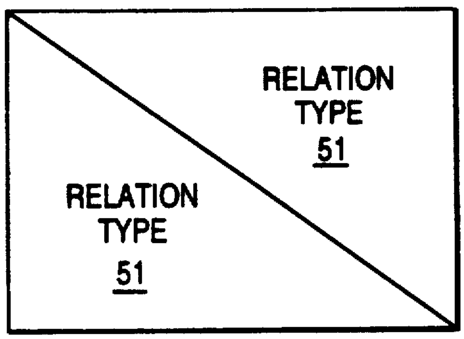

Relational matrices 34 include domain matrices and procedural dependency matrices, such as those described in co-pending application Ser. No. 807,941, and data dependency matrices. The data dependency matrices of this embodiment will now be described. Referring to FIG. 9, the operand portions of two instructions 48 and 50 and the five possible data dependencies 51–55 are shown. (Instructions are shown with two sources and one sink.) Instruction 48 is previous to instruction 50 in IQ 18. For each pair of instructions in IQ 18, the five possible data dependencies are evaluated by comparing pairs of addresses. Each comparison determines an element in a binary upper triangular half matrix wherein each column indicates all of an instruction's data dependencies of a specific type (51–55) with respect to preceding instructions in the IQ. These matrices are, conveniently arranged as shown in FIG. 9A–9C, where DD1 combines source 1-sink dependencies (types 52 and 54 in FIG. 9), and DD2 combines source 2-sink dependencies (types 53 and 55 in FIG. 9), and DD3 includes type 51 sink-sink dependencies. All lower triangular matrices have been rotated about their diagonals from their original positions.

The data dependencies illustrated in FIG. 9 are the full set of data interrelationships between instructions which can affect concurrency extraction, corresponding to the three types shown and described with reference to Table I. If an instruction's source is a previous instruction's sink (dependencies 54 and 55, corresponding to type 1 in Table I), then the later instruction cannot execute until the previous instruction has executed. If an instruction's sink is a previous instruction's source (dependencies 52 and 53, corresponding to type 2 in Table I),then the later instruction can execute first if (and only if) such execution does not prevent the earlier instruction from having access to its source operand value as it exists before execution of the later instruction. As will be shown, the present invention provides for such access by providing multiple copies of sink variables in the internal cpu buffer (the SSI matrix, described in detail below). However, when multiple iterations are considered, each instruction is both serially prior to and serially later than the instructions preceding it in the static IQ; it is therefore necessary to take type 2 data dependencies into consideration. For example, if there is a type 2 relationship (e.g., dependency 52) between instructions 48 and 50, then iteration $x+1$ of instruction 48 cannot execute before iteration x of instruction 50, because iteration x of instruction 50 calculates a source for iteration $x+1$ of instruction 48. However, the type 2 relationship does not itself preclude iteration x of instruction 50 from executing before iteration x of instruction 48, because the SSI matrix contains multiple copies of instruction 2's sink variable (one per iteration). Thus, in the combined (dependency 52 and 54) matrix of FIG. 9A, column j indicates both types of relations for instruction j—type 1 for instructions preceding instruction j in the IQ and type 2 for instructions succeeding instruction j in the IQ. Further, the diagonal indicates that an instruction in a given iteration can be data dependent on the same instruction in a previous iteration (e.g., instruction $z=z+1$). As will also be shown below, the type 3 sink-sink dependencies of DD3 are only needed for array accesses.

Although this embodiment comprises data dependency matrices DD1, DD2, and DD3 for instructions having two sources and one sink, it will be understood that the invention can accommodate instructions with more sources and sinks. According to the invention, the data dependencies for each source in each instruction are separately accessible.

Internal cpu buffer 14 (FIG. 2) is referred to as the shadow sink (SSI) matrix. The shadow sink matrix is an $n \times m$ matrix, where n is an implementation-dependent variable indicating the number of instructions in the IQ and m is an implementation-dependent variable indicating the total number of iterations being considered for execution. Each element of the SSI matrix is typically the size of an architectural machine register, i.e., large enough to hold a variable's value. SSI(i,j) is loaded with the sink (result) value of an assignment instruction i (the ith instruction in IQ) having executed in iteration j.

Variables' values are held in SSI at least until they have been copied to memory. Values in SSI may be used as source variables for data dependent instructions. Since there are multiple copies of variables in SSI, "shadow effects" can be avoided; that is, if an instruction's sink variable is a source variable for a previous instruction in the IQ (e.g., Type 2 dependency in Table I), iteration x of the later instruction can execute before, or concurrently with, iteration x of the earlier instruction. The earlier instruction is given access to its source variable (in SSI) as it exists before execution of the later instruction, e.g., in iteration $x-1$. Similarly, two instructions can write the same sink variable to SSI (e.g., Type 3 dependency in Table I), allowing instructions with common sinks to execute concurrently.

Figure 10:
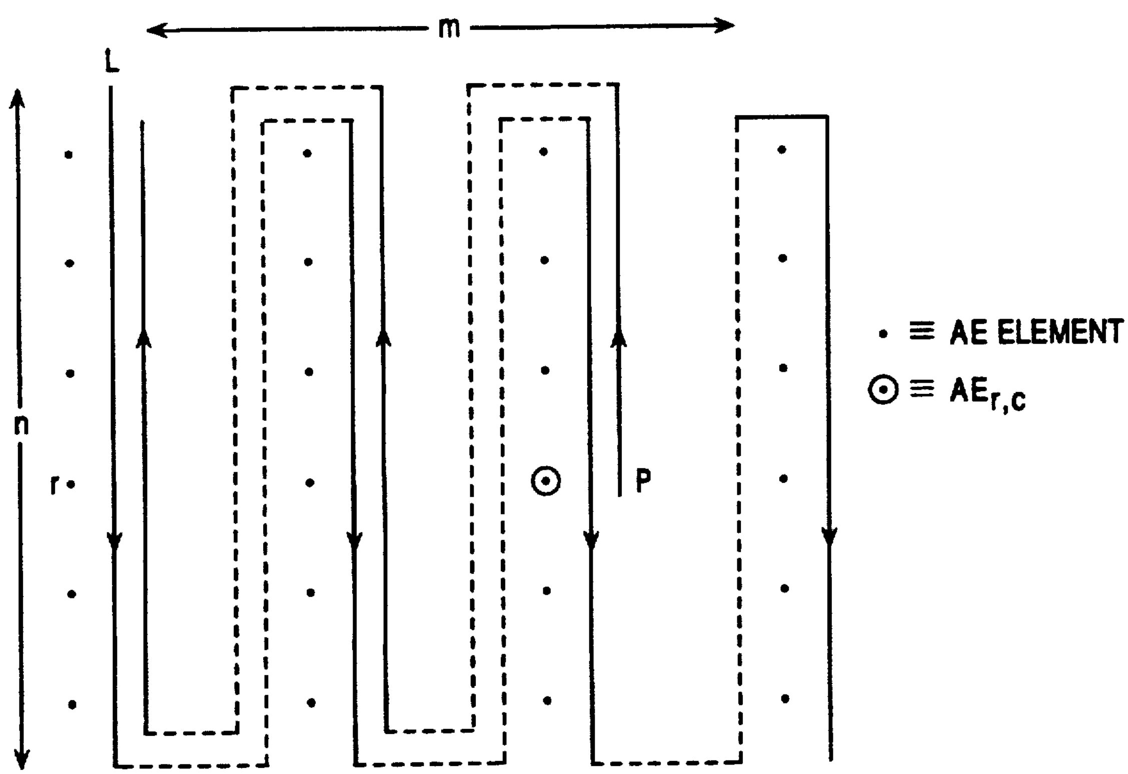
FIG. 10 is a model of the nominal instruction execution order of the instructions in the instruction queue.
Figure 11:
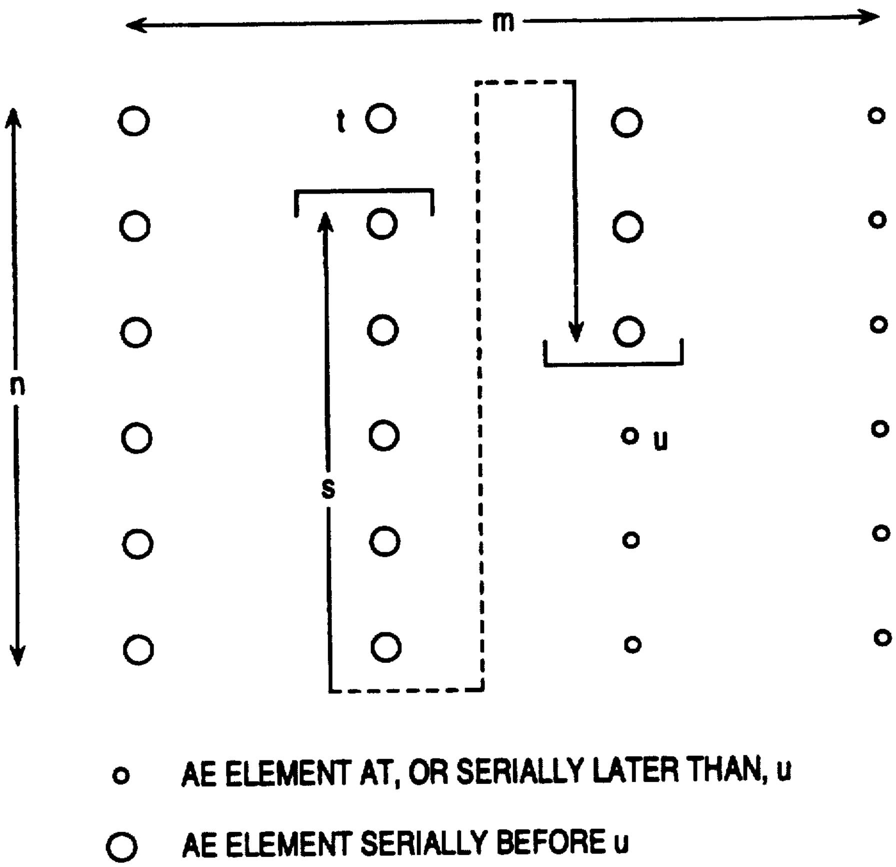
FIG. 11 illustrates the method for determining an instruction's source data, according to the invention.

Referring to FIG. 10, a model of the nominal execution order of instructions in the IQ is shown. Each row represents an instruction in the IQ and each column represents an iteration. The directed line L shows the nominal, or serial, order of execution of the sequentially biased code in the IQ. Instructions execute in this order when dependencies force instructions to be executed one at a time. Instruction R in iteration C uses as its source a sink generated previously and residing in either main memory or in SSI. The instruction iteration generating the previous sink is somewhere serially previous to instruction iteration R,C along line P. The particular SSI word to be used is determined by both the data dependencies and the execution state of the relevant instructions. The execution state is contained in the execution matrices.

The execution matrices (FIG. 2, 38) will now be described. There are two execution matrices: the real execution (RE) matrix and the virtual execution (VE) matrix. Each matrix is an $n \times m$ binary matrix, where n is the number of instructions in the IQ and m is the number of iterations under consideration. The RE matrix indicates whether a particular iteration j of instruction i has been really executed. An iteration really executes if ,for an assignment statement, an assignment has really occurred, or for a branch statement, a conditional has been really evaluated and a branch decision made. In this embodiment, RE(i,j) equals 1 if IQ(i) has been executed in iteration j, else RE(i,j)=0. The VE matrix indicates whether an iteration of an instruction has been "virtually" executed; an instruction is virtually executed when it is disabled (branched around) as a result of the true execution of a branch instruction. In this embodiment, VE(i,j) equals 1 if IQ(i) has been virtually executed in iteration j, else VE(i,j)=0. The execution matrices are updated by the resource dependency filter after it determines which semantically executably independent instructions are to be executed, or by the branch execution unit when branch instructions are executed. When new instructions are loaded into the IQ, the execution matrices are updated by shifting each row up and initializing a new bottom row.

Associated with the execution matrices is a register called the b-element register. The b-element is an integer indicating the total number of iterations that each instruction in the instruction queue is to execute (really or virtually). The b-element is incremented when a backward branch executes true (enabling a new iteration for execution). When all of the instructions in an iteration have been executed, the column is retired from the execution matrices (by shifting higher number columns to the left and initializing a new column of zeroes on the right) and the b-element is decremented. The b-vector (BV) is an ordered set of m (where m is the width of the execution matrices) binary elements derived from the b-element; the first n elements of the b-vector equal 1, and all other elements are zeroes. The b-vector is implemented with a shift register and is used in certain calculations described below.

The data independence calculations can now be described. In the following description, the execution matrices, the data dependency matrices, and the other two-dimensional matrices will be considered as one dimensional vectors of length n * m, with the elements ordered in column-major fashion, as shown by line L in FIG. 10. The formal mappings for deriving a serial index for an n×m matrix M are:

For all $s \mid 1 \leqq s \leqq n \cdot m$, $M_s = M_{i,j}$; $s = i + (j-1)n$

For all $(i,j) \mid (1 \leqq i \leqq n,\ 1 \leqq j \leqq m)$, $M_{i,j} = M_s$; i=row(s), j=col(s)

where:

$$row(x) = 1 + [(x-1)\text{REMAINDER}(n)];$$

this is the row index of x $$col(x) = 1 = [(x-1)\text{INTEGERDIVIDE}(n)];$$

this is the column index of x.

The executable independence calculator (28, FIG. 2) uses execution matrices RE and VE, and data dependency matrices DD1, DD2, and DD3 to determine, for each instruction in IQ, which iterations of that instruction are data executably independent in this execution cycle. This determination is made concurrently, in logic circuitry, for each instruction iteration, i.e., for each iteration (1 thru m) of each instruction (1 thru n) in IQ. More than one iteration of an instruction may execute in a cycle, and one instruction may execute in one iteration while another instruction is executing in another iteration.

Data independence is established when all inputs (sources) are available for an instruction. If all sources are available, then the sources are linked to a processing element for execution of the instruction. A source for an instruction iteration may be available either in SSI or in memory.

Figure 7:
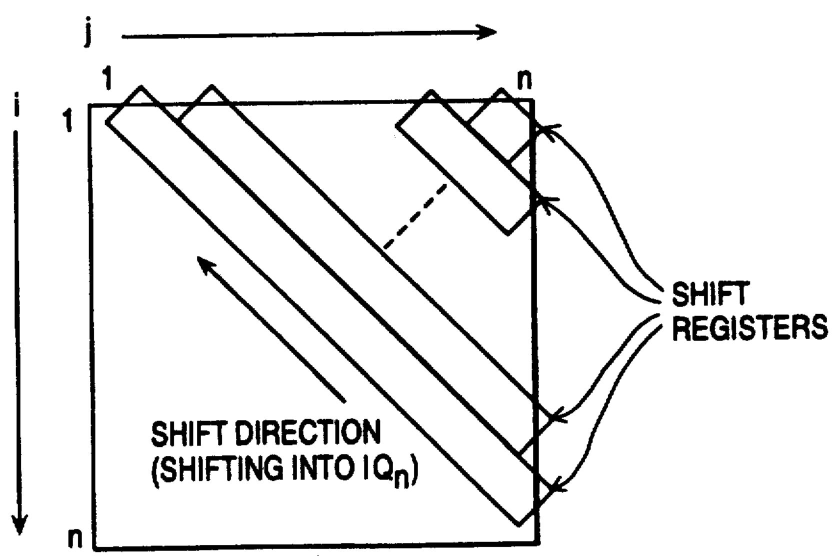
FIG. 7 is a diagram of the relational matrices of FIG. 2.

Referring to FIG. 7, if instruction iteration u (iteration j of instruction IQ(i)) is under consideration for execution, then one or none of the instruction iterations serially previous to u (indicated by the larger circles) may supply a sink to be used as a source by u. Looking back along line S, the SSI element needed for execution of instruction iteration u is the first element SSI(t) (corresponding to iteration 1 of instruction IQ(k)) which is data dependent (source(i)=sink(k)) with IQ(i), where instruction iteration (k,l) has really executed, and all intervening data dependent instructions have been virtually executed.

If a source for an instruction iteration is available in SSI (as the sink of a previously executed instruction iteration) one sink enable line (SEN) is enabled by the executable independence calculator. There are nm sets of less than nm output SEN lines (29, FIG. 2) each, one set per source per IQ instruction iteration, each line of which potentially enables (connects) a serially previous sink to the instruction iteration's source input. These lines are implemented using the following equation:

For all(u,t,z,) | t<u, $$SEN_{t,z}^{u} = RE_t \cdot DD_{row(t),row(u)}^{Z} \cdot AE_u \cdot \pi_{s=t+1}^{4-1}(DD_{row(s),row(u)}^{z} + VE_s)$$

where where u is the serial index to the IQ instruction iteration (i,j) under consideration for execution;

t indicates the serial SSI element under consideration for linking to an input of u;

z is the source element index for instruction i; and

AE=VE+RE (Actual Execution=Virtual Execution OR Real Execution);

This equation indicates that SSI(t) may be used by instruction IQ(i) in iteration j if: (1) SSI(t) has been generated (RE(t)=1) and (2) it is required as a source to instruction IQ(i) in iteration j (indicated by the presence of the data dependency (DD) matrix term) and (3) instruction iteration u has not been executed (indicated by the AE(u) term); and (4) there is no serially later sink SSI(s) that should be used as the z source for instruction IQ(i) in iteration j (indicated by the product term). The product term ensures that for each u,z combination at most one SEN is enabled (equal to 1). For a sink t to be used as a source to instruction iteration u, all SSI elements between t and u must correspond to instruction iterations which are either data independent of u or virtually executed (disabled). If an SSI element between t and u corresponds to an instruction that is data dependent on u and really executed, then that SSI element is potentially the one to use as a source for instruction iteration u; if it is data dependent and not executed at all (either virtually or really) than it is too early to use SSI(t).

If no SEN line is enabled, then either the source is not in SSI, i.e., it is in memory, or the source has not yet been produced. A source is taken from storage if for all serially previous iterations, no valid sink exists in SSI. This is determined according to the following equation:

For all u | (u is the serial index of $IQ_i$), $$SFS_{u,z} = \pi_{s=1}^{u-1}(DD^{z}_{row(s),row(u)} + VE_s)$$

This equation is the same basic product series term as the SEN equation, but performed once over all iterations serially prior to u. SFS equals 1 if all instructions prior to u are either data independent of u or virtually executed (VE=1). In this case, the source is obtained from memory, using the address in IQ.

EIC 28 therefore implements the following equation for determining data executable independence (DDEI)

For all $u \mid 1 \leqq u \leqq nm$, $$DDEI_u = \pi_{z=1}^{2}[SFS_{u,z} + \Sigma_{s=1}^{8-1} SEN_{s,z}^{u}]$$

This means that instruction iteration u is data executably independent if either its source(s) is in memory or one SSI element is set (i.e., a valid sink exists in SSI).

The reduction of data dependencies through the implementation of the sink storage matrix and the calculation of DDEI, SEN, and SFS, are thus rendered feasible by the implementation of the particular execution matrices (VE and RE) and data dependency matrices (DDz, where z is a source variable) described hereinabove. These matrices and the logic circuitry for the calculations can be implemented at reasonable cost by those of ordinary skill in the art, whereby the data independence determination and the enabling of SEN lines can be performed with a high degree of concurrency.

EIC 28 determines procedural independence concurrently with the determination of data independence. In this embodiment, the procedural independence calculations and hardware implementation are similar to the embodiment described in copending commonly assigned patent application Ser. No. 807,941, with certain modifications to accommodate the new data independence calculations described herein.

Besides the modification described previously, modification must be made to the out-of-bounds branches and executable independence calculations.

The OOBBBEI (out-of-bounds backward branch executably independent indicator) and OOBBBEN (out-of-bounds backward branch enable: indicates if an instruction is below an unexecuted OOBB and thus should be kept from fully executing) hardware remains the same. IFE (instruction fully executed) and IAFE (instruction almost fully executed) are calculated by the following logic:

BVLS = BV left shifted by one bit, $i = row(u)$, $j = col(u)$

For all $i \mid 1 \leqq i \leqq n$, $IFE_i = EQ(AE_{i,\bullet}, BVLS\bullet)$, each vector is taken as an integer for the equal calculation $IAFE_i = \sim GT(AE_{1,\bullet}, BVLS\bullet)$, each vector is taken as an integer for the greater than calculation; $GT(x,y) = 1$ iff $x > y$, $GT(x,y) = 0$ otherwise.

$BBI_i$ are the backward branch indicators, and are defined as follows:

$BBI_1 = a$ iff $IQ_i$ is a backward branch.

$EXSTAT^u$ is the execution status indicator for instruction $IQ_i$, and for the purposes of this implementation is given by:

For all $u \mid 1 \leqq u \leqq nm$, $$EXSTAT_u = (OOBBBEN_i PDSAEVE_u + (IFE \cdot BBI_i)) + (\sim OOBBBEN_i \cdot (IAFE_i + \sim BVLS_j))$$

The EXSTAT logic keeps instructions from executing more iterations than they should, i.e., normally less than or equal to about b iterations, except when an instruction is super-advanced executing. Not included in the equation is logic to prevent instructions from executing in iteration m when $b < m$; this logic is straightforward, and may be derived from the BV vector and a similar m-based vector. The PDSAEVE indicator ensures that only instruction interactions for which PDSAEVE=0 are allowed to execute. The $PDSAEVE_u$ term may also be OR'd with the entire EXSTAT equation.

SEI (semantically executable independence) is now for all nm serial iterations:

For all $u \mid 1 \leqq u \leqq nm$, $$SEI_u = DDEI_u \cdot BBEI_u \cdot FBEI_u \cdot OOBBBEI_{row(u)} \cdot \sim EXSTAT_u$$

$SEI_u = 1$ iff serial instruction iteration u will execute in the current execution cycle, ignoring resource dependencies.

The TAEN (target address enable) logic becomes: given:

$BEXS_k$ is the branch execution sign (=0 for False, =1 for True) of instruction iteration k.

$FBD_{k,n}$ is 1 iff $IQ_k$ is an OOBFB (out-of-bounds forward branch). then:

For all $i \mid 1 \leqq i \leqq n$, $$TAEN_i = FBD_{i,n} \cdot \{\Sigma_{k=0}{}^{b-1}(EI_{i+kn} \cdot BEXS_{i+kn})\} \cdot \{\pi_{j=1}{}^{i-1}[\sim FBD_{j,n} + \pi_{k=0}{}^{b-1}(\sim EI_{j+kn} + \sim BEX_{j+kn} + AE_{j,k+1})]\}$$

The logic causes a target address to be enabled to be used from instruction $IQ_I$ if the instruction is an out-of-bounds forward branch executing true in the current cycle, and all statically previous out-of-bounds forward branches either are not executing, or are executing false, in the current cycle.

The UPIN (AE update inhibit) logic becomes:

For all $u \mid 1 \leqq u \leqq nm$, $$UPIN_u = BEXS_u \cdot FBD_{row(u),n} \cdot [\sim BV_{col(u)} + \Sigma_{s=1}{}^{8-1} \cdot (\sim EI_s + \sim AE_s + \{BEXS_s \cdot FBD_{row(s),n}\})]$$

This logic inhibits an out-of-bounds forward branch from executing if any serially previous instruction either is not executing in the current cycle (indicated by the EI term), or has not really or virtually executed in a previous cycle (indicated by the AE term), or a statically previous out-of-bounds forward branch is executing true in the current cycle (as indicated by the term in {■}). The logic allows multiple out-of-bounds forward branches to execute in the same cycle, as long as only one executes true.

Figure 28:
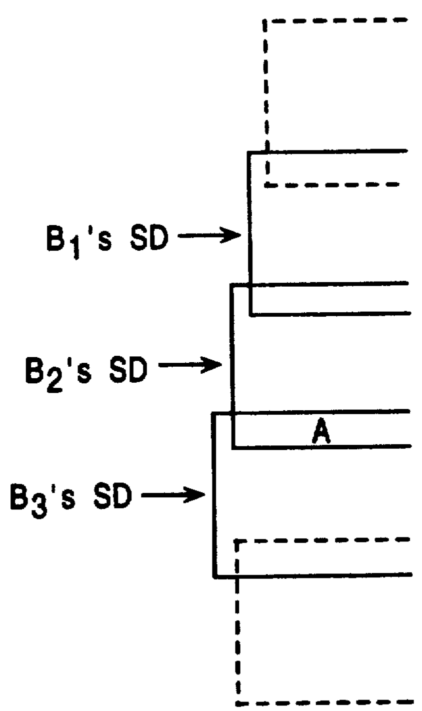
FIG. 28 is a diagram of chained branches.

FIG. 28 realizes minimal semantic dependencies for code containing addresses known at Instruction Queue load time, with the minor exceptions give in the section or theory. When this embodiment is used with fully dynamic data dependency calculators, it achieves minimal semantic dependencies overall, with the minor exceptions given in the theory section. It will be understood, however, that other methods and systems for determining procedural independence may be used with the data independence calculations described herein and the teachings of the present invention. It will be further understood that the separation of the data independence calculation from the procedural independence calculation is an advantageous feature of this invention.

The logic for writing SSI variables to memory will now be described. The memory updates are advantageously decoupled from the execution of instructions. This decoupling improves performance and also allows for zero-time-penalty branch prediction, as will be described below. Memory update logic (36, FIG. 2), includes the Instruction Sink Address matrix (ISA), the Advanced Storage Matrix (AST) and the Write Sink Enable (WSE) logic.

The instruction sink address matrix (ISA) is of the same dimensions as the SSI matrix and stores the memory address of each SSI element. ISA(i,j) holds the memory address of SSI(i,j). For scalars (non-array writes), ISA(i,*)=AA(i), where AA is the address of operand A (held in IQ). For array write instructions, ISA is determined for each iteration at run time.

The AST matrix is a binary matrix with the same dimensions as the SSI matrix. AST(i,j) is set to one if either VE(i,j) is 1 or SSI(i,j) has been written to memory. Thus AST(i,j) equals one if SSI(i,j) has been really or virtually stored.

Every cycle, each eligible SSI value is written to memory at the location pointed to by the contents of the corresponding ISA element. Eligibility is determined by the WSE logic. The WSE logic implements the following equation:

For all $|u1 \leqq u \leqq nm$, $$WSE_u = AST_u \cdot AE_u \cdot VE_u \cdot BV_{col(u)} \cdot \pi_{s=1}^{u-1}([DD_{row(s),row(u)}{}^4 + AE_s] \cdot [AE_s + DD_{row(s),row(u)}{}^3 + AST_s])$$

SSI(u) is written to memory (WSE=1) if the following conditions are met:

1) Instruction iteration u has really executed (RE(u)=1), and SSI(u) has not been written to storage (AST(u) not=1), and this iteration has been enabled (b-element greater than or equal to col(u)); and 2) For all instruction iterations serially prior to u, all instructions that are data dependent on instruction u have executed (AE=1). The data dependency referred to here is DD4, where $DD4=(DD1+DD2)^T$, i.e the transpose of the combined DD1 and DD2 matrices. Thus, all serially previous instructions having a source which is the sink variable under consideration for writing must have executed (really or virtually); and 3) For all instruction iterations serially prior to u, all instructions that write the same sink variable as instruction u (type 3 data dependencies, stored in DD3) have either executed (AE=1) or have already been written to memory (AST=1).

An instruction iteration is said to execute absolutely if it is executed only once, i.e., it is not re-evaluated, regardless of the final control-flow of the code.

The inclusion of the B-vector in the WSE logic allows only valid sinks to be written (those sinks whose iterations have been enabled), not those to the right of the column indicated by the b-element. This means that branch prediction techniques can be used to absolutely execute code beyond branches, ahead of time as described below; sinks generated by such execution will be written to SSI, but will not be written to memory unless and until the predicted branch is actually executed. In other words, iterations may be executed before it is known that they will be needed. A unique feature of this invention is that no time penalty is incurred if a branch prediction turns out to be wrong.

In this embodiment, the following form of branch prediction is used: Instructions within an innermost loop assume that the backward branch comprising the loop will always execute true. Thus, such backward branches are, in effect, conditionally executed. The instructions within the inner loops are therefore allowed to execute absolutely up to m iterations ahead of time, where m is the width of the execution matrices. Thus, forward branches within the inner loop may also execute absolutely ahead of time in future (unenabled) iterations. Therefore, both forward and backward branches may be executed ahead of time. A novel feature of the present invention is that both forward branch and other instructions within an inner loop may be executed absolutely ahead of time (in future iterations), while eliminating state restoration and backtracking, thereby improving performance.

Figure 12:
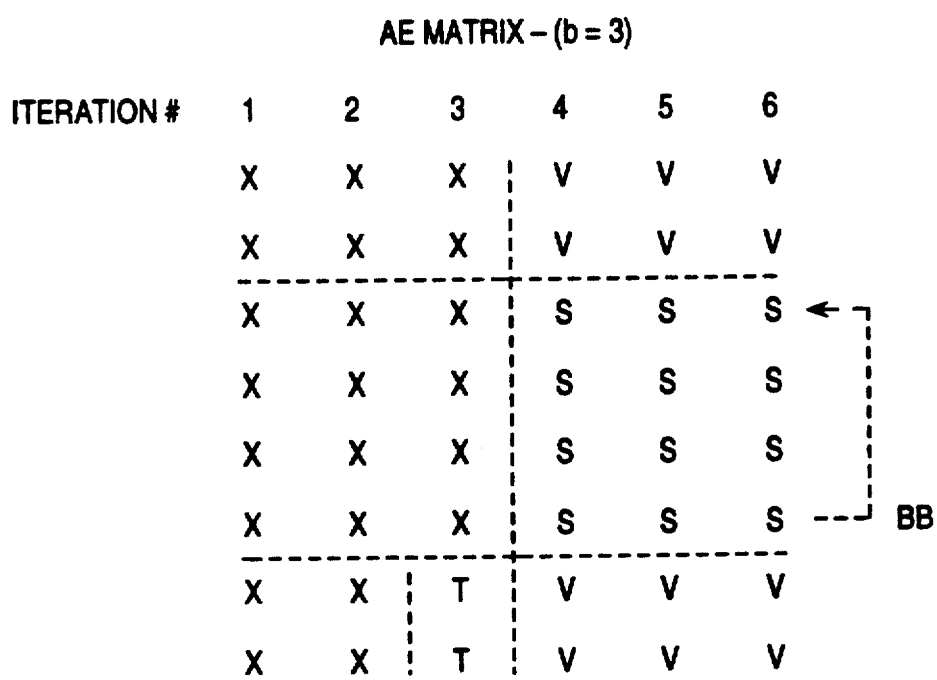
FIG. 12 is a diagram of an Advanced Execution Matrix illustrating the branch prediction technique.

Referring to FIG. 12, b=3, and therefore normally only those instruction's iterations in columns 1-3 (indicated by Xs and Ts) are allowed to execute absolutely. (Indeed, they must execute for correct results.) The instruction iterations (indicated by Ss) to the right of column 3 (to the right of the b pointer) and within the inner loop are now also allowed to execute. This is possible by considering the instruction iterations indicated by Vs to be virtually executed. An SAEVE matrix indicates those instruction iterations considered to be virtually executed for this limited purpose. The instructions in the T region are also considered to be virtually executed by instruction iterations in the S region. This is so that T sinks are not used as inputs to S instruction iterations. Otherwise, T instruction iterations are allowed to execute as normal X instruction iterations. Instruction iterations in the S region thus execute ahead of time, absolutely (with the minor exception given in the SAE section), writing to the SSI matrix. However, the sink is not copied to memory at least until the instruction iteration becomes an X instruction iteration. This can occur only upon the inner loop's backward branch executing true.

This branch prediction technique is a direct result of the decoupling of instruction execution and memory updating taught by the present invention. Very little additional cost (in hardware or performance penalty) is incurred by implementing this branch prediction technique because: a) the WSE logic and the SSI, ISA, and AST matrices are already in place; and b) no state restoration or backtracking is needed in the event that the branch does not execute tue.

A later section discusses implementation details of this branch prediction technique (called "Super Advanced Execution" (SAE)).

It will be understood that the embodiment described hereinabove assumes that all source and sink addresses are known at the time instructions are loaded into IQ and the data depenoency matrices are calculated. The logic can be expanded to handle array accesses or indirect accesses, where addresses are calculated at execution time, e.g., from an array base address and an index value. One possible approach is to compare calculated array read (source) addresses to sink addresses stored in ISA, to match array sources with array sinks stored in SSI. This requires a large number of comparators, and it is therefore preferred to force all array reads to be done from memory (not from SSI).

Including array accesses, the logic for SEN becomes:

For all(u,t,z)|(t<u, $1 \leqq z \leqq 2$), $$SEN_{t,z}{}^u = RE_t \cdot DD_{row(t),row(u)}{}^Z \cdot AE_u \cdot ARWI_t \cdot \pi_{s=t+1}^{u-1}(DD_{row(s),row(u)}{}^z + VE_s + ARWI_s)$$

where ARWI(i)=1 if instruction i is an array write instruction.

The inclusion of the ARWI terms has the following effects: 1) ARWI(t) ensures that no array write instruction is used as a sink to a serially later source (all array reads are from memory); and 2) ARWI(s) ensures that array writes do not inhibit other assignments from being used as inputs.

With array accesses, there are effectively three sources to an instruction, the normal two (B,C) appearing on the right hand side of the assignment relation, and that for A, when A specifies the name of an array base address for array write instructions. A must be read to obtain the base address of the array before the array element can be written; therefore A is also a source and a sink enable (SEN) computation must be made to ensure that it is linked to the proper sink. When a third source is implied (array write instructions) the SEN logic for $z=3$ is:

For all$(u,t,z)|(t<u,z=3)$, $$SEN_{t,z}^{u}=RE_t \cdot DD_{row(t),row(u)}^{z} \cdot AE_u \cdot ARWI_t \cdot ARWI_u \cdot \pi_{s=t+1}^{8-1}(DD_{row(s),row(u)}^{z}+VE_s+ARWI_s)$$

The inclusion of ARWI(u) ensures that A (the first operand specifier, normally a sink) is only used as a source if the instruction is an array write instruction.

The modified (SFS) source from storage logic is:

For all$(u,z)|$(u is the serial index of $IQ_i, 1 \leqq z \leqq 2$), $$SFS_{u,z}=\pi_{s=1}^{u-1}(DD_{row(s),row(u)}^{z}+VE_s+ARWI_s)$$

For the sink, the logic is:

For all$(u,z)|$(u is the serial index of $IQ_i, z=3$), $$SFS_{u,z}=ARWI_u+\pi_{s=1}^{u-1}(DD_{row(s),row(u)}^{z}+VE_s+ARWI_s)$$

The modified Data Dependency Executable Independence (DDEI) indicators are:

For all $u|1 \leqq u \leqq nm$, $$DDEI_u=\pi_{z=1}^{3}[SFS_{u,z}+\Sigma_{s=1}^{u-1}SEN_{s,z}^{u}] \cdot [ARRI_{row(u)}+\pi_{s=1}^{u-1}[ARWI_{row(s)}+\Sigma_{z=1}^{2}(DD_{row(s),row(u)}^{z}+AST_s)]]$$

DDEI is now checked for all sources, including $z=3$, and the largest bracketed term ensures that if instruction u is an array read instruction, all previous array writes to the specified array have been stored in memory. $ARRI(i)=1$ if instruction i is an array read instruction.

Since all array reads are from memory, and not SSI, array accesses involving both an array read and an array write to the same array must be sequentialized; otherwise, with only array reads or only array writes taking place, the accesses may proceed concurrently.

With this exception, and those in the theory section, this embodiment achieves minimal semantic dependencies of all code consisting of assignment statements and branches.

In summary, the preferred embodiment of the present invention provides an improved method and apparatus for extracting low level concurrency from sequential instruction streams to achieve greatly reduced semantic dependencies, as well as allowing absolute execution of instructions dynamically past conditionally executed backward branches. All or part of the invention can be implemented in software, but the preferred embodiment is in hardware to maximize the overall concurrency of the machine. The design of logic circuitry for implementing all of the equations presented herein is well within the capability of those of ordinary skill in the art of digital logic design. Theoretical background (including derivations of the equations presented herein) is provided along with execution examples and additional implementation details.

A computer program source code listing in the "C" language for simulating the system described in the foregoing description of the preferred embodiment is provided herewith as Appendix 1. A brief description of the simulator program of Appendix 1 is given below.

Although the invention has been described in terms of a preferred embodiment, it will be understood that many modifications may be made to this embodiment by those skilled in the art without departing from the true spirit and scope of the invention. The scope of the invention may be determined by the appended claims.

THEORY

The following items enumerate the procedural dependencies (PD) of instruction i on instruction j for non-trivial sequentially-biased code. Note that statements 1-6 (labelled PD 1-6) are only concerned with the present iteration of instruction i. Statement 7 (labeled PD 7) is only concerned with future iterations of instruction i. The notation $IQ_k$ (k is either i or j) indicates instruction k in the Instruction Queue. For the general case, take the Instruction queue length to be infinite. These procedural dependencies hold for any section of static code.

Figure 13:
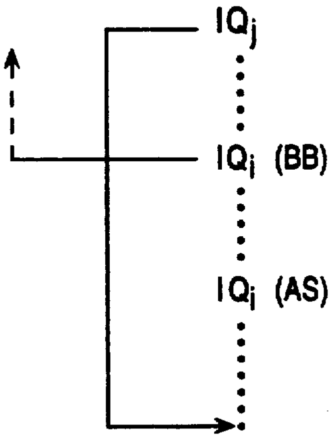
FIG. 13 is an illustration of PD1 and PD2.
Figure 14:
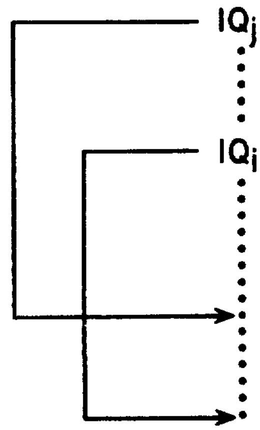
FIG. 14 is an illustration of PD3.
Figure 15:
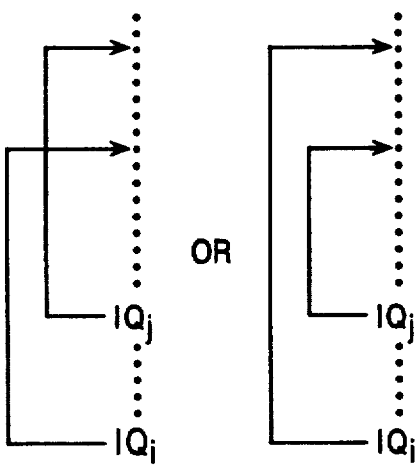
FIG. 15 is an illustration of PD4.
Figure 16:
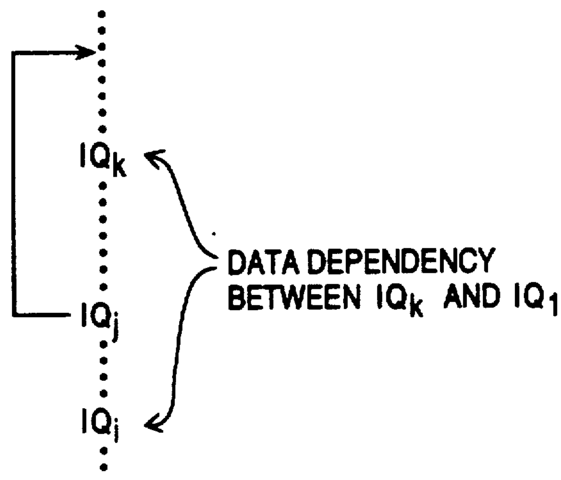
FIG. 16 is an illustration of PD5.
Figure 17:
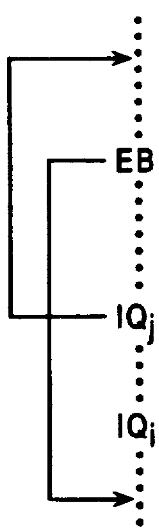
FIG. 17 is an illustration of PD6.

1. $IQ_i$ is an As in the domain of FB $IQ_j$; see FIG. 13.
2. $IQ_i$ is a BB in the domain of FB $IQ_j$; see FIG. 13.
3. $IQ_i$ is an FB in the domain of FB $IQ_j$ and the two FBs are overlapped; see FIG. 14; this procedural dependency is only essential for unstructured code; note that non-overlapped FBs are completely procedurally independent.
4. $IQ_i$ is a BB statically later in the code than BB $IQ_j$ and the two BBs are either overlapped or nested; see FIG. 15.
5. $IQ_i$ is any type of instruction statically later in the code than BB $IQ_j$ and $IQ_i$ is data dependent on one or more instructions in $IQ_j$'s domain; see FIG. 16.
6. $IQ_i$ is any type of instruction statically later in the code than BB $IQ_j$ and $IQ_i$ is in the domain of an FB which is overlapped with $IQ_j$; see FIG. 17; this procedural dependency is only relevant for unstructured code.
7. $IQ_i$ is any type of instruction in BB $IQ_j$'s super domain; i.e., future iterations of $IQ_i$ are not enabled until one or more BBs whose domains contain $IQ_i$ execute true.

The enumerated procedural dependencies are direct dependencies, one instruction being immediately dependent on another. Indirect dependencies (for example, instruction 1 is dependent on instruction 2 which is dependent on instruction 3, implies instruction 1 is indirectly dependent on instruction 3) do not imply direct dependencies and are not considered further; enforcing just the direct dependencies guarantees that the indirect ones will be enforced, and code will be executed correctly.

Figure 18:
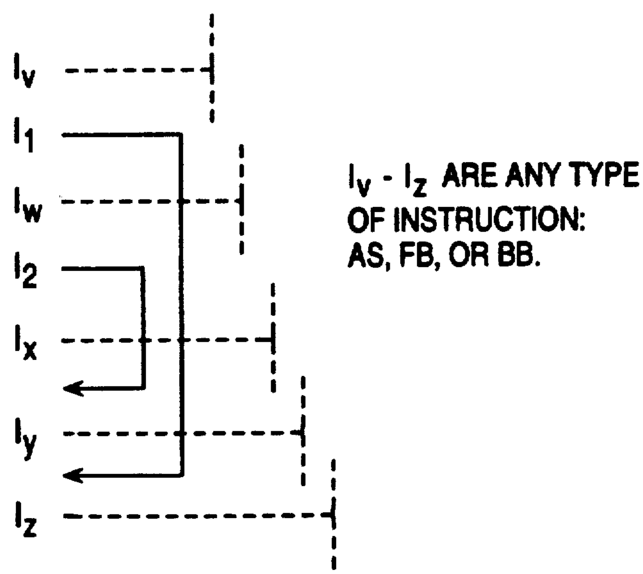
FIG. 18 is a diagram of nested forward branches.

Nested forward branches are procedurally independent. The proof consists of examining all consequences of the relative execution order of $I_1$ and $I_2$ as shown in FIG. 18. This order is only relevant insofar as it affects the state of memory, i.e., the actual user's program state. The execution of $I_1$ preceding the execution of $I_2$ is the normal (sequential) case and is not examined further. $I_2$ executing at the same time as or before $I_1$ executes is the case now examined.

The program's memory state will only be valid if an instruction executes ahead of time, ignoring some dependency. The data dependencies amongst the instructions in FIG. 18 are independent of the procedural dependencies and, more to the point, are independent of the relative execution of $I_1$ and $I_2$. $I_x$ will not execute until both $I_1$ and $I_2$ have executed true, since $I_x$ is in both $I_1$'s and $I_2$'s domains, and by definition can instruction in a forward branch domain must wait for the branch to execute true before the instruction may execute. Therefore any instruction procedurally or data dependent on $I_x$ will not execute until both $I_1$ and $I_2$ have executed true, maintaining correct program execution results. The order of execution of $I_1$ and $I_2$ is thus irrelevant: $I_2$ executing before $I_1$ only partially enables $I_x$; $I_x$ cannot execute until $I_1$, and all forward branches in $PDS_x$, have executed true.

Also note that neither $I_1$ nor $I_2$ executing true or false affects the contents of memory, hence $I_2$ can execute prior to $I_1$, then $I_1$ may execute without any change in program memory state taking place. Therefore, $I_1$ and $I_2$ are procedurally independent.

Two utility lemmas are stated and proven. Then the procedural dependencies necessary and sufficient for structured code (SC) are derived. The structured code restriction is then relaxed and the additional procedural dependencies are derived and, when taken together with those procedural dependencies arising from structured code, are shown to be necessary and sufficient for all non-trivial code.

Figure 19:
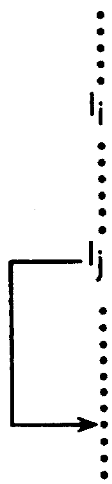
FIG. 19 is a diagram of statically later FB.
Figure 20:
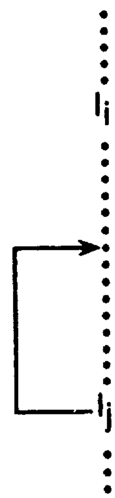
FIG. 20 is a diagram of a statically later BB, SD disjoint.
Figure 21:
FIG. 21 is a diagram of a statically later BB, enclosing.

The first utility lemma is that an instruction I is only procedurally dependent on a statically later branch B iff B is a BB and $I \epsilon SD_B$. (This is just a re-statement of PD 7). this is true since, by definition, only a statically later BB executing true can create new (future) iterations of I. In cases other than that considered in the above lemma, $I_i$ can only be procedurally dependent in its present iteration on statically previous branches $I_j$ (lemma 2). To prove this assume $I_j$ is a statically later branch. The three possible cases of statically later branches are examined and shown not to create present iteration procedural dependencies with $I_i$. First, in any given iteration, $I_i$'s execution is independent of $I_j$'s; $I_i$ may execute, regardless of $I_j$'s execution (FIG. 19). Second, in any given iteration, $I_i$'s execution is independent of $I_j$'s; $I_i$ may execute regardless of $I_j$'s execution (FIG. 20). Third, in any given present iteration $I_i$ must execute, virtually or really, independently of $I_j$. $I_j$ can only partially enable future iterations of $I_i$ (FIG. 21).

Figure 22:
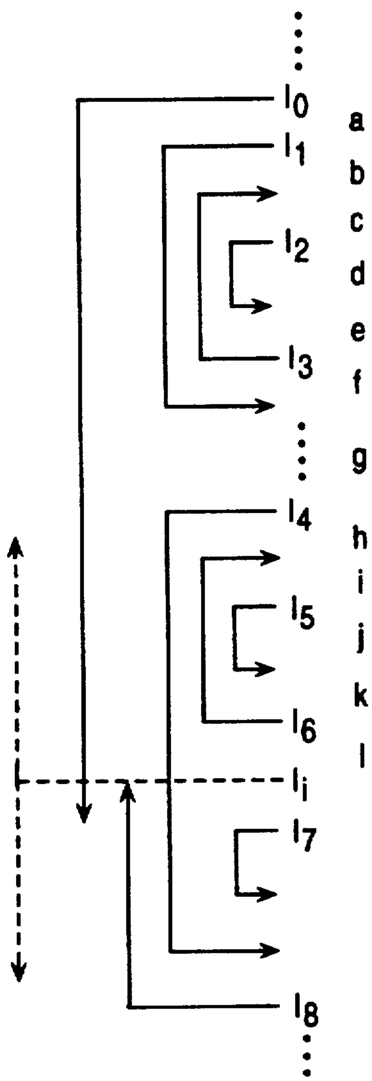
FIG. 22 is a diagram of a universal structural code example.

For structured code, PDs 1, 2, 4 and 5 are necessary and sufficient for describing codes' present iteration procedural dependencies (lemma 3). With the structured code and present iteration constraints, the procedural dependencies are determined by an exhaustive examination of possible codes. FIG. 22 is an all-encompassing example of structured code used in the proof.

In the first case, $I_i$ is an AS. By definition, $I_i$ is procedurally dependent on all FBs in whose super-domain it is, therefore PD 1 is sufficient. In the example, $I_i$ is procedurally dependent on $I_0$ and $I_4$. $I_i$ is not procedurally dependent on $I_1$, $I_2$, and $I_5$ (by definition), or $I_7$ and $I_8$ (by Lemma 2). If $I_i$ is data dependent on one or more $I_d$ in $I_3$'s super-domain, then $I_i$ may not execute until $I_d$ has fully executed in the present iteration. Since $I_d$ cannot be fully executed until $I_3$ is fully executed ($I_3$ may generate more iterations of $I_d$, and $I_d$ may appear to be fully executed before $I_3$ has finished executing), $I_i$ is procedurally dependent on $I_3$. An equivalent argument can be made for all previous BBs. Therefore PD 5 is sufficient for $I_i$ being an AS.

In the second case, $I_i$ is an FB. Based on the earlier proof in this section, $I_i$ is procedurally independent of $I_0$, $I_1$, $I_2$, $I_4$ and $I_5$ (in the example), and in fact all other FBs, since the code is structured (no overlapped branches). For the same reasons as in the first case, PD 5 is sufficient for $I_i$ being an FB.

In the third case, $I_i$ is a BB. As in the first case, $I_i$ is procedurally independent of those previous FBs that $I_i$ is not in the super-domain of (e.g., $I_1$, $I_2$, and $I_5$ in the example). If $I_i$ branched back to section h in the example, then the relevant enclosing FB would be $I_4$. Given the definition of FBs, $I_4$ only partially enables the present iterations of the instructions in $I_i$'s super-domain, therefore allowing $I_i$ to generate new iterations of the instructions in its upper-domain before $I_4$ executes is incorrect, and $I_i$ must be procedurally dependent on $I_4$. Therefore PD 2 is sufficient. Note that if the definition of FBs were changed to also partially enable future iterations of the instructions in their domains, then $I_i$ could generate new iterations and infinitum, since none would be executed until the enclosing FBs execute true. Allowing this execution of backward branches ahead of time is only possible when the BB forms an endless loop, i.e., is trivial code. (If the loop is not endless, then it contains loop termination instructions which by definition are procedurally dependent on the FB.)

Figure 23:
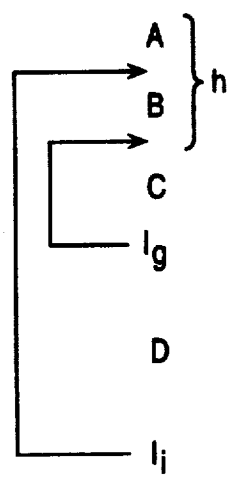
FIG. 23 is a diagram of nested BBs.

As in the first case, $I_i$ is procedurally dependent on those statically previous BBs (containing $I_d$ in their super-domains), in which $I_i$ is data dependent on an $I_d$. If $I_i$ branches to section h, then $I_6$ is nested in $I_i$. The relevant instructions are shown in FIG. 23.

Consider the following scenario:

1. $I_B$ is data dependent on $I_C$
2. $I_i$ executes true, enabling a new iteration each of $I_B$, $I_C$ and $I_D$
3. $I_6$ executes true, enabling a new iteration of $I_C$ If is now possible for $I_B$ to use a variable as a source which is sunk by $I_C$ and does not yet contain the proper value, as $I_6$ (and hence $I_C$) may not have executed in all $I_6$ loop iterations for the first iteration of the $I_i$ loop. A similar argument exists for code $I_D$ with respect to $I_C$. Therefore $I_i$ is procedurally dependent on $I_6$ if either $I_B$ or $I_D$ is data dependent on $I_C$. Since the cases when there are no such dependencies consist of only trivial code (the inner loop would be executed only for the first iteration of the outer loop, and could be moved outside of the outer loop), $I_i$ is procedurally dependent on $I_6$. Therefore PD 4 is sufficient for non-trivial code.

In summary, an exhaustive search for all the procedural dependencies has been made, resulting in PDs 1, 2, 4 and 5 being found to be sufficient. Having found no other present iteration procedural dependencies in structured code, PDs 1, 2, 4 and 5 are also necessary. Furthermore, PDs 1, 2, 4, 5 and 7 are necessary and sufficient to describe all possible procedural dependencies in structured code. Since an iteration may only be present in future, all such code is covered by lemmas 1 and 3; in the proofs of the lemmas the specific dependencies were either derived, or determined via an exhaustive search; they were all that were found.

To determine unstructured code procedural dependencies the structured code constraint is removed. The sole difference between structured code and unstructured code is that unstructured code allows overlapped branches, while structured code does not.

The fourth lemma states that the procedural dependencies additionally sufficient for unstructured code (due to overlapped branches) are PD 2 (overlapped), PD 3, PD 4 (overlapped) and PD 6. The overlapped cases of PDs 2 and 4 are meant to distinguish the new dependencies from those also found in structured code, i.e., nested cases. The four new possible control flow scenarios created by overlapped branches are now exhaustively examined for new procedural dependencies. Unless noted otherwise, the present iteration is assumed. (In the figures, assume code sections A, B, and C each contain unstructured code with no branch targets outside of the section). For each of the scenarios, each code section is examined, along with the statically later branch.

Figure 24:
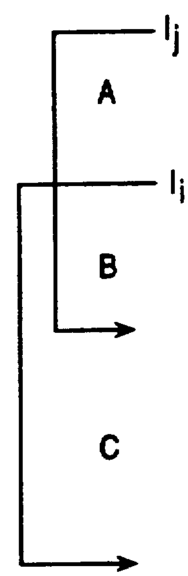
FIG. 24 is a diagram of overlapped FBs.

The first case, shown in FIG. 24, is for overlapped FBs. Code A is only procedurally dependent on $I_j$, by definition. Code B is procedurally dependent on both $I_i$ and $I_j$, be definition. Code C is only procedurally dependent on $I_i$, by definition.

$I_i$ is procedurally dependent on $I_j$; otherwise, $I_i$ could execute before $I_j$ and thus code C could be disabled before the execution of $I_j$, which can indirectly determine if code C is to execute. ($I_j$ executing true causes $I_i$ not to be executed, thus indirectly enabling code C; otherwise $I_i$ might execute true, incorrectly disabling code C.) Therefore PD 3 is sufficient.

Figure 25:
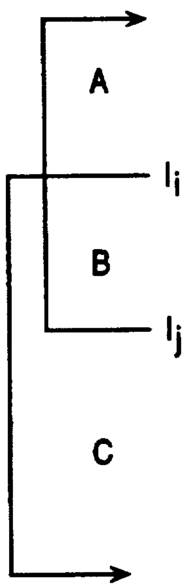
FIG. 25 is a diagram of FB domain overlapped with previous BB domain.

In the second case the FB domain is overlapped with the previous BB domain (FIG. 25). Code A is only procedurally dependent (in future iterations) on $I_j$, by definition and lemmas 1 and 2. Code B is procedurally dependent in future iterations on $I_j$, by definition. Code B is procedurally dependent in the present iteration on $I_i$, by definition. Code C is procedurally dependent in the present iteration on $I_i$, by definition. Also, since multiple iterations of $I_i$ may be pending (due to looping by $I_j$), it cannot be assumed that code C will execute, until the last iteration of $I_i$ executes true; this is indicated by $I_j$ executing false and $I_j$ executing false in its last present iteration. Therefore code C is procedurally dependent on $I_j$, i.e., PD 6 is sufficient. $I_j$ is procedurally dependent on $I_i$, since otherwise it is possible for unwanted iterations of codes A and B to be partially enabled by $I_j$. Therefore PD 2 is sufficient for the overlapped case.

Figure 26:
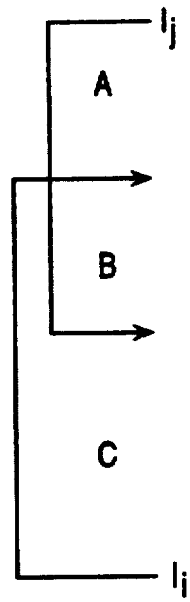
FIG. 26 is a diagram of BB domain overlapped with previous FB domain.

In the third case, shown in FIG. 26, the BB domain overlaps with the previous FB domain. Code A is procedurally dependent on $I_j$, by definition. Code B is procedurally dependent on $I_j$, by definition. Code B is also procedurally dependent in future iterations on $I_i$, by definition. Code C is procedurally dependent in future iterations on $I_i$, by definition. For $I_i$ only its present iteration is in question. In the worst case, $I_i$ is data dependent on $I_B$ which is procedurally dependent on $I_j$. But any necessary serialization of code execution is guaranteed by these already present dependencies. Therefore there are not new procedural dependencies resulting from this situation.

Figure 27:
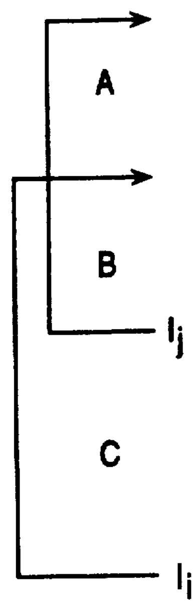
FIG. 27 is a diagram of overlapped BBs.

The fourth case, shown in FIG. 27, is for overlapped BBs. Code A is procedurally dependent in future iterations on $I_j$, by definition. Code B is procedurally dependent in future iterations on $I_j$ and $I_i$, by definition. Code C is procedurally dependant in future iterations on $I_i$, by definition. Also, PD 5 applies, as usual. For $I_j$, PD 5 applies, as usual. Assume $I_i$ is present iteration independent of $I_j$. Then new iterations of $I_B$ can be enabled by $I_i$ before code A has executed in all iterations, and erroneous execution may result. Therefore the assumption is false and $I_i$ is procedurally dependent on $I_j$, i.e., PD 4 (overlapped) is sufficient.

Having shown that the unstructured code procedural dependencies are sufficient, the necessity of all of the procedural dependencies (PDs) for unstructured code is demonstrated via a sequence of two lemmas and a theorem. The following lemma effectively anchors an induction.

Lemma 5 states that present iteration procedural dependencies due to multiple chained branches (FIG. 28) are described by PDs 1–6. Chained branches are overlapped branches such that an overlapped area is in the domains of at most two branches. In FIG. 28, the extent of each branch's super domain (SD) is represented by a solid lien (in the shape of a "C"); the branches may be either forward or backward, so no arrows are shown. Two cases must be reviewed in order to prove the lemma. In the first case the branches (within overlapped areas) are nested or disjoint. This is just structured code, in which case structured code procedural dependencies apply.

In the second case, in which the branches are overlapped, only code A can be procedurally dependent on at most branches 1, 2 and 3, and then only if $B_1$ is a BB and $B_2$ and $B_3$ are FBs. All three procedural dependencies arise from either an unstructured code procedural dependency ($B_1$) or from definitions ($B_2$ and $B_3$). Other combinations of FBs and BBs are covered by the cases in lemma 4. By inspection and lemma 2, chained branches above $B_1$ or below $B_3$ cannot add any new procedural dependencies to code A.

Figure 29:
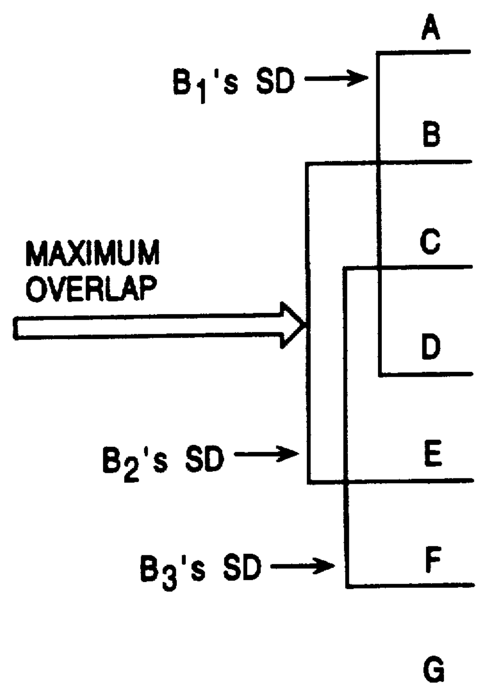
FIG. 29 is a diagram of multiply overlapped branches.

Lemma 6 states that present iteration procedural dependencies due to multiply overlapped (not nested) branches are covered (contained) by PDs 1–6 (FIG. 29). In order to prove this lemma, first the particular three branch case of FIG. 29 is exhaustively examined for procedural dependencies other than PD 1–7. This case is then generalized to k-tuple overlap, $k \epsilon$ positive integers.

In FIG. 29, the extent of each branch's (B's) super domain is represented by a solid line (in the shape of a "C"); the branches may be either forward or backward, so no arrows at the ends of the lines are shown. Only code in sections F, E and D can possible have additional procedural dependencies arising from the overlap of all branches 1–3 (indicated by the large arrow in the figure), since lemma 2 eliminates codes sections A–C.

Code F is only unstructured code procedurally dependent on $B_1$ and $B_2$ iff $B_1$ and $B_2$ are BBs and $B_3$ is a FB. All of the possible procedural dependencies resulting from these branches and that resulting from $F \epsilon SD_3$ imply code F is procedurally dependent on $B_3$, in turn implying that code F is maximally procedurally dependent, i.e., it is procedurally dependent on all $B_1$–$B_3$. If $B_3$ is a BB, then there are no unstructured code procedural dependencies, since $B_3$ is after code F (no present iteration procedural dependencies). If $B_1$ is a FB, F is not procedurally dependent on $B_1$ since it is not in $B_1$'s super-domain. The same is true for $B_2$.

For code E: $B_1$ is a BB, $B_2$ and $B_3$ are FBs, implying code E is procedurally dependent on $B_1$–$B_3$ in turn implying that code E is maximally procedurally dependent, i.e., is dependent on all of the branches.

For code D: is procedurally dependent on $B_1$–$B_3$ iff $B_1$–$B_3$ are FBs, i.e., code D is maximally procedurally dependent.

In other branch combinations, the code cases are covered by overlaps of less than three, since both: enclosing BBs affect only the future iterations of an instruction, reducing the possible present iterations procedural dependencies; and non-enclosing FBs also reduce the present iteration procedural dependencies, since an instruction must be in the domain of a FB for the FB to cause any procedural dependencies between the instruction and previous branches. The latter effectively keeps such branches from generating additional procedural dependencies.

In general, code K in the k-tuple intersection (e.g., code D in FIG. 29) can have a new procedural dependency only if all enclosing branches are FBs, but then it is maximally procedurally dependent, and the case is covered by structured code and unstructured code procedural dependency conditions. Code K+q (q is a positive integer between 0 and k−1, inclusive, this code is statically later than code K) requires combinations of ≧k−q FBs for maximal procedural dependence, since ≧q BBs overlap with the FBs; this implies that code K+q is procedurally dependent on the BBs. Or all statically later branches are BBs implies that only the codes' future iterations are affected.

Intermediate cases (less than maximal procedural dependence), as well as the procedural dependencies for code above code K, are covered by the proofs for other k-tuple overlaps, k'<k, applied recursively. This is possible since for the non-maximally procedurally dependent cases of code K+q (q>0), the non-enclosing branches are FBs, and thus there are no procedural dependencies between them and code K+q. In this way the situation is the same as if only k' overlap is occurring. For example, in FIG. 29 k=3. Code D is the k case. For code E k'=2, and for F use k'=1 for the non-maximally procedurally dependent cases.

Based on the above proofs, PDs 1-7 are both necessary and sufficient to describe all procedural dependencies in all non-trivial unstructured code, i.e., all non-trivial code. All code may be considered to be formed of sections of structured code optionally interspersed with overlapped branches, forming unstructured code. The dependencies arising form the unstructured branches (where overlap occurs) are found to be sufficient in lemma 4. The baseline for demonstrating their necessity is given in lemma 5. Lemma 6 demonstrates their complete necessity.

The previous theory assumed an unlimited IQ (or instruction window). A finite IQ is now considered as far as forward branches are concerned. The primary new concern is with out-of-bounds forward branches (OOBFBs). OOBFBs jump to locations statically later than all instructions in the IQ. The study of OOBFBs is essentially the study of the interface between the static and dynamic instruction streams. The interface arises from the inherent finiteness of the Instruction Queue.

Allowing the execution of multiple OOBFBs simultaneously is useful for the speedy execution of both large SWITCH statement constructs, and mixtures of branches and procedure calls, as calls may be considered to be OOBFBs. Without the capability of multiple OOBFB execution, some code would be forced to execute sequentially, one OOBFB per cycle.

All non-forward branch instructions statically before an OOBFB must fully execute before the OOBFB can execute, since the OOBFB's execution may cause new code to be loaded into the IQ. If full execution is not required, then when now code is loaded into the IQ the partially executed instructions will be overwritten, implying that one or more of their iterations will not execute, leading to erroneous results. Conversely, all non-forward branch instructions statically later than OOBFB cannot execute until the OOBFB has executed. Forward branches (e.g., $I_3$ and $I_4$ in FIG. 30) nested in OOBFBs ($I_1$ and $I_2$ in FIG. 30), are procedurally independent of the enclosing OOBFBs. (In FIG. 30, $I_2$ and $I_3$ may be considered to be nested in $I_1$ since $ASD_2$ $ASD_1$ and $ASD_3$ $ASD_1$. $ASD_i$ is the apparent super domain of instruction i.) Therefore if there are not instructions between OOBFBs (as is the case with $I_1$ and $I_2$ in FIG. 30), the OOBFBs are procedurally independent, assuming that statically lower numbered OOBFBs executing true have priority over following branches. For example, $I_1$ executing true inhibits the activation of $I_2$, as far as jumping to $I_2$'s target address is concerned.

All of the possible outcomes of the two OOBFSs' ($I_1$ and $I_2$ in FIG. 30) execution are shown in FIG. 3; in this truth table the branch conditions $C_k$ have one of four possible states:

1. T—the branch executes in the current cycle and its condition evaluates "true", i.e., the branch is to be taken;
2. F—the branch executes in the current cycle and its condition evaluates "false", i.e., the branch is not to be taken;
3. ale (already executed)—the branch fully executed in a previous cycle;
4. nye (not yet executed)—the branch is not yet fully executed, nor is it executing in the current cycle.

The output TA (target address) indicates one of three possible actions:

1. 1—jump is to be taken to the TA of OOBFB 1, IQ loading starts at that address;
2. 2—a jump is to be taken to the TA of OOBFB 2, IQ loading starts at that address;
3. F—no jumps are to be taken, execution of the code currently in the IQ continues.

Figures 30, 31:
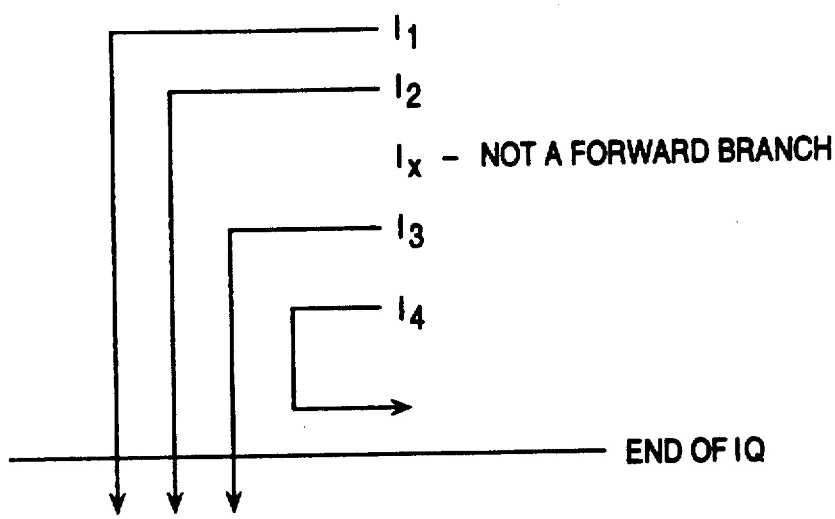
FIG. 30 is an illustration of OOBFB.
FIG. 31 is a diagram of the multiple OOBFB execution truth-table.

In the noted case in FIG. 31, branch 2 is statically previous to branch 1, and branch 1 is "not yet executed"(nye); therefore branch 2 cannot be allowed to execute true, as this would cause instruction 1 to be unexecuted (its condition untested), leading to erroneous results. In such a case, the execution state of branch 2 is reset so that it is evaluated again in another later cycle, and branch 2 is inhibited from being taken; therefore it is not completely executed.

The truth table can be expanded to include more than two OOBFBs; in such cases the statically previous OOBFBs have priority, as mentioned earlier. Logic an be realized from the truth table allowing all OOBFBs to conditionally execute in the same cycle. Only the statically most previous OOBFB executing true, and statically later OOBFBs executing false, are allowed to completely execute, however. Therefore, multiple OOBFBs may be executed concurrently.

Since structured code by definition consists of non-overlapped branches, FDs 2, 3, and 6 do not exist for structured code. In other words, the procedural dependencies extent for structured code are a proper subset of those existing in unstructured code. Thus it appears that more concurrent exists in structured code than in unstructured code. This does not mean that the algorithmic conversion from unstructured to structured code [61] results in faster code execution. It does mean that if HLL code (primarily of a structured nature) is converted to the model's machine code, constraining the machine code to be structured, more concurrent execution of the HLL code will likely result. Structured code may be used to advantage in realizing HLL statements.

SUPER ADVANCED EXECUTION DETAILS

The logic basically stays the same when SAE is used. Wherever a virtual execution (VE) terms occurs in the original logic, another term is OR'd with it indicating the pseudovirtual execution of certain instructions' iterations.

The regions of the AE matrix shown in FIG. 12 are calculated as follows. The BV and BVLS vectors indicate the horizontal boundaries of the regions delineated in the figure. The vertical region boundaries are given by the bit vector in inner loop (IIL) of length n. IIL is determined in a relatively static fashion using the contents of the backward branch domain (BBDO) matrix to set those elements of IIL that are within an inner loop's backward branch's domain. Taking the BV vector to be horizontal, with its elements' values extending vertically, and the IIL vector to be vertical, with its elements' values extending horizontally, then the various regions of FIG. 12 are calculated by various logical combinations of the intersections of the BV, BVLS, and IIL values.

Forward branches within inner loops (overlapped with the loop-forming backward branch) are allowed to conditionally execute in super advanced iterations, such that they are only allowed to completely execute false (branch not taken). If their conditions evaluate true, then they are not executed, nor is the AE matrix updated to show an execution. This keeps loops from prematurely terminating.

The following logic is used to compute the IIL elements:

ILI (Inner Loop backward branch indicator) is computed at each load cycle:

$$ILI=[\pi_{i=2}^{n}(BBDO_{i,new}+BBDO_{i,i})]\cdot BBDO_{new,new}$$

wherein:

new $=n+1$ $BBDO_{i,new}=1$ if $IQ_i$ is in new instruction's BB domain;

$BBDO_{i,i}=1$ if $IQ_i$ is a BB;

$BBDO_{new,new}=1$ if $IQ_{new}$ is a BB; and

ILI $=1$ iff the new instruction being loaded is an inner loop forming backward branch.

$IIL_i$ (Inner Loop indicators) are initialized to zero and computed at each load cycle for all i, where $2 \leqq i \leqq n+1$:

$$IIL_i=IIL_i+(ILI\cdot BBDO_{i,new})$$

The following logic computes (at each load cycle) indicators showing those instructions which are forward branches with targets out of an inner loop, also known as Out of Inner Loop Forward Branches:

for all i, where $2 \leqq i < n+1$:

$$OOILFB_i=IIL_{n+1}\cdot IIL_i\cdot FBD_{i,n+1}$$

The $BIL_i$ (Below Inner Loop) indicators are also computed at each load cycle:

for all i where $2 \leqq i \leqq n+1$:

$$BIL_i=[\Sigma_{j=1}^{n+1}IIL_j]\cdot \Sigma_{k=2}^{n+1}ILL_k$$

(All of the above indicators are nominally computed after the new (n+1) columns of the BBDO and FBD matrices have been computed.

Now, referring to FIG. 12, the matrix SAEVE indicates those instruction iterations (V and T) which would be considered to be virtually executed for Super Advanced Execution of instruction iterations marked "S" in the figure. Using row and column indexing:

for all i,j:

$$SAEVE_{i,j}=(BV_j\cdot IIL_i)+(BVLS_j\cdot BIL_i)$$

Similar logic, indicating just the V's is:

for all i,j:

$$PDSAEVE_{i,j}=BV_j\cdot IIL_i$$

The PDSAEVE indicators are OR'd with the AE and VE terms in the procedural independence calculating logic. The SAEVE and PDSAEVE indicators are computed by arrays of logic; their values only (potentially) change upon load cycles. For example, PDSAEVE is computed using a logic array with an AND gate at each intersection; each element of the column vector $\overline{IIL}$ is AND'd with each element of the row vector $\overline{BV}$ to generate the PDSAEVE matrix. The ones in this matrix are the "V" terms in FIG. 12. Note that $\overline{PDSAEVE}$ indicates those instructions allowed to execute, either normally or SAE.

The SAEVE indicators are used to modify the SEN and SFS logic for SAE, as follows:

for all i,j:

$$VETYP_{i,j}=BV_j\cdot IIL_i$$

Where $VETYP_{i,j}=1$, this indicates the "S" instruction iterations of FIG. 12. This VETYP matrix can also be computed using a logic array.

One technique then OR's the original $VE_s$ term in the SEN and SFS logic with:

$$(VETYP_{u}\cdot SAEVE_s)$$

where u and s are serial indices.

Alternatively, and in a preferred fashion, the original $VE_s$ terms in the SEN and SFS logic is OR'd with:

$$(\overline{BV}_{col(u)}\cdot SAEVE_s)$$

These modifications ensure that only "S" instruction iterations consider the "T" iterations to be virtually executed in SAE operation.

BRIEF DESCRIPTION OF THE "SIMCD"

Simulator Program and Documentation

The simcd program is a simulator of the hardware embodiment described in the specification. With appropriate input switch settings (described below), and a suitably encoded test program, the execution of the simulator causes the internal actions of the hardware to be mimicked, and the test program to be executed. The simulator program is written "C", the test programs are written in machine language.

The file simcd.doc contains descriptions of the switch settings and input parameters of the simulator. For the hardware embodiment described in the specification, dct=1, bct=4, n=32 (typically), m=8 (typically), parameters 5–8=32 or greater, IQ load type=1. The specification of the input code has not been included.

The basic operation of the simulator program is now described. Page numbers will refer to those numbers on the pages of the simcd54.c program listing. The first few pages contain descriptions of the data structures, in particular the dynamic concurrency structures of the hardware are declared on page 2 right; the name is dcs. Much of the 'main' ( ) routine, starting on page 4 left, is concerned with initialization of the simulated memory and other data structures.

The major execution loop of the simulator starts on page 5 right, 12th line down (the while loop). Each iteration of the loop corresponds to one hardware machine cycle. The first function executed in the loop is the 'load' ( ) function which loads instructions into the Instruction Queue, and also sets corresponding entries of the static concurrency structures. In many, if not most, cases, no instructions will be loaded, and the 'load' ( ) function will take 0 time (otherwise, the current cycle may have to be effectively lengthened). Continuing to refer to page 5 right, the next relevant code is in the section in case 1: of the 'switch' (ddct) construct. The next five function calls are the heart of the machine cycle simulation; the rest of the 'while' loop consists of output specification statements, which are not relevant to the application claims. In hardware, the actions of these functions would be overlapped in time, keeping the cycle time reasonable.

The first function, 'eidetr' ( ), is one of the most relevant sections of code; it starts on page 22 right. Its primary functions are to determine those instruction instances (iterations) eligible for execution in the current cycle, and for assignment instructions, to determine the inputs to each instruction instance. The first code in the function, page 22 right to page 23 right top, determines whether procedural dependencies have been resolved or not. The next small piece of code on page 23 right determines 'saeve' terms for use in the SEN (sink enable) calculations, allowing the super advanced execution by the hardware. The 'for' loop at the bottom of page 23 right, continuing on to page 24 left, computes the SEN pointers in an incremental fashion, to reduce simulation time. Next is the DD EI calculation, which determines the final data dependency executable independence of the instructions instances. There are some further relatively minor calculations on pages 24 right through 25 right, including the final determination of semantic executable independence, and the function ends.

The next function in the main loop is 'asex' ( ). In this function, those assignment instruction instances found to be ready for execution in eidetr ( ) are actually executed, with their results being written into the shadow sink matrix. The advanced execution matrix is also updated, indicating those instances which have executed.

The next major function is 'memupd' ( ), which is contained on page 29 right. First, a determination is made of which shadow sink registers are eligible for writing to main memory, i.e., the WSE calculations are made using the advanced storage matrix. Next, memory is updated with the eligible shadow sink values, using the addresses in instructions in address; and the advanced storage matrix is updated.

The next function is brex ( ) beginning on page 27 left. In this code, the appropriate branch tests are made (very possibly more than one per cycle), and branches out of the Instruction Queue are handled.

The last major function is the 'dcsupd' ( ) function, which starts on page 29 right bottom. The dynamic concurrency structures are updated as indicated by branch executions. Also, fully executed iterations, in which the advanced execution and advanced storage matrix columns corresponding to that iteration and all those earlier that have all ones in them, are retired, making room for new iterations to be executed.

All the major functions in the primary loop of the simcd54.c simulator program have been described. The loop continues until a special "end-of-simulation" instruction is encountered in the test program.

Appendix 1

SOURCE CODE LISTING

FOR SIMULATOR simcd.doc

```
The first part of this file gives the command line specs for running
        simcd. The second part describes the input parameters to simcd
        (these are read by simcd via stdin). (dct and pct are explained
        in the second part.) The third part contains some miscellaneous
        notes on the simulator.


First Part - simulator command line:

    (Notation: <...> necessary item
               [...] optional item)


    simcd <input file> <output file> [switches]

  In other words:

    simcd <input file> <output file> [-b] [-c <cycle number>] [-d] \
        [-h <hist file>] [-m] [-r] [-s] [-t <trace file> <cycle number>] [-v]

    Argument descriptions:
        <input file>: CONDEL hex code ( .cdh file); this is essentially the
                machine code of the program to be simulated.

        <output file>: simulation results (normal file extension:  .res);
                This file is written at the end of simulation. It contains
                a summary of the simulation, including execution times,
                memory traffic inforamtion, and an optional CONDEL memory dump
                which is normally used to check for correct simulated program
                output results.

        [switches]:
            -b : background; suppresses most output messages

            -c <cycle number> : cycle limit. Causes the simulator to
                gracefully abort when cycle <cycle nmuber> is reached, sending
                a trace snapshot to stderr, as well as generating the usual
                <output file>.

            -d  : dump. Include memory dump in <output file>. The limits of
                the dump are specified in the input parameters.

            -h <hist file> : histogram. Generates pseudo-histogram (bins)
                of <input file> execution, (like a profile); a list of
                instruction addresses and the number of times they were
                executed is placed into <hist file>.
                Normal file extension:    .hst

            -m : medium trace. Causes a fair amount of information to be sent
                to stdout each cycle during execution of <input file>, so add
                "> <medium trace file>" to command line to save the trace
                results. Not recommended for simultaneous use with the "-r"
                switch.
                Normal file extension:    .mtc

                The information dumped to stdout is:
                    Header: usual preamble, including simulation
                        parameters.
                    For each cycle:
                        Cycle number;
                        First section:
                            First column group: Contains the addresses of
                                the instructions in the instruction queue.
                            (Remaining column groups contain n X m elements,
                                each element corresponding to an element in
                                the AE matrix, for dct=1 or 2; for dct = 3,
                                the group size is n X 1, as only one
                                instruction per IQ row may execute in a cycle).
                            Second column group: Executably Independent
                                matrix. Indicates which instruction iterations
                                were executed in the cycle (one exception;
                                see third column group).
                            Third column group: UPdate INhibit matrix.
                                Indicates, for out-of-bounds forward branches,
                                which ones are not to be marked as executed
                                (potentially allowing them to execute again);
                                if set, negates the effect of the corresponding
                                EI element being set.
                            Fourth column group: Write Sink Enable logic output
                                matrix. Indicates which Shadow Sinks were
                                written to a memory address in the current
                                cycle; not of interest when dct=3.
                            Fifth column group: Branch EXecution Sign logic
                                matrix. Indicates how the corresponding branch
                                instruction iteration is to execute in the
                                cycle: 1 => branch taken, 0 => branch not taken

                        Second section; in each case, the number given is for
                                the current cycle only:
                            First row:
                                Total number of word reads.
                                Total number of word writes.
                                Physical memory reads.
                                Physical memory writes.
                            Second row:
                                Register reads.
                                Register writes.
                                Load sub-cycles.
                                AE horizontal shifts.
                            Third row:
                                Word reads for instruction fetches into the IQ.
                                The value of "b" at the end of the cycle.
                                CALLs expanded.
                                RETURNs expanded.

            -r  : reduced trace. Causes a reduced execution trace of
                <input file> to be sent to stdout, therefore add
                "> <red. trace file>" to command line to save the trace
                results.
                Normal file extension:    .rtc

            -s  : suppress messages. Suppresses messages requesting input
                parameters; normally used with either the following addition to
                the command line: "< <parameter file>", or, within a shell
                script (see condel/gpbmk/gpsim): "<< parend" followed by a
                list of parameters and "parend".
                Normal file extension:  NONE ( .par preferred, when used)

            -t <trace file> <cycle number> : trace (detailed).
                Causes detailed execution trace information of <input file>
                to be dumped into the <trace file>, starting with cycle
                <cycle number>, for a total of 10 (resp. 4) cycles with
                dct=3 (resp. 1 or 2). Normally, the entire contents of all
                (or most) of the concurrency structures is given each cycle,
                in 132 column format. When the Instruction Queue length is
                greater than 19, the output is restricted. The information
                is labeled, so is hopefully self-explanatory (with the thesis
```

2 simcd.doc

```
        as a guide).
        Normal <trace file> extension:   .trc

     -v  : verbose. Causes many messages to be output during a
        simulation, many useful for simcd debugging.


Second Part - simcd Input Parameters.
    These parameters must be supplied in the order given to stdin when
        simcd is invoked. If the -s switch is not set, prompting
        messages will be sent to stdout.

    [...]   contain acceptable values; other values entered will be
        detected and not allowed to propagate.

    1) dct (or ddct) (Data Dependency Check Type) [1-3]
        1 - equivalent to Data Concurreny Type 3 in Uht's writings;
              minimal data dependencies are enforced, and Super
              Advanced Execution is used.
        2 - equivalent to Data Concurreny Type 2 in Uht's writings;
              minimal data dependencies are enforced; no Super
              Advanced Execution is allowed.
        3 - equivalent to Data Concurreny Type 1 in Uht's writings;
              this enforces the most restrictive set of data
              dependencies.

    2) bct (or bdct) (Branch Dependency Check Type) [1-4]
        1 - equivalent to Procedural Concurrency Type A in Uht's
              writings; maximally restrictive procedural
              dependencies are enforced.
        2 - OBSOLETE: DO NOT USE
        3 - equivalent to Procedural Concurrency Type B in Uht's
              writings; minimally restrictive procedural
              dependencies are enforced.
        4 - equivalent to Procedural Concurrency Type C in Uht's
              writings; same as 3, but CALLs and RETURNs are
              conditionally expanded, and multiple out-of-bounds
              forward branches may be executed.

    3) n (Instruction Queue (IQ) length) [1-130] <- NOT 1000! See me
        if this is a problem. Set to 1 to simulate sequential
        execution.

    4) m (Advanced Execution matrix width) [1-32]

    5) NAS (maximum Number of Assignment Statements allowed to execute
        per cycle; = # of PEs) [1-1000]
        Set to 1000 for unlimited resource simulations.

    6) NFB (maximum Number of Forward Branches allowed to execute
        per cycle; = # of PEs) [1-1000]
        Set to 1000 for unlimited resource simulations.

    7) NBB (maximum Number of Backward Branches allowed to execute
        per cycle; = # of PEs) [1-1000]
        Set to 1000 for unlimited resource simulations.

    8) NTB (maximum Total Number of Branches allowed to execute
        per cycle; = # of PEs) [1-1000]
        Set to 1000 for unlimited resource simulations.

    9) NREG (Number of registers) [0-1024] <- normally set to 256.
        Accesses to addresses below 4*NREG are counted as register
        accesses; those above as physical memory accesses.

    10) memory dump lower limit address, in hex [0-9C40]
        Only necessary when the -d switch is set.

    11) memory dump upper limit address, in hex [0-9C40]
        Only necessary when the -d switch is set.

    12) IQ load type [1-2]
        1 - standard: unexecuted BB domains held in IQ until the
              corresponding BBs are fully executed.
        2 - unexecuted BB domains not given special treatment.

        Notes: BB - backward branch

        This parameter is optional. The default value is 1.


Third Part - other points of interest:

    - Simulation time is proportional to n**2 for dct=3, and (nm)**2 for
        dct=1 or 2, so be careful.

    - Current maximum simulated memory size is 10000 32-bit words (byte
        addressable). This can be altered easily (by yours truly).

    - All programs start at 1000 (hex).

    - The Data Base Address register points to 40 (hex) initially.

    - The current version number of simcd.c is 5.1/8
```

simcd54.c

```
/* CONDEL Simulator, Version 2.0 (the first never really existed) */
/* 3/27/84  -Created V. 2.0  -A.K. Uht */
/* 4/8/84   -V. 2.1; n=1,5,20-bcdbin.cdh working version, */
/*              output redirected  -A.K. Uht */
/* 4/10/84  -V. 2.2; bct-1-improved loading, corrected output, */
/*              added specifiable limit on total Bs exec. per cycle */
/*              -A.K. Uht */
/* 4/29/84  -V. 2.3; corrected bb aeupd and dddet bugs; */
/*              changed ae update order to AS, FB, BB; */
/*              FB update looks at static AELZ; -A.K. Uht */
/* 5/4/84   -V. 2.4; corrected n > 30 bug (IQ length); */
/*              changed .e input code interpretation; -A.K. Uht */
/* 5/9/84   -V. 2.5; corrected bb AE mods for aemax case; -A.K. Uht */
/*              modified AE column retiring to allow removal of eligible */
/*              columns anywhere in the AE matrix; -A.K. Uht */
/* 8/8/84   -V. 3.0; added new branch instructions, allowing flexible */
/*              condition testing; -A.K. Uht */
/* 8/11/84  -V. 3.1; modified array access instructions, so that on word */
/*              accesses, the index is shifted left by two bits to */
/*              convert it to a word boundary address; */
/*      NOTE: All input code written before this date and using array word */
/*              accesses will no longer work properly. -A.K. Uht */
/* 8/18/84  -V. 3.2; added Branch Concurrency Type (bct) 3- unstructured */
/*              concurrent execution of the input code; added user- */
/*              specifiable cycle start number for trace output; -A.K. Uht */
/* 8/21/84  -V. 3.3; added -h switch, generates pseudo histogram output, */
/*              requires command line file specification after switch; */
/*              -A.K. Uht */
/* 8/24/84  -V. 3.4; added fbbbddet routine to catch I-FB-BB PDs; */
/*              added -r (for reduced trace) switch, traces instr. */
/*              execution, output to stdout; -A.K. Uht */
/* 8/29/84  -V. 3.5; fixed aeset() bug; -A.K. Uht */
/* 11/26/84 -V. 3.6; changed algorithm to put PD 3s into PBBDE instead */
/*              of DDE (DD); -A.K. Uht */
/* 3/11/85  -V. 4.0; fixed call, return code; added multiple out-of- */
/*              bounds FB execution code; added dummy instr. */
/*              execution; -A.K. Uht */
/* 3/20/85  -V. 4.1; added peak memory bandwidth counters; fixed */
/*              byte accessing; fixed hist, redtrc counts; -A.K. Uht */
/* 3/27/85  -V. 4.2; fixed getsimp(), added warning message; */
/*              fixed bct-1 bug; -A.K. Uht */
/* 3/30/85  -V. 4.3; fixed OOBFB (iafe) bug; -A.K. Uht */
/* 3/31/85  -V. 4.4; fixed BBDO generation potential bug (for recursive */
/*              procedures); -A.K. Uht */
/* 4/9/85   -V. 4.5; fixed limited AE width (m) bug; -A.K.Uht */
/* 5/27/85  -V. 5.0; reduced data dependencies option added; -A.K. Uht */
/* 6/10/85  -V. 5.1; super-advanced execution fixed; -A.K. Uht */
/* 7/11/85  -V. 5.2; optimized code; added cycle limit switch and */
/*              parameter; -A.K. Uht */
/* 7/23/85  -V. 5.3; fixed bugs; added simcd execution time output; */
/*              -A.K. Uht */
/* 7/24/85  -V. 5.4; expanded SAE virtual ex. range; -A.K. Uht */
/* 8/9/85   -V. 5.5; bugs fixed; -A.K. Uht */
/* 8/17/85  -V. 5.6; added -m (medium trace) code and switch; more */
/*              optimization; added time stamp and directory expansion */
/*              to output; fixed minor SAE bug (more like an unwanted */
/*              feature); fixed reduced trace bug; -A.K. Uht */
/* 8/21/85  -V. 5.7; fixed potential bug in OOBFB TAEN and UPIN; as of 8/20 */
/*              has successfully simulated all ddct and bct combinations */
/*              with n=16, m=4 of the standard GP benchmark set; -A.K. Uht */
/* 8/30/85  -V. 5.8; fixed SAE bugs occurring with n=32, m=2 (se la vie); */
/*              -A.K. Uht */
/* 9/1/85   -V. 5.9; added IQ load type switch, for not holding BB domains */
/*              ONLY TESTED FOR bct=1; added bexs ouput to med. trace; */
/*              -A.K. Uht */
/* 9/3/85   -V. 5.10; added saeve mechanism to procedural dependency */
/*              calculations; -A.K. Uht */
/* 10/15/85 -V. 5.11; fixed bug in calculation of PEI for bct=1, dct=1 or */
/*              2; caused poor performance in those modes; -A.K. Uht */
/* 1/23/87  -V. 5.12; moved arrays local to eldetr() to global memory; */
/*              original set caused stack overflow during compile on a */
/*              Sun 3/50; -A.K. Uht */
/* 6/3/87   -V. 5.13; increased IQ length limit to 165 from 130, fixed */
/*              getsimp() check on IQ limit; -A.K. Uht */
/* 9/30/88  -V. 5.14; changed loading hardware to allow for movtaw to use */
/*              immediate operand for A operand; -A.K. Uht */
/* 9/30/88  -V. 5.15; fixed 5.14, added bit 17 in opcode for lengths 8 and */
/*              16 to fully specify immediate operands; -A. K. Uht */
/* 3/11/89  -V. 5.16; changed initilization of IQ in flushiq() for dct=1; */
/*              now only first column of AE, VE, and AST are set to 1; */
/*              this bug caused reduced performance on loops whose size */
/*              was less than iqs, if they were loaded right after an */
/*              initialization; -A.K. Uht  */
/* 5/6/89   -V. 5.17; fixed iqnew() bugs which caused incorrect "flag" */
/*              fields to be entered for branches and no-ops; caused */
/*              an elcerr of 29 (more than one 1 in a SEN); -A.K. Uht */
/* 12/15/89 -V. 5.18; added left shift function (lshft) to bypass bug */
/*              of Sun 4/60 &/or its cc compiler; - A.K. Uht */

/* Copyright (c) 1984, 1985, 1987, 1988  Augustus Kinzel Uht */
/*      For a clearer understanding of how this program functions, see */
/* the papers in /usr/gus/condel/doc, in particular ir*.mss & tp.mss. */

#include <stdio.h>      /* I/O routines */
#include <sys/time.h>   /* timing, resource usage code */
#include <sys/resource.h>
#include <sys/types.h>  /* for real time stamp */
#include <sys/timeb.h>

#include "opcdcd.c"     /* include CONDEL opcodes */

/* Conditional compilation switch for testing. As of 7/15/85 forces */
/*      Sink ENables to be calculated for all iterations when it is set. */
/*      This is now the default mode (7/23/85). */
#define TEST 1

/* constants */
#define simver1 5       /* simcd version numbers; first digit */
#define simver2 18      /*      second digit */

#define msbmsk  0x80000000
#define lsbmsk  0x1
#define ms      10000   /* max size of memory (in 32-bit words) */
#define mmax    ms-1    /* max address of memory (        "    ) */
#define iqmax   165     /* max size (length) of Instruction Queue (IQ) */
#define aewmax  32      /* max width of AE (,etc.) matrices */
#define sermax  iqmax*aewmax /* max serial size (n*m) */
#define pcstart 0x1000  /* all programs start at this byte address */
#define dbastart 0x40   /* initial data base address */
#define csjwmax (((iqmax+2)/32)+1) /* max. word width of concur. struct. */
#define allz    0x0     /* all zeros */
#define allo    ~0x0    /* all ones */
#define cswl    32      /* concurrency structures word length */


/* MACROS */
/* return n bits from x starting at bit p, and going to the right */
#define getbits(x,p,n)  ((x>>(p+1-n)) & ~(~0<<n))
```

2 simcd54.c

```
#define calw(coll)      ((coll-1)/cswl)  /* calc. word # of col */

#define calb(coll)      ((cswl-1)-((coll-1)%cswl))  /* calc. bit # of col */

/* read csn(row, col(bit)) */
#define csrd(csn,r,c)   (getbits(cs[csn][r][calw(c)],calb(c),1))

/* returns serial index for row r and col. c indices (rect.) */
#define ser(r,c)   (r+((c-1)*iqs))

/* return row index of serial index */
#define row(serindex)   (1+((serindex-1)%iqs))

/* return column index of serial index */
#define col(serindex)   (1+((serindex-1)/iqs))

/* read dyn. conc. struct. at row r col. c */
#define dcsrd(dcsno,r,c)   (dcs[dcsno][ser(r,c)])

/* write dyn. conc. struct. at row r col. c */
#define dcswr(dcsno,r,c,data)   (dcs[dcsno][ser(r,c)]=data)

/* LOOK AHEAD TO cs[][][] DEFINITION FOR dd() MACRO */



/* global arrays */
static unsigned int m[ms];      /* code and data memory */
static int hist[ms];    /* histogram memory */

struct instrqueue{
    unsigned int res;   /* result operand (A) */
    unsigned int op[2]; /* input operands (B, C) */
    unsigned int flg;   /* flags */
                        /* bit 0 - don't compare op[0] */
                        /* bit 1 -   "      "    op[1] */
                        /* bit 2 -   "      "    res */
                        /* bit 3 -   "      "    ta  */
                        /* bit 4 - op[0] spec. (0-name, 1-immediate) */
                        /* bit 5 - op[1]     "      "        "       */
                        /* bit 6 - res       "      "        "       */
                        /* bit 7 - this instr. dep. on all previous instr. */
    unsigned int ae;    /* Advanced Execution vector */
    unsigned int addr;  /* instruction address (byte) */
    unsigned int opc;   /* opcode - reduced version (least sig. 7 bits) */
    unsigned int ta;    /* Target Address */
    unsigned int dba;   /* Data Base Address used with this instruction */
    unsigned int mpb;   /* Most Previous Branch - used when bct=1 */
};

static struct instrqueue iq[iqmax];     /* IQ */


/* Define the static concurrency structures. */
static unsigned int cs[16][iqmax][cswmax]; /* concurrency structures */
        /* 0 - DD - all Data Dependencies */
        /* 1 - FBD - Forward Branch Domain/Dependencies */
        /* 2 - BBDO - Backward Branch DOmains */
        /* 3 - PBBDE - Previous BB DEpendencies */
        /* 4 - IE (Iteration Enabled) */
        /* 5 - CBB (Chained Backward Branches, used when bct=3) */
    /* The following structures are only used with reduced data */
/*      dependencies - ddct=1 or 2 */
        /* 6 - OFBDE - Overlapped FB DEpendencies alone */
        /* 7 - DDE1 - the next five are the component DDs */
        /* 8 - DDE2 */
        /* 9 - DDE3 */
        /* 10- DDE4 */
        /* 11- DDE5 */
        /* 12- DD1 - the next four are the mapped DDs (from DDEs) */
        /* 13- DD2 */
        /* 14- DD3 */
        /* 15- DD4 */
/* define cs address constants */
#define dde     0
#define fbd     1
#define bbdo    2
#define pbbde   3
#define ie      4
#define cbb     5
#define ofbde   6
#define dde1    7
#define dde2    8
#define dde3    9
#define dde4    10
#define dde5    11
#define dd1     12
#define dd2     13
#define dd3     14
#define dd4     15
#define ddbase  (dd1-1)

/* OUT-OF-PLACE MACRO */
/* read DD matrix arno at row r column c */
#define dd(arno,r,c)   (csrd((ddbase+arno),r,c))



/* Define the dynamic concurrency structures. These are only used with */
/*      ddct=1 or 2, and are realized in a serial (vector) format. */
static unsigned int dcs[7][sermax];     /* dynamic concurrency structures */
        /* 0 - AE - Advance Execution matrix */
        /* 1 - RE - Real Execution */
        /* 2 - VE - Virtual Execution */
        /* 3 - AST - Advanced STorage */
        /* 4 - ISA - Instruction Sink Address */
        /* 5 - SSI - Shadow Sinks */
        /* 6 - BWI - Byte Write Indicator */
                /* 0 - word write */
                /* 1 - byte write */
/* Define dcs address constants. */
#define AE      0
#define re      1
#define ve      2
#define ast     3
#define isa     4
#define ssi     5
#define bwi     6
static unsigned int dcsnew[7][aewmax]; /* these are the new rows of the dcs */
        /* structures; they are of width m (aew) */

static int aelz[iqmax]; /* AE leftmost zero vector */
static int aero[iqmax]; /* AE rightmost one vector */
static int ife[iqmax];  /* Instruction Fully Executed */
static int iafe[iqmax]; /* Instruction Almost Fully Executed */
static int nddi[sermax];        /* no data dependancy inhibitions */
```

simcd54.c

```
static int nfbdi[sermax]; /* " FB        "        "        */
static int nbbdi[sermax]; /* " BB        "        "        */
static int noobbi[sermax]; /*" oobb inhibitions */
static int nrei[sermax];  /* executably independant, ignoring resource dep. */
static int nrasei[sermax]; /*      "          "     ASs,  "     "   "   */
static int nrfbei[sermax]; /*      "          "     FBs,  "     "   "   */
static int nrbbei[sermax]; /*      "          "     BBs,  "     "   "   */
static int asei[sermax]; /*      "          "     ASs, including all dep. */
static int fbei[sermax]; /*      "          "     FBs,     "      "   "   */
static int bbei[sermax]; /*      "          "     BBs,     "      "   "   */
static int ei[sermax]; /*      "          "  Instr.,     "      "   "   (4.0 ) */
static int oobbeif[sermax]; /* oobb ei flags */
static int oobbben[sermax]; /* oobbb enable flags (only one should be set (4.0) */
static int bexs[sermax]; /* branch execution status (0-not taken; 1-taken) */
static int taen[iqmax]; /* target address enable, for oobfb execution (4.0) */
static int upin[sermax]; /* AE UPdate INhibit, for oobfb execution (4.0) */
static int wse[sermax]; /* Write Sink Enable (5.0) */
static int sfs[3][sermax]; /* Source From Storage (5.0) */
static int sen[3][sermax]; /* Sink ENable for sources 1 and 2 (5.0) */
static int elcol[aewmax+1]; /* eligible-column-for-retiring indicators (5.0)*/
static int arri[sermax]; /* array read instruction indicators (5.0) */
static int arwi[sermax]; /* array write instruction indicators (5.0) */
static int bv[aewmax+1]; /* b vector; all bv[i]=1 | i<=b (5.0) */
static int bvls[aewmax+1]; /* = bv left shifted by one position (5.0) */
static int iil[iqmax]; /* Inside Inner Loop indicators; only for SAE; (5.1) */
static int saeve[sermax]; /* super-advanced execution virtual exec. (5.1) */
static int bil[iqmax]; /* Below Inner Loop indicators; only for SAE; (5.3) */
static int ooilfb[iqmax]; /* Out of Inner Loop FB; used for SAE; (5.5) */

/* arrays originally local to eldetr(); they overflowed the stack on the Sun */
static unsigned int exstatr[sermax];    /* execution status */
static unsigned int aes[sermax];  /* a modified version of AE; see the Doc. */
static unsigned int vet[sermax];  /* virtual execution terms - for ddct==2, */
                /* are just = VE; for ddct==1, SAE-VE is used */
static unsigned int vetyp[sermax]; /* virtual execution type; used */
                                   /*     with SAE calc. on a per iteration */
                                   /*     basis */
static unsigned int temp1[sermax];       /* temps for ddve calculations */
static unsigned int temp2[sermax];       /* temps for sent calculations */
static unsigned int pdsaeve[sermax]; /* saeve for procedural dependencies */


/* global variables */
static int b;   /* the infamous bi (iteration counter for AE matrix) */
static int codmax;       /* first free m location */
static int pcmax;        /* first free address space location */
static int pc;           /* program counter */
static int dba;          /* data base address */
static int tos;          /* top of stack (stack builds downward) */
static int ompb;         /* old most previous branch */
static int mpb;          /*        "        "        "   */
static long *clock;      /* pointer to real time indicator */
static long clkst;       /* storage for real time indicator */
static char *timday;     /* string giving real time */
static char *cdp;        /* string containing current directory pathname */
static char cdpst[1024]; /* storage for cdp */

/* counters */
static int ldcnt;        /* load cycle count */
static int ldscnt;       /* load sub-cycle count */
static int ldscntac;     /*    "    "    "   per cycle count */
static int stacklkc;     /* stack read count */
static int tpopc;        /* total stack pops */
static int tmemrdc;      /* total memory word read count */
```

```
static int tmemwrc;      /*   "    "    "  write  "   */
static int tmbrdc;       /*   "    "   byte read  "   */
static int tmbwrc;       /*   "    "    "  write  "   */
static int memrdc;       /* main   "   read count */
static int memwrc;       /*   "    "   write  "   */
static int regrdc;       /* register read count */
static int regwrc;       /*    "    write  "   */
static int tmemrdcc;     /* total memory word read count in the cycle (4.1) */
static int tmemwrcc;     /*   "    "    "  write  "  in the cycle (4.1) */
static int memrdcc;      /* main   "   read count in the cycle (4.1) */
static int memwrcc;      /*   "    "   write  "  in the cycle (4.1) */
static int regrdcc;      /* register read count in the cycle (4.1) */
static int regwrcc;      /*    "    write  "  in the cycle (4.1) */
/* peak counts below are measured over one execution cycle */
static int tmemrdcp;     /* total memory word read count, peak (4.1) */
static int tmemwrcp;     /*   "    "    "  write  " , peak (4.1) */
static int memrdcp;      /* main   "   read count, peak (4.1) */
static int memwrcp;      /*   "    "   write  " , peak (4.1) */
static int regrdcp;      /* register read count, peak (4.1) */
static int regwrcp;      /*    "    write  " , peak (4.1) */
static int aspec;        /* AS processing element count */
static int fbpec;        /* FB    "    "    "   */
static int bbpec;        /* BB    "    "    "   */
static int tbpec;        /* Tot. B "    "    "   */
static int aeshc;        /* AE shift left count */
static int aeshcc;       /* AE shift left count, per cycle (5.6) */
static int cno;          /* instruction cycle number (count) */
static int asexmax;      /* max. ASs executed per cycle */
static int fbexmax;      /*  "   FBs    "    "    "   */
static int bbexmax;      /*  "   BBs    "    "    "   */
static int tbexmax;      /*  " Tot. Bs  "    "    "   */
static int ifc;          /* instruction fetch count */
static int ifmrc;        /*      "      "  memory read count */
static int ifmrcc;       /*      "      "  memory read count in the cycle (4.1) */
static int ifmrcp;       /*      "      "  memory read count, peak (4.1) */
static int bmax;         /* max. b valua reached */
static int oobbtcnt;     /* oobb executed true count (4.0) */
static int oobbcnt;      /* oobb executed count (4.0) */
static int retexc;       /* RETURN expansion count (5.6) */
static int callexc;      /* CALL expansion count (5.6) */
static int retexcc;      /* =retexc, per cycle (5.6) */
static int callexcc;     /* =callexc, per cycle (5.6) */

/* misc. flags */
static int endsimf;      /* end simulation flag, set in asex() */
static int oobbexf;      /* out-of-bounds branch executed */
static int oobbextf;     /* out-of-bounds branch executed true flag: */
static int oobfbexf;     /* out-of-bounds FB executed */
static int oobbbexf;     /* out-of-bounds BB executed */
static int oobbbnxf;     /* out-of-bounds BB in IQ(iqs)(=n) executed */
static int oobbta;       /* oobb target address */
static int oobbbf;       /* oob BB loaded flag */
static int exflg;        /* exit instruction encountered flag */
static int aemaxflg;     /* AE capacity limited flag */

/* parameters */
static int csis;         /* cs row dimension */
static int csjs;         /* cs column dimension */
static int csjws;        /* cs    "     "    in words */
static int regno;        /* number of 32-bit registers */
static int new;          /* new instruction number (= iqs + 1) */
static int aspeq;        /* AS processing elements available (quantity) */
static int fbpeq;        /* FB    "    "    "    "   */
static int bbpeq;        /* BB    "    "    "    "   */
```

4 simcd54.c

```
static int tbpeq;       /* Tot. B "         "         "        "     */
static int mdll;        /* memory dump lower limit */
static int mdul;        /*    "     "  upper   "   */
static int iqs;         /* IQ size (length) */
static int aew;         /* AE width */
static int ddct;        /* data dependancy check type (see getsimp()) */
static int bct;         /* branch     "       "     "     "      "    */
static int ldt;         /* IQ load type (see getsimp()) (5.9) */
static int trace;       /* trace flag (see getsimp()) */
static int trcstrt;     /* start trace output at this cycle number */
static int trcend;      /* end trace output at this cycle number - 1 (5.0) */
static int mdump;       /* memory dump flag  "    "    */
static int sprompt;     /* suppress prompts flag */
static int back;        /* "background" indicator; =1-suppress runtime mess */
static int verbose;     /* =1-print extra runtime messages */
static int histgram;    /* =1 - take histogram of instruction execution */
static int redtrc;      /* reduced trace; gives instruction exec. on stdout */
static int medtrc;      /* medium trace; puts IQ addr, EI, WSE, cycle */
                        /*       counters, etc., on stdout (5.6) */
static int cyclim;      /* limit on # of execution cycles permitted (5.2) */
static char *ifnp;      /* input file name pointer */
static int nm;          /* serial limit (number of iterations active) */


/* functions */

main(argc,argv)
int argc;        /* number of arguments */
char *argv[];    /* argument pointer table */
{
    /* file pointers */
    FILE *ifp, *fopen();        /* input file (containing hex machine code) */
    FILE *tfp, *fopen();        /* trace output file */
    FILE *ofp, *fopen();        /* results output file */
    FILE *hfp, *fopen();        /* pseudo-histogram output file */
    FILE *fp;                   /* mtout file pointer */

    char *s;
    int abtsim;         /* abort simulation flag */
    int simerr;         /* simulation error flag */
    char *ctime();      /* give the convert time function the right type */
    long time();        /* give the time function the right type */

    cno=0;      /* init cycle number */
    abtsim=0;   /* no abort */
    simerr=0;   /* no error */
    cyclim=0;   /* no cycle limit */

    /* get time stamp */
    clock= &clkst;      /* point to real storage */
    time(clock);
    timday = ctime(clock);

    /* get directory path name */
    cdp=cdpst;  /* have cdp point to adequate storage */
    if (getwd(cdp)== -1) cdp="[getwd: error]";

    /* read in command line, open files, set switches */
    if (argc==1){
        fprintf(stderr,"simcd: No input file specified.\n");
        abortnt();
    }
    else{
        /* open input file */
        argc--;
        if ((ifp=fopen(*++argv, "r"))==NULL){
            errop(*argv);
            abortnt();
        }
        else {
            ifnp=(*argv);       /* save pointer to input file name */
            /* check for output file specifier */
            if (argc==1){
                fprintf(stderr,"simcd: No output file specified.\n");
                abortnt();
            }
            else{
                /* open input file */
                argc--;
                if ((ofp=fopen(*++argv, "w"))==NULL){
                    errop(*argv);
                    abortnt();
                }
            }

            /*check switches, open appropriate files */
            while (--argc>0 && (*++argv)[0]=='-'){
                for (s=argv[0]+1; *s!='\0'; s++){
                    switch (*s){
                        case 'b':
                            back=1;
                            break;

                        case 'c':
                            if ((argc--)==1){
                                fprintf(stderr,"simcd: No cycle limit specified.\n");
                                abortnt();
                            }
                            else cyclim=numcon(*++argv);
                            break;

                        case 'd':
                            mdump=1;
                            break;

                        case 'h':
                            histgram=1;
                            if ((argc--)==1){
                                fprintf(stderr,"simcd: No histogram file specified.\n
                                abortnt();
                            }
                            else {
                                if ((hfp=fopen(*++argv,"w"))==NULL){
                                    errop(*argv);
                                    abortnt();
                                }
                            }
                            break;

                        case 'm':
                            medtrc=1;
                            break;

                        case 'r':
                            redtrc=1;
                            break;
```

simcd54.c

```
                case 's':
                    sprompt=1;
                    break;

                case 't':
                    trace=1;
                    if ((argc--)==1){
                        fprintf(stderr,"simcd: No trace file specified.\n");
                        abortnt();
                    }
                    else {
                        if ((tfp=fopen(*++argv,"w"))==NULL){
                            errop(*argv);
                            abortnt();
                        }
                        else {
                            if ((argc--)==1){
                                fprintf(stderr,"simcd: No trace start number spe
cified.\n");
                                abortnt();
                            }
                            else {
                                trcstrt=numcon(*++argv);
                            }
                        }
                    }
                    break;

                case 'v':
                    verbose=1;
                    break;

                default:
                    fprintf(stderr,"simcd: Illegal option: %c.\n",*s);
                    abortnt();
                    break;
                }
            }
        }
    }
}

if ((back==0) || (medtrc==1)){
    printf("CONDEL Simulator Version %d.%d\n", simver1, simver2);
    printf("\tInput file:   %s/%s\n",cdp,ifnp);
}

getsimp();          /* get simulation parameters */

if ((back==0) || (medtrc==1)){
    /* print input parameters */
    fp=stdout;
    printf("\tSimulation start time:    %s",timday);
    printf("\n");
    fprintf(fp,"Input Parameters:\n");
    fprintf(fp,"\tIQ length (n)= %-5d\t\tAE width= %-5d\n",iqs,aew);
    fprintf(fp,"\tFBs exec./cycle= %-5d\t\tBBs exec./cycle= %-5d\n",fbpeq,bbpeq);
    fprintf(fp,"\tASs exec./cycle= %-5d\t\tBs exec./cycle= %-5d\n",aspeq,tbpeq);
    fprintf(fp,"\tPD check type (1-std., 2-SC conc., 3-UC conc., 4-UC ext.)= %-2d\n"
,bct);
    fprintf(fp,"\tDD check type (3-std., 2-red. DD w/o SAE, 1-red. DD w/SAE)= %-2d\n
",ddct);
    fprintf(fp,"\tIQ load type (1-std., 2-BB domains not held)= %-2d\n",ldt);
    fprintf(fp,"\tNo. of registers= %-5d\n",regno);
    fprintf(fp,"\n");
}

codmax=rdcd(ifp);   /* read hex code into m */
pcmax=codmax<<2;    /* set pc limit */

init();             /* initiliaze structures, etc. */

/* Time to simulate!! (finally...) */
prfb("Crunching....\n");

while ((pc<pcmax) && (endsimf==0) && (abtsim==0)){
    cno++;          /* update cycle counter */

    /* clear per cycle counters */
    tmemrdcc=tmemwrcc=memrdcc=memwrcc=0;
    regrdcc=regwrcc=ifmrcc=aeshcc=0;
    callexcc=retexcc=0;

    load();         /* load IQ */
    prfv("\tload\n");

    switch (ddct){
        case 3:
            /* normal (restrictive) data dependencies cycle */
            eldet();        /* determine instructions to be executed */
            prfv("\teldet\n");

            brex();         /* execute branches */
            prfv("\tbrex\n");

            aeupd();        /* update ae, b */
            prfv("\taeupd\n");

            asex(); /* execute ASs */
            prfv("\tasex\n");

            break;

        case 1:
        case 2:
            /* reduced data dependencies cycle */
            eldetr();       /* determine instructions to be executed */
            prfv("\teldetr\n");

            asex(); /* execute ASs */
            prfv("\tasex\n");

            memupd();       /* memory update (writing sinks to memory) */
            prfv("\tmemupd\n");

            brex();         /* execute branches */
            prfv("\tbrex\n");

            dcsupd();       /* update dynamic conc. structures */
            prfv("\tdcsupd\n");

            break;

        default:
            fprintf(stderr,"simcd: Illegal DD spec. in basic cycle.\n");
            abortnt();
            break;
    }
```

6 simcd54.c

```
        if ((trace==1) && (cno>=trcstrt) && (cno<trcend)){
            tout(tfp);  /* output trace of execution */
            prfv("\ttout\n");
        }
        if ((trace==1) && (cno==(trcend-1))) fclose(tfp);
        if ((back==0) || (medtrc==1))
                printf("cycle %d\n",cno);  /* indicate execution cycle */

        /* output medium trace, if asked for */
        if (medtrc==1) mtout(stdout);

        /* cycle limit check */
        if ((cno>=cyclim) && (cyclim>0) && (endsimf==0)) abtsim=1;
    }
    prfb("\n"); /* clean up */

    /* simulation over; output results */
    if ((trace==1) && (cno<(trcend-1))) fclose(tfp);

    if (back==0) printf("simcd: End of simulation at cycle %d\n",cno);

    if ((pc >= pcmax) || ((endsimf == 0) && (abtsim==0))){
        fprintf(stderr,"simcd: Abnormal termination of execution:");
        fprintf(stderr," no \"exit\" or too little memory.\n");
        simerr=1;
    }

    prfb("\tWait for stats and/or dump generation....\n");
    if (abtsim!=0){
        fprintf(stderr,"simcd: CYCLE LIMIT REACHED: SIMULATION ABORTED\n\n");
        tout(stderr);   /* output a trace */
        fprintf(ofp,"\tCYCLE LIMIT REACHED: SIMULATION ABORTED\n\n");
    }
    stats(1,ofp);               /* output main results */
    if (mdump == 1){
        fprintf(ofp,"\n");
        dump(ofp,4);    /* output memory dump, 4 words per line */
    }
    fclose(ofp);

    if (histgram==1){
        histout(hfp);   /* output pseudo-histogram */
        fclose(hfp);
    }

    /* set exit flag if error has occurred; abort */
    if ((abtsim==1) || (simerr==1)) abortnt();

    /* Thats all, folks! */
}


int numcon(s)   /* convert string s to binary number, and return same */
char *s;
{
    int out;
    int err;    /* error */
    char *ts;   /* temp string */

    out=err=0;

    ts=s;

    /* check number */
    while (*ts!='\0'){
        if (isdigit(*ts)==0) err=1;
        ts++;
    }
    if (err==0) out=atoi(s);
    else {
        fprintf(stderr,"simcd: Illegal trace start cycle number: %s\n",s);
        abortnt();
    }

    return(out);
}


int atoi(s)     /* convert decimal ASCII number to integer */
char s[];
{
    int err;
    int i;      /* index */
    long int n; /* output */

    err=n=0;

    for (i=0; (s[i]>='0') && (s[i]<='9') && (err==0); ++i){
        n=(10*n) + s[i] - '0';
        if (n>((long int) 0x7fffffff)){
            err=1;
            fprintf(stderr,"simcd: Command line number too large: %s\n",s);
            abortnt();
        }
    }
    return(n);
}


int isdigit(c)  /* return non-zero if c is digit, 0 otherwise */
char c;
{
    if ((c>='0') && (c<='9')) return(1);
    else return(0);
}


prfb(s)         /* if condition OK, print string */
char *s;
{
    if (back==0) printf("%s",s);
}


prfs(s)         /* if condition OK, print string */
char *s;
{
    if (sprompt==0) printf("%s",s);
}


prfv(s)         /* if condition OK, print string */
```

simcd54.c

```
char *s;
{
    if ((back==0) && (verbose==1)) printf("%s",s);
}


abort()         /* print error message and stop program */
{
    fprintf(stderr,"simcd: Simulation aborted at cycle %d\n", cno);
    tout(stderr);
    exit(1);
}


abortnt()       /* print error message and stop program; no trace output */
{
    fprintf(stderr,"simcd: Simulation aborted at cycle %d\n", cno);
    exit(1);
}


errop(p)        /* print unopenable file name */
char *p;
{
    fprintf(stderr,"simcd: Can't open \"%s\"\n", p);
}


getsimp()       /* get simulation parameters */
{
    int err;

    prfs("simcd: Warning: in data entry, CRs alone are ignored.\n\n");
    prfs("simcd: Enter data dependancy check type (1-3)\n");
    prfs("\t(1- reduced checking w/super-advanced execution,\n");
    prfs("\t 2- reduced checking w/out super-advanced execution,\n");
    prfs("\t 3- complete checking): ");
    ddct=getn(0,1,3);   /* get input */

    prfs("simcd: Enter branch dependancy check type\n");
    prfs("\t(1-standard, 2-SC concurrent, 3-UC concurrent,\n");
    prfs("\t 4-UC concurrent w/multiple OOBFB execution): ");
    bct=getn(0,1,4);

    prfs("simcd: Enter length of Instruction Queue (1-165): ");
    iqs=getn(0,1,165);
    new=iqs+1;

    prfs("simcd: Enter AE width (1-32): ");
    aew=getn(0,1,32);

    prfs("simcd: Enter # of AS execution units (1-1000): ");
    aspeq=getn(0,1,1000);

    prfs("simcd: Enter # of FBs executable per cycle (1-1000): ");
    fbpeq=getn(0,1,1000);

    prfs("simcd: Enter # of BBs executable per cycle (1-1000): ");
    bbpeq=getn(0,1,1000);

    prfs("simcd: Enter total # of Bs executable per cycle (1-1000): ");
    tbpeq=getn(0,1,1000);

    prfs("simcd: Enter # of registers (0-1024): ");
    regno=getn(0,0,1024);

    if (mdump==1) {
        do {
            err=0;
            prfs("simcd: Enter inclusive lower memory dump limit (0-9C40): ");
            mdll=getn(1,0,40000);

            prfs("simcd: Enter exclusive upper memory dump limit (0-9C40): ");
            mdul=getn(1,0,40000);

            if (mdll>=mdul){
                fprintf(stderr,"simcd: Lower mem. limit >= upper limit; try again.\n");
                if (sprompt==1) abortnt();
                err=1;
            }

        } while (err==1);
    }

    prfs("simcd: Enter IQ load type\n");
    prfs("\t(1- std.-unexecuted BBs domains held in IQ,\n");
    prfs("\t 2- unexecuted BBs domains not held in IQ): ");
    ldt=getn(0,1,2);
}


int getn(t,lo,hi)       /* get number from stdin */
int lo, hi;             /* bounds of input */
int t;                  /* type of input: 0-decimal, 1-hex */
{
    int in;     /* input */
    int err;    /* error flag */
    int smat;   /* # items matched by scan */

    do {
        if (t==0) smat=scanf("%d", &in);        /* get input */
        else smat=scanf("%x", &in);

        if (smat==EOF) in=lo;   /* set default */

        if ((in>=lo) && (in<=hi)) err=0;
        else {
            err=1;
            if (sprompt!=1) fprintf(stderr,"\tsimcd: Input out of range; re-enter:");
            else {
                fprintf(stderr,"simcd: Bad input parameter.\n");
                abortnt();
            }
        }
    } while (err==1);
    return(in);
}

/* NOW A MACRO
int getbits(x,p,n)
unsigned int x,p,n;
{
    return((x>>(p+1-n)) & ~(~0<<n));
}
*/

int gbsh(x,y,z)         /* getbits shifted left by 2 bits */
```

simcd54.c

```
unsigned int x,y,z;
{
    return(getbits(x,y,z)<<2);
}


int lnz(p)       /* determine lowest numbered zero in AE(p) */
int p;
{
    unsigned int t;     /* temp AE row */
    int j;      /* pointer */

    t=iq[p].ae;
    for (j=1; ((j<=aew) && ((t & msbmsk)==msbmsk)); j++) t=t<<1;
    return(j);
}


int hno(p)       /* return location of highest numbered 1 in AE(p) */
int p;
{
    unsigned int t;     /*temp.*/
    int j;      /* counter, pointer */

    t=iq[p].ae;

    for (j=32;(((t & lsbmsk)==0) && (j>0)); j--) t=t>>1;
    return(j);
}


int instex(n)    /* instruction IQ(n) executed? */
int n;
{
    int t;      /* temp. */

    switch (ddct){
        case 1:
        case 2:
            if (lnz(n)>b) return(1);
            else return(0);
            break;

        case 3:
            t=hno(n);
            if ((t==(lnz(n)-1)) && (t==b)) return(1);
            else return(0);
            break;

        default:
            eicerr(99,n);
            break;
    }
}


int rdcd(fp)     /* load program into m, starting at pcstart */
                 /* return max m address */
FILE *fp;
{
    int i;      /* pointer to m */

    i=pcstart>>2;       /* init i to first m address to be loaded */

    /* read in file to memory */
    while ((fscanf(fp, "%x", &m[i++]) != EOF) && (i < mmax));
    fclose(fp);

    /* if error, abort */
    if (i >= mmax){
        fprintf(stderr,"simcd: Inadequate storage for program.\n");
        abortnt();
    }

    return(i);
}


init()          /* initialization */
{
    int t;      /* fractional remainder indicator */
    int i;      /* index */

    /* indicate none of hist used */
    if (histgram==1){
        for (i=0; i<=mmax; i++) hist[i]=(-1);
    }

    nm=iqs * aew;       /* serial limit */

    csis=iqs;
    csjs=iqs;

    csjws=iqs/cswl;

    tos=mmax<<2;        /* init top of stack to memory limit address */
    endsimf=0;  /* init flags */
    oobbexf=0;
    oobbextf=0;
    oobfbexf=0;
    oobbbexf=0;
    oobbbnxf=0;
    oobbbf=0;
    exflg=0;
    aemaxflg=0;

    bmax=1;     /* init. max. b value */

    pc=pcstart;         /* init pc, dba */
    dba=dbastart;

    if (trace==1){
        switch (ddct){
            case 1:
            case 2:
                trcend=trcstrt+4;
                break;

            case 3:
                trcend=trcstrt+10;
                break;

            default:
                fprintf(stderr,"simcd: Illegal data concurrency type in init().\n");
                abortnt();
                break;
        }
    }
```

9 simcd54.c

```
	flushiq();  /* initialize instruction queue */
}


flushiq()		/* set up IQ to nice values */
{
	int i,j,k;	/* counters */
	int bp;		/* b prime value; leftmost columns to initialize to 1 */

	ompb=0;		/* init old mpb */

	/* init dynamic conc. structures */
	for (i=0; i<=nm; i++){
		for (j=0; j<=6; j++) dcs[j][i]=0;
	}
	for (i=0; i<=aew; i++){
		for (j=0; j<=6; j++) dcsnew[j][i]=0;
	}

	for (i=0; i<=iqs; i++){
		iq[i].res=0;
		iq[i].op[0]=0;
		iq[i].op[1]=0;
		iq[i].flg=0x7f; /* compare none of the operands or ta; all operands are constant
s */
		iq[i].addr=0;
		iq[i].opc=ocmisnop;	/* all instructions set to no-ops */
		iq[i].mpb=0;	/* no bct=1 branch dependancies */
		iq[i].ta=0;
		iq[i].dba=dbastart;

		/* initialize dynamic concurrency structures */
/*		if (ddct==1) bp=aew-1;
		else bp=1;
		*/
		bp=1;

		for (j=1; j<=bp; j++){
			asset(i,j);
			dcswr(AE,i,j,1);
			dcswr(ve,i,j,1);
			dcswr(ast,i,j,1);
		}

		/* set up concurrency structures */
		for (j=0; j<=5; j++){
			for (k=0; k<=csjws; k++) cs[j][i][k]=0;
		}
		if ((ddct==1) || (ddct==2)){
			for (j=6; j<=11; j++){
				for (k=0; k<=csjws; k++) cs[j][i][k]=0;
			}
		}

		/* init. inside inner loop indicators */
		iii[i]=0;
	}
	b=1;
	bv[1]=1;
	bvis[1]=0;
	for (j=2; j<=aew; j++){
		bv[j]=0;
		bvis[j]=0;
	}
}

int allix(l,u)	/* all instructions between l and u in IQ fully executed? */
int l,u;
{
	int i;		/* counter */
	int ok;		/* flag */

	ok=1;		/* assume yes */
	for (i=l; i<=u; i++) i=i & instex(i);
	return(ok);
}


load()		/* load IQ while conditions are right */
{
	int flg;	/* count flag */
	int expflg; /* expansion flag */
	int fbf;	/* OOBFB and OOBBB presence flag */
	int i;		/* counter */

	ldscntsc=0;		/* init count */
	flg=0;			/* init flag */

	if (verbose==1) printf("\tfebbfe=%d, fife=%d, oobbbe=%d\n",febbfe(),fife(),oobbbe());
	while ((febbfe()==1) && (fife()==1) && (oobbbe()==1) && ((exflg==0) || ((oobbexf==1)
&& (oobbextf==1)))){
		expflg=0;		/* clear flag, assume no expansion of CALL or RET. */
		do{
			pcdbadet(expflg);	/* determine new PC, DBA */
			iqnew();	/* create IQ(n+1) */
			if (bct==4){
				if ((iq[new].opc==ocprc101)||(iq[new].opc==ocprret0)){
					/* see if any OOBFBs are in the IQ */
					fbf=0;		/* clear flag */
					for (i=2; i<=iqs; i++){
						fbf=fbf | card(1,i,iqs);	/* OOBFB check */
						fbf=fbf | card(2,0,1);	/* OOBBB check */
					}
					fbf=fbf & 1;		/* mask off msbs */
					if (fbf==1) expflg=0;		/* dont expand ocpr */
					else if (iq[new].opc==ocprc101) expflg=1;
							/* no OOBBs, so expand call */
					else if (iq[new].opc==ocprret0) expflg=2;	/* expand RET */
					else;
				}

				else expflg=0;	/* dont expand other instructions */
			}
			/* update sub-cycle counters */
			ldscnt++;
			ldscntsc++;

		} while (expflg!=0);	/* while instructions to be expanded */

		dsdet();		/* create dependancy structures new columns (n+1) */
		if ((bct==3)||(bct==4)){
			fb2dedet(); /* compute and store FB-FB PDs */
			fbbbddet(); /*  "    "    "    "   1->BB PDs (special) */
		}
```

10 simcd54.c

```
        shiftin();      /* shift it all in ((n+1) -> n) */

        arraydet();     /* determine array access instructions */

        /* update counters */
        if (flg==0){
            idcnt++;
            flg=1;
        }
    }
    if ((ddct==1) || (ddct==2)){
        ddetodd();      /* map DDE contents to full DD matrices */
    }
}


arraydet()      /* determine array access instructions and their type */
{
    int i;      /* row index */
    int u;      /* serial index */

    /* set array access indicators */
    /*    note that the calculations are redundant, being performed for */
    /*    all iterations, whereas they only need to be done for each */
    /*    row. The following technique is used to reduce row calculations */
    for (u=1; u<=nm; u++){
        i=row(u);
        switch (iq[i].opc & (~ocaselmk)){
            case ocasarf:
                arri[u]=1;      /* array read */
                arwi[u]=0;
                break;

            case ocasart:
                arwi[u]=1;      /* array write */
                arri[u]=0;
                break;

            default:
                arwi[u]=arri[u]=0;      /* assignment instruction */
                break;
        }
    }
}


ddetodd()       /* map the half-matrices DDE to the full matrices DD */
{
    int arno;   /* DD index */
    int r;      /* row index */
    int c;      /* column index */
    unsigned int out;   /* current data value */

    for (arno=dd1; arno<=dd4; arno++){
        for (r=1; r<=iqs; r++){
            for (c=1; c<=iqs; c++){
                switch (arno){
                    case dd1:
                        /* for source 1 */
                        if (r<=c) out=card(dde4,r,c);
                        else out=card(dde2,c,r);
                        break;

                    case dd2:
                        /* for source 2 */
                        if (r<=c) out=card(dde5,r,c);
                        else out=card(dde3,c,r);
                        break;

                    case dd3:
                        /* for sinks */
                        if (r<=c) out=card(dde1,r,c);
                        else out=card(dde1,c,r);
                        break;

                    case dd4:
                        /* for array references, ast enabling */
                        if (r<c) out=card(dde2,r,c) | card(dde3,r,c);
                        else out=card(dde4,c,r) | card(dde5,c,r);
                        break;

                    default:
                        lderr(7);
                        break;
                }
                cswr(arno,r,c,(1 & out));
            }
        }
    }
}


int febbfe()    /* return 1 if fully enclosed BBs have fully executed */
                /* or oob branch executed true, in the case of bct=3 */
                /*     BB TA must be to IQ 1 */
{
    int flg;    /* output */
    int i;      /* counter */
    int k;      /* index */
    unsigned int inh,inhh;      /* cumulative OR */

    flg=0;
    inh=0;

    if (ldt==1){
     switch (bct){
      case 2:
          for (i=2; i<=iqs; i++){
              inh=0x1 & (inh | ((~(card(2,0,i))) & (card(2,1,i)) & (~(instex(i)))));
          }
          flg=1 & (~inh);
          break;

      case 1:
      case 3:
      case 4:
          for (i=2; i<=iqs; i++){
              inhh=0;
              for (k=1; k<=iqs; k++){
                  inhh=inhh | (card(5,i,k) & (~(instex(k))));
              }
              inh=inh | ((~(card(2,0,i))) & card(2,1,i) & ((~(instex(i))) | inhh));
          }
          flg=1 & (~inh);
          if ((oobbexf==1) && (oobbext==1)) flg=1;
```

11 simcd54.c

```
            break;

        default:
            lderr(10);  /* error */
            break;
        }
    }
    else if (ldt==2) flg=1;
    else lderr(12);

    return(flg);
}


int fife()      /* ddct=3 -> return 1 if first instruction fully executed */
                /* ddct=1 or 2 -> return 1 if IQ(1) can be eliminated */
{
    int f;      /* temp */
    int j;      /* index */

    switch (ddct){
        case 3:
            return(instex(1));
            break;

        case 1:
        case 2:
            f=dcs[ast][1];
            for (j=2; j<=b; j++) f&=dcard(ve,1,j);
            f&=1;
            return(f);
            break;

        default:
            lderr(15);
            break;
    }
}


int oobbbe()    /* out of bounds backward branch executed? */
{
    int flg;    /* output */

    switch (bct){
        case 1:
            /* no difference in algorithms; below is old code */
            /*if ((card(2,iqs,iqs)==1) && (instex(iqs) == 0)) flg=0;*/
            /*else flg=1;*/
            /*break;*/

        case 2:
            if ((oobbbf==1) && (oobbexf == 0)) flg=0;
            else flg=1;
            break;

        case 3:
        case 4:
            if ((oobbbf==0) || ((oobbbf==1) && (((oobfbexf==1) && (oobbext[==1]) || ((oo
bbbexf==1) && (oobbextf==1)) || (oobbbnxf==1))))) flg=1;
            else flg=0;
            break;

        default:
            lderr(20);
            break;
    }
    return(flg);
}


pcdbadet(ldtyp) /* determine program counter and data base address */
int ldtyp;      /* load type: 2-RETURN (bct=4), 1-expanded CALL (bct=4), */
                /*      0-other */
{
    int histno; /* histogram pointer */

    switch (ldtyp){
        case 0:
            /* normal case */
            if (oobbextf!=0) pc=oobbta;  /* oobb executing */
            else pc=pc;         /* no change */
            dba=dba;            /* "    "   */
            break;

        case 1:
            /* expanding procedure call */

            /* save state */
            stackwr(pc);        /* store old pc */
            stackwr(dba);       /* store old dba */

            /* set new pc, dba */
            pc=iq[new].ta;
            if (getbits(iq[new].flg,4,1)==0) dba=mrd(iq[new].op[0]);
            else dba=iq[new].dba+iq[new].op[0];

            /* update counter */
            callexcc++;
            callexc++;

            break;

        case 2:
            /* expanding return */
            pc=stacklk(1,0);    /* restore pc */
            dba=stacklk(0,2);   /* restore dba */

            /* update counters */
            retexcc++;
            retexc++;

            break;

        default:
            lderr(23);
            break;
    }

    /* update counts, if appropriate */
    if ((ldtyp==1) || (ldtyp==2)){
        if (histgram==1){
            histno=(iq[new].addr-pcstart)>>2;

            if (hist[histno]==-1) hist[histno]=1;
            else hist[histno]+=1;
        }
        if ((redtrc==1) && (back==0)){
```

```
            printf("%x  Expanded\n",iq[new].addr);
        }
    }
}

iqnew()         /* partialy decode the next instruction and put it into IQ(n+1) */
{
    unsigned int aco,bco,cco;   /* 0-compare operands; 1-dont */
    int tac;    /* 0-compare target address; 1-dont */
    unsigned int eab;   /* execute all instructions before this one */
    int it;     /* instruction type: */
                /* 0- AS, 1-FB, 2-BB, 3-exit, 4-PCA01, 5-PCA02, 6-RETURN0,1 */
                /* 7-NOP */
    unsigned int at,bt,ct;      /* operand types: 0-rel., 1-absolute, 2-immediate */
    unsigned int t[4];  /* temp new instruction */
    unsigned int opcode;        /* temp new instructions opcode */
    int il;     /* instruction length, in bytes (always a multiple of 4) */
    unsigned int texi;  /* bit 31 of t[0]; indicates extended instruction */
    unsigned int texexi;        /* bit 23 of t[0]; extended even more */
    int asnsh;  /* -1- dont shift AS operands */
    int j;      /* column pointer */

    /* start of code */
    if (oobbextf != 0) flushiq();       /* oobb executed, so set up IQ */

    exflg=0;    /* clear exit flag */

    t[0]=mrd(pc);       /* read first word of instruction */
    ifc++;      /* update counters */
    ifmrc++;
    ifmrcc++;

    opcode=getbits(t[0],30,7);  /* get opcode */
    texi=getbits(t[0],31,1);    /* get bit */
    texexi=getbits(t[0],23,1);  /* get bit */

    at=bt=ct=2;         /* init operand types */

    eab=0;      /* assume normal instructions */

    /* fetch rest of instruction, set instruction length */
    switch (texi){
        case 0:
            il=4;
            break;

        case 1:
            t[1]=mrd(pc+4);     /* read second word of instruction */
            ifmrc++;
            ifmrcc++;
            switch (texexi){
                case 0:
                    il=8;
                    break;

                case 1:
                    il=16;
                    t[2]=mrd(pc+8);     /* read rest of instruction */
                    t[3]=mrd(pc+12);
                    ifmrc+=2;           /* last counter update */
                    ifmrcc+=2;
                    break;

                default:
                    lderr(30);
                    break;
            }
            break;

        default:
            lderr(40);
            break;
    }

    /* determine instruction type */
    switch (opcode){
        case ocprex:    /* exit */
            it=3;
            exflg=1;
            break;

        case ocprcl01:  /* PCA01 */
            it=4;
            break;

        case ocprcl02:  /* PCA02 */
            it=5;
            break;

        case ocprret0:  /* RETURNs */
        case ocprret1:
            it=6;
            break;

        case ocmisnop:  /* NO-OP */
            it=7;
            break;

        default:        /* AS */
            switch (opcode & (~occfsmk) & (~occfcmk)){
                case occffb:    /* FB */
                    it=1;
                    break;

                case occfbb:    /* BB */
                    it=2;
                    break;

                default:        /* AS */
                    it=0;
                    break;
            }
            break;
    }

    /* calculate res, op||s, and flg contents of IQ(new) */
    switch (il){
        case 4:
            at=bt=ct=0; /* all rel. types */
            switch (it){
                case 0:
                    if ((opcode & (~ocassmsk))==(ocassiby | ocass)) asnsh=1;
                    else asnsh=0;       /* see if byte move */

                    if (((opcode & (ocassmsk | ocldmsk)) == ocassb) || (opcode == oclogne
```

13 simcd54.c

```
g)){
            lq[new].op[1]=0;          /* single source */
            cco=1;
            ct=2;
        }
        else {
            if (asnsh==1) lq[new].op[1]=getbits(t[0],7,8)+dba;
            else lq[new].op[1]=gbsh(t[0],7,8)+dba;
            cco=0;
        }
        aco=bco=0;
        if (asnsh==1){
            lq[new].op[0]=getbits(t[0],15,8)+dba;
            lq[new].res=getbits(t[0],23,8)+dba;
        }
        else {
            lq[new].op[0]=gbsh(t[0],15,8)+dba;
            lq[new].res=gbsh(t[0],23,8)+dba;
        }
        lq[new].ta=0;
        tac=1;
        break;

    case 1:
    case 2:
        lq[new].ta=pc+extend(gbsh(t[0],15,16),18);
        lq[new].op[0]=gbsh(t[0],23,8)+dba;
        lq[new].op[1]=0;
        lq[new].res=0;
        aco=cco=1;
        bco=0;
        at=ct=2;
        tac=0;
        break;

    case 3:
        aco=bco=cco=1;
        eab=1;
        at=bt=ct=2;
        lq[new].ta=0;
        tac=1;
        break;

    case 4:
        /* as of V. 4.0, no longer a valid length */
        /*lq[new].res=gbsh(t[0],23,8);
        lq[new].op[0]=gbsh(t[0],15,8);
        lq[new].op[1]=gbsh(t[0],7,8);
        lq[new].ta=0;
        aco=bco=cco=0;
        tac=1;
        at=bt=ct=1;
        break;*/

    case 5:
        errdid("illegal opcode length",pc);
        break;

    case 6:
        lq[new].res=gbsh(t[0],23,8);
        lq[new].op[0]=gbsh(t[0],15,8);
        lq[new].ta=0;
        aco=bco=0;
        cco=1;
            tac=1;
            at=bt=1;
            ct=2;
            break;

        case 7:
            lq[new].res=0;
            lq[new].op[0]=0;
            lq[new].op[1]=0;
            lq[new].ta=0;
            tac=1;
            aco=bco=cco=1;
            at=bt=ct=2;
            break;

        default:
            lderr(50);
            break;
    }
    break;

case 8:
    switch (lt){
        case 4:
        case 5:
            errdid("illegal opcode length",pc);
            break;

        default:
            break;
    }

case 16:
    at=optyp(t[0],1);
    if ((opcode & ocassart) == ocassart){
        at |= getbits(t[0],17,1) << 1;  /* get extra bit */
    }
    bt=optyp(t[0],2);
    ct=optyp(t[0],3);
    aco=bco=cco=0;
    tac=1;
    lq[new].ta=0;
    lq[new].res=0;
    lq[new].op[0]=0;
    lq[new].op[1]=0;

    switch (lt){
        case 0:
        case 5:
        case 6:
            if (((opcode & (ocassmsk | ocldmsk)) == ocassb) || (opcode == oclogne
g) || (opcode==ocprret0) || (opcode == ocprret1)){
                cco=1;
            }
            else {
                if (ct==2) cco=1;       /* set C comparison ind. */
                else cco=0;

                switch (ll){
                    case 8:
                        lq[new].op[1]=calargm(t[0],t[1],3,lt,ct);
                        break;

                    case 16:
```

14 simcd54.c

```
                        iq[new].op[1]=calargl(t[1],t[2],t[3],3,lt,ct);
                        break;

                    default:
                        lderr(60);
                        break;
                    }
                }
                break;

            case 1:
            case 2:
                aco=cco=1;
                tac=0;
                switch (l1){
                    case 8:
                        iq[new].ta=calargm(t[0],t[1],3,lt,ct);
                        break;

                    case 16:
                        iq[new].ta=calargl(t[1],t[2],t[3],3,lt,ct);
                        break;

                    default:
                        lderr(70);
                        break;
                }
                break;

            case 4:
                cco=1;
                tac=0;
                iq[new].ta=calargl(t[1],t[2],t[3],3,lt,ct);
                break;

            default:
                lderr(80);
                break;
        }
        break;

    default:
        lderr(90);
        break;
}

if (lt==5) cco=1;   /* PCA02 correction */

if (bt==2) bco=1;   /* set B comparison indicator */
else bco=0;

if (at==2) aco=1;   /* set A comparison indicator */
else aco=0;

if (lt==7) {
  at=bt=ct=1;  /* set to absolute address type if no-op */
}

if ((lt==1) || (lt==2)) aco=1;   /* set A comparison indicator for br. */

switch (l1){
    case 4:
        break;
```

```
        case 8:
            iq[new].res=calargm(t[0],t[1],1,lt,at);
            iq[new].op[0]=calargm(t[0],t[1],2,lt,bt);
            break;

        case 16:
            iq[new].res=calargl(t[1],t[2],t[3],1,lt,at);
            iq[new].op[0]=calargl(t[1],t[2],t[3],2,lt,bt);
            break;

        default:
            lderr(100);
            break;
    }

    /* set rest of IQ(new) */
    iq[new].flg=0;
    iq[new].flg=(eab<<7) | ((2 & at)<<5) | ((2 & ct)<<4) | ((2 & bt)<<3) | (tac<<3) ' 'c
o<<2) | (cco<<1) | bco;

    if (oobbextf!=0){
        iq[new].ae=0;
        if ((ddct==1) || (ddct==2)){
            for (j=1; j<=aew; j++){
                dcsnew[AE][j]=0;
                dcsnew[ve][j]=0;
                dcsnew[ast][j]=0;
            }
        }
        oobbextf=0;
    }
    iq[new].addr=pc;
    iq[new].opc=opcode;
    iq[new].mpb=ompb;
    iq[new].dba=dba;
    if ((lt==1)||(lt==2)||(lt==4)||(lt==5)||(lt==6)) ompb=pc;
    pc+=l1;     /* update program counter */
    oobbexf=0;  /* clear oobb execution flag */
    if (ifmrcc > ifmrcp) ifmrcp=ifmrcc;    /* update peak indicator */
}


errdld(p,n)     /* input error during load; print message and pc */
char *p;
unsigned int n;
{
    fprintf(stderr,"simcd: Input error during load: %s. PC= %08x\n",p,n);
    abortnt();
}


int extend(n,s)         /* sign-extend n starting at bit s-1 */
unsigned int n;
int s;
{
    int bn;     /* bit number */
    unsigned int out;   /* output */
    unsigned int mask;  /* extension mask */
    unsigned int ones;  /* allo */

    ones=allo;

    bn=s-1;
    mask=ones<<bn;      /* create mask */
```

|(ac

15 simcd54.c

```
    if (getbits(n,bn,1) == 0) out=(~mask) & n;  /* sign bit = 0 */
    else out=mask | n;          /* sign bit = 1 */

    return(out);
}


int stacklk(tosd,popc)  /* return element @ tos+tosd, pop stack by popc */
unsigned int tosd;
int popc;
{
    unsigned int t;     /* temp */

    stacklkc++;         /* update counter */

    t=mrd((tosd<<2) + tos);     /* read stack */
    tos+=(popc<<2);     /* pop stack */
    tpopc+=popc;        /* update counter */

    if ((tos>>2) > mmax){
        fprintf(stderr,"simcd: Stack underflow.\n");
        abort();
    }

    return(t);
}


stackwr(wd)     /* push wd on stack */
unsigned int wd;
{
    tos-=4;     /* adjust pointer */

    mwr(tos,wd,0);      /* write memory (push) */

    if (tos <= pcmax){
        fprintf(stderr,"simcd: Stack overflow.\n");
        abort();
    }
}


int mrd(addr)           /* read word or byte at addr */
unsigned int addr;
{
    int ptr;    /* m pointer */
    int fmod;   /* four modulus */
    unsigned int out;   /* output */

    ptr=addr>>2;        /* calculate m pointer */

    if (ptr > mmax){
        fprintf(stderr,"simcd: Memory bounds exceeded on m read.\n");
        abort();
    }

    fmod=addr & 0x3;    /* determine byte address */

    if (fmod==0) out=m[ptr];    /* get word */
    else {
        /* out=getbits(m[ptr],((fmod<<3)-1),8); */ /* get, normalize byte */
                        /* the above line not used as of Version 4.1 */
        fprintf(stderr,"simcd: Byte read attempted.\n");
        abort();
    }

    /* update counters */
    tmemrdc++;
    tmemrdcc++;
    if (tmemrdcc > tmemrdcp) tmemrdcp=tmemrdcc;   /* update peak indicator */

    if (ptr < regno){
        regrdc++;
        regrdcc++;
        if (regrdcc > regrdcp) regrdcp=regrdcc;   /* update peak indicator */
    }
    else {
        memrdc++;
        memrdcc++;
        if (memrdcc > memrdcp) memrdcp=memrdcc;   /* update peak indicator */
    }

    return(out);
}


mwr(addr,wd,size)       /* write wd in m at addr; size: 0=wd, 1=byte */
unsigned int addr;
unsigned int wd;
int size;
{
    int ptr;    /* m pointer */
    int mfmod;  /* modified four modulus */

    ptr=addr>>2;        /* create pointer */

    /* check bounds */
    if (ptr > mmax){
        fprintf(stderr,"simcd: Memory bounds exceeded during write.\n");
        abort();
    }

    mfmod=(3-(addr & 0x3))*8;   /* create bit count from 4 modulus of addr */

    if (size==0) m[ptr]=wd;     /* write word */
    else m[ptr]=(m[ptr] & (~(0xff << mfmod))) | ((wd & 0xff) << mfmod); /* write byt
                                                                              byte */

    /* update counters */
    tmemwrc++;
    tmemwrcc++;
    if (tmemwrcc > tmemwrcp) tmemwrcp=tmemwrcc;   /* update peak indicator */

    if (ptr < regno){
        regwrc++;
        regwrcc++;
        if (regwrcc > regwrcp) regwrcp=regwrcc;   /* update peak indicator */
    }
    else {
        memwrc++;
        memwrcc++;
        if (memwrcc > memwrcp) memwrcp=memwrcc;   /* update peak indicator */
    }
}


int calargm(t0,t1,opn,it,opt)   /* calculate IQ operand entry for two word instructions *
/
```

simcd54.c

```
unsigned int t0,t1;     /* machine code of instruction */
int opn;        /* operand #: 1-A, 2-B, 3-C */
int it;         /* instruction type */
int opt;        /* operand type */
{
    unsigned int out;   /* output */
    unsigned int rawopnd;       /* raw operand */
    int bt;             /* base type: 0-dba, 2-pc */

    /* get raw operand */
    switch (opn){
        case 1:
            rawopnd=getbits(t0,15,16);
            break;

        case 2:
            rawopnd=getbits(t1,31,16);
            break;

        case 3:
            rawopnd=getbits(t1,15,16);
            break;

        default:
            lderr(110);
            break;
    }

    if ((it==0)||(it==6)||(((it==1)||(it==2)||(it==4))&&((opn==1)||(opn==2)))) bt=0;
    else bt=2;

    /* calculate output */
    switch (opt){
        case 0:
            if (bt==0) out=rawopnd+dba;         /* relative */
            else out=pc+((extend(rawopnd,16))<<2);
            break;

        case 1:
            out=rawopnd;        /* absolute */
            break;

        case 2:
            if (bt==0) out=extend(rawopnd,16);
            else lderr();
            break;

        default:
            lderr(120);
            break;
    }
    return(out);
}


int calargl(t1,t2,t3,opn,it,opt)        /* calculate IQ operand entry for two word instr
uctions */
unsigned int t1;        /* machine code of instruction (last three words) */
unsigned int t2;
unsigned int t3;
int opn;        /* operand #: 1-A, 2-B, 3-C */
int it;         /* instruction type */
int opt;        /* operand type */
{
    unsigned int out;   /* output */
    unsigned int rawopnd;       /* raw operand */
    int bt;             /* base type: 0-dba, 2-pc */

    /* get raw operand */
    switch (opn){
        case 1:
            rawopnd=t1;
            break;

        case 2:
            rawopnd=t2;
            break;

        case 3:
            rawopnd=t3;
            break;

        default:
            lderr(130);
            break;
    }

    if ((it==0)||(it==6)||(((it==1)||(it==2)||(it==4)||(it==5))&&((opn==1)||(opn==2)))) b
t=0;
    else bt=2;

    /* calculate output */
    switch (opt){
        case 0:
            if (bt==0) out=rawopnd+dba;         /* relative */
            else out=pc+rawopnd;
            break;

        case 1:
            out=rawopnd;        /* absolute */
            break;

        case 2:
            if (bt==0) out=rawopnd;     /* immediate */
            else lderr();
            break;

        default:
            lderr(140);
            break;
    }
    return(out);
}


int optyp(t0,opn)       /* determine operand type */
unsigned int t0;        /* first machine code word of instruction */
int opn;                /* operand #: 1-A, 2-B, 3-C */
{
    int out;    /* output */

    switch (opn){
        case 1:
            out=getbits(t0,22,1);
            break;

        case 2:
            out=getbits(t0,21,2);
```

simcd54.c

```
            break;

        case 3:
            out=getbits(t0,19,2);
            break;

        default:
            lderr(150);
            break;
    }
    return(out);
}


lderr(loc)      /* load error; notify, abort; occurance at loc */
int loc;
{
    fprintf(stderr,"simcd: Error during load. Location= %d. PC=%x.\n",loc,pc);
    abort();
}


exerr(loc,iqn)  /* execute error; notify, abort; occurance at loc; in IQ(iqn) */
int loc,iqn;
{
    fprintf(stderr,"simcd: Error during execution; bad opcode.\n");
    fprintf(stderr,"\tLocation= %d. PC= %x. IQ row= %d.\n",loc,pc,iqn);
    abort();
}


eicerr(loc,iqn) /* EI check error; notify, abort; occurance at loc; in IQ(iqn) */
int loc,iqn;
{
    fprintf(stderr,"simcd: Error during EI checking.\n");
    fprintf(stderr,"\tLocation= %d. PC= %x. IQ row= %d.\n",loc,pc,iqn);
    abort();
}


ddet()          /* determine dependancy structures new columns */
{
    dddet();
    fbddet();
    bbdodet();
    pbbdedet();
    cbbdet();
    if (ddct==1) iildet();
}


dddet()         /* determine data dependancies */
{
    int out;    /* dd */
    int i;      /* pointer */
    int aco,bco,cco;    /* compare indicators of IQ(n+1) */
    int aaco;   /* second result compare indicator */

    /* get comparison indicators */
    aco=getbits(iq[new].flg,2,1);
    bco=getbits(iq[new].flg,0,1);
    cco=getbits(iq[new].flg,1,1);

    /* determine dependancies with all previous instructions in IQ */

    switch (ddct){
        case 1:
        case 2:
            for (i=2; i<=new; i++){
                aaco=getbits(iq[i].flg,2,1);
                if (aco==0){
                    if (aaco==0) cswr(dde1,i,new,eq(iq[i].res,iq[new].res));
                    else cswr(dde1,i,new,0);

                    if (getbits(iq[i].flg,1,1)==0)
                        cswr(dde3,i,new,eq(iq[i].op[1],iq[new].res));
                    else cswr(dde3,i,new,0);

                    if (getbits(iq[i].flg,0,1)==0)
                        cswr(dde2,i,new,eq(iq[i].op[0],iq[new].res));
                    else cswr(dde2,i,new,0);
                }
                else {
                    cswr(dde1,i,new,0);
                    cswr(dde3,i,new,0);
                    cswr(dde2,i,new,0);
                }

                if (aaco==0){
                    if (bco==0) cswr(dde4,i,new,eq(iq[i].res,iq[new].op[0]));
                    else cswr(dde4,i,new,0);

                    if (cco==0) cswr(dde5,i,new,eq(iq[i].res,iq[new].op[1]));
                    else cswr(dde5,i,new,0);
                }
                else {
                    cswr(dde4,i,new,0);
                    cswr(dde5,i,new,0);
                }
            }
/*          break;  */ /* always compute the old DD matrix, for PBBDE calc.*/

        case 3:
            for (i=2; i<new; i++){
                out=0;
                aaco=getbits(iq[i].flg,2,1);
                if (aco==0){
                    if (aaco==0) out=out | eq(iq[i].res,iq[new].res);
                    if (getbits(iq[i].flg,1,1)==0) out=out | eq(iq[i].op[1],iq[new]
                    if (getbits(iq[i].flg,0,1)==0) out=out | eq(iq[i].op[0],iq[new]
                }
                if (aaco==0){
                    if (bco==0) out=out | eq(iq[i].res,iq[new].op[0]);
                    if (cco==0) out=out | eq(iq[i].res,iq[new].op[1]);
                }
                cswr(0,i,new,out);      /* write the result */
            }
            break;

        default:
            lderr(160);
            break;
    }
}


fbddet()        /* determine forward branch domains and dependancies */
{
    int i;      /* pointer */
```

18 simcd54.c

```
    /* set FBD(new,new) */
    /* calls and returns are treated as FBs */
    if ((iq[new].opc & (~occfamk) & (~occfcmk))==occffb) cswr(1,new,new,1);
    else if ((iq[new].opc==ocprc101)||(iq[new].opc==ocprret0)) cswr(1,new,new,1);
    else cswr(1,new,new,0);

    /* determine other new column elements */
    for (i=2; i<new; i++){
        cswr(1,i,new,((1 & (~eq(iq[new].addr,iq[i].ta))) & csrd(1,i,iqs)));
    }
}

bbdodet()        /* determine backward branch domains */
{
    int i,j;     /* pointers */
    int bbt[iqmax];      /* bb target vector */
    int nabb;    /* new I is a BB */
    int iiq;     /* match in IQ */
    int sum;     /* temp. logical summation */

    /* set-up */
    iiq=0;
    if ((iq[new].opc & (~occfamk) & (~occfcmk))==occfbb) nabb=1;
    else nabb=0;
    oobbbf=0;    /* clear flags */
    oobfbexf=0;
    oobbbexf=0;
    oobbbnxf=0;

    /* calc. BBT */
    for (i=2; i<=new; i++){
        if (nabb==0) bbt[i]=0;
        else bbt[i]=eq(iq[new].ta,iq[i].addr);
        iiq=iiq | bbt[i];
    }

    /* calc. BBDO new column */
    for (i=2; i<=new; i++){
        if (iiq==1){
            sum=0;
            for (j=2; j<=i; j++) sum=sum | bbt[j];
            for (j=i+1; j<=new; j++) sum=sum & 1 & (~bbt[j]);
            cswr(2,i,new,sum);
        }
        else if (nabb==0) cswr(2,i,new,0);
        else {
            cswr(2,i,new,1);
            oobbbf=1;    /* set oob bb loaded flag */
        }
    }

    if ((nabb==1) && (iiq==0)) cswr(2,1,new,1);
    else cswr(2,1,new,0);
}

pbbdedet()       /* determine previous bb dependancies */
{
    int i,j;     /* pointers */
    int t;       /* temp. logical sum */

    /* calculate new PBBDE column */
    for (j=2; j<new; j++){
        t=0;
        for (i=2; i<=j; i++) t=t | (csrd(2,i,j) & csrd(0,i,new));
        t=t | (csrd(2,j,j) & csrd(2,j,new));    /* nested BB dependancies */
        cswr(3,j,new,t);
    }
}

cbbdet()         /* determine new chained BB column entries */
{
    int i,k,l;   /* indices */
    unsigned int obb[iqmax];    /* partially overlapped BBs */
    unsigned int t;      /* temp. */

    cswr(5,new,new,0);

    for (i=2; i<=iqs; i++){
        obb[i]=0;
        for (l=2; l<=i; l++){
            obb[i]=1 & (obb[i] | (csrd(2,l,new) & csrd(2,l,i) & (~(csrd(2,l,new)))));
        }
    }

    for (i=2; i<=iqs; i++){
        t=0;
        for (k=1; k<=iqs; k++){
            t=t | (obb[k] & csrd(5,i,k));
        }
        cswr(5,i,new,(1 & (obb[i] | t)));
    }
}

fb2dedet()       /* determine FB-FB PDs and put them into array PBBDE */
{
    int i,j;     /* indices */
    unsigned int pd;     /* procedural dependency */
    unsigned int fbpd;   /* derived PDs */

    for (j=3; j<=iqs; j++){
        for (i=2; i<j; i++){
            /* partially overlapped FBs determination */
            pd=1 & csrd(1,i,iqs) & (~(csrd(1,i,new))) & csrd(1,j,iqs) & csrd(1,j,new);

            /* store results */
            switch (ddct){
                case 3:
                    fbpd=pd | csrd(3,i,j);
                    cswr(3,i,j,fbpd);
                    break;

                case 1:
                case 2:
                    fbpd=pd | csrd(ofbde,i,j);
                    cswr(ofbde,i,j,fbpd);
                    break;

                default:
                    ierr(170);
                    break;
            }
        }
```

simcd54.c

```
fbbbddet()      /* determine I-BB PDs and put them into array PBBDE */
{
    int i,k;     /* indices */
    unsigned int bbpd;  /* 1->BB PD exists */

    for (i=2; i<iqs; i++){
        for (k=(i+1); k<new; k++){
            bbpd=1 & card(2,k,k) & card(1,i,k) & card(2,i,k) & card(1,i,new);
            bbpd=bbpd | card(3,k,new);
            cswr(3,k,new,bbpd);
        }
    }
}


ilidet()        /* calculate Inside and Below Inner Loop Indicators */
{
    int i;       /* index */
    unsigned int ili;   /* Inner Loop BB Indicator */
    unsigned int cum;   /* cumulative OR of ili[] */

    ili=1;
    for (i=2; i<=iqs; i++){
        ili &= (~card(bbdo,i,new)) | (~card(bbdo,i,i));
    }
    ili &= 1 & card(bbdo,new,new);
    ili[new]=0,          /* init. */

    cum=0;
    for (i=new; i>=2; i--){
        ili[i]= 1 & (ili[i] | (ili & card(bbdo,i,new)));

        cum |= ili[i];
        bil[i] = 1 & (~cum);
    }

    /* mark those FBs with targets outside of the inner loop */
    /*     Only update when a new inner loop is created. */
    if (ili[new]==1){
        for (i=2; i<=new; i++){
            if ((ili[i]==1) && (card(fbd,i,new)==1)) oolifb[i]=1;
            else oolifb[i]=0;
        }
    }

    /* correct for no loops in Instruction Queue */
    if (cum==0){
        for (i=2; i<=new; i++) bil[i]=0;
    }
}


cswr(csn,roww,coll,in)  /* write the lsb of in into csn(row,col(bit)) */
int csn,roww,coll,in;
{
    int colw;   /* column word */
    int colb;   /* column bit */

    /* calc. word, bit address of col */
    colw=calw(coll);
    colb=calb(coll);

    /* write new bit (in) */
    cs[csn][roww][colw]=(cs[csn][roww][colw] & (~(lsbmsk<<colb))) | ((in & 1)<<colb);
}

/* NOW MACROS
int card(csn,roww,coll)
int csn,roww,coll;
{
    int colw;
    int colb;

    colw=calw(coll);
    colb=calb(coll);

    return(getbits(cs[csn][roww][colw],colb,1));
}


int calw(coll)
int coll;
{
    return((coll-1)/cswl);
}


int calb(coll)
int coll;
{
    return((cswl-1)-((coll-1)%cswl));
}
*/

int eq(a,b)     /* return 1 if a=b, 0 otherwise */
unsigned int a,b;
{
    if (a==b) return(1);
    else return(0);
}


shiftin()       /* shift in new instruction into IQ(n); shift in new cs cols. */
{
    int i,j,k;  /* pointers */

    for (i=0; i<=iqs; i++){
        /* shift in new IQ data */
            j=i+1;
            iq[i].res=iq[j].res;
            iq[i].op[0]=iq[j].op[0];
            iq[i].op[1]=iq[j].op[1];
            iq[i].flg=iq[j].flg;
            iq[i].ae=iq[j].ae;
            iq[i].addr=iq[j].addr;
            iq[i].opc=iq[j].opc;
            iq[i].ta=iq[j].ta;
            iq[i].mpb=iq[j].mpb;
```

simcd54.c

```
        lq[i].dba=lq[j].dba;

        /* shift cs data to upper left, shift dcs data up when appropriate */
        for (k=0; k<=3; k++) shcs(k,i,j);
        shcs(5,i,j);
        if ((ddct==1)||(ddct==2)){
            for(k=6; k<=11; k++) shcs(k,i,j);
            if (i!=0){
                for(k=0; k<=6; k++) shdcs(k,i,j);
            }
        }
        if (ddct==1){
            iil[i]=iil[j];
            ooilfb[i]=ooilfb[j];
            bil[i]=bil[j];
        }
    }
}


shdcs(dcsn,rto,rfr)     /* shift up dcsn row rfr into row rto */
int dcsn,rto,rfr;
{
    int j;      /* column pointer */

    for (j=1; j<=sew; j++){
        if (rfr!=new) dcswr(dcsn,rto,j,dcsrd(dcsn,rfr,j));
        else dcswr(dcsn,rto,j,dcsnew[dcsn][j]);
    }
}


shcs(csn,rto,rfr)       /* diagonally shift (to upper left) csn row rfr into rto */
int csn,rto,rfr;
{
    unsigned int t[csjwmax];    /* temp. rfr */
    int i;      /* pointer */

    /* copy rfr */
    for (i=0; i<=csjws; i++) t[i]=cs[csn][rfr][i];

    /* shift temp row left, store into csn */
    for (i=0; i<=(csjws-1); i++){
        cs[csn][rto][i]=(t[i]<<1) | getbits(t[i+1],(csw1-1),1);
    }

    /* shift final row word left */
    cs[csn][rto][csjws]=t[csjws]<<1;
}


/* NOW MACROS
int ser(r,c)
int r,c;
{
    return(r+((c-1)*iqs));
}


int row(serindex)
int serindex;
{
    return(1+((serindex-1)%iqs));
}


int col(serindex)
int serindex;
{
    return(1+((serindex-1)/iqs));
}


int dcsrd(dcsno,r,c)
int dcsno,r,c;
{
    return(dcs[dcsno][ser(r,c)]);
}


dcswr(dcsno,r,c,data)
int dcsno;
int r,c;
unsigned int data;
{
    dcs[dcsno][ser(r,c)]=data;
}
*/

eidet()             /* executable independance determination */
{
    int i,j,k;  /* pointers */
    int t1,t2;  /* temp. logical products */
    int f;      /* flag */
    int ifeall; /* all instr. fully executed till now */
    int oobbbno;        /* oob BB number */
    unsigned int exstat;        /* execution status */
    int iex;    /* instruction i executed */
    int histno; /* hist index */
    int dumnop; /* dummy or no-op indicator */

    /* set-up */
    aelzcal();  /* calculate AE leftmost zero vector */
    aerocal();  /* calculate AE rightmost one vector */
    ifecal();   /* calculate instruction fully executed vector */
    if ((bct==1)||(bct==3)||(bct==4)){
        iafecal();      /* calculate instr. almost fully exec. vector */
        oobbbno=new;
    }
    ifeall=1;   /* init. */

    /* calc. IE matrix (cs # 4) */
    for (i=1; i<=iqs; i++){
        for (j=1; j<i; j++){
            if (aelz[j]>aelz[i]) cswr(4,i,j,1);
            else cswr(4,i,j,0);
        }
    }

    /* calculate dependancies, or rather the lack of them */
    for (i=1; i<=iqs; i++){
        /* calc. nbbdi, nfbdi */
        switch (bct){
            case 1:
                j=1;
                f=0;
```

```
            /* see if there is a match */
            while ((j<=(i-1)) && (f==0)){
                f=eq(iq[j].addr,iq[i].mpb);
                j++;
            }

            /* no match or match executed implies branch executable ind. */
            if ((f==0) || (card(4,i,(j-1))==1)) nbbdi[i]=nfbdi[i]=1;
            else nbbdi[i]=nfbdi[i]=0;
            break;

        case 2:
            t1=t2=1;          /* init. */
            for (j=1; j<=(i-1); j++){
                t1=t1 & (card(4,i,j) | (isbmsk & (~card(3,j,i))));
                t2=t2 & (card(4,i,j) | (isbmsk & (~card(1,j,i))));
            }
            nbbdi[i]=t1;
            nfbdi[i]=t2 | card(1,i,i) | card(2,i,i);
            break;

        case 3:
        case 4:
            t1=t2=1;          /* init. */
            for (j=1; j<=(i-1); j++){
                t1=t1 & (card(4,i,j) | (isbmsk & (~card(3,j,i))));
/* possible line:   t1=t1 & (card(4,i,j) | (isbmsk & ((~card(3,j,i)) & (~card(5,j,i)))))
; */

                t2=t2 & (card(4,i,j) | (isbmsk & (~card(1,j,i))));
            }
            nbbdi[i]=t1;
            nfbdi[i]=t2 | card(1,i,i); /* only difference from bct=2 */
            break;

        default:
            elcerr(10,i);
            break;
    }

    /* calc. dd exec. ind. */
    j=f=1;
    while ((j<i) && (f==1)){
        f=isbmsk & ((~card(0,j,i)) | card(4,i,j));
        j++;
    }
    j=i+1;
    while ((j<=iqs) && (f==1)){
        f=isbmsk & ((~card(0,i,j)) | (~card(4,j,i)));
        j++;
    }
    nddi[i]=f;

    /* out of bounds branch exec. ind. calculation */
    if ((card(1,i,i)==1) && (card(1,i,iqs)==1)){
        switch (bct){
            case 1:
            case 2:
            case 3:
                j=f=1;
                while ((f==1) && (j<i)){
                    f=f & ife[j];
                    j++;
                }
                while ((f==1) && (j<=iqs)){
                    f=f & (iafe[j] | ife[j]);
                    j++;
                }
                noobbi[i]=oobbeif[i]=isbmsk & f;
                break;

            case 4:
                f=1;
                j=1;
                while ((f==1) && (j<=iqs)){
                    f=f & (iafe[j] | ife[j]);
                    j++;
                }
                noobbi[i]=oobbeif[i]=1 & f;
                break;

            default:
                elcerr(13,i);
                break;
        }
    }
    else if ((i==iqs) && (oobbbf==1)){
        j=f=1;
        while ((f==1) && (j<iqs)){
            f=f & ife[j];
            j++;
        }
        noobbi[i]=oobbeif[i]=isbmsk & f;
    }
    else if (((bct==3)||(bct==1)) && (card(2,i,i)==1) && (card(2,0,i)==1)){
        j=f=1;
        while ((f==1) && (j<i)){
            f=f & ife[j];
            j++;
        }
        while ((f==1) && (j<=iqs)){
            f=f & iafe[j];
            j++;
        }
        noobbi[i]=oobbeif[i]=1 & f;
        if ((ife[i]==0) && (oobbbno==new)) oobbbno=i;
    }
    else {
        noobbi[i]=1;
        oobbeif[i]=0;
    }

    if (bct==4){
        j=1;
        f=0;
        while ((f==0) && (j<i)){
            f=f | ((~ife[j]) & card(2,0,j));
            j++;
        }
        oobbben[i]=1 & (~f);

        if (card(2,0,i)==1){
            j=f=1;
            while ((f==1) && (j<i)){
                f=f & ife[j];
                j++;
            }
            while ((f==1) && (j<=iqs)){
```

```
                f=f & iafe[j];
                j++;
            }

            noobbi[i]=oobbeif[i]-1 & f & oobbben[i];
        }
    }

    /* calculate EI vectors, without and with resource dependancies */
    /* calc. overall EI vector, ignoring RDs */
    switch (bct){
        case 2:
            exstat=ife[i];
            break;

        case 1:
        case 3:
            if (i<=oobbbno) exstat=ife[i];
            else exstat=iafe[i];
            break;

        case 4:
            exstat=1 & (((~oobbben[i]) & iafe[i]) | (oobbben[i] & ife[i]));
            break;

        default:
            eicerr(15,i);
            break;
    }
    nrei[i]=f=nddi[i] & nfbdi[i] & nbbdi[i] & noobbi[i] & (lsbmsk & (~exstat));

    /* allow for exit, etc. */
    if ((getbits(iq[i].flg,7,1)) && (ifeall==0)) nrei[i]=f=0;

    ifeall=ifeall & ife[i];

    /* set the other nr vectors appropriately */
    switch (iq[i].opc & (~occfsmk) & (~occfcmk)){
        case occffb:
        case ocprcl01:
        case ocprret0:
            /* FB, CALL, or RETURN */
            nrasei[i]=0;
            nrfbei[i]=f;
            nrbbei[i]=0;
            break;

        case occfbb:
            nrasei[i]=0;
            nrfbei[i]=0;
            nrbbei[i]=f;
            break;

        default:
            nrasei[i]=f;
            nrfbei[i]=0;
            nrbbei[i]=0;
            break;
    }
}

rdf(iqs);   /* calculate final EI vectors */
}
```

```
eidetr()        /* executable independance determination for reduced */
                /*      data dependencies */

{
    int i,j,k;  /* pointers */
    int t1,t2,t3,t4;    /* temp. logical products */
    int f;      /* flag */
    int ifeall; /* all instr. fully executed till now */
    int oobbbno;        /* oob BB number */
    int iex;    /* instruction i executed */
    register int u,z,t,s;       /* indices */
    register unsigned int flag; /* indicates a sen has been set */
    register unsigned int ddve; /* logical accumulator */
    register unsigned int sent; /* temp for SEN calculation */
    register unsigned int sfst; /* temp for SFS calculation */
    register unsigned int ddeitt,ddeit; /* temps for DDEI calculation */
    register unsigned int sae;  /* to allow for super-advanced execution */
    register unsigned int vetypp; /* temp for vetyp[u] */
    register unsigned int ndcsaeu; /* temp for ~dcs[AE][u] */
    register int ru;    /* temp for row(u) */

    /* set-up */
    aelzcal();  /* calculate AE leftmost zero vector */
    aerocal();  /* calculate AE rightmost one vector */
    ifecal();   /* calculate instruction fully executed vector */
    if ((bct==1)||(bct==3)||(bct==4)){
        iafecal();      /* calculate instr. almost fully exec. vector */
        oobbbno=new;
    }
    ifeall=1;   /* init. */

    /* calc. IE matrix (cs # 4) */
    for (i=1; i<=iqs; i++){
        for (j=1; j<i; j++){
            if (aelz[j]>aelz[i]) cswr(4,i,j,1);
            else cswr(4,i,j,0);
        }
    }

    /* calculate SAEVE for procedural dependencies */
    for (s=1; s<=nm; s++){
        switch (ddct){
            case 1:
                pdsaeve[s]=1 & ((~bv[col(s)]) & (~ii[row(s)]));
                break;

            case 2:
                pdsaeve[s]=0;
                break;

            case 3:
            default:
                eicerr(21,s);
                break;
        }
    }

    /* calculate dependancies, or rather the lack of them */

    /* calc. nbbdi, nfbdi */
    switch (bct){
        case 1:
```

23 simcd54.c

```
            for (u=1; u<=nm; u++){
                i=row(u);
                j=1;
                f=0;

                /* see if there is a match */
                while ((j<=(i-1)) && (f==0)){
                    f=eq(iq[j].addr,iq[i].mpb);
                    j++;
                }
                j--;    /* correct match pointer */

                /* no match or match executed implies
                                branch executable ind. */
                if ((f==0) || ((dcs[AE][ser(j,col(u))]==1) &&
                            (dcs[AE][u]==0))) nbbdi[u]=nfbdi[u]=1;
                else nbbdi[u]=nfbdi[u]=0;

                /* make BBs dependent on their earlier iterations */
                j=col(u);
                t1=1;
                if (csrd(bbdo,i,i)==1){
                    for (k=1; k<=(j-1); k++){
                        t1 &= dcsrd(AE,i,k);
                    }
                }
                nbbdi[u]= 1 & t1;
            }
            break;

        case 2:
        case 3:
        case 4:
            /* FB EI calculation */
            for (u=1; u<=nm; u++){
                i=row(u);

                /* init. logic product accumulators */
                t1=1;
                t2=1;
                for (j=1; j<=(i-1); j++){
                    t1&=1 & (dcsrd(AE,j,col(u)) | pdsaeve[ser(j,col(u))] |
                        (~csrd(fbd,j,i)));
                    t2&=1 & (dcsrd(AE,j,col(u)) | pdsaeve[ser(j,col(u))] |
                        (~csrd(ofbde,j,i)));
                }
                nfbdi[u]=1 & (csrd(fbd,i,i) | t1) & t2;
                if (bct==2) nfbdi[u] |= csrd(bbdo,i,i);
            }

            /* BB EI calculation */
            /* AES calculation */
            for (i=1; i<=iqs; i++){
                t1=1;
                for (k=1; k<=aew; k++){
                    t1 &= 1 & (dcsrd(AE,i,k) | pdsaeve[ser(i,k)]);
                    aes[ser(i,k)]=t1;
                }
            }
            /* nbbdi calculation */
            for (u=1; u<=nm; u++){
                t1=1;
                i=row(u);
                for (j=1; j<=(i-1); j++){
                        t1 &= 1 & (aes[ser(j,col(u))] | (~csrd(pbbde,j,i)));
                    }
                    /* make BBs dependent on their earlier iterations */
                    j=col(u);
                    if (csrd(bbdo,i,i)==1){
                        for (k=1; k<=(j-1); k++){
                            t1 &= dcsrd(AE,i,k);
                        }
                    }
                    nbbdi[u]= 1 & t1;
                }
                break;

        default:
            elcerr(20,-1);
            break;
    }

    /* Determine virtual execution terms for use in SEN calculations */
    for (s=1; s<=nm; s++){
        switch (ddct){
            case 1:
                saeve[s]=1 & (((~bv[col(s)]) & (~iil[row(s)])) |
                            ((~bvis[col(s)]) & (bil[row(s)])));
                vet[s]= 1 & (dcs[ve][s] | saeve[s]);
                break;

            case 2:
                saeve[s]=0;
                vet[s]=dcs[ve][s];
                break;

            case 3:
            default:
                elcerr(22,s);
                break;
        }
    }

    /* Calculate Sink ENable pointers */
    /*      calculate temps (values invariant over z, s, t) */
    for (u=1; u<=nm; u++){
        t=s=u;
        vetyp[u]=1 & (~bv[col(u)]) & iil[row(u)];
        temp1[s]= dcs[ve][s] | arwi[s];
        temp2[t]= dcs[re][t] & (~arwi[t]);
    }

    for (z=1; z<=3; z++){
        sen[z-1][1]=0;
        sfs[z-1][1]=1;
        for (u=2; u<=nm; u++){
/*          vetyp=1 & (~bv[col(u)]) & iil[row(u)]; */
            vetypp=vetyp[u];    /* assign temp to eliminate accesses */
            ndcsaeu= ~dcs[AE][u]; /* assign temp to eliminate accesses */
            ru=row(u);  /* assign temp to eliminate accesses */
            flag=0;
            sen[z-1][u]=0;
            ddve=1;
#if TEST
            for (t=u-1; t>=0; t--){
#else
        /* The following mode is not currently used (8/17/85) due to its */
        /*      slow operation; maybe someday... */
```

```
            /* Normally, stop computations after a source has been found; */
            /*  to reduce execution time of the simulation. */
            for (t=u-1; ((t>=0) && (flag==0)); t--){
#endif
                /* ddve is calculated incrementally, over the values of */
                /*    t, to reduce execution time */
                s=t+1;
                if (s<=u-1){
                    ddve &= (~dd(z,row(s),ru)) | (vetypp & saeve[s]) |
                                templ[s];
                }
                sent=1 & dd(z,row(t),ru) & ndcsaeu & temp2[t] & ddve &
                        (bv[col(u)] | (~saeve[t]));
                if (z==3) sent &= 1 & arwi[u] & (~arwi[t]);

                if ((sent==1) && (t>=1)){
                    if (flag==1) elcerr(29,u);  /* more than one 1 in a SEN */
                                                /* array, so abort */
                    else flag=1;
                    sen[z-1][u]=t;    /* SEN element points to proper sink */
                }
            }
            sfst = 1 & ddve;
            if (z==3) sfst |= 1 & (~arwi[u]);
            sfs[z-1][u] = sfst;
        }
    }

    /* Sink From Storage calculation - if reinstated, check vetyp
    for (z=1; z<=3; z++){
        for (u=1; u<=nm; u++){
            vetyp=1 & (~bv[col(u)]) & iil[row(u)];
            sfst=1;
            for (s=1; s<=(u-1); s++){
                if (z==3) sfst &= (~dd(z,row(s),row(u))) | arwi[s] |
                                (~arwi[u]) | dcs[ve][s] | (vetyp[u] & saeve[s]);
                else sfst &= (~dd(z,row(s),row(u))) | dcs[ve][s] |
                                arwi[s] |(vetyp[u] & saeve[s]);
            }

            sfs[z-1][u]=1 & (sfst);
        }
    }
    */

    /* DD EI calculation */
    for (u=1; u<=nm; u++){
        ddeltt=1;
        for (z=1; z<=3; z++){
            if (sen[z-1][u]!=0) ddelt=1;
            else ddelt=0;
            ddeltt &= ddelt | sfs[z-1][u];
        }
        t4=1;
        for (s=1; s<=(u-1); s++){
            t3=1;
            for (z=1; z<=2; z++){
                t3 &= (~dd(z,row(s),row(u))) | dcs[ast][s];
            }
            t4 &= (~arwi[row(s)]) | t3;
        }

        nddi[u]= 1 & ddeltt & ((~arri[row(u)]) | t4) & (~dcs[AE][u]);
    }

    /* out of bounds branch exec. ind. calculation */
    for (u=1; u<=nm; u++){
        i=row(u);
        if ((csrd(1,1,i)==1) && (csrd(1,i,iqs)==1)){
            switch (bct){
                case 1:
                case 2:
                case 3:
                    j=f=1;
                    while ((f==1) && (j<i)){
                        f=f & ife[j];
                        j++;
                    }
                    while ((f==1) && (j<=iqs)){
                        f=f & (iafe[j] | ife[j]);
                        j++;
                    }
                    noobbi[u]=oobbeif[u]=isbmsk & f & bv[col(u)];
                    break;

                case 4:
                    f=1;
                    j=i;
                    while ((f==1) && (j<=iqs)){
                        f=f & (iafe[j] | ife[j]);
                        j++;
                    }
                    noobbi[u]=oobbeif[u]=1 & f;
                    break;

                default:
                    elcerr(30,u);
                    break;
            }
        }
        else if ((i==iqs) && (oobbbf==1)){
            j=f=1;
            while ((f==1) && (j<iqs)){
                f=f & ife[j];
                j++;
            }
            noobbi[u]=oobbeif[u]=isbmsk & f;
        }
        else if (((bct==3)||(bct==1)) && (csrd(2,1,i)==1) && (csrd(2,0,i)==1)){
            j=f=1;
            while ((f==1) && (j<i)){
                f=f & ife[j];
                j++;
            }
            while ((f==1) && (j<=iqs)){
                f=f & iafe[j];
                j++;
            }
            noobbi[u]=oobbeif[u]=1 & f & bv[col(u)];
            if ((ife[i]==0) && (oobbbno==new)) oobbbno=1;
        }
        else {
            noobbi[u]=1;
            oobbeif[u]=0;
        }

        if (bct==4){
            j=1;
```

```
            f=0;
            while ((f==0) && (j<i)){
                f=f | ((~ife[j]) & card(2,0,j));
                j++;
            }
            oobbben[i]=1 & (~f);

            if (card(2,0,i)==1){
                j=f=1;
                while ((f==1) && (j<i)){
                    f=f & ife[j];
                    j++;
                }
                while ((f==1) && (j<=iqs)){
                    f=f & iafe[j];
                    j++;
                }

                noobbi[u]=oobbei[u]=1 & f & oobbben[i] & bv[col(u)];
            }
        }
    }

    /* calculate EI vectors, without and with resource dependancies */
    /* calc. overall EI vector, ignoring RDs */
    for (u=1; u<=nm; u++){
        i=row(u);
        j=col(u);
        /* take care of super-advanced execution */
        switch (ddct){
            case 1:
/*              sae=1 & ife[i] & (card(bbdo,1,i) | saeve(u)); */
                sae=1 & (((~bv[j]) & saeve(u)) | (ife[i] & card(bbdo,1,i)));
                break;

            case 2:
                sae=1 & (ife[i] | (~bv[j]));
                break;

            case 3:
            default:
                eicerr(40,i);
        }

        /* calculate execution status indicators */
        switch (bct){
            case 2:
                exstatr[u]=sae;
                break;

            case 1:
            case 3:
                if (i<=oobbbno) exstatr[u]=sae;
                else exstatr[u]=(iafe[i] | (~bvis[j])) & isbmsk;
                break;

            case 4:
                exstatr[u]=1 & (((~oobbben[i]) & (iafe[i] | (~bvis[j]))) | (oobbben[i] &
sae));
                break;

            default:
                eicerr(45,i);
                break;
        }
    }

    /* calculate  Semantically Executably Independent Instructions */
    for (u=1; u<=nm; u++){
        /* take care of restriction on super-advanced execution */
        switch (ddct){
            case 1:
                if ((b<aew) && (col(u)==aew)) t=0;
                else t=1;
                break;

            case 2:
            case 3:
                t=1;
                break;

            default:
                eicerr(35,u);
                break;
        }
        /* actual SEI calc. */
        nrel[u]=nddi[u] & nfbdi[u] & nbbdi[u] & noobbi[u] & (isbmsk & (~exstatr[u])) & t;
    }

    /* allow for exit, etc. */
    for (i=1; i<=iqs; i++){
        if ((getbits(iq[i].flg,7,1)) && (ifeal1==0)){
            for (k=i; k<=nm; k+=iqs) nrel[k]=0;
        }
        ifeal1=ifeal1 & ife[i];
    }

    /* set the other nr vectors appropriatnly */
    for (u=1; u<=nm; u++){
        switch (iq[row(u)].opc & (~occfsmk) & (~occfcmk)){
            case occffb:
            case ocprcl01:
            case ocprret0:
                /* FB, CALL, or RETURN */
                nrasei[u]=0;
                nrfbei[u]=nrel[u];
                nrbbei[u]=0;
                break;

            case occfbb:
                nrasei[u]=0;
                nrfbei[u]=0;
                nrbbei[u]=nrel[u];
                break;

            default:
                nrasei[u]=nrel[u];
                nrfbei[u]=0;
                nrbbei[u]=0;
                break;
        }
    }

    rdf(nm);    /* calc. final EI vectors */
}

/* NOW A MACRO; LOADED IN load()
```

26 simcd54.c

```
int dd(arno,r,c)
register int arno,r,c;
{
    register unsigned int out;

    switch (arno){
        case 1:

            if (r<=c) out=card(dde4,r,c);
            else out=card(dde2,c,r);
            break;

        case 2:

            if (r<=c) out=card(dde5,r,c);
            else out=card(dde3,c,r);
            break;

        case 3:

            if (r<=c) out=card(dde1,r,c);
            else out=card(dde1,c,r);
            break;

        case 4:

            if (r<c) out=card(dde2,r,c) | card(dde3,r,c);
            else out=card(dde4,c,r) | card(dde5,c,r);
            break;

        default:
            elcerr(25,-1);
            break;
    }
    return(1 & out);
}
*/



rdf(len)        /* pass SEI vectors through the resource dependency filters */
                /*      creating the final EI vectors */
int len;        /* length of vectors, normally =lqs for ddct=3 (normal), */
                /*      =nm for ddct=1 or 2 (reduced data dependencies) */
{
    int i;      /* vector index */
    int j;      /* counter */
    unsigned int iex;   /* instruction executed */
    int dumnop; /* dummy or no-op indicator */
    int histno; /* hist index */

    /* create final EI vectors, taking into account resource dependancies */
    aspec=fbpec=bbpec=tbpec=0;  /* init. counts */
    for (i=1; i<=len; i++){
        /* see if dummy or no-op */
        if ((iq[row(i)].opc==ocmlsdum) || (iq[row(i)].opc==ocmlsnop)) dumnop=1;
        else dumnop=0;

        if ((nrasel[i]==1) && (aspec<aspeq) && (dumnop==0)){
            aspec++;
            asel[i]=1;
        }
        else if ((nrasel[i]==1) && (dumnop==1)) asel[i]=1;  /* don't count */
        else asel[i]=0;
    }

    for (i=1; i<=len; i++){
        if ((nrbbel[i]==1) && (bbpec<bbpeq) && (tbpec<tbpeq)){
            bbpec++;
            tbpec++;
            bbel[i]=1;
        }
        else bbel[i]=0;
    }

    for (i=1; i<=len; i++){
        if ((nrfbel[i]==1) && (fbpec<fbpeq) && (tbpec<tbpeq)){
            fbpec++;
            tbpec++;
            fbel[i]=1;
        }
        else fbel[i]=0;
    }

    for (i=1; i<=len; i++) ei[i]=asel[i] | fbel[i] | bbel[i];

    if (histgram==1){
        for (i=1; i<=len; i++){
            histno=(iq[row(i)].addr-pcstart)>>2;

            /* only count those actually updated */
            iex=1 & ei[i] & (~upin[i]);
            if (hist[histno]== -1) hist[histno]=iex;
            else hist[histno]+=iex;
        }
    }

    if ((redtrc==1) && (back==0)){
        j=0;
        for (i=1; i<=len; i++){
            if ((ei[i]==1) && (upin[i]==0)){
                if (((j%10)==0) && (j!=0)) printf("\n");
                j++;
                printf("%x  ",iq[row(i)].addr);
            }
        }
        printf("\n");
    }

    /* update max. executions per cycle */
    if (aspec>asexmax) asexmax=aspec;
    if (fbpec>fbexmax) fbexmax=fbpec;
    if (bbpec>bbexmax) bbexmax=bbpec;
    if (tbpec>tbexmax) tbexmax=tbpec;
}


aelzcal()       /* calc. all AELZs */
{
    int i;      /* pointer */

    for (i=1; i<=lqs; i++) aelz[i]=lnz(i);
}


aerocal()       /* calc. all AEROs */
```

```
{
    int i;      /* pointer */

    for (i=1; i<=lqs; i++) aero[i]=hno(i);
}


iafecal()       /* calc. all iafe elements */
{
    int i;      /* pointer */

    for (i=1; i<=lqs; i++){
        switch (ddct){
            case 1:
            case 2:
                if (aelz[i]>=b) iafe[i]=1;
                else iafe[i]=0;
                break;

            case 3:
                if ((aero[i]==(aelz[i]-1)) && (aero[i]==(b-1))) iafe[i]=1;
                else iafe[i]=0;
                break;

            default:
                elcerr(98,i);
                break;
        }
    }
}


ifecal()        /* calc. all ife elements */
{
    int i;      /* pointer */

    for (i=1; i<=lqs; i++) ife[i]=instex(i);
}


brex()          /* execute branch tests */
{
    int i;      /* pointer */
    int j;      /* counter */
    int f;      /* flag */
    unsigned int cond;  /* condition to be evaluated */
    unsigned int cet;   /* condition evaluation type */
    int lim;    /* loop limit */
    int u,k,s;  /* indices */
    int ind;    /* serial index */
    unsigned int tl;    /* logical accumulator */
    unsigned int upin2; /* temp for extra update inhibit for ddct=1 */

    oobbextf=0; /* init. oobb executed true flag */
    oobbexf=0;  /* init. oobb executed flag */
    oobfbexf=0; /* init. flags */
    oobbbexf=0;
    oobbbnxf=0;

    /* determine loop limit */
    switch (ddct){
        case 3:
            lim=lqs;
            break;

        case 1:
        case 2:
            lim=nm;
            break;

        default:
            exerr(3,-1);
            break;
    }

    /* calculate Branch EXecution Signs (condition tests) */
    for (u=1; u<=lim; u++){
        i=row(u);
        if (((fbei[u]==1) || (bbei[u]==1)) && (iq[i].opc!=ocprcl01) && (iq[i].opc!=ocprre
t0)){
            if ((iq[i].flg & 0x10)==0){
                switch (ddct){
                    case 3:
                        cond=mrd(iq[i].op[0]);
                        break;

                    case 1:
                    case 2:
                        if (sfa[0][u]==0) cond=dcs[ss][sen[0][u]];
                        else cond=mrd(iq[i].op[0]);
                        break;

                    default:
                        exerr(4,u);
                        break;
                }
            }
            else cond=iq[i].op[0];
            cet=(occfsmk | occfcmk) & iq[i].opc;
            switch (cet){
                case (occfsf | occfcz):
                    if (cond!=0) bexs[u]=1;
                    else bexs[u]=0;
                    break;

                case (occfsf | occfco):
                    if (cond!=(~0)) bexs[u]=1;
                    else bexs[u]=0;
                    break;

                case (occfst | occfcz):
                    if (cond==0) bexs[u]=1;
                    else bexs[u]=0;
                    break;

                case (occfst | occfco):
                    if (cond==(~0)) bexs[u]=1;
                    else bexs[u]=0;
                    break;

                default:
                    exerr(5,u);
                    break;
            }
        }
        else if ((iq[i].opc==ocprcl01)||(iq[i].opc==ocprret0)) bexs[u]=1;
```

```
        else bexs[u]=0;
    }

    /* take care of oobbs */
    for (u=1; u<=llm; u++) upin[u]=0;
    for (l=1; l<=lqs; l++) taen[l]=0;
    for (u=1; u<=llm; u++){
        l=row(u);
        if ((fbel[u]==1) && (oobbelf[u]==1)){
            switch (bct){
                case 1:
                case 2:
                case 3:
                    if (bexs[u]==1){
                        oobbextf=1;
                        if (lq[l].opc==ocprcl0l){
                            stackwr(lq[l].addr + 16);
                            stackwr(lq[l].dba);
                            oobbta=lq[l].ta;
                            if (getbits(lq[l].flg,4,1)==0) dba=mrd(lq[l].op[0]);
                            else dba=lq[l].dba+lq[l].op[0];
                        }
                        else if (lq[l].opc==ocprret0){
                            oobbta=stacklk(1,0);        /* restore pc */
                            dba=stacklk(0,2);   /* restore dba */
                        }
                        else oobbta=lq[l].ta;
                    }
                    oobbexf=1;
                    oobfbexf=1;
                    oobbcnt++;  /* update OOBB counter */
                    break;

                case 4:
                    switch (ddct){
                        case 3:
                            /* calculate target address pointer */
                            j=f=1;
                            while ((f==1) && (j<l)){
                                f=f & 1 & ((~csrd(1,j,lqs))|(~bexs[j])|(csrd(4,1,j)&(~el
[j]))));

                            j++;
                            }
                            taen[l]=1 & bexs[l] & csrd(1,l,lqs) & f;

                            /* calculate update inhibit */
                            j=1;
                            f=0;
                            while ((f==0) && (j<l)){
                                f=1 & (f |((~csrd(4,1,j)) & (~(el[j] & lafe[j]))));
                                j++;
                            }
                            upin[l]=1 & bexs[l] & csrd(1,l,lqs) & f;

                            break;


                        case 1:
                        case 2:
                            /* calculate TA ENable */
                            if (l<=lqs){
                                f=0;
                                for (k=1; (k<=b)&&(f==0); k++){
                                    ind=ser(l,k);
                                    f |= el[ind] & bexs[ind];
                                }
                                f &= csrd(fbd,l,lqs);
                                for (j=1; (j<=(l-1))&&(f==1); j++){
                                    t1=1;
                                    for (k=1; (k<=b)&&(t1==1); k++){
                                        ind=ser(j,k);
                                        t1 &= 1 & ((~el[ind]) | (~bexs[ind]) | dcsrd(AE,j
,k));

                                    }
                                    t1=1 & (t1 | (~csrd(fbd,j,lqs)));
                                    f &= t1;
                                }
                                taen[l]= 1 & f;
                            }

                            /* calculate UPdate INhibit */
                            f=0;
                            for (s=1; (s<=(u-1))&&(f==0); s++){
                                f=1 & (f | (((~el[s]) | (bexs[s] &
                                    csrd(fbd,row(s),lqs))) & (~dcs[AE][s])));
                            }
                            upin[u]=1 & bexs[u] & csrd(fbd,row(u),lqs) &
                                        (f | (~bv[col(u)]));
                            break;

                        default:
                            exerr(8,u);
                            break;
                    }


                    /* do the oobb calculations */
                    if (taen[l]==1){
                        oobbta=lq[l].ta;
                        if (upin[u]==0){
                            oobbextf=1;
                            oobbexf=1;
                            oobfbexf=1;
                            if (lq[l].opc==ocprcl0l){
                                /* execute procedure call */
                                stackwr(lq[l].addr + 16);
                                stackwr(lq[l].dba);
                                if (getbits(lq[l].flg,4,1)==0) dba=mrd(lq[l].op[0]);
                                else dba=lq[l].dba+lq[l].op[0];
                            }
                            else if (lq[l].opc==ocprret0){
                                oobbta=stacklk(1,0);    /* restore pc */
                                dba=stacklk(0,2);       /* restore dba */
                            }
                            else;
                        }
                    }
                    if (upin[u]==0) oobbcnt++;
                    break;

                default:
                    exerr(9,u);
                    break;
            }
        }
        else if ((bbel[u]==1) && (oobbelf[u]==1)){
            if (bexs[u]==1){
                oobbextf=1;
```

```
                oobbta=iq[i].ta;
            }
            oobbexf=1;
            oobbbexf=1;
            if (i==iqs) oobbbnxf=1;
            oobbcnt++;
        }
        else;
    }
    oobbtcnt+=oobbextf;

    /* modify UPIN accordingly */
    if (ddct==1){
        for (u=1; u<=lim; u++){
            upin2= 1 & bexs[u] & (~bv[col(u)]) & ool[b[row(u)] & fbel[u];
            upin[u] |= upin2;
        }
    }
}


aeupd()         /* AE, b update */
{
    int i,j,k;  /* pointers */
    int aept;   /* AE pointer */
    int aeptp;  /*  "    "    plus one */
    unsigned int btmsk; /* bit test mask */

    /* ae update */
    for (i=1; i<=iqs; i++){
        if (asel[i]==1) aeset(i,aelz[i]);
    }

    /* fb update */
    for (i=1; i<=iqs; i++){
        if ((fbe[i]==1) && ((bct[=4) || (upin[i]==0))){
            aept=aelz[i];
            aeset(i,aept);
            if (bexs[i]==1){
                j=i+1;
                while ((j<=iqs) && (csrd(1,i,j)==1)){
                    aeset(j,aept);
                    j++;
                }
            }
        }
    }

    /* BB update */
    for (i=1; i<=iqs; i++){
        if (bbel[i]==1){
            aept=lnz(i);
            if ((bexs[i]==0) || (oobbelf[i]==1)) aeset(i,aept);
            aeptp=aept+1;
            if ((bexs[i]==1) && ((aemaxflg=aemaxt(i))==0) && (oobbelf[i]==0,){
                aeset(i,aept);
                for (j=1; j<=i; j++) aesh(j,aeptp,(i & (~csrd(2,j,i))));
                for (j=i+1; j<=new; j++) aesh(j,aept,1);
                b++;
                if (b>bmax) bmax=b;
            }
        }
    }
    /* remove all-ones columns from AE */
    btmsk=1;
    btmsk=btmsk<<(32-b);        /* adjust mask to point to b column */

    for (k=b; k>=1; k--){
        /* see if we can eliminate column k */
        j=0;
        i=1;
        while ((i<=iqs) && (j==0)){
            if ((iq[i].ae & btmsk)==0) j=1;
            i++;
        }

        /* if so retire (eliminate) column k */
        if ((j==0) && (b>1)){
            b--;
            remcol(k);

            /* update counters */
            aeshc++;
            aeshcc++;
        }

        btmsk=btmsk<<1; /* point btmsk at next column */
    }
}


memupd()        /* update memory with allowable sink (ssi) contents */
{
    unsigned int tl;    /* logical product accumulator */
    int u,s;    /* indices */

    /* calculate Write Sink Enables */
    for (u=1; u<=nm; u++){
        tl=1;
        for (s=1; s<=(u-1); s++){
/*          tl &= (~arri[s]) | (~dd(4,row(s),row(u))) | dcs[AE][s] | (~arwl[u]);
*/
            tl &= (~dd(4,row(s),row(u))) | dcs[AE][s];
            tl &= dcs[AE][s] | (~dd(3,row(s),row(u))) | dcs[ast][s];
        }
        wse[u]= 1 & tl & (~dcs[ast][u]) & dcs[rel[u] & bv[col(u)];
    }

    /* update memory and AST */
    for (u=1; u<=nm; u++){
        if (wse[u]==1){
            /* only write real sinks, ie. don't write sinks of branches */
            if ((getbits(iq[row(u)].flg,6,1)==0)&&(getbits(iq[row(u)].flg,2,1)==0)){
                mwr(dcs[isa][u],dcs[asi][u],dcs[bwi][u]);
            }
            /* always update the advanced storage matrix */
            dcs[ast][u]=1;
        }
    }
}



dcsupd()        /* dynamic concurrency structure update, primarily based */
```

simcd54.c

```
        /*      on AE, b; for reduced data dependencies */
{
    int i,j,k;  /* pointers */
    int aept;   /* AE pointer */
    int aeptp;  /*  "    "     plus one */
    unsigned int btmsk; /* bit test mask */
    int u,t;    /* serial indices */
    int ind;    /* serial index */

    /* as update */
        /* accomplished in function asex() */

    /* fb update */
    for (u=1; u<=nm; u++){
        i=row(u);
        if (((fbel[u]==1) && ((bct!=4) || (upin[u]==0)) &&
                ((ddct!=1) || (upin[u]==0))){
            dcs[re][u]=1;
            dcs[AE][u]=1;
            dcs[ast][u]=1;
            aeset(i,col(u));
            if (bexs[u]==1){
                j=i+1;
                while ((j<=iqs) && (card(1,1,j)==1)){
                    ind=ser(j,col(u));
                    dcs[AE][ind]=dcs[ve][ind]=dcs[ast][ind]=1;
                    aeset(j,col(u));
                    j++;
                }
            }
        }
    }

    /* BB update - only one BB executes per row */
    for (u=1; u<=nm; u++){
        i=row(u);
        if (bbx[u]==1){
            aept=lnz(i);
            if ((bexs[u]==0) || (oobbelf[u]==1)){
                aeset(i,aept);
                ind=ser(i,aept);
                dcs[AE][ind]=dcs[re][ind]=dcs[ast][ind]=1;
            }
            aeptp=aept+1;
            if ((bexs[u]==1) && ((aemaxflg-aemaxt(i))==0) && (oobbelf[u]==0)){
                aeset(i,aept);
                ind=ser(i,aept);
                dcs[AE][ind]=dcs[re][ind]=dcs[ast][ind]=1;

                /* shift in and above BB domain */
                for (j=1; j<=i; j++){
                    switch (ddct){
                        case 1:
                            if ((iii[i]==0)||(b>aept)||(card(bbdo,j,1)==0)){
                                aesh(j,aeptp,(1 & (~csrd(2,j,1))));
                            }
                            else; /* dont shift, allowing use of SAE inst. */

                            /* reset dcss if outer loop executes */
                            if ((iii[i]==0)&&(iii[j]==1)&&(b<=aept)&&
                                (card(bbdo,j,1)==1)){
                                dcsres(j,aeptp);
                            }
                            break;
                        case 2:
                            aesh(j,aeptp,(1 & (~csrd(2,j,1))));
                            break;

                        case 3:
                        default:
                            exerr(300,u);
                    }
                }

                /* shift below BB domain */
                for (j=i+1; j<=new; j++) aesh(j,aept,1);
                bvls[b]=1;
                b++;
                bv[b]=1;
                if (b>bmax) bmax=b;
            }
        }
    }


    /* remove all-ones columns from AE, etc. */

    /* determine list of eligible columns for removal, derived from BB */
    /*  execution status */
    elcol[1]=1;
    for (j=2; j<=aew; j++) elcol[j]=0;
    for (i=1; i<=iqs; i++){
        if ((t=lnz(i))<b) elcol[t+1]=1;
    }

    for (k=b; k>=1; k--){
      if (elcol[k]==1){
        /* see if we can eliminate column k */
        j=0;
        i=1;
        while ((i<=iqs) && (j==0)){
            if (dcsrd(ast,i,k)==0) j=1;
            i++;
        }

        /* if so retire (eliminate) column k */
        if ((j==0) && (b>1)){
            bv[b]=0;
            b--;
            bvls[b]=0;
            remcol(k);

            /* update counters */
            aeshcc++;
            aeshc++;
        }
      }
    }
}


remcol(coll)    /* remove column coll from AE, shifting left */
unsigned int coll;
{
    unsigned int lmsk,hmsk;     /* low mask, high mask */
```

simcd54.c

```
    unsigned int rlc;    /* real column number */
    int i;       /* AE index */
    int j,k;     /* indices */

    rlc=32-coll;

    /* create masks */
    lmsk=hmsk=~0;
/*    lmsk=lmsk<<(rlc+1);  */ /* removed due to Sun 4/60 bug */
    lmsk=lshft(lmsk,(rlc+1));
    hmsk=hmsk>>(32-rlc);

    /* retire column, row by row */
    for (i=1; i<=new; i++){
        iq[i].ae=(iq[i].ae & lmsk) | ((iq[i].ae & hmsk)<<1);
    }
    if ((ddct==1) || (ddct==2)){
        for (k=0; k<=6; k++){
            for (i=1; i<=new; i++){
                for (j=coll; j<aew; j++){
                    if (i!=new) dcswr(k,i,j,dcard(k,i,j+1));
                    else dcsnew[k][j]=dcsnew[k][j+1];
                }
                if (i!=new) dcswr(k,i,aew,0);
                else dcsnew[k][aew]=0;
            }
        }
    }
}


int lshft(invar,numbits)   /* procedure to do a left shift,*/
                /* added to fix Sun 4/60 bug */
unsigned int invar;     /* number to be shifted */
unsigned int numbits;      /* number of bits to shift */
{
  int i;     /* bit counter */
  unsigned int bitclr;
  unsigned int varout;   /* variable output */

  bitclr = -1;    /* used to clear lsb */

  for (i = 1; i <= numbits; i++){
    invar = (invar << 1) & bitclr;
  }
  varout = invar;
  return(varout);
}



aeset(roww,coll)                /* set bit at AE(row,col) */
unsigned int roww,coll;
{
    iq[roww].ae=iq[roww].ae | (((unsigned) msbmsk)>>(coll-1));
}



aeclr(roww,coll)                /* clear bit at AE(row,col) */
unsigned int roww,coll;
{
    iq[roww].ae=iq[roww].ae & (~(((unsigned) msbmsk)>>(coll-1)));
}



aesh(roww,coll,val)     /* shift val into AE(roww) at coll to right */
unsigned int roww,coll;
unsigned int val;
{
    unsigned int t;     /* temp AE row */
    unsigned int ones;  /* allo */
    int k,j;    /* pointers */

    ones=allo;
    t=iq[roww].ae;
    iq[roww].ae=(t & (ones<<(33-coll))) | (val<<(32-coll)) | ((t>>1) & (ones>>coll));
    if ((ddct==1) || (ddct==2)){
        for (k=0; k<=6; k++){
            for (j=(aew-1); j>=coll; j--){
                if (roww!=new) dcswr(k,roww,(j+1),dcsrd(k,roww,j));
                else dcsnew[k][j+1]=dcsnew[k][j];
            }
            switch (k){
                case AE:
                case ve:
                case ast:
                    if (roww!=new) dcswr(k,roww,coll,val);
                    else dcsnew[k][coll]=val;
                    break;

                case re:
                case lsa:
                case ssl:
                case bwl:
                    if (roww!=new) dcswr(k,roww,coll,0);
                    else dcsnew[k][coll]=0;
                    break;

                default:
                    exerr(42,-1);
                    break;
            }
        }
    }
}



dcsres(r,startcol)      /* clear all dcs in row r from startcol(umn) to m */
int r,startcol;
{
    int j;      /* column index */

    for (j=startcol; j<=aew; j++){
        aeclr(r,j);
        dcswr(AE,r,j,0);
        dcswr(ve,r,j,0);
        dcswr(ast,r,j,0);
        dcswr(re,r,j,0);
        dcswr(lsa,r,j,0);
        dcswr(ssl,r,j,0);
        dcswr(bwl,r,j,0);
    }
```

32 simcd54.c

```
}

int aemaxt(roww) /* return 1 iff AE at max. (one or more 1s in last AE */
                 /* column) OR ((one or more previous unexecuted in bounds */
                 /* BBs) AND (one or more 1s in second to last AE column)) */
int roww;        /* BB to check for execution */
{
    int i;       /* pointer */
    int f;       /* flag, one or more ones in last AE column */
    int f2;      /* flag, one or more ones in next to last AE column */
    int unexbb;  /* unexecuted in-bounds BB */
    int bn;      /* bit number */

    i=1;
    f=0;
    bn=32-aew;

    while ((i<=new) && (f==0)){
        f=getbits(iq[i].ae,bn,1);
        i++;
    }

    i=1;
    f2=0;
    bn+=1;

    while ((i<=new) && (f2==0)){
        f2=getbits(iq[i].ae,bn,1);
        i++;
    }

    i=1;
    unexbb=0;
    while ((i<roww) && (unexbb==0)){
        unexbb=1 & (~ife[i]) & card(2,i,1) & (~card(2,0,1));
        i++;
    }

    return(1 & (f | (f2 & unexbb)));
}


asex()          /* execute assignment statements */
{
    int i;      /* pointer */
    unsigned int aval,bval,cval;        /* actual values of A,B,C */
    unsigned int tval;                  /* total value; normally an address */
    unsigned int aaddr;                 /* address of A */
    unsigned int tflg;                  /* temp IQ flag */
    int ic,isc;                         /* instr. class, sub-class */
    int sisb,isb;                       /* (sub-)instr. switch base */
    unsigned int t;                     /* temp. */
    int bival,cival;                    /* integer versions of B,C */
    int it;                             /* integer versions of t */
    int opcode;                         /* guess */
    int lim;                            /* loop limit */
    int u;                              /* loop (serial iteration) counter */

    /* determine limit */
    switch (ddct){
        case 3:
            lim=iqs;
            break;

        case 1:
        case 2:
            lim=nm;
            break;

        default:
            exerr(5,-1);
            break;
    }

    /* execute all instructions i such that they are EI */
    for (u=1; u<=lim; u++){
        i=row(u);
        if (asel[u]==1){

            /* get A,B,C */
            aaddr=iq[i].res;
            tflg=iq[i].flg;
            switch (ddct){
                case 3:
                    if (getbits(tflg,4,1)==0) bval=mrd(iq[i].op[0]);
                    else bval=iq[i].op[0];
                    if (getbits(tflg,5,1)==0) cval=mrd(iq[i].op[1]);
                    else cval=iq[i].op[1];
                    if (arw[u]==1){
                        if (getbits(tflg,6,1)==0) aval=mrd(iq[i].res);
                        else aval=iq[i].res;
                    }
                    break;

                case 1:
                case 2:
                    /* partial update (only for assignment statements) */
                    dcs[re][u]=dcs[AE][u]-1;
                    aeset(i,col(u));

                    /* get source 1 */
                    if (getbits(tflg,4,1)==0){
                        if (sfs[0][u]==0) bval=dcs[ss][sen[0][u]];
                        else bval=mrd(iq[i].op[0]);
                    }
                    else bval=iq[i].op[0];

                    /* get source 2 */
                    if (getbits(tflg,5,1)==0){
                        if (sfs[1][u]==0) cval=dcs[ss][sen[1][u]];
                        else cval=mrd(iq[i].op[1]);
                    }
                    else cval=iq[i].op[1];

                    /* get sink */
                    if (arw[i]==1){
                        if (getbits(tflg,6,1)==0){
                            if (sfs[2][u]==0) aval=dcs[ss][sen[2][u]];
                            else aval=mrd(iq[i].res);
                        }
                        else aval=iq[i].res;
                    }
                    break;
```

33 simcd54.c

```
    default:
        exerr(7,u);
        break;
}

/* calculate opcode parts */
opcode=iq[i].opc & 0x7f;
ic=opcode & ocidmsk;
iac=opcode & ocscidmk;

/* execute instruction (we made it!) */
/* first switch level: class */
switch (ic){
    case oclog:
        if ((iac & oclognb)!=0) bval=~bval;
        if ((iac & oclognc)!=0) cval=~cval;
        isb=opcode & (oclogmsk | ocidmsk);
        switch (isb){
            case ocloganđ:
                t=bval & cval;
                break;

            case oclogori:
                t=bval | cval;
                break;

            case oclogore:
                t=bval ^ cval;
                break;

            case oclogneg:
                t=bval;
                break;

            default:
                exerr(10,u);
                break;
        }
        skwr(u,aaddr,t,0); /* write result */
        break;

    /* arithmetic ops */
    case oca:
        isb=opcode & (ocamsk | ocidmsk);
        sisb=opcode & ocaopmsk;
        bival=uti(bval);
        cival=uti(cval);
        switch (sisb){
            case ocaintn:
                switch (isb){
                    case ocaplus:
                        it=bival+cival;
                        break;

                    case ocaminus:
                        it=bival-cival;
                        break;

                    case ocatimes:
                        it=bival*cival;
                        break;

                    case ocadiv:
                        it=bival/cival;
                        break;

                    default:
                        exerr(20,u);
                        break;
                }
                skwr(u,aaddr,itu(it),0);
                break;

            case ocainta:
                switch (isb){
                    case ocadiv:
                        it=bival%cival;
                        break;

                    default:
                        exerr(30,u);
                        break;
                }
                skwr(u,aaddr,itu(it),0);
                break;

            default:
                exerr(40,u);
                break;
        }
        break;

    /* comparison (relational) ops */
    case ocrl:
        isb=opcode & (ocrlmsk | ocidmsk);
        bival=uti(bval);
        cival=uti(cval);
        switch (isb){
            case ocrlgt:
                if (bival>cival) t=allo;
                else t=allz;
                break;

            case ocrleq:
                if (bival==cival) t=allo;
                else t=allz;
                break;

            case ocrlgteq:
                if (bival>=cival) t=allo;
                else t=allz;
                break;

            case ocrllt:
                if (bival<cival) t=allo;
                else t=allz;
                break;

            case ocrlne:
                if (bival!=cival) t=allo;
                else t=allz;
                break;

            case ocrllteq:
                if (bival<=cival) t=allo;
                else t=allz;
                break;
```

34 simcd54.c

```
            default:
                exerr(50,u);
                break;
        }
        skwr(u,aaddr,t,0);
        break;

    /* shift ops */
    case ocsh:
        isb=opcode & (ocshmsk | ocldmsk);
        switch (isb){
            case ocshl:
                t=bval<<cval;
                break;

            case ocshr:
                t=bval>>cval;
                break;

            default:
                exerr(60,u);
                break;
        }
        skwr(u,aaddr,t,0);
        break;

    /* simple assignment (move) ops */
    case ocass:
        isb=opcode & (ocamsk | ocldmsk);
        sisb=opcode & ocassimk;
        switch (isb){
            /* A=B */
            case ocassb:
                switch (sisb){
                    /* byte op */
                    case ocasslby:
                        /* mwr(aaddr,bval,1); */
                        /* illegal as of Version 4.1 */
                        exerr(60,u);
                        break;

                    /* 32-bit word op */
                    case ocasslls:
                        skwr(u,aaddr,bval,0);
                        break;

                    default:
                        exerr(70,u);
                        break;
                }
                break;

            /* A=B(C) */
            case ocassarf:
                switch (sisb){
                    case ocasslby:
                        tval=bval+cval;  /* compute address */
                        t=mrd(tval & (~0x3));  /* get word */
                        t=getbits(t,(((4-(tval & 0x3))*8)-1),8); /* get byte from word */

                        skwr(u,aaddr,t,0);
                        tmbrdc++;    /* update access counter */
                        break;

                    case ocasslls:
                        t=mrd(bval+(cval<<2)); /* read source */
                        skwr(u,aaddr,t,0);
                        break;

                    default:
                        exerr(80,u);
                        break;
                }
                break;

            /* A(B)=C */
            case ocassart:
                switch (sisb){
                    case ocasslby:
                        t=bval+aval;   /* calc. addr. of sink */
                        skwr(u,t,cval,1);
                        tmbwrc++;   /* update access counter */
                        break;

                    case ocasslls:
                        t=aval+(bval<<2); /* calc. addr. of sink*/
                        skwr(u,t,cval,0);
                        break;

                    default:
                        exerr(90,u);
                        break;
                }
                break;

            default:
                exerr(100,u);
                break;
        }
        break;

    /* misc. ops */
    case ocmis:
        isb=opcode;
        switch (isb){
            case ocmisdum:
                /* dummy instr., ignore operands, treat as */
                /* no-op normally; treat as A=B where A and B */
                /* point to the same location if using reduced */
                /* data dependencies */
                switch (ddct){
                    case 3:
                        /* do nothing */
                        break;

                    case 1:
                    case 2:
                        if ((getbits(tflg,4,1)==1) ||
                          (getbits(tflg,6,1)==1) ||
                          (iq[i].op[0]!=iq[i].res)) {
                            fprintf(stderr,"simcd: illegal dummy instruction at row %d.\n",row(u));

                            abort();
                        }
                        else skwr(u,aaddr,bval,0);
                        break;
```

simcd54.c

```
                        default:
                            exerr(105,u);
                    }
                    break;

                case ocmisnop:
                    /* no-op */
                    break;

                default:
                    exerr(110,u);
                    break;
            }
            break;

        /* procedural ops */
        case ocpr:
            lab=opcode;
            switch (lab){
                case ocprcl01:
                    exerr(113,u);
                    break;

                case ocprcl02:
                    break;

                case ocprret0:
                    exerr(116,u);
                    break;

                case ocprret1:
                    break;

                case ocprex:
                    endsimf=1;  /* signal end of simulation */
                    break;

                default:
                    exerr(120,u);
                    break;
            }
            break;

        default:
            exerr(130,u);
            break;
        }
      }
    }
}


skwr(u,addr,data,size)  /* sink write */
int u;                  /* serial index */
unsigned int addr;      /* data address */
unsigned int data;      /* data to be written */
int size;               /* data size 0-word, 1-byte */
{
    switch (ddct){
        case 3:
            mwr(addr,data,size);        /* always written to memory */
            break;

        case 1:
        case 2:
            /* only the dynamic concurrency structures are affected */
            dcs[isa][u]=addr;
            dcs[ssi][u]=data;
            dcs[bwi][u]=size;
            break;

        default:
            exerr(140,u);
            break;
    }
}


int uti(u)      /* unsigned to int */
unsigned int u;
{
    int i,ii;

    i=u>>1;
    ii=u & 1;
    i=(i<<1) | ii;
    return(i);
}


int itu(i)      /* integer to unsigned */
int i;
{
    int u,uu;

    u=(i>>1) & (~msbmsk);
    uu=i & 1;
    u=(u<<1) | uu;
    return(u);
}


mtout(fp)       /* output medium trace; normally called once per cycle */
FILE *fp;       /* file pointer */
{
    int i,j;    /* row, column indices */
    int lim;    /* column limit */

    switch (ddct){
        case 1:
        case 2:
            lim=aew;
            break;

        case 3:
            lim=1;
            break;

        default:
            fprintf(stderr,"simcd: Error during medium trace output.\n");
            abortnt();
    }

    /* output arrays */
    for (i=1; i<=iqs; i++){
```

```
        fprintf(fp,"%x ",iq[i].addr);
        for (j=1; j<=lim; j++) fprintf(fp,"%1x",ei[ser(i,j)]);
        fprintf(fp," ");
        for (j=1; j<=lim; j++) fprintf(fp,"%1x",upin[ser(i,j)]);
        fprintf(fp," ");
        for (j=1; j<=lim; j++) fprintf(fp,"%1x",wse[ser(i,j)]);
        fprintf(fp," ");
        for (j=1; j<=lim; j++) fprintf(fp,"%1x",bexs[ser(i,j)]);
        fprintf(fp,"\n");
    }
    fprintf(fp,"\n");

    /* output per cycle counter values */
    fprintf(fp,"%d %d %d %d\n",tmemrdcc,tmemwrcc,memrdcc,memwrcc);
    fprintf(fp,"%d %d %d %d\n",regrdcc,regwrcc,ldscntsc,aeshcc);
    fprintf(fp,"%d %d %d %d\n",ifmrcc,b,callexcc,retexcc);
    fprintf(fp,"\n\n");
}


tout(fp)        /* output trace */
FILE *fp;       /* file pointer */
{
    int i,j,k;  /* pointers */
    int lit,ult;        /* temp. m limits for dump */
    int mlim;   /* limited AE width used, <= 14 */

    fprintf(fp,"%s %d%s%d %s %s/%s\n","simcd Version Number:",simver1,".",simver2,"Input
 File:",cdp,ifnp);
    fprintf(fp,"%70s %d\n","Trace, cycle number:",cno);
    fprintf(fp,"%60s\n","Instruction Queue contents:");
    fprintf(fp,"%-5s%-10s%-10s%-10s%-10s%-10s","row","address","DBA","opcode","sink(A)",
"src1(B)");
    fprintf(fp,"%-10s%-10s%-10s%-10s%20s\n","src2(C)","flags","TA","MPB","AE(in binary)"
);

    for (i=0; i<=iqs; i++){
        fprintf(fp,"%2d  %08x  %08x  %08x  %08x",i,iq[i].addr,iq[i].dba,iq[i].opc,iq[i].
res);
        fprintf(fp,"  %08x  %08x  %08x  %08x  %08x  ",iq[i].op[0],iq[i].op[1],iq[i].flg,
iq[i].ta,iq[i].mpb);
        prbits(fp,iq[i].ae,1,aew);      /* print bits of AE */
        fprintf(fp,"\n");
    }

    fprintf(fp,"\n");

  if (iqs<=19){
    fprintf(fp,"%60s\n","Concurrency Structures:");
    fprintf(fp,"%-4s%-24s%-24s%-24s%-24s%-24s\n","row","DD","FBD","BBDO","PBBDE","CBB");
    for (i=0; i<=iqs; i++){
        fprintf(fp,"%2d  ",i);
        for (j=0; j<=5; j++){
            if (j!=4){
                prbits(fp,cs[j][i][0],1,new);
                prc(fp,(24-new),' ');
            }
        }
        fprintf(fp,"\n");
    }
  }
    fprintf(fp,"\f");
```

```
    if ((ddct==1) || (ddct==2)){
        /* print extra data */
        if (iqs<=19){
            fprintf(fp,"%60s\n","Concurrency Structures:");
            fprintf(fp,"%-4s%-24s%-24s%-24s%-24s%-24s\n","row","DDE1","DDE2","DDE3","DDE4
","DDE5");
            for (i=0; i<=iqs; i++){
                fprintf(fp,"%2d  ",i);
                for (j=7; j<=11; j++){
                    prbits(fp,cs[j][i][0],1,new);
                    prc(fp,(24-new),' ');
                }
                fprintf(fp,"\n");
            }
        }

        fprintf(fp,"\n");

        if (iqs<=19){
            fprintf(fp,"%60s\n","Concurrency Structures:");
            fprintf(fp,"%-4s%-24s%-24s%-24s%-24s%-24s\n","row","DD1","DD2","DD3","DD4","O
FBDE");
            for (i=0; i<=iqs; i++){
                fprintf(fp,"%2d  ",i);
                for (j=1; j<=4; j++){
                    for (k=1; k<=new; k++){
                        fprintf(fp,"%01x",dd(j,i,k));
                    }
                    prc(fp,(24-new),' ');
                }
                prbits(fp,cs[ofbde][i][0],1,new);
                prc(fp,(24-new),' ');
                fprintf(fp,"\n");
            }
        }
        fprintf(fp,"\f");

        if (aew>14){
            fprintf(fp,"\tWarning: only the lowest 14 columns of m width structures are s
hown.\n\n");
            mlim=14;
        }
        else mlim=aew;


        /* Print the dynamic concurrency structures */
        fprintf(fp,"%60s\n","Dynamic Concurrency Structures-Binary; Source pointers:");
        fprintf(fp,"%-4s%-16s%-16s%-16s%-16s","row","AE","RE","VE","AST");
        fprintf(fp,"%-16s%-16s%-16s%-16s\n","BWI","SFS-source1","SFS-source2","SFS-sink")
;
        for (i=1; i<=iqs; i++){
            fprintf(fp,"%2d  ",i);
            for (j=0; j<=6; j++){
                if ((j!=4) && (j!=5)){
                    prdcsr(fp,dcs[j],i,mlim);
                    prc(fp,(16-mlim),' ');
                }
            }
            for (j=0; j<=2; j++){
                prdcsr(fp,sfs[j],i,mlim);
                prc(fp,(16-mlim),' ');
            }
            fprintf(fp,"\n");
        }
```

```
fprintf(fp,"\n");

/* Print misc. logic structures */
fprintf(fp,"%60s\n","Miscellaneous Logic Stuctures:");
fprintf(fp,"%-4s%-16s%-16s%-16s","row","NDDI-(DDEI)","NFBDI-(FBEI)","NBBDI-(BBE
I)");
fprintf(fp,"%-16s%-16s%-16s%-16s%-16s\n","NOOBBI","NREI-(SEI)","EI","WSE","SAEVE
");
for (i=1; i<=iqs; i++){
    fprintf(fp,"%2d  ",i);
    prdcar(fp,nddi,i,mlim);
    prc(fp,(16-mlim),' ');
    prdcar(fp,nfbdi,i,mlim);
    prc(fp,(16-mlim),' ');
    prdcar(fp,nbbdi,i,mlim);
    prc(fp,(16-mlim),' ');
    prdcar(fp,noobbi,i,mlim);
    prc(fp,(16-mlim),' ');
    prdcar(fp,nrei,i,mlim);
    prc(fp,(16-mlim),' ');
    prdcar(fp,ei,i,mlim);
    prc(fp,(16-mlim),' ');
    prdcar(fp,wse,i,mlim);
    prc(fp,(16-mlim),' ');
    prdcar(fp,saeve,i,mlim);
    prc(fp,(16-mlim),' ');
    fprintf(fp,"\n");
}
fprintf(fp,"\f");


/* Print integer dynamic concurrency structures. */
fprintf(fp,"%60s\n","ISA-Iteration Sink Addresses:");
fprintf(fp,"%-4s\n","row");
prdcsint(fp,isa,mlim);

fprintf(fp,"\n%60s\n","SSI-Shadow Sinks:");
fprintf(fp,"%-4s\n","row");
prdcsint(fp,ssi,mlim);
fprintf(fp,"\f");


/* Print Sink Enable arrays (integer versions) */
fprintf(fp,"    %-56s","SEN1 - Sink ENable source 1:");
fprintf(fp,"    %-56s\n","SEN2 - Sink ENable source 2:");
fprintf(fp,"%-4s\n","row");
for (i=1; i<=iqs; i++){
    /* print a line */
    fprintf(fp,"%2d  ",i);
    prsenr(fp,0,i,mlim);
    prc(fp,(5+((14-mlim)*4)),' ');
    prsenr(fp,1,i,mlim);
    fprintf(fp,"\n");
}
fprintf(fp,"\n");

fprintf(fp,"    %-56s\n","SEN3 - Sink ENable sink:");
fprintf(fp,"%-4s\n","row");
for (i=1; i<=iqs; i++){
    /* print a line */
    fprintf(fp,"%2d  ",i);
    prsenr(fp,2,i,mlim);
    fprintf(fp,"\n");
        }
        fprintf(fp,"\f");
    }


  if (ddct==3){
    /* output IE, misc. vectors */
    fprintf(fp,"%60s\n","Miscellaneous Structures and Indicators:");
    fprintf(fp,"%-4s%-23s%-7s%-7s%-7s%-7s%-7s","row","IE","AELZ","IFE","NDDI","NFBDI","NB
BDI");
    fprintf(fp,"%-7s%-7s%-7s%-7s%-7s","NOOBBI","NREI","NRASEI","NRFBEI","NRBBEI");
    fprintf(fp,"%-7s%-7s%-6s%-5s%-7s\n","ASEI","FBEI","BBEI","BEXS","OOBBEIF");

    for (i=0; i<=iqs; i++){
        fprintf(fp,"%2d  ",i);
        if (iqs<=19){
            prbits(fp,cs[4][i][0],1,new);
            prc(fp,(24-new),' ');
        }
        else prc(fp,24,' ');
        fprintf(fp,"%-7.1x%-7.1x%-7.1x%-7.1x%-7.1x",aelz[i],ife[i],nddi[i],nfbdi[i],nbbdi
[i]);
        fprintf(fp,"%-7.1x%-7.1x%-7.1x%-7.1x%-7.1x",noobbi[i],nrei[i],nrasei[i],nrfbei[i]
,nrbbei[i]);
        fprintf(fp,"%-7.1x%-7.1x%-7.1x%-7.1x%-1.1x",asei[i],fbei[i],bbei[i],bexs[i],oobbe
if[i]);
        fprintf(fp,"\n");
    }
    fprintf(fp,"\n");
  }


    /* output stats */
    stats(0,fp);
    fprintf(fp,"\f");

    /* output register, memory dumps */
    llt=mdll;   /* save limits */
    ult=mdul;
    mdll=dbastart;      /* set up for dumping registers */
    mdul=regno<<2;

    dump(fp,8); /* dump registers, 8 words per line */

    if (mdump==1){
        mdll=llt;       /* restore limits */
        mdul=ult;

        fprintf(fp,"\n");

        dump(fp,8);     /* dump memory */
    }
    fprintf(fp,"\f");
}


prbits(fp,wd,lb,rb)     /* print bits lb thru rb of wd in file at fp */
int wd,lb,rb;
FILE *fp;
{
    int i,j;    /* counters, etc. */
    unsigned int bit;   /* bit to be printed */
    char s;     /* character to be printed */
```

38 simcd54.c

```
    j=32-lb;
    for (i=lb; i<=rb; i++){
        bit=getbits(wd,j,1);
        s=bit+'0';
        fprintf(fp,"%c",s);
        j--;
    }
}


prc(fp,q,s)      /* print character s q times to file at fp */
FILE *fp;
int q;
char s;
{
    int i;      /* counter */

    for (i=1; i<=q; i++) fprintf(fp,"%c",s);
}


prdcsint(fp,k,mlim)     /* print dcs[k] as hex integers, mlim ints to a line */
FILE *fp;
int k,mlim;
{
    int i,j;    /* indices */

    for (i=1; i<=lqe; i++){
        /* print a line */
        fprintf(fp,"%2d  ",i);
        for (j=1; j<=mlim; j++){
            fprintf(fp,"%08x ",dcs[k][ser(i,j)]);
        }
        fprintf(fp,"\n");
    }
}


prsenr(fp,senno,r,w)    /* print row r of width w of sen[senno] to file fp */
FILE *fp;
int senno,r,w;
{
    int i;      /* counter */

    for (i=1; i<=w; i++){
        fprintf(fp," %3d",sen[senno][ser(r,i)]);
    }
}


prdcsr(fp,ar,r,w)       /* print row r of width w of array ar in file fp */
                        /*   assumes only the lsb is valid */
FILE *fp;
unsigned int ar[];
int r,w;
{
    int i;      /* counter */

    for (i=1; i<=w; i++){
        fprintf(fp,"%01x",(ar[ser(r,i)] & lsbmsk));
    }
}


stats(flg,fp)   /* print parameters and results */
int flg;        /* 0-for trace output; 1-for normal output */
FILE *fp;
{
    struct rusage *rusage;      /* timing data structure */
    long usert,syst;    /* user time, system time */
    int i;      /* counter */

    /* allocate storage for timing data */
    for (i=1;
      ((rusage = (struct rusage *) malloc (sizeof (struct rusage)))==NULL)
      && (i<1000); i++);

    /* get simulation times */
    getrusage(RUSAGE_SELF,rusage);
    usert=rusage->ru_utime.tv_sec;
    syst=rusage->ru_stime.tv_sec;

    /* Output data */
    if (flg==0) fprintf(fp,"%60s\n","Simulation Parameters and Counters");
    else {
        fprintf(fp,"%s %d%s","Cumulative Stats of simcd Version Number:",simver1,".");
        fprintf(fp,"%d\n\t%s %s/%s\n",simver2,"Input File:",cdp,ifnp);
        fprintf(fp,"\tSimulation start time: %s",timday);
        fprintf(fp,"\tUser time= %ld\t\tSystem time= %ld\n",usert,syst);
        fprintf(fp,"\n");
    }

    /* print input parameters */
    fprintf(fp,"Input Parameters:\n");
    fprintf(fp,"\tIQ length (n)= %-5d\t\tAE width= %-5d\n",iqs,aew);
    fprintf(fp,"\tFBs exec./cycle= %-5d\t\tBBs exec./cycle= %-5d\n",fbpeq,bbpeq);
    fprintf(fp,"\tASs exec./cycle= %-5d\t\tBs exec./cycle= %-5d\n",aspeq,tbpeq);
    fprintf(fp,"\tPD check type (1-std., 2-SC conc., 3-UC conc., 4-UC ext.)= %-2d\n",bct)
;
    fprintf(fp,"\tDD check type (3-std., 2-red. DD w/o SAE, 1-red. DD w/SAE)= %-2d\n"
t);
    fprintf(fp,"\tIQ load type (1-std., 2-BB domains not held)= %-2d\n",ldt);
    fprintf(fp,"\tNo. of registers= %-5d\n",regno);
    fprintf(fp,"\n");

    /* print stats */
    if (flg==0){
        fprintf(fp,"Cycle dependant counter values:\n");
        fprintf(fp,"\tLoad sub-cycles= %-5d\t\tAS PEs used= %-5d\n",ldscntsc,aspec);
        fprintf(fp,"\tFB PEs used= %-5d\t\tBB PEs used= %-5d\n",fbpec,bbpec);
        fprintf(fp,"\tCurrent b= %-5d\t\tB PEs used= %-5d\n",b,tbpec);
        fprintf(fp,"\n");
    }

    /* print cumulative stats */
    fprintf(fp,"Cumulative Counts, Stats:\n");
    fprintf(fp,"\tExecution cycles= %-9d\tLoad cycles= %-9d\n",cno,ldcnt);
    fprintf(fp,"\tLoad sub-cycles= %-9d\tAE left shifts= %-9d\n",ldscnt,aeshc);
/*  fprintf(fp,"\tAE width reached (0-no, 1-yes)= %-2d\n",aemaxflg); */
    fprintf(fp,"\tMax. b value= %-9d\n",bmax);
    fprintf(fp,"\tStack reads= %-9d\t\tStack pops= %-9d\n",stackikc,tpopc);
    fprintf(fp,"\tTot. mem. wd. reads= %-9d\tTot. mem. wd. writes= %-9d\n",tmemrdc,tmemwr
```

simcd54.c

```
c);
    if (flg==1){
        fprintf(fp,"\t Peak  \"  per cycle= %-9d\t Peak  \"   per cycle= %-9d\n",tmemrdc
p,tmemwrcp);
    }
    fprintf(fp,"\tTot. mem. by. reads= %-9d\tTot. mem. by. writes= %-9d\n",tmbrdc,tmbwrc
);
    fprintf(fp,"\tMain memory reads= %-9d\tMain memory writes= %-9d\n",memrdc,memwrc);
    if (flg==1){
        fprintf(fp,"\t Peak \" per cycle= %-9d\t Peak  \" per cycle= %-9d\n",memrdcp,mem
wrcp);
    }
    fprintf(fp,"\tRegister reads= %-9d\tRegister writes= %-9d\n",regrdc,regwrc);
    if (flg==1){
        fprintf(fp,"\t Peak \" /cycle= %-9d\t Peak \"  /cycle= %-9d\n",regrdcp,regwrcp);
    }
    fprintf(fp,"\tMax. ASs exec./cycle= %-5d\tMax. FBs exec./cycle= %-5d\n",asexmax,fbex
max);
    fprintf(fp,"\tMax. BBs exec./cycle= %-5d\tMax. Bs exec./cycle= %-5d\n",bbexmax,tbexm
ax);
    fprintf(fp,"\tTot. OOBBs executed= %-9d\tTot. OOBBs exec. true= %-9d\n",oobbcnt,oobb
tcnt);
    fprintf(fp,"\tInstr. fetch count= %-9d\tI.F. memory reads= %-9d\n",ifc,ifmrc);
    if (flg==1){
        fprintf(fp,"\t\t\t\t\t Peak \" per cycle= %-9d\n",ifmrcp);
    }
    fprintf(fp,"\tCALLs expanded= %-9d\tRETURNs expanded= %-9d\n",
                callexc,retexc);
}


dump(fp,w)      /* dump memory (m), w words per line */
FILE *fp;
int w;
{
    int i,j,k;  /* pointers */
    int ll,ul;  /* filtered limits */
    int la,ua;  /* lower, upper addresses */

    la=mdll & (~0x3);   /* set-up */
    ua=mdul & (~0x3);
    ll=la>>2;
    ul=ua>>2;

    fprintf(fp,"Memory dump; start= %08x, end about= %08x;\n",la,ua);

    i=la;
    k=ll;
    while (i<ua){
        /* print a line */
        fprintf(fp,"\t  %08x:",i);
        for (j=1; j<=w; j++){
            if (k<=mmax){
                fprintf(fp,"  %08x",m[k]);
                i+=4;
                k++;
            }
        }
        fprintf(fp,"\n");
    }
}
```

```
histout(fp)     /* output histogram of instruction execution */
FILE *fp;
{
    int i;      /* index */
    int exitflg;        /* set when exit instruction encountered */
    int addrs;  /* address */

    fprintf(fp,"Histogram of input file: %s\n\n",ifnp);

    for (i=0; exitflg==0; i++){
        addrs=(i<<2)+pcstart;
        if (hist[i]!=(-1)){
            fprintf(fp,"%08x  %8d\n",addrs,hist[i]);
        }
        if ((addrs>=pcmax) || (i>mmax)) exitflg=1;
    }
}
```

Appendix 3

SOURCE CODE LISTING

FOR SIMULATOR simcd.doc

```
The first part of this file gives the command line specs for running
      simcd. The second part describes the input parameters to simcd
      (these are read by simcd via stdin). (dct and pct are explained
      in the second part.) The third part contains some miscellaneous
      notes on the simulator.


First Part - simulator command line:

    (Notation: <...> necessary item
               [...] optional item)


    simcd <input file> <output file> [switches]

  in other words:

    simcd <input file> <output file> [-b] [-c <cycle number>] [-d] \
        [-h <hist file>] [-m] [-r] [-s] [-t <trace file> <cycle number>] [-v]

    Argument descriptions:
        <input file>: CONDEL hex code ( .cdh file); this is essentially the
                machine code of the program to be simulated.

        <output file>: simulation results (normal file extension:  .res);
                This file is written at the end of simulation. It contains
                a summary of the simulation, including execution times,
                memory traffic inforamtion, and an optional CONDEL memory dump
                which is normally used to check for correct simulated program
                output results.

        [switches]:
            -b : background; suppresses most output messages

            -c <cycle number> : cycle limit. Causes the simulator to
                gracefully abort when cycle <cycle nmuber> is reached, sending
                a trace snapshot to stderr, as well as generating the usual
                <output file>.

            -d  : dump. Include memory dump in <output file>. The limits of
                the dump are specified in the input parameters.

            -h <hist file> : histogram. Generates pseudo-histogram (bins)
                of <input file> execution, (like a profile); a list of
                instruction addresses and the number of times they were
                executed is placed into <hist file>.
                Normal file extension;   .hst

            -m : medium trace. Causes a fair amount of information to be sent
                to stdout each cycle during execution of <input file>, so add
                "> <medium trace file>" to command line to save the trace
                results. Not recommended for simultaneous use with the "-r"
                switch.
                Normal file extension:   .mtc

                The information dumped to stdout is:
                    Header: usual preamble, including simulation
                        parameters.
                    For each cycle:
                        Cycle number;
                        First section:
                            First column group: Contains the addresses of
                                the instructions in the instruction queue.
                            (Remaining column groups contain n X m elements,
                                each element corresponding to an element in
                                the AE matrix, for dct=1 or 2; for dct = 3,
                                the group size is n X 1, as only one
                                instruction per IQ row may execute in a cycle).
                            Second column group: Executably Independent
                                matrix. Indicates which instruction iterations
                                were executed in the cycle (one exception;
                                see third column group).
                            Third column group: UPdate INhibit matrix.
                                Indicates, for out-of-bounds forward branches,
                                which ones are not to be marked as executed
                                (potentially allowing them to execute again);
                                if set, negates the effect of the corresponding
                                EI element being set.
                            Fourth column group: Write Sink Enable logic output
                                matrix. Indicates which Shadow Sinks were
                                written to a memory address in the current
                                cycle; not of interest when dct=3.
                            Fifth column group: Branch EXecution Sign logic
                                matrix. Indicates how the corresponding branch
                                instruction iteration is to execute in the
                                cycle: 1 => branch taken, 0 => branch not taken

                        Second section; in each case, the number given is for
                                the current cycle only:
                            First row:
                                Total number of word reads.
                                Total number of word writes.
                                Physical memory reads.
                                Physical memory writes.
                            Second row:
                                Register reads.
                                Register writes.
                                Load sub-cycles.
                                AE horizontal shifts.
                            Third row:
                                Word reads for instruction fetches into the IQ.
                                The value of "b" at the end of the cycle.
                                CALLs expanded.
                                RETURNs expanded.

            -r  : reduced trace. Causes a reduced execution trace of
                <input file> to be sent to stdout, therefore add
                "> <red. trace file>" to command line to save the trace
                results.
                Normal file extension:   .rtc

            -s  : suppress messages. Suppresses messages requesting input
                parameters; normally used with either the following addition to
                the command line: "< <parameter file>", or, within a shell
                script (see condel/gpbmk/gpsim): "<< parend" followed by a
                list of parameters and "parend".
                Normal file extension:  NONE ( .par preferred, when used)

            -t <trace file> <cycle number> : trace (detailed).
                Causes detailed execution trace information of <input file>
                to be dumped into the <trace file>, starting with cycle
                <cycle number>, for a total of 10 (resp. 4) cycles with
                dct=3 (resp. 1 or 2). Normally, the entire contents of all
                (or most) of the concurrency structures is given each cycle,
                in 132 column format. When the Instruction Queue length is
                greater than 19, the output is restricted. The information
                is labeled, so is hopefully self-explanatory (with the thesis
```

```
        as a guide).
        Normal <trace file> extension:   .trc

     -v  : verbose. Causes many messages to be output during a
        simulation, many useful for simcd debugging.


Second Part - simcd Input Parameters.
     These parameters must be supplied in the order given to stdin when
        simcd is invoked. If the -s switch is not set, prompting
        messages will be sent to stdout.

     [...]  contain acceptable values; other values entered will be
        detected and not allowed to propagate.

     1) dct (or ddct) (Data Dependency Check Type) [1-3]
        1 - equivalent to Data Concurreny Type 3 in Uht's writings;
                minimal data dependencies are enforced, and Super
                Advanced Execution is used.
        2 - equivalent to Data Concurreny Type 2 in Uht's writings;
                minimal data dependencies are enforced; no Super
                Advanced Execution is allowed.
        3 - equivalent to Data Concurreny Type 1 in Uht's writings;
                this enforces the most restrictive set of data
                dependencies.

     2) bct (or bdct) (Branch Dependency Check Type) [1-4]
        1 - equivalent to Procedural Concurrency Type A in Uht's
                writings; maximally restrictive procedural
                dependencies are enforced.
        2 - OBSOLETE: DO NOT USE
        3 - equivalent to Procedural Concurrency Type B in Uht's
                writings; minimally restrictive procedural
                dependencies are enforced.
        4 - equivalent to Procedural Concurrency Type C in Uht's
                writings; same as 3, but CALLs and RETURNs are
                conditionally expanded, and multiple out-of-bounds
                forward branches may be executed.

     3) n (Instruction Queue (IQ) length) [1-130] <- NOT 1000! See me
        if this is a problem. Set to 1 to simulate sequential
        execution.

     4) m (Advanced Execution matrix width) [1-32]

     5) NAS (maximum Number of Assignment Statements allowed to execute
        per cycle; = # of PEs) [1-1000]
        Set to 1000 for unlimited resource simulations.

     6) NFB (maximum Number of Forward Branches allowed to execute
        per cycle; = # of PEs) [1-1000]
        Set to 1000 for unlimited resource simulations.

     7) NBB (maximum Number of Backward Branches allowed to execute
        per cycle; = # of PEs) [1-1000]
        Set to 1000 for unlimited resource simulations.

     8) NTB (maximum Total Number of Branches allowed to execute
        per cycle; = # of PEs) [1-1000]
        Set to 1000 for unlimited resource simulations.

     9) NREG (Number of registers) [0-1024] <- normally set to 256.
        Accesses to addresses below 4*NREG are counted as register
        accesses; those above as physical memory accesses.

     10) memory dump lower limit address, in hex [0-9C40]
        Only necessary when the -d switch is set.

     11) memory dump upper limit address, in hex [0-9C40]
        Only necessary when the -d switch is set.

     12) IQ load type [1-2]
        1 - standard: unexecuted BB domains held in IQ until the
                corresponding BBs are fully executed.
        2 - unexecuted BB domains not given special treatment.

        Notes: BB = backward branch

        This parameter is optional. The default value is 1.


Third Part - other points of interest:

     - Simulation time is proportional to n**2 for dct=3, and (nm)**2 for
        dct=1 or 2, so be careful.

     - Current maximum simulated memory size is 10000 32-bit words (byte
        addressable). This can be altered easily (by yours truly).

     - All programs start at 1000 (hex).

     - The Data Base Address register points to 40 (hex) initially.

     - The current version number of simcd.c is 5.1/8
```

simcd54.c

```
/* CONDEL Simulator, Version 2.0 (the first never really existed) */
/* 3/27/84  -Created V. 2.0  -A.K. Uht */
/* 4/8/84   -V. 2.1; n=1,5,20-bcdbin.cdh working version, */
/*              output redirected  -A.K. Uht */
/* 4/10/84  -V. 2.2; bct=1-improved loading, corrected output, */
/*              added specifiable limit on total Bs exec. per cycle */
/*              -A.K. Uht */
/* 4/29/84  -V. 2.3; corrected bb aeupd and dddet bugs; */
/*              changed ae update order to AS, FB, BB; */
/*              FB update looks at static AELZ; -A.K. Uht */
/* 5/4/84   -V. 2.4; corrected n > 30 bug (IQ length); */
/*              changed .s input code interpretation; -A.K. Uht */
/* 5/9/84   -V. 2.5; corrected bb AE mods for aemax case; -A.K. Uht */
/*              modified AE column retiring to allow removal of eligible */
/*              columns anywhere in the AE matrix; -A.K. Uht */
/* 8/8/84   -V. 3.0; added new branch instructions, allowing flexible */
/*              condition testing; -A.K. Uht */
/* 8/11/84  -V. 3.1; modified array access instructions, so that on word */
/*              accesses, the index is shifted left by two bits to */
/*              convert it to a word boundary address; */
/*      NOTE: All input code written before this date and using array word */
/*              accesses will no longer work properly. -A.K. Uht */
/* 8/18/84  -V. 3.2; added Branch Concurrency Type (bct) 3- unstructured */
/*              concurrent execution of the input code; added user- */
/*              specifiable cycle start number for trace output; -A.K. Uht */
/* 8/21/84  -V. 3.3; added -h switch, generates pseudo histogram output, */
/*              requires command line file specification after switch; */
/*              -A.K. Uht */
/* 8/24/84  -V. 3.4; added fbbbddet routine to catch I-FB-BB PDs; */
/*              added -r (for reduced trace) switch, traces instr. */
/*              execution, output to stdout; -A.K. Uht */
/* 8/29/84  -V. 3.5; fixed aeset() bug; -A.K. Uht */
/* 11/26/84 -V. 3.6; changed algorithm to put PD 3s into PBBDE instead */
/*              of CDE (DD); -A.K. Uht */
/* 3/11/85  -V. 4.0; fixed call, return code; added multiple out-of- */
/*              bounds FB execution code; added dummy instr. */
/*              execution; -A.K. Uht */
/* 3/20/85  -V. 4.1; added peak memory bandwidth counters; fixed */
/*              byte accessing; fixed hist, redtrc counts; -A.K. Uht */
/* 3/27/85  -V. 4.2; fixed getsimp(), added warning message; */
/*              fixed bct=1 bug; -A.K. Uht */
/* 3/30/85  -V. 4.3; fixed OOBFB (iafe) bug; -A.K. Uht */
/* 3/31/85  -V. 4.4; fixed BBDO generation potential bug (for recursive */
/*              procedures); -A.K. Uht */
/* 4/9/85   -V. 4.5; fixed limited AE width (m) bug; -A.K.Uht */
/* 5/27/85  -V. 5.0; reduced data dependencies option added; -A.K. Uht */
/* 6/18/85  -V. 5.1; super-advanced execution fixed; -A.K. Uht */
/* 7/11/85  -V. 5.2; optimized code; added cycle limit switch and */
/*              parameter; -A.K. Uht */
/* 7/23/85  -V. 5.3; fixed bugs; added simcd execution time output; */
/*              -A.K. Uht */
/* 7/24/85  -V. 5.4; expanded SAE virtual ex. range; -A.K. Uht */
/* 8/9/85   -V. 5.5; bugs fixed; -A.K. Uht */
/* 8/17/85  -V. 5.6; added -m (medium trace) code and switch; more */
/*              optimization; added time stamp and directory expansion */
/*              to output; fixed minor SAE bug (more like an unwanted */
/*              feature); fixed reduced trace bug; -A.K. Uht */
/* 8/21/85  -V. 5.7; fixed potential bug in OOBFB TAEN and UPIN; as of 8/20 */
/*              has successfully simulated all ddct and bct combinations */
/*              with n=16, m=4 of the standard GP benchmark set; -A.K. Uht */
/* 8/30/85  -V. 5.8; fixed SAE bugs occurring with n=32, m=2 (se la vie); */
/*              -A.K. Uht */
/* 9/1/85   -V. 5.9; added IQ load type switch, for not holding BB domains */
/*              ONLY TESTED FOR bct=1; added bexs ouput to med. trace; */
/*              -A.K. Uht */
/* 9/3/85   -V. 5.10; added saeve mechanism to procedural dependency */
/*              calculations; -A.K. Uht */
/* 10/15/85 -V. 5.11; fixed bug in calculation of PEI for bct=1, dct=1 or */
/*              2; caused poor performance in those modes; -A.K. Uht */
/* 1/23/87  -V. 5.12; moved arrays local to sidetr() to global memory; */
/*              original set caused stack overflow during compile on a */
/*              Sun 3/50; -A.K. Uht */
/* 6/3/87   -V. 5.13; increased IQ length limit to 165 from 130, fixed */
/*              getsimp() check on IQ limit; -A.K. Uht */
/* 9/30/88  -V. 5.14; changed loading hardware to allow for movtaw to use */
/*              immediate operand for A operand; -A.K. Uht */
/* 9/30/88  -V. 5.15; fixed 5.14, added bit 17 in opcode for lengths 8 and */
/*              16 to fully specify immediate operands; -A. K. Uht */
/* 3/11/89  -V. 5.16; changed initiliazation of IQ in flushiq() for dct=1; */
/*              now only first column of AE, VE, and AST are set to 1; */
/*              this bug caused reduced performance on loops whose size */
/*              was less than iqs, if they were loaded right after an */
/*              initialization; -A.K. Uht */
/* 5/6/89   -V. 5.17; fixed iqnew() bugs which caused incorrect "flag" */
/*              fields to be entered for branches and no-ops; caused */
/*              an eicerr of 29 (more than one 1 in a SEN); -A.K. Uht */
/* 12/15/89 -V. 5.18; added left shift function (lshft) to bypass bug */
/*              of Sun 4/60 &/or its cc compiler; - A.K. Uht */

/* Copyright (c) 1984, 1985, 1987, 1988  Augustus Kinzel Uht */
/*     For a clearer understanding of how this program functions, see */
/* the papers in /usr/gus/condel/doc, in particular ir*.mss & tp.mss. */

#include <stdio.h>      /* I/O routines */
#include <sys/time.h>   /* timing, resource usage code */
#include <sys/resource.h>
#include <sys/types.h>  /* for real time stamp */
#include <sys/timeb.h>

#include "opcdcd.c"     /* include CONDEL opcodes */

/* Conditional compilation switch for testing. As of 7/15/85 forces */
/*      Sink ENables to be calculated for all iterations when it is set. */
/*      This is now the default mode (7/23/85). */
#define TEST 1

/* constants */
#define simver1 5       /* simcd version numbers; first digit */
#define simver2 18      /*      second digit */

#define msbmsk  0x80000000
#define lsbmsk  0x1
#define ms      10000   /* max size of memory (in 32-bit words) */
#define mmax    ms-1    /* max address of memory (      "     ) */
#define iqmax   165     /* max size (length) of Instruction Queue (IQ) */
#define aewmax  32      /* max width of AE (,etc.) matrices */
#define sermax  iqmax*aewmax /* max serial size (n*m) */
#define pcstart 0x1000  /* all programs start at this byte address */
#define dbastart 0x40   /* initial data base address */
#define csjwmax (((iqmax+2)/32)+1) /* max. word width of concur. struct. */
#define allz    0x0     /* all zeros */
#define allo    ~0x0    /* all ones */
#define cswl    32      /* concurrency structures word length */


/* MACROS */
/* return n bits from x starting at bit p, and going to the right */
#define getbits(x,p,n)  ((x>>(p+1-n)) & ~(~0<<n))
```

simcd54.c

```
#define calw(coll)      ((coll-1)/cswl)  /* calc. word # of col */

#define calb(coll)      ((cswl-1)-((coll-1)%cswl))  /* calc. bit # of col */

/* read csn(row, col(bit)) */
#define csrd(csn,r,c)  (getbits(cs[csn][r][calw(c)],calb(c),1))

/* returns serial index for row r and col. c indices (rect.) */
#define ser(r,c)  (r+((c-1)*iqs))

/* return row index of serial index */
#define row(serindex)  (1+((serindex-1)%iqs))

/* return column index of serial index */
#define col(serindex)  (1+((serindex-1)/iqs))

/* read dyn. conc. struct. at row r col. c */
#define dcsrd(dcsno,r,c)  (dcs[dcsno][ser(r,c)])

/* write dyn. conc. struct. at row r col. c */
#define dcswr(dcsno,r,c,data)  (dcs[dcsno][ser(r,c)]=data)

/* LOOK AHEAD TO cs[][][] DEFINITION FOR dd() MACRO */



/* global arrays */
static unsigned int m[ms];      /* code and data memory */
static int hist[ms];    /* histogram memory */

struct instrqueue{
    unsigned int res;   /* result operand (A) */
    unsigned int op[2]; /* input operands (B, C) */
    unsigned int flg;   /* flags */
                        /* bit 0 - don't compare op[0] */
                        /* bit 1 -   "      "    op[1] */
                        /* bit 2 -   "      "    res */
                        /* bit 3 -   "      "    ta  */
                        /* bit 4 - op[0] spec. (0-name, 1-immediate) */
                        /* bit 5 - op[1]    "       "        "     */
                        /* bit 6 - res      "       "        "     */
                        /* bit 7 - this instr. dep. on all previous instr. */
    unsigned int ae;    /* Advanced Execution vector */
    unsigned int addr;  /* instruction address (byte) */
    unsigned int opc;   /* opcode - reduced version (least sig. 7 bits) */
    unsigned int ta;    /* Target Address */
    unsigned int dba;   /* Data Base Address used with this instruction */
    unsigned int mpb;   /* Most Previous Branch - used when bct=1 */
};

static struct instrqueue iq[iqmax];     /* IQ */


/* Define the static concurrency structures. */
static unsigned int cs[16][iqmax][csjwmax]; /* concurrency structures */
        /* 0 - DD - all Data Dependencies */
        /* 1 - FBD - Forward Branch Domain/Dependencies */
        /* 2 - BBDO - Backward Branch DOmains */
        /* 3 - PBBDE - Previous BB DEpendencies */
        /* 4 - IE (Iteration Enabled) */
        /* 5 - CBB (Chained Backward Branches, used when bct=3) */
    /* The following structures are only used with reduced data */
/*      dependencies - ddct=1 or 2 */
        /* 6 - OFBDE - Overlapped FB DEpendencies alone */
        /* 7 - DDE1 - the next five are the component DDs */
        /* 8 - DDE2 */
        /* 9 - DDE3 */
        /* 10- DDE4 */
        /* 11- DDE5 */
        /* 12- DD1 - the next four are the mapped DDs (from DDEs) */
        /* 13- DD2 */
        /* 14- DD3 */
        /* 15- DD4 */
/* define cs address constants */
#define dde     0
#define fbd     1
#define bbdo    2
#define pbbde   3
#define ie      4
#define cbb     5
#define ofbde   6
#define dde1    7
#define dde2    8
#define dde3    9
#define dde4    10
#define dde5    11
#define dd1     12
#define dd2     13
#define dd3     14
#define dd4     15
#define ddbase  (dd1-1)

/* OUT-OF-PLACE MACRO */
/* read DD matrix arno at row r column c */
#define dd(arno,r,c)  (csrd((ddbase+arno),r,c))


/* Define the dynamic concurrency structures. These are only used with */
/*      ddct=1 or 2, and are realized in a serial (vector) format. */
static unsigned int dcs[7][sermax];     /* dynamic concurrency structures */
        /* 0 - AE - Advance Execution matrix */
        /* 1 - RE - Real Execution */
        /* 2 - VE - Virtual Execution */
        /* 3 - AST - Advanced STorage */
        /* 4 - ISA - Instruction Sink Address */
        /* 5 - SSI - Shadow SInks */
        /* 6 - BWI - Byte Write Indicator */
                /* 0 - word write */
                /* 1 - byte write */
/* Define dcs address constants. */
#define AE      0
#define re      1
#define ve      2
#define ast     3
#define isa     4
#define ssi     5
#define bwi     6
static unsigned int dcsnew[7][aewmax]; /* these are the new rows of the dcs */
        /* structures; they are of width m (aew) */

static int aelz[iqmax]; /* AE leftmost zero vector */
static int aero[iqmax]; /* AE rightmost one vector */
static int ife[iqmax];  /* Instruction Fully Executed */
static int iafe[iqmax]; /* Instruction Almost Fully Executed */
static int nddi[sermax];        /* no data dependancy inhibitions */
```

3 simcd54.c

```
static int nfbdi[sermax]; /* * FB       "        "     */
static int nbbdi[sermax]; /* * BB       "        "     */
static int noobbi[sermax]; /*" oobb inhibitions */
static int nrei[sermax];  /* executably independant, ignoring resource dep. */
static int nrasei[sermax]; /*     "          "     ASs,  "     "    "   */
static int nrfbei[sermax]; /*     "          "     FBs,  "     "    "   */
static int nrbbei[sermax]; /*     "          "     BBs,  "     "    "   */
static int asei[sermax]; /*     "          "     ASs, including all dep. */
static int fbei[sermax]; /*     "          "     FBs,      "    "   "   */
static int bbei[sermax]; /*     "          "     BBs,      "    "   "   */
static int ei[sermax]; /*      "          " instr.,     "    "   "  (4.0 ) */
static int oobbeif[sermax]; /* oobb ei flags */
static int oobbben[sermax]; /* oobbb enable flags (only one should be set (4.0) */
static int bexs[sermax]; /* branch execution status (0-not taken; 1-taken) */
static int taen[iqmax]; /* target address enable, for oobfb execution (4.0) */
static int upin[sermax]; /* AE UPdate INhibit, for oobfb execution (4.0) */
static int wse[sermax]; /* Write Sink Enable (5.0) */
static int sfs[3][sermax]; /* Source From Storage (5.0) */
static int sen[3][sermax]; /* Sink ENable for sources 1 and 2 (5.0) */
static int eicol[aewmax+1]; /* eligible-column-for-retiring indicators (5.0)*/
static int arri[sermax]; /* array read instruction indicators (5.0) */
static int arwi[sermax]; /* array write instruction indicators (5.0) */
static int bv[aewmax+1]; /* b vector; all bv[i]=1 | i<=b (5.0) */
static int bvls[aewmax+1]; /* = bv left shifted by one position (5.0) */
static int iil[iqmax]; /* Inside Inner Loop indicators; only for SAE; (5.1) */
static int saeve[sermax]; /* super-advanced execution virtual exec. (5.1) */
static int bil[iqmax]; /* Below Inner Loop indicators; only for SAE; (5.3) */
static int ooilfb[iqmax]; /* Out of Inner Loop FB; used for SAE; (5.5) */

/* arrays originally local to eidetr(); they overflowed the stack on the Sun */
static unsigned int exstatr[sermax];    /* execution status */
static unsigned int aes[sermax];  /* a modified version of AE; see the Doc. */
static unsigned int vet[sermax];  /* virtual execution terms - for ddct==2, */
          /* are just = VE; for ddct==1, SAE-VE is used */
static unsigned int vetyp[sermax]; /* virtual execution type; used */
                                  /*     with SAE calc. on a per iteration */
                                  /*     basis */
static unsigned int temp1[sermax];      /* temps for ddve calculations */
static unsigned int temp2[sermax];      /* temps for sent calculations */
static unsigned int pdsaeve[sermax]; /* saeve for procedural dependencies */


/* global variables */
static int b;   /* the infamous bi (iteration counter for AE matrix) */
static int codmax;      /* first free m location */
static int pcmax;       /* first free address space location */
static int pc;          /* program counter */
static int dba;         /* data base address */
static int tos;         /* top of stack (stack builds downward) */
static int ompb;        /* old most previous branch */
static int mpb;         /*      "     "       "  */
static long *clock;     /* pointer to real time indicator */
static long clkst;      /* storage for real time indicator */
static char *timday;    /* string giving real time */
static char *cdp;       /* string containing current directory pathname */
static char cdpst[1024]; /* storage for cdp */

/* counters */
static int ldcnt;       /* load cycle count */
static int ldscnt;      /* load sub-cycle count */
static int ldscntsc;    /*  "    "    "  per cycle count */
static int stacklkc;    /* stack read count */
static int tpopc;       /* total stack pops */
static int tmemrdc;     /* total memory word read count */
static int tmemwrc;     /*   "     "     "  write  "   */
static int tmbrdc;      /*   "     "  byte read    "   */
static int tmbwrc;      /*   "     "    "  write   "   */
static int memrdc;      /* main    "   read count */
static int memwrc;      /*   "     "   write  "   */
static int regrdc;      /* register read count */
static int regwrc;      /*     "   write  "   */
static int tmemrdcc;    /* total memory word read count in the cycle (4.1) */
static int tmemwrcc;    /*   "     "     "  write  "  in the cycle (4.1) */
static int memrdcc;     /* main    "   read count in the cycle (4.1) */
static int memwrcc;     /*   "     "   write  "  in the cycle (4.1) */
static int regrdcc;     /* register read count in the cycle (4.1) */
static int regwrcc;     /*     "   write  "  in the cycle (4.1) */
/* peak counts below are measured over one execution cycle */
static int tmemrdcp;    /* total memory word read count, peak (4.1) */
static int tmemwrcp;    /*   "     "     "  write  " , peak (4.1) */
static int memrdcp;     /* main    "   read count, peak (4.1) */
static int memwrcp;     /*   "     "   write  " , peak (4.1) */
static int regrdcp;     /* register read count, peak (4.1) */
static int regwrcp;     /*     "   write  " , peak (4.1) */
static int aspec;       /* AS processing element count */
static int fbpec;       /* FB     "        "      "   */
static int bbpec;       /* BB     "        "      "   */
static int tbpec;       /* Tot. B "        "      "   */
static int aeshc;       /* AE shift left count */
static int aeshcc;      /* AE shift left count, per cycle (5.6) */
static int cno;         /* instruction cycle number (count) */
static int asexmax;     /* max. ASs executed per cycle */
static int fbexmax;     /*  "  FBs     "     "    "  */
static int bbexmax;     /*  "  BBs     "     "    "  */
static int tbexmax;     /*  " Tot. bs  "     "    "  */
static int ifc;         /* instruction fetch count */
static int ifmrc;       /*      "        "  memory read count */
static int ifmrcc;      /*      "        "  memory read count in the cycle (4.1) */
static int ifmrcp;      /*      "        "  memory read count, peak (4.1) */
static int bmax;        /* max. b value reached */
static int oobbtcnt;    /* oobb executed true count (4.0) */
static int oobbcnt;     /* oobb executed count (4.0) */
static int retexc;      /* RETURN expansion count (5.6) */
static int callexc;     /* CALL expansion count (5.6) */
static int retexcc;     /* =retexc, per cycle (5.6) */
static int callexcc;    /* =callexc, per cycle (5.6) */

/* misc. flags */
static int endsimf;     /* end simulation flag, set in asex() */
static int oobbexf;     /* out-of-bounds branch executed */
static int oobbextf;    /* out-of-bounds branch executed true flag: */
static int oobfbexf;    /* out-of-bounds FB executed */
static int oobbbexf;    /* out-of-bounds BB executed */
static int oobbbnxf;    /* out-of-bounds BB in IQ(iqs)(-n) executed */
static int oobbta;      /* oobb target address */
static int oobbbf;      /* oob BB loaded flag */
static int exflg;       /* exit instruction encountered flag */
static int aemaxflg;    /* AE capacity limited flag */

/* parameters */
static int csis;        /* cs row dimension */
static int csjs;        /* cs column dimension */
static int csjws;       /* cs    "      "   in words */
static int regno;       /* number of 32-bit registers */
static int new;         /* new instruction number (= iqs + 1) */
static int aspeq;       /* AS processing elements available (quantity) */
static int fbpeq;       /* FB     "        "        "         "  */
static int bbpeq;       /* BB     "        "        "         "  */
```

simcd54.c

```
static int tbpeq;       /* Tot. B "      "       "        "    */
static int mdll;        /* memory dump lower limit */
static int mdul;        /*    "     "   upper   "  */
static int iqs;         /* IQ size (length) */
static int aew;         /* AE width */
static int ddct;        /* data dependancy check type (see getsimp()) */
static int bct;         /* branch    "      "    "    "    "     */
static int idt;         /* IQ load type (see getsimp()) (5.9) */
static int trace;       /* trace flag (see getsimp()) */
static int trcstrt;     /* start trace output at this cycle number */
static int trcend;      /* end trace output at this cycle number - 1 (5.0) */
static int mdump;       /* memory dump flag  "   "    */
static int sprompt;     /* suppress prompts flag */
static int back;        /* "background" indicator; =1-suppress runtime mess */
static int verbose;     /* =1-print extra runtime messages */
static int histgram;    /* =1 - take histogram of instruction execution */
static int redtrc;      /* reduced trace; gives instruction exec. on stdout */
static int medtrc;      /* medium trace; puts IQ addr, EI, NSE, cycle */
                        /*      counters, etc., on stdout (5.6) */
static int cyclim;      /* limit on # of execution cycles permitted (5.2) */
static char *ifnp;      /* input file name pointer */
static int nm;          /* serial limit (number of iterations active) */


/* functions */

main(argc,argv)
int argc;       /* number of arguments */
char *argv[];   /* argument pointer table */
{
    /* file pointers */
    FILE *ifp, *fopen();        /* input file (containing hex machine code) */
    FILE *tfp, *fopen();        /* trace output file */
    FILE *ofp, *fopen();        /* results output file */
    FILE *hfp, *fopen();        /* pseudo-histogram output file */
    FILE *fp;                   /* mtout file pointer */

    char *s;
    int abtsim;         /* abort simulation flag */
    int simerr;         /* simulation error flag */
    char *ctime();      /* give the convert time function the right type */
    long time();        /* give the time function the right type */

    cno=0;      /* init cycle number */
    abtsim=0;   /* no abort */
    simerr=0;   /* no error */
    cyclim=0;   /* no cycle limit */

    /* get time stamp */
    clock= &clkst;      /* point to real storage */
    time(clock);
    timday = ctime(clock);

    /* get directory path name */
    cdp=cdpst;  /* have cdp point to adequate storage */
    if (getwd(cdp)== -1) cdp="|getwd: error|";

    /* read in command line, open files, set switches */
    if (argc==1){
        fprintf(stderr,"simcd: No input file specified.\n");
        abortnt();
    }
    else{
        /* open input file */
        argc--;
        if ((ifp=fopen(*++argv, "r"))==NULL){
            errop(*argv);
            abortnt();
        }
        else {
            ifnp=(*argv);       /* save pointer to input file name */
            /* check for output file specifier */
            if (argc==1){
                fprintf(stderr,"simcd: No output file specified.\n");
                abortnt();
            }
            else{
                /* open input file */
                argc--;
                if ((ofp=fopen(*++argv, "w"))==NULL){
                    errop(*argv);
                    abortnt();
                }
            }

            /*check switches, open appropriate files */
            while (--argc>0 && (*++argv)[0]=='-'){
                for (s=argv[0]+1; *s!='\0'; s++){
                    switch (*s){
                        case 'b':
                            back=1;
                            break;

                        case 'c':
                            if ((argc--)==1){
                                fprintf(stderr,"simcd: No cycle limit specified.\n");
                                abortnt();
                            }
                            else cyclim=numcon(*++argv);
                            break;

                        case 'd':
                            mdump=1;
                            break;

                        case 'h':
                            histgram=1;
                            if ((argc--)==1){
                                fprintf(stderr,"simcd: No histogram file specified.\n");
                                abortnt();
                            }
                            else {
                                if ((hfp=fopen(*++argv,"w"))==NULL){
                                    errop(*argv);
                                    abortnt();
                                }
                            }
                            break;

                        case 'm':
                            medtrc=1;
                            break;

                        case 'r':
                            redtrc=1;
                            break;
```

simcd54.c

```
        case 's':
            sprompt=1;
            break;

        case 't':
            trace=1;
            if ((argc--)==1){
                fprintf(stderr,"simcd: No trace file specified.\n");
                abortnt();
            }
            else {
                if ((tfp=fopen(*++argv,"w"))==NULL){
                    errop(*argv);
                    abortnt();
                }
                else {
                    if ((argc--)==1){
                        fprintf(stderr,"simcd: No trace start number spe
cified.\n");
                        abortnt();
                    }
                    else {
                        trcstrt=numcon(*++argv);
                    }
                }
            }
            break;

        case 'v':
            verbose=1;
            break;

        default:
            fprintf(stderr,"simcd: Illegal option: %c.\n",*s);
            abortnt();
            break;
        }
      }
    }
  }
}

if ((back==0) || (medtrc==1)){
    printf("CONDEL Simulator Version %d.%d\n", simver1, simver2);
    printf("\tInput file:  %s/%s\n",cdp,ifnp);
}

getsimp();          /* get simulation parameters */

if ((back==0) || (medtrc==1)){
    /* print input parameters */
    fp=stdout;
    printf("\tSimulation start time:   %s",timday);
    printf("\n");
    fprintf(fp,"Input Parameters:\n");
    fprintf(fp,"\tIQ length (n)= %-5d\t\tAE width= %-5d\n",iqs,aew);
    fprintf(fp,"\tFBs exec./cycle= %-5d\t\tBBs exec./cycle= %-5d\n",fbpeq,bbpeq);
    fprintf(fp,"\tASs exec./cycle= %-5d\t\tBs exec./cycle= %-5d\n",aspeq,tbpeq);
    fprintf(fp,"\tPD check type (1-std., 2-SC conc., 3-UC conc., 4-UC ext.)= %-2d\n"
,bct);
    fprintf(fp,"\tDD check type (3-std., 2-red. DD w/o SAE, 1-red. DD w/SAE)= %-2d\n
",ddct);
    fprintf(fp,"\tIQ load type (1-std., 2-BB domains not held)= %-2d\n",ldt);
    fprintf(fp,"\tNo. of registers= %-5d\n",regno);
    fprintf(fp,"\n");
}

codmax=rdcd(ifp);   /* read hex code into m */
pcmax=codmax<<2;    /* set pc limit */

init();             /* initiliaze structures, etc. */

/* Time to simulate!! (finally...) */
prfb("Crunching....\n");

while ((pc<pcmax) && (endsimf==0) && (abtsim==0)){
    cno++;          /* update cycle counter */

    /* clear per cycle counters */
    tmemrdcc=tmemwrcc=memrdcc=memwrcc=0;
    regrdcc=regwrcc=ifmrcc=aeshcc=0;
    callexcc=retexcc=0;

    load();         /* load IQ */
    prfv("\tload\n");

    switch (ddct){
        case 3:
            /* normal (restrictive) data dependencies cycle */
            eidet();        /* determine instructions to be executed */
            prfv("\teidet\n");

            brex();         /* execute branches */
            prfv("\tbrex\n");

            aeupd();        /* update ae, b */
            prfv("\taeupd\n");

            asex(); /* execute ASs */
            prfv("\tasex\n");

            break;

        case 1:
        case 2:
            /* reduced data dependencies cycle */
            eidetr();       /* determine instructions to be executed */
            prfv("\teidetr\n");

            asex(); /* execute ASs */
            prfv("\tasex\n");

            memupd();       /* memory update (writing sinks to memory) */
            prfv("\tmemupd\n");

            brex();         /* execute branches */
            prfv("\tbrex\n");

            dcsupd();       /* update dynamic conc. structures */
            prfv("\tdcsupd\n");

            break;

        default:
            fprintf(stderr,"simcd: Illegal DD spec. in basic cycle.\n");
            abortnt();
            break;
    }
```

simcd54.c

```
        if ((trace==1) && (cno>=trcstrt) && (cno<trcend)){
            tout(tfp);  /* output trace of execution */
            prfv("\ttout\n");
        }
        if ((trace==1) && (cno==(trcend-1))) fclose(tfp);
        if ((back==0) || (medtrc==1))
                printf("cycle %d\n",cno);  /* indicate execution cycle */

        /* output medium trace, if asked for */
        if (medtrc==1) mtout(stdout);

        /* cycle limit check */
        if ((cno>=cyclim) && (cyclim>0) && (endsimf==0)) abtsim=1;
    }
    prfb("\n"); /* clean up */

    /* simulation over; output results */
    if ((trace==1) && (cno<(trcend-1))) fclose(tfp);

    if (back==0) printf("simcd: End of simulation at cycle %d\n",cno);

    if ((pc >= pcmax) || ((endsimf == 0) && (abtsim==0))){
        fprintf(stderr,"simcd: Abnormal termination of execution:");
        fprintf(stderr," no \"exit\" or too little memory.\n");
        simerr=1;
    }

    prfb("\tWait for stats and/or dump generation....\n");
    if (abtsim!=0){
        fprintf(stderr,"simcd: CYCLE LIMIT REACHED: SIMULATION ABORTED\n\n");
        tout(stderr);   /* output a trace */
        fprintf(ofp,"\tCYCLE LIMIT REACHED: SIMULATION ABORTED\n\n");
    }
    stats(1,ofp);               /* output main results */
    if (mdump == 1){
        fprintf(ofp,"\n");
        dump(ofp,4);    /* output memory dump, 4 words per line */
    }
    fclose(ofp);

    if (histgram==1){
        histout(hfp);   /* output pseudo-histogram */
        fclose(hfp);
    }

    /* set exit flag if error has occurred; abort */
    if ((abtsim==1) || (simerr==1)) abortnt();

    /* Thats all, folks! */
}


int numcon(s)   /* convert string s to binary number, and return same */
char *s;
{
    int out;
    int err;    /* error */
    char *ts;   /* temp string */

    out=err=0;

    ts=s;

    /* check number */
    while (*ts!='\0'){
        if (isdigit(*ts)==0) err=1;
        ts++;
    }
    if (err==0) out=atoi(s);
    else {
        fprintf(stderr,"simcd: Illegal trace start cycle number: %s\n",s);
        abortnt();
    }

    return(out);
}


int atoi(s)     /* convert decimal ASCII number to integer */
char s[];
{
    int err;
    int i;      /* index */
    long int n; /* output */

    err=n=0;

    for (i=0; (s[i]>='0') && (s[i]<='9') && (err==0); ++i){
        n=(10*n) + s[i] - '0';
        if (n>((long int) 0x7fffffff)){
            err=1;
            fprintf(stderr,"simcd: Command line number too large: %s\n",s);
            abortnt();
        }
    }
    return(n);
}


int isdigit(c)  /* return non-zero if c is digit, 0 otherwise */
char c;
{
    if ((c>='0') && (c<='9')) return(1);
    else return(0);
}


prfb(s)         /* if condition OK, print string */
char *s;
{
    if (back==0) printf("%s",s);
}


prfs(s)         /* if condition OK, print string */
char *s;
{
    if (sprompt==0) printf("%s",s);
}


prfv(s)         /* if condition OK, print string */
```

simcd54.c

```
char *s;
{
    if ((back==0) && (verbose==1)) printf("%s",s);
}


abort()         /* print error message and stop program */
{
    fprintf(stderr,"simcd: Simulation aborted at cycle %d\n", cno);
    tout(stderr);
    exit(1);
}


abortnt()       /* print error message and stop program; no trace output */
{
    fprintf(stderr,"simcd: Simulation aborted at cycle %d\n", cno);
    exit(1);
}


errop(p)        /* print unopenable file name */
char *p;
{
    fprintf(stderr,"simcd: Can't open \"%s\"\n", p);
}


getsimp()       /* get simulation parameters */
{
    int err;

    prfs("simcd: Warning: in data entry, CRs alone are ignored.\n\n");
    prfs("simcd: Enter data dependancy check type (1-3)\n");
    prfs("\t(1- reduced checking w/super-advanced execution,\n");
    prfs("\t 2- reduced checking w/out super-advanced execution,\n");
    prfs("\t 3- complete checking): ");
    ddct=getn(0,1,3);   /* get input */

    prfs("simcd: Enter branch dependancy check type\n");
    prfs("\t(1-standard, 2-SC concurrent, 3-UC concurrent,\n");
    prfs("\t 4-UC concurrent w/multiple OOBFB execution): ");
    bct=getn(0,1,4);

    prfs("simcd: Enter length of Instruction Queue (1-165): ");
    iqs=getn(0,1,165);
    new=iqs+1;

    prfs("simcd: Enter AE width (1-32): ");
    aew=getn(0,1,32);

    prfs("simcd: Enter # of AS execution units (1-1000): ");
    aspeq=getn(0,1,1000);

    prfs("simcd: Enter # of FBs executable per cycle (1-1000): ");
    fbpeq=getn(0,1,1000);

    prfs("simcd: Enter # of BBs executable per cycle (1-1000): ");
    bbpeq=getn(0,1,1000);

    prfs("simcd: Enter total # of Bs executable per cycle (1-1000): ");
    tbpeq=getn(0,1,1000);

    prfs("simcd: Enter # of registers (0-1024): ");
    regno=getn(0,0,1024);

    if (mdump==1) {
        do {
            err=0;
            prfs("simcd: Enter inclusive lower memory dump limit (0-9C40): ");
            mdll=getn(1,0,40000);

            prfs("simcd: Enter exclusive upper memory dump limit (0-9C40): ");
            mdul=getn(1,0,40000);

            if (mdll>=mdul) {
                fprintf(stderr,"simcd: Lower mem. limit >= upper limit; try again.\n");
                if (sprompt==1) abortnt();
                err=1;
            }

        } while (err==1);
    }

    prfs("simcd: Enter IQ load type\n");
    prfs("\t(1- std.-unexecuted BBs domains held in IQ,\n");
    prfs("\t 2- unexecuted BBs domains not held in IQ): ");
    ldt=getn(0,1,2);
}



int getn(t,lo,hi)       /* get number from stdin */
int lo, hi;             /* bounds of input */
int t;                  /* type of input: 0-decimal, 1-hex */
{
    int in;     /* input */
    int err;    /* error flag */
    int smat;   /* # items matched by scan */

    do {
        if (t==0) smat=scanf("%d", &in);        /* get input */
        else smat=scanf("%x", &in);

        if (smat==EOF) in=lo;   /* set default */

        if ((in>=lo) && (in<=hi)) err=0;
        else {
            err=1;
            if (sprompt!=1) fprintf(stderr,"\tsimcd: Input out of range; re-enter:");
            else {
                fprintf(stderr,"simcd: Bad input parameter.\n");
                abortnt();
            }
        }
    } while (err==1);
    return(in);
}

/* NOW A MACRO
int getbits(x,p,n)
unsigned int x,p,n;
{
    return((x>>(p+1-n)) & ~(~0<<n));
}
*/

int gbsh(x,y,z)         /* getbits shifted left by 2 bits */
```

8 simcd54.c

```
unsigned int x,y,z;
{
    return(getbits(x,y,z)<<2);
}


int lnz(p)      /* determine lowest numbered zero in AE(p) */
int p;
{
    unsigned int t;     /* temp AE row */
    int j;      /* pointer */

    t=iq[p].ae;
    for (j=1; ((j<=aew) && ((t & msbmsk)==msbmsk)); j++) t=t<<1;
    return(j);
}


int hno(p)      /* return location of highest numbered 1 in AE(p) */
int p;
{
    unsigned int t;     /*temp.*/
    int j;      /* counter, pointer */

    t=iq[p].ae;

    for (j=32;(((t & lsbmsk)==0) && (j>0)); j--) t=t>>1;
    return(j);
}


int instex(n)   /* instruction IQ(n) executed? */
int n;
{
    int t;      /* temp. */

    switch (ddct){
        case 1:
        case 2:
            if (lnz(n)>b) return(1);
            else return(0);
            break;

        case 3:
            t=hno(n);
            if ((t==(lnz(n)-1)) && (t==b)) return(1);
            else return(0);
            break;

        default:
            elcerr(99,n);
            break;
    }
}


int rdcd(fp)    /* load program into m, starting at pcstart */
                /* return max m address */
FILE *fp;
{
    int i;      /* pointer to m */

    i=pcstart>>2;       /* init i to first m address to be loaded */
    /* read in file to memory */
    while ((fscanf(fp, "%x", &m[i++]) != EOF) && (i < mmax));
    fclose(fp);

    /* if error, abort */
    if (i >= mmax){
        fprintf(stderr,"simcd: Inadequate storage for program.\n");
        abortnt();
    }

    return(i);
}


init()          /* initialization */
{
    int t;      /* fractional remainder indicator */
    int i;      /* index */

    /* indicate none of hist used */
    if (histgram==1){
        for (i=0; i<=mmax; i++) hist[i]=(-1);
    }

    nm=iqs * aew;       /* serial limit */

    csis=iqs;
    csjs=iqs;

    csjws=iqs/cswl;

    tos=mmax<<2;        /* init top of stack to memory limit address */
    endsimf=0;  /* init flags */
    oobbexf=0;
    oobbextf=0;
    oobfbexf=0;
    oobbbexf=0;
    oobbbnxf=0;
    oobbbf=0;
    exflg=0;
    aemaxflg=0;

    bmax=1;     /* init. max. b value */

    pc=pcstart;         /* init pc, dba */
    dba=dbastart;

    if (trace==1){
        switch (ddct){
            case 1:
            case 2:
                trcend=trcstrt+4;
                break;

            case 3:
                trcend=trcstrt+10;
                break;

            default:
                fprintf(stderr,"simcd: Illegal data concurrency type in init().\n");
                abortnt();
                break;
        }
    }
```

simcd54.c

```
    flushiq();  /* initialize instruction queue */
}

flushiq()        /* set up IQ to nice values */
{
    int i,j,k;  /* counters */
    int bp;     /* b prime value; leftmost columns to initialize to 1 */

    ompb=0;     /* init old mpb */

    /* init dynamic conc. structures */
    for (i=0; i<=nm; i++){
        for (j=0; j<=6; j++) dcs[j][i]=0;
    }
    for (i=0; i<=aew; i++){
        for (j=0; j<=6; j++) dcsnew[j][i]=0;
    }

    for (i=0; i<=iqs; i++){
        iq[i].res=0;
        iq[i].op[0]=0;
        iq[i].op[1]=0;
        iq[i].flg=0x7f; /* compare none of the operands or ta; all operands are constant
s */
        iq[i].addr=0;
        iq[i].opc=ocmisnop;     /* all instructions set to no-ops */
        iq[i].mpb=0;    /* no bct-1 branch dependancies */
        iq[i].ta=0;
        iq[i].dba=dbastart;

        /* initialize dynamic concurrency structures */
/*      if (ddct==1) bp=aew-1;
        else bp=1;
        */
        bp=1;

        for (j=1; j<=bp; j++){
            aeset(i,j);
            dcswr(AE,i,j,1);
            dcswr(ve,i,j,1);
            dcswr(ast,i,j,1);
        }

        /* set up concurrency structures */
        for (j=0; j<=5; j++){
            for (k=0; k<=csjws; k++) cs[j][i][k]=0;
        }
        if ((ddct==1) || (ddct==2)){
            for (j=6; j<=11; j++){
                for (k=0; k<=csjws; k++) cs[j][i][k]=0;
            }
        }

        /* init. inside inner loop indicators */
        iil[i]=0;
    }
    b=1;
    bv[1]=1;
    bvis[1]=0;
    for (j=2; j<=aew; j++){
        bv[j]=0;
        bvis[j]=0;
```

```
    }
}

int allix(l,u)  /* all instructions between l and u in IQ fully executed? */
int l,u;
{
    int i;      /* counter */
    int ok;     /* flag */

    ok=1;       /* assume yes */
    for (i=l; i<=u; i++) i=i & instex(i);
    return(ok);
}

load()          /* load IQ while conditions are right */
{
    int flg;    /* count flag */
    int expflg; /* expansion flag */
    int fbf;    /* OOBFB and OOBBB presence flag */
    int i;      /* counter */

    ldscntsc=0;         /* init count */
    flg=0;              /* init flag */

    if (verbose==1) printf("\tfebbfe=%d, flfe=%d, oobbbe=%d\n",febbfe(),flfe(),oobbbe());
    while ((febbfe()==1) && (flfe()==1) && (oobbbe()==1) && ((exflg==0) || ((oobbexf==1)
&& (oobbextf==1)))){
        expflg=0;       /* clear flag, assume no expansion of CALL or RET. */
        do{
            pcdbadet(expflg);   /* determine new PC, DBA */
            iqnew();    /* create IQ(n+1) */
            if (bct==4){
                if ((iq[new].opc==ocprcl01)||(iq[new].opc==ocprret0)){
                    /* see if any OOBFBs are in the IQ */
                    fbf=0;      /* clear flag */
                    for (i=2; i<=iqs; i++){
                        fbf=fbf | card(1,i,iqs);        /* OOBFB check */
                        fbf=fbf | card(2,0,i);  /* OOBBB check */
                    }
                    fbf=fbf & 1;        /* mask off msbs */
                    if (fbf==1) expflg=0;       /* dont expand ocpr */
                    else if (iq[new].opc==ocprcl01) expflg=1;
                                /* no OOBBs, so expand call */
                    else if (iq[new].opc==ocprret0) expflg=2;  /* expand RET */
                    else;
                }

                else expflg=0;  /* dont expand other instructions */
            }
            /* update sub-cycle counters */
            ldscnt++;
            ldscntsc++;

        } while (expflg!=0);    /* while instructions to be expanded */

        dsdet();        /* create dependancy structures new columns (n+1) */
        if ((bct==3)||(bct==4)){
            fb2dedet(); /* compute and store FB-FB PDs */
            fbbbddet(); /*  "   "   "   "   I->BB PDs (special) */
        }
```

```
        shiftin();      /* shift it all in ((n+1) -> n) */

        arraydet();     /* determine array access instructions */

        /* update counters */
        if (flg==0){
            ldcnt++;
            flg=1;
        }
    }
    if ((ddct==1) || (ddct==2)){
        ddetodd();      /* map DDE contents to full DD matrices */
    }
}


arraydet()      /* determine array access instructions and their type */
{
    int i;      /* row index */
    int u;      /* serial index */

    /* set array access indicators */
    /*    note that the calculations are redundant, being performed for */
    /*    all iterations, whereas they only need to be done for each */
    /*    row. The following technique is used to reduce row calculations */
    for (u=1; u<=nm; u++){
        i=row(u);
        switch (iq[i].opc & (~ocassimk)){
            case ocassarf:
                arri[u]=1;      /* array read */
                arwi[u]=0;
                break;

            case ocassart:
                arwi[u]=1;      /* array write */
                arri[u]=0;
                break;

            default:
                arwi[u]=arri[u]=0;      /* assignment instruction */
                break;
        }
    }
}


ddetodd()       /* map the half-matrices DDE to the full matrices DD */
{
    int arno;   /* DD index */
    int r;      /* row index */
    int c;      /* column index */
    unsigned int out;   /* current data value */

    for (arno=dd1; arno<=dd4; arno++){
        for (r=1; r<=iqs; r++){
            for (c=1; c<=iqs; c++){
                switch (arno){
                    case dd1:
                        /* for source 1 */
                        if (r<=c) out=csrd(dde4,r,c);
                        else out=csrd(dde2,c,r);
                        break;

                    case dd2:
                        /* for source 2 */
                        if (r<=c) out=csrd(dde5,r,c);
                        else out=csrd(dde3,c,r);
                        break;

                    case dd3:
                        /* for sinks */
                        if (r<=c) out=csrd(dde1,r,c);
                        else out=csrd(dde1,c,r);
                        break;

                    case dd4:
                        /* for array references, ast enabling */
                        if (r<c) out=csrd(dde2,r,c) | csrd(dde3,r,c);
                        else out=csrd(dde4,c,r) | csrd(dde5,c,r);
                        break;

                    default:
                        iderr(7);
                        break;
                }
                cswr(arno,r,c,(1 & out));
            }
        }
    }
}


int febbfe()    /* return 1 if fully enclosed BBs have fully executed */
                /* or oob branch executed true, in the case of bct=3 */
                /*    BB TA must be to IC 1 */
{
    int flg;    /* output */
    int i;      /* counter */
    int k;      /* index */
    unsigned int inh,inhh;      /* cumulative OR */

    flg=0;
    inh=0;

    if (ldt==1){
      switch (bct){
        case 2:
            for (i=2; i<=iqs; i++){
                inh=0x1 & (inh | ((~(csrd(2,0,i))) & (csrd(2,1,i)) & (~(instex(i)))));
            }
            flg=1 & (~inh);
            break;

        case 1:
        case 3:
        case 4:
            for (i=2; i<=iqs; i++){
                inhh=0;
                for (k=i; k<=iqs; k++){
                    inhh=inhh | (csrd(5,i,k) & (~(instex(k))));
                }
                inh=inh | ((~(csrd(2,0,i))) & csrd(2,1,i) & ((~(instex(i))) | inhh));
            }
            flg=1 & (~inh);
            if ((oobbexf==1) && (oobbextf==1)) flg=1;
```

```
            break;

        default:
            lderr(10);  /* error */
            break;
        }
    }
    else if (ldt==2) flg=1;
    else lderr(12);

    return(flg);
}


int fife()      /* ddct=3 -> return 1 if first instruction fully executed */
                /* ddct=1 or 2 -> return 1 if IQ(1) can be eliminated */
{
    int f;      /* temp */
    int j;      /* index */

    switch (ddct){
        case 3:
            return(instex(1));
            break;

        case 1:
        case 2:
            f=dcs[ast][1];
            for (j=2; j<=b; j++) f&=dcard(ve,1,j);
            f&=1;
            return(f);
            break;

        default:
            lderr(15);
            break;
    }
}


int oobbbe()    /* out of bounds backward branch executed? */
{
    int flg;    /* output */

    switch (bct){
        case 1:
            /* no difference in algorithms; below is old code */
            /*if ((csrd(2,iqs,iqs)==1) && (instex(iqs) == 0)) flg=0;*/
            /*else flg=1;*/
            /*break;*/

        case 2:
            if ((oobbbf==1) && (oobbexf == 0)) flg=0;
            else flg=1;
            break;

        case 3:
        case 4:
            if ((oobbbf==0) || ((oobbbf==1) && (((oobfbexf==1) && (oobbextf==1)) || ((oo
bbbexf==1) && (oobbextf==1))) || (oobbbnxf==1)))) flg=1;
            else flg=0;
            break;

        default:
            lderr(20);
            break;
    }
    return(flg);
}


pcdbadet(ldtyp) /* determine program counter and data base address */
int ldtyp;      /* load type: 2-RETURN (bct=4), 1-expanded CALL (bct=4), */
                /*      0-other */
{
    int histno; /* histogram pointer */

    switch (ldtyp){
        case 0:
            /* normal case */
            if (oobbextf!=0) pc=oobbta;  /* oobb executing */
            else pc=pc;          /* no change */
            dba=dba;             /*  "    "   */
            break;

        case 1:
            /* expanding procedure call */

            /* save state */
            stackwr(pc);        /* store old pc */
            stackwr(dba);       /* store old dba */

            /* set new pc, dba */
            pc=iq[new].ta;
            if (getbits(iq[new].flg,4,1)==0) dba=mrd(iq[new].op[0]);
            else dba=iq[new].dba+iq[new].op[0];

            /* update counter */
            callexcc++;
            callexc++;

            break;

        case 2:
            /* expanding return */
            pc=stacklk(1,0);    /* restore pc */
            dba=stacklk(0,2);   /* restore dba */

            /* update counters */
            retexcc++;
            retexc++;

            break;

        default:
            lderr(23);
            break;
    }

    /* update counts, if appropriate */
    if ((ldtyp==1) || (ldtyp==2)){
        if (histgram==1){
            histno=(iq[new].addr-pcstart)>>2;

            if (hist[histno]==-1) hist[histno]=1;
            else hist[histno]+=1;
        }
        if ((redtrc==1) && (back==0)){
```

```
			printf("%x  Expanded\n",iq[new].addr);
		}
	}
}


iqnew()		/* partialy decode the next instruction and put it into IQ(n+1) */
{
	unsigned int aco,bco,cco;	/* 0-compare operands; 1-dont */
	int tac;	/* 0-compare target address; 1-dont */
	unsigned int eab;	/* execute all instructions before this one */
	int it;		/* instruction type: */
			/* 0- AS, 1-FB, 2-BB, 3-exit, 4-PCA01, 5-PCA02, 6-RETURN0,1 */
			/* 7-NOP */
	unsigned int at,bt,ct;		/* operand types: 0-rel., 1-absolute, 2-immediate */
	unsigned int t[4];	/* temp new instruction */
	unsigned int opcode;		/* temp new instructions opcode */
	int il;		/* instruction length, in bytes (always a multiple of 4) */
	unsigned int texl;	/* bit 31 of t[0]; indicates extended instruction */
	unsigned int texexl;		/* bit 23 of t[0]; extended even more */
	int asnsh;	/* -1- dont shift AS operands */
	int j;		/* column pointer */

	/* start of code */
	if (oobbextf != 0) flushiq();		/* oobb executed, so set up IQ */

	exflg=0;	/* clear exit flag */

	t[0]=mrd(pc);		/* read first word of instruction */
	ifc++;		/* update counters */
	ifmrc++;
	ifmrcc++;

	opcode=getbits(t[0],30,7);	/* get opcode */
	texl=getbits(t[0],31,1);	/* get bit */
	texexl=getbits(t[0],23,1);	/* get bit */

	at=bt=ct=2;		/* init operand types */

	eab=0;		/* assume normal instructions */

	/* fetch rest of instruction, set instruction length */
	switch (texl){
		case 0:
			il=4;
			break;

		case 1:
			t[1]=mrd(pc+4);		/* read second word of instruction */
			ifmrc++;
			ifmrcc++;
			switch (texexl){
				case 0:
					il=8;
					break;

				case 1:
					il=16;
					t[2]=mrd(pc+8);		/* read rest of instruction */
					t[3]=mrd(pc+12);
					ifmrc+=2;		/* last counter update */
					ifmrcc+=2;
```

```
					break;

				default:
					iderr(30);
					break;
			}
			break;

		default:
			iderr(40);
			break;
	}

	/* determine instruction type */
	switch (opcode){
		case ocprex:	/* exit */
			it=3;
			exflg=1;
			break;

		case ocprcl01:	/* PCA01 */
			it=4;
			break;

		case ocprcl02:	/* PCA02 */
			it=5;
			break;

		case ocprret0:	/* RETURNs */
		case ocprret1:
			it=6;
			break;

		case ocmisnop:	/* NO-OP */
			it=7;
			break;

		default:	/* AS */
			switch (opcode & (~occfsmk) & (~occfcmk)){
				case occffb:	/* FB */
					it=1;
					break;

				case occfbb:	/* BB */
					it=2;
					break;

				default:	/* AS */
					it=0;
					break;
			}
			break;
	}

	/* calculate res, op[]s, and flg contents of IQ(new) */
	switch (il){
		case 4:
			at=bt=ct=0; /* all rel. types */
			switch (it){
				case 0:
					if ((opcode & (~ocassmsk))==(ocasslby | ocass)) asnsh=1;
					else asnsh=0;		/* see if byte move */

					if (((opcode & (ocassmsk | ocidmsk)) == ocassb) || (opcode == oclogne
```

simcd54.c

```
g))(
            iq[new].op[1]=0;        /* single source */
            cco=1;
            ct=2;
        }
        else {
            if (asnsh==1) iq[new].op[1]=getbits(t[0],7,8)+dba;
            else iq[new].op[1]=gbsh(t[0],7,8)+dba;
            cco=0;
        }
        aco=bco=0;
        if (asnsh==1){
            iq[new].op[0]=getbits(t[0],15,8)+dba;
            iq[new].res=getbits(t[0],23,8)+dba;
        }
        else {
            iq[new].op[0]=gbsh(t[0],15,8)+dba;
            iq[new].res=gbsh(t[0],23,8)+dba;
        }
        iq[new].ta=0;
        tac=1;
        break;

    case 1:
    case 2:
        iq[new].ta=pc+extend(gbsh(t[0],15,16),18);
        iq[new].op[0]=gbsh(t[0],23,8)+dba;
        iq[new].op[1]=0;
        iq[new].res=0;
        aco=cco=1;
        bco=0;
        at=ct=2;
        tac=0;
        break;

    case 3:
        aco=bco=cco=1;
        eab=1;
        at=bt=ct=2;
        iq[new].ta=0;
        tac=1;
        break;

    case 4:
        /* as of V. 4.0, no longer a valid length */
        /*iq[new].res=gbsh(t[0],23,8);
        iq[new].op[0]=gbsh(t[0],15,8);
        iq[new].op[1]=gbsh(t[0],7,8);
        iq[new].ta=0;
        aco=bco=cco=0;
        tac=1;
        at=bt=ct=1;
        break;*/

    case 5:
        errdld("illegal opcode length",pc);
        break;

    case 6:
        iq[new].res=gbsh(t[0],23,8);
        iq[new].op[0]=gbsh(t[0],15,8);
        iq[new].ta=0;
        aco=bco=0;
        cco=1;
            tac=1;
            at=bt=1;
            ct=2;
            break;

        case 7:
            iq[new].res=0;
            iq[new].op[0]=0;
            iq[new].op[1]=0;
            iq[new].ta=0;
            tac=1;
            aco=bco=cco=1;
            at=bt=ct=2;
            break;

        default:
            lderr(50);
            break;
    }
    break;

case 8:
    switch (lt){
        case 4:
        case 5:
            errdld("illegal opcode length",pc);
            break;

        default:
            break;
    }

case 16:
    at=optyp(t[0],1);
    if ((opcode & ocassart) == ocassart){
        at |= getbits(t[0],17,1) << 1;  /* get extra bit */
    }
    bt=optyp(t[0],2);
    ct=optyp(t[0],3);
    aco=bco=cco=0;
    tac=1;
    iq[new].ta=0;
    iq[new].res=0;
    iq[new].op[0]=0;
    iq[new].op[1]=0;

    switch (lt){
        case 0:
        case 5:
        case 6:
            if (((opcode & (ocassmsk | ocldmsk)) == ocassb) || (opcode == oclogne
g) || (opcode==ocprret0) || (opcode == ocprret1)){
                cco=1;
            }
            else {
                if (ct==2) cco=1;       /* set C comparison ind. */
                else cco=0;

                switch (l1){
                    case 8:
                        iq[new].op[1]=calargm(t[0],t[1],3,lt,ct);
                        break;

                    case 16:
```

```
                        iq[new].op[1]=calargl(t[1],t[2],t[3],3,it,ct);
                        break;

                    default:
                        lderr(60);
                        break;
                }
            }
            break;

        case 1:
        case 2:
            aco=cco=1;
            tac=0;
            switch (i1){
                case 8:
                    iq[new].ta=calargm(t[0],t[1],3,it,ct);
                    break;

                case 16:
                    iq[new].ta=calargl(t[1],t[2],t[3],3,it,ct);
                    break;

                default:
                    lderr(70);
                    break;
            }
            break;

        case 4:
            cco=1;
            tac=0;
            iq[new].ta=calargl(t[1],t[2],t[3],3,it,ct);
            break;

        default:
            lderr(80);
            break;
    }
    break;

  default:
    lderr(90);
    break;
}

if (it==5) cco=1;   /* PCA02 correction */

if (bt==2) bco=1;   /* set B comparison indicator */
else bco=0;

if (at==2) aco=1;   /* set A comparison indicator */
else aco=0;

if (it==7) {
  at=bt=ct=1;  /* set to absolute address type if no-op */
}

if ((it==1) || (it==2)) aco=1;   /* set A comparison indicator for br. */

switch (i1){
    case 4:
        break;
```

```
        case 8:
            iq[new].res=calargm(t[0],t[1],1,it,at);
            iq[new].op[0]=calargm(t[0],t[1],2,it,bt);
            break;

        case 16:
            iq[new].res=calargl(t[1],t[2],t[3],1,it,at);
            iq[new].op[0]=calargl(t[1],t[2],t[3],2,it,bt);
            break;

        default:
            lderr(100);
            break;
    }

    /* set rest of IQ(new) */
    iq[new].flg=0;
    iq[new].flg=(eab<<7) | ((2 & at)<<5) | ((2 & ct)<<4) | ((2 & bt)<<3) | (tac<<3)
o<<2) | (cco<<1) | bco;

    if (oobbextf!=0){
        iq[new].ae=0;
        if ((ddct==1) || (ddct==2)){
            for (j=1; j<=aew; j++){
                dcsnew[AE][j]=0;
                dcsnew[ve][j]=0;
                dcsnew[ast][j]=0;
            }
        }
        oobbextf=0;
    }
    iq[new].addr=pc;
    iq[new].opc=opcode;
    iq[new].mpb=ompb;
    iq[new].dba=dba;
    if ((it==1)||(it==2)||(it==4)||(it==5)||(it==6)) ompb=pc;
    pc+=1;     /* update program counter */
    oobbexf=0;  /* clear oobb execution flag */
    if (ifmrcc > ifmrcp) ifmrcp=ifmrcc;    /* update peak indicator */
}


errdld(p,n)     /* input error during load; print message and pc */
char *p;
unsigned int n;
{
    fprintf(stderr,"simcd: Input error during load: %s. PC= %08x\n",p,n);
    abortnt();
}


int extend(n,s)         /* sign-extend n starting at bit s-1 */
unsigned int n;
int s;
{
    int bn;     /* bit number */
    unsigned int out;   /* output */
    unsigned int mask;  /* extension mask */
    unsigned int ones;  /* allo */

    ones=allo;

    bn=s-1;
    mask=ones<<bn;      /* create mask */
```

```
    if (getbits(n,bn,1) == 0) out=(~mask) & n;  /* sign bit = 0 */
    else out=mask | n;          /* sign bit = 1 */

    return(out);
}


int stacklk(tosd,popc)  /* return element @ tos+tosd, pop stack by popc */
unsigned int tosd;
int popc;
{
    unsigned int t;     /* temp */

    stacklkc++;         /* update counter */

    t=mrd((tosd<<2) + tos);     /* read stack */
    tos+=(popc<<2);     /* pop stack */
    tpopc+=popc;        /* update counter */

    if ((tos>>2) > mmax){
        fprintf(stderr,"simcd: Stack underflow.\n");
        abort();
    }

    return(t);
}


stackwr(wd)     /* push wd on stack */
unsigned int wd;
{
    tos-=4;     /* adjust pointer */

    mwr(tos,wd,0);      /* write memory (push) */

    if (tos <= pcmax){
        fprintf(stderr,"simcd: Stack overflow.\n");
        abort();
    }
}


int mrd(addr)           /* read word or byte at addr */
unsigned int addr;
{
    int ptr;    /* m pointer */
    int fmod;   /* four modulus */
    unsigned int out;   /* output */

    ptr=addr>>2;        /* calculate m pointer */

    if (ptr > mmax){
        fprintf(stderr,"simcd: Memory bounds exceeded on m read.\n");
        abort();
    }

    fmod=addr & 0x3;    /* determine byte address */

    if (fmod==0) out=m[ptr];    /* get word */
    else {
        /* out=getbits(m[ptr],((fmod<<3)-1),8); */ /* get, normalize byte */
                        /* the above line not used as of Version 4.1 */
        fprintf(stderr,"simcd: Byte read attempted.\n");
            abort();
    }

    /* update counters */
    tmemrdc++;
    tmemrdcc++;
    if (tmemrdcc > tmemrdcp) tmemrdcp=tmemrdcc;   /* update peak indicator */

    if (ptr < regno){
        regrdc++;
        regrdcc++;
        if (regrdcc > regrdcp) regrdcp=regrdcc;   /* update peak indicator */
    }
    else {
        memrdc++;
        memrdcc++;
        if (memrdcc > memrdcp) memrdcp=memrdcc;   /* update peak indicator */
    }

    return(out);
}


mwr(addr,wd,size)       /* write wd in m at addr; size: 0-wd, 1-byte */
unsigned int addr;
unsigned int wd;
int size;
{
    int ptr;    /* m pointer */
    int mfmod;  /* modified four modulus */

    ptr=addr>>2;        /* create pointer */

    /* check bounds */
    if (ptr > mmax){
        fprintf(stderr,"simcd: Memory bounds exceeded during write.\n");
        abort();
    }

    mfmod=(3-(addr & 0x3))*8;   /* create bit count from 4 modulus of addr */

    if (size==0) m[ptr]=wd;     /* write word */
    else m[ptr]=(m[ptr] & (~(0xff << mfmod))) | ((wd & 0xff) << mfmod); /* write by

    /* update counters */
    tmemwrc++;
    tmemwrcc++;
    if (tmemwrcc > tmemwrcp) tmemwrcp=tmemwrcc;   /* update peak indicator */

    if (ptr < regno){
        regwrc++;
        regwrcc++;
        if (regwrcc > regwrcp) regwrcp=regwrcc;   /* update peak indicator */
    }
    else {
        memwrc++;
        memwrcc++;
        if (memwrcc > memwrcp) memwrcp=memwrcc;   /* update peak indicator */
    }
}


int calargm(t0,t1,opn,it,opt)   /* calculate IQ operand entry for two word instructions *
/
```

simcd54.c

```
unsigned int t0,t1;     /* machine code of instruction */
int opn;          /* operand #: 1-A, 2-B, 3-C */
int it;           /* instruction type */
int opt;          /* operand type */
{
    unsigned int out;   /* output */
    unsigned int rawopnd;       /* raw operand */
    int bt;             /* base type: 0-dba, 2-pc */

    /* get raw operand */
    switch (opn){
        case 1:
            rawopnd=getbits(t0,15,16);
            break;

        case 2:
            rawopnd=getbits(t1,31,16);
            break;

        case 3:
            rawopnd=getbits(t1,15,16);
            break;

        default:
            lderr(110);
            break;
    }

    if ((it==0)||(it==6)||(((it==1)||(it==2)||(it==4))&&((opn==1)||(opn==2)))) bt=0;
    else bt=2;

    /* calculate output */
    switch (opt){
        case 0:
            if (bt==0) out=rawopnd+dba;          /* relative */
            else out=pc+((extend(rawopnd,16))<<2);
            break;

        case 1:
            out=rawopnd;         /* absolute */
            break;

        case 2:
            if (bt==0) out=extend(rawopnd,16);
            else lderr();
            break;

        default:
            lderr(120);
            break;
    }
    return(out);
}


int calargi(t1,t2,t3,opn,it,opt)        /* calculate IQ operand entry for two word instr
uctions */
unsigned int t1;        /* machine code of instruction (last three words) */
unsigned int t2;
unsigned int t3;
int opn;          /* operand #: 1-A, 2-B, 3-C */
int it;           /* instruction type */
int opt;          /* operand type */
{
    unsigned int out;   /* output */
    unsigned int rawopnd;       /* raw operand */
    int bt;             /* base type: 0-dba, 2-pc */

    /* get raw operand */
    switch (opn){
        case 1:
            rawopnd=t1;
            break;

        case 2:
            rawopnd=t2;
            break;

        case 3:
            rawopnd=t3;
            break;

        default:
            lderr(130);
            break;
    }

    if ((it==0)||(it==6)||(((it==1)||(it==2)||(it==4)||(it==5))&&((opn==1)||(opn==2)))) b
t=0;
    else bt=2;

    /* calculate output */
    switch (opt){
        case 0:
            if (bt==0) out=rawopnd+dba;          /* relative */
            else out=pc+rawopnd;
            break;

        case 1:
            out=rawopnd;         /* absolute */
            break;

        case 2:
            if (bt==0) out=rawopnd;     /* immediate */
            else lderr();
            break;

        default:
            lderr(140);
            break;
    }
    return(out);
}


int optyp(t0,opn)        /* determine operand type */
unsigned int t0;         /* first machine code word of instruction */
int opn;                 /* operand #: 1-A, 2-B, 3-C */
{
    int out;    /* output */

    switch (opn){
        case 1:
            out=getbits(t0,22,1);
            break;

        case 2:
            out=getbits(t0,21,2);
```

```
        break;

    case 3:
        out=getbits(t0,19,2);
        break;

    default:
        lderr(150);
        break;
    }
    return(out);
}


lderr(loc)      /* load error; notify, abort; occurance at loc */
int loc;
{
    fprintf(stderr,"simcd: Error during load. Location= %d. PC=%x.\n",loc,pc);
    abort();
}


exerr(loc,iqn)  /* execute error; notify, abort; occurance at loc; in IQ(iqn) */
int loc,iqn;
{
    fprintf(stderr,"simcd: Error during execution; bad opcode.\n");
    fprintf(stderr,"\tLocation= %d. PC= %x. IQ row= %d.\n",loc,pc,iqn);
    abort();
}


eicerr(loc,iqn) /* EI check error; notify, abort; occurance at loc; in IQ(iqn) */
int loc,iqn;
{
    fprintf(stderr,"simcd: Error during EI checking.\n");
    fprintf(stderr,"\tLocation= %d. PC= %x. IQ row= %d.\n",loc,pc,iqn);
    abort();
}

dsdet()         /* determine dependancy structures new columns */
{
    dddet();
    fbddet();
    bbdodet();
    pbbdedet();
    cbbdet();
    if (ddct==1) illdet();
}


dddet()         /* determine data dependancies */
{
    int out;    /* dd */
    int i;      /* pointer */
    int aco,bco,cco;    /* compare indicators of IQ(n+1) */
    int aaco;   /* second result compare indicator */

    /* get comparison indicators */
    aco=getbits(iq[new].flg,2,1);
    bco=getbits(iq[new].flg,0,1);
    cco=getbits(iq[new].flg,1,1);

    /* determine dependancies with all previous instructions in IQ */
    switch (ddct){
        case 1:
        case 2:
            for (i=2; i<=new; i++){
                aaco=getbits(iq[i].flg,2,1);
                if (aco==0){
                    if (aaco==0) cswr(dde1,i,new,eq(iq[i].res,iq[new].res));
                    else cswr(dde1,i,new,0);

                    if (getbits(iq[i].flg,1,1)==0)
                        cswr(dde3,i,new,eq(iq[i].op[1],iq[new].res));
                    else cswr(dde3,i,new,0);

                    if (getbits(iq[i].flg,0,1)==0)
                        cswr(dde2,i,new,eq(iq[i].op[0],iq[new].res));
                    else cswr(dde2,i,new,0);
                }
                else {
                    cswr(dde1,i,new,0);
                    cswr(dde3,i,new,0);
                    cswr(dde2,i,new,0);
                }

                if (aaco==0){
                    if (bco==0) cswr(dde4,i,new,eq(iq[i].res,iq[new].op[0]));
                    else cswr(dde4,i,new,0);

                    if (cco==0) cswr(dde5,i,new,eq(iq[i].res,iq[new].op[1]));
                    else cswr(dde5,i,new,0);
                }
                else {
                    cswr(dde4,i,new,0);
                    cswr(dde5,i,new,0);
                }
            }
/*          break;  */ /* always compute the old DD matrix, for PBBDE calc.*/

        case 3:
            for (i=2; i<new; i++){
                out=0;
                aaco=getbits(iq[i].flg,2,1);
                if (aco==0){
                    if (aaco==0) out=out | eq(iq[i].res,iq[new].res);
                    if (getbits(iq[i].flg,1,1)==0) out=out | eq(iq[i].op[1],iq[new]..   ;
                    if (getbits(iq[i].flg,0,1)==0) out=out | eq(iq[i].op[0],iq[new].res);
                }
                if (aaco==0){
                    if (bco==0) out=out | eq(iq[i].res,iq[new].op[0]);
                    if (cco==0) out=out | eq(iq[i].res,iq[new].op[1]);
                }
                cswr(0,i,new,out);      /* write the result */
            }
            break;

        default:
            lderr(160);
            break;
    }
}


fbddet()        /* determine forward branch domains and dependancies */
{
    int i;      /* pointer */
```

simcd54.c

```
	/* set FBD(new,new) */
	/* calls and returns are treated as FBs */
	if ((iq[new].opc & (~occfamk) & (~occfcmk))==occffb) cswr(1,new,new,1);
	else if ((iq[new].opc==ocprcl01)||(iq[new].opc==ocprret0)) cswr(1,new,new,1);
	else cswr(1,new,new,0);

	/* determine other new column elements */
	for (i=2; i<new; i++){
		cswr(1,i,new,((1 & (~eq(iq[new].addr,iq[i].ta))) & card(1,i,iqs)));
	}
}


bbdodet()	/* determine backward branch domains */
{
	int i,j;	/* pointers */
	int bbt[iqmax];		/* bb target vector */
	int nabb;	/* new I is a BB */
	int liq;	/* match in IQ */
	int sum;	/* temp. logical summation */

	/* set-up */
	liq=0;
	if ((iq[new].opc & (~occfsmk) & (~occfcmk))==occfbb) nabb=1;
	else nabb=0;
	oobbbf=0;	/* clear flags */
	oobfbexf=0;
	oobbbexf=0;
	oobbbnxf=0;

	/* calc. BBT */
	for (i=2; i<=new; i++){
		if (nabb==0) bbt[i]=0;
		else bbt[i]=eq(iq[new].ta,iq[i].addr);
		liq=liq | bbt[i];
	}

	/* calc. BBDO new column */
	for (i=2; i<=new; i++){
		if (liq==1){
			sum=0;
			for (j=2; j<=i; j++) sum=sum | bbt[j];
			for (j=i+1; j<=new; j++) sum=sum & 1 & (~bbt[j]);
			cswr(2,i,new,sum);
		}
		else if (nabb==0) cswr(2,i,new,0);
		else {
			cswr(2,i,new,1);
			oobbbf=1;	/* set oob bb loaded flag */
		}
	}

	if ((nabb==1) && (liq==0)) cswr(2,1,new,1);
	else cswr(2,1,new,0);
}


pbbdedet()	/* determine previous bb dependancies */
{
	int i,j;	/* pointers */
	int t;		/* temp. logical sum */

	/* calculate new PBBDE column */
	for (j=2; j<new; j++){
		t=0;
		for (i=2; i<=j; i++) t=t | (csrd(2,i,j) & card(0,i,new));
		t=t | (csrd(2,j,j) & card(2,j,new));	/* nested BB dependancies */
		cswr(3,j,new,t);
	}
}


cbbdet()	/* determine new chained BB column entries */
{
	int i,k,l;	/* indices */
	unsigned int obb[iqmax];	/* partially overlapped BBs */
	unsigned int t;		/* temp. */

	cswr(5,new,new,0);

	for (i=2; i<=iqs; i++){
		obb[i]=0;
		for (l=2; l<=i; l++){
			obb[i]=1 & (obb[i] | (card(2,l,new) & card(2,l,i) & (~(card(2,i,new)))));
		}
	}

	for (i=2; i<=iqs; i++){
		t=0;
		for (k=i; k<=iqs; k++){
			t=t | (obb[k] & card(5,i,k));
		}
		cswr(5,i,new,(1 & (obb[i] | t)));
	}
}


fb2dedet()	/* determine FB-FB PDs and put them into array PBBDE */
{
	int i,j;	/* indices */
	unsigned int pd;	/* procedural dependency */
	unsigned int fbpd;	/* derived PDs */

	for (j=3; j<=iqs; j++){
		for (i=2; i<j; i++){
			/* partially overlapped FBs determination */
			pd=1 & card(1,i,iqs) & (~(card(1,i,new))) & card(1,j,iqs) & card(1,j,new);

			/* store results */
			switch (ddct){
				case 3:
					fbpd=pd | card(3,i,j);
					cswr(3,i,j,fbpd);
					break;

				case 1:
				case 2:
					fbpd=pd | card(ofbde,i,j);
					cswr(ofbde,i,j,fbpd);
					break;

				default:
					lderr(170);
					break;
			}
		}
```

```
    }
}


fbbbddet()      /* determine I-BB PDs and put them into array PBBDE */
{
    int i,k;      /* indices */
    unsigned int bbpd;  /* I->BB PD exists */

    for (i=2; i<iqs; i++){
        for (k=(i+1); k<new; k++){
            bbpd=1 & csrd(2,k,k) & csrd(1,i,k) & csrd(2,i,k) & csrd(1,i,new);
            bbpd=bbpd | csrd(3,k,new);
            cswr(3,k,new,bbpd);
        }
    }
}


ilidet()        /* calculate Inside and Below Inner Loop Indicators */
{
    int i;      /* index */
    unsigned int ili;   /* Inner Loop BB Indicator */
    unsigned int cum;   /* cumulative OR of ili[] */

    ili=1;
    for (i=2; i<=iqs; i++){
        ili &= (~csrd(bbdo,i,new)) | (~csrd(bbdo,i,i));
    }
    ili &= 1 & csrd(bbdo,new,new);
    iii[new]=0;         /* init. */

    cum=0;
    for (i=new; i>=2; i--){
        iii[i]= 1 & (iii[i] | (ili & csrd(bbdo,i,new)));

        cum |= iii[i];
        bii[i] = 1 & (~cum);
    }

    /* mark those FBs with targets outside of the inner loop */
    /*     Only update when a new inner loop is created. */
    if (iii[new]==1){
        for (i=2; i<=new; i++){
            if ((iii[i]==1) && (csrd(fbd,i,new)==1)) ooilfb[i]=1;
            else ooilfb[i]=0;
        }
    }

    /* correct for no loops in Instruction Queue */
    if (cum==0){
        for (i=2; i<=new; i++) bii[i]=0;
    }
}


cswr(csn,roww,coll,in)  /* write the lsb of in into csn(row,col(bit)) */
int csn,roww,coll,in;
{
    int colw;   /* column word */
    int colb;   /* column bit */

    /* calc. word, bit address of col */
    colw=calw(coll);
    colb=calb(coll);

    /* write new bit (in) */
    cs[csn][roww][colw]=(cs[csn][roww][colw] & (~(lsbmsk<<colb))) | ((in & 1)<<colb);
}

/* NOW MACROS
int csrd(csn,roww,coll)
int csn,roww,coll;
{
    int colw;
    int colb;

    colw=calw(coll);
    colb=calb(coll);

    return(getbits(cs[csn][roww][colw],colb,1));
}


int calw(coll)
int coll;
{
    return((coll-1)/cswl);
}


int calb(coll)
int coll;
{
    return((cswl-1)-((coll-1)%cswl));
}
*/

int eq(a,b)     /* return 1 if a=b, 0 otherwise */
unsigned int a,b;
{
    if (a==b) return(1);
    else return(0);
}


shiftin()       /* shift in new instruction into IQ(n); shift in new cs cols. */
{
    int i,j,k;  /* pointers */

    for (i=0; i<=iqs; i++){
        /* shift in new IQ data */
        j=i+1;
        iq[i].res=iq[j].res;
        iq[i].op[0]=iq[j].op[0];
        iq[i].op[1]=iq[j].op[1];
        iq[i].flg=iq[j].flg;
        iq[i].ae=iq[j].ae;
        iq[i].addr=iq[j].addr;
        iq[i].opc=iq[j].opc;
        iq[i].ta=iq[j].ta;
        iq[i].mpb=iq[j].mpb;
```

simcd54.c

```
        iq[i].dba=iq[j].dba;

        /* shift cs data to upper left, shift dcs data up when appropriate */
        for (k=0; k<=3; k++) shcs(k,i,j);
        shcs(5,i,j);
        if ((ddct==1)||(ddct==2)){
            for(k=6; k<=11; k++) shcs(k,i,j);
            if (i!=0){
                for(k=0; k<=6; k++) shdcs(k,i,j);
            }
        }
        if (ddct==1){
            iil[i]=iil[j];
            oolfb[i]=oolfb[j];
            bil[i]=bil[j];
        }
    }
}


shdcs(dcsn,rto,rfr)     /* shift up dcsn row rfr into row rto */
int dcsn,rto,rfr;
{
    int j;      /* column pointer */

    for (j=1; j<=aew; j++){
        if (rfr!=new) dcswr(dcsn,rto,j,dcsrd(dcsn,rfr,j));
        else dcswr(dcsn,rto,j,dcsnew[dcsn][j]);
    }
}


shcs(csn,rto,rfr)       /* diagonally shift (to upper left) csn row rfr into rto */
int csn,rto,rfr;
{
    unsigned int t[csjwmax];    /* temp. rfr */
    int i;      /* pointer */

    /* copy rfr */
    for (i=0; i<=csjws; i++) t[i]=cs[csn][rfr][i];

    /* shift temp row left, store into csn */
    for (i=0; i<=(csjws-1); i++){
        cs[csn][rto][i]=(t[i]<<1) | getbits(t[i+1],(cswl-1),1);
    }

    /* shift final row word left */
    cs[csn][rto][csjws]=t[csjws]<<1;
}


/* NOW MACROS
int ser(r,c)
int r,c;
{
    return(r+((c-1)*iqs));
}


int row(serindex)
int serindex;
{
    return(1+((serindex-1)%iqs));
}


int col(serindex)
int serindex;
{
    return(1+((serindex-1)/iqs));
}


int dcsrd(dcsno,r,c)
int dcsno,r,c;
{
    return(dcs[dcsno][ser(r,c)]);
}


dcswr(dcsno,r,c,data)
int dcsno;
int r,c;
unsigned int data;
{
    dcs[dcsno][ser(r,c)]=data;
}
*/

eidet()         /* executable independance determination */
{
    int i,j,k;  /* pointers */
    int t1,t2;  /* temp. logical products */
    int f;      /* flag */
    int ifeall; /* all instr. fully executed till now */
    int oobbbno;        /* oob BB number */
    unsigned int exstat;        /* execution status */
    int iex;    /* instruction i executed */
    int histno; /* hist index */
    int dumnop; /* dummy or no-op indicator */

    /* set-up */
    aelzcal();  /* calculate AE leftmost zero vector */
    aerocal();  /* calculate AE rightmost one vector */
    ifecal();   /* calculate instruction fully executed vector */
    if ((bct==1)||(bct==3)||(bct==4)){
        iafecal();      /* calculate instr. almost fully exec. vector */
        oobbbno=new;
    }
    ifeall=1;   /* init. */

    /* calc. IE matrix (cs # 4) */
    for (i=1; i<=iqs; i++){
        for (j=1; j<i; j++){
            if (aelz[j]>aelz[i]) cswr(4,i,j,1);
            else cswr(4,i,j,0);
        }
    }

    /* calculate dependancies, or rather the lack of them */
    for (i=1; i<=iqs; i++){
        /* calc. nbbdl, nfbdl */
        switch (bct){
            case 1:
                j=1;
                f=0;
```

21 simcd54.c

```
            /* see if there is a match */
            while ((j<=(i-1)) && (f==0)){
                f=eq(iq[j].addr,iq[i].mpb);
                j++;
            }

            /* no match or match executed implies branch executable ind. */
            if ((f==0) || (card(4,1,(j-1))==1)) nbbdi[i]=nfbdi[i]=1;
            else nbbdi[i]=nfbdi[i]=0;
            break;

        case 2:
            t1=t2=1;        /* init. */
            for (j=1; j<=(i-1); j++){
                t1=t1 & (card(4,1,j) | (lsbmsk & (~card(3,j,1))));
                t2=t2 & (card(4,1,j) | (lsbmsk & (~card(1,j,1))));
            }
            nbbdi[i]=t1;
            nfbdi[i]=t2 | card(1,i,1) | card(2,i,1);
            break;

        case 3:
        case 4:
            t1=t2=1;        /* init. */
            for (j=1; j<=(i-1); j++){
                t1=t1 & (card(4,1,j) | (lsbmsk & (~card(3,j,1))));
/* possible line:   t1=t1 & (card(4,1,j) | (lsbmsk & ((~card(3,j,1)) & (~card(5,j,1)))))
; */
                t2=t2 & (card(4,1,j) | (lsbmsk & (~card(1,j,1))));
            }
            nbbdi[i]=t1;
            nfbdi[i]=t2 | card(1,i,1); /* only difference from bct=2 */
            break;

        default:
            eicerr(10,i);
            break;
    }

    /* calc. dd exec. ind. */
    j=f=1;
    while ((j<i) && (f==1)){
        f=lsbmsk & ((~card(0,j,1)) | card(4,1,j));
        j++;
    }
    j=i+1;
    while ((j<=iqs) && (f==1)){
        f=lsbmsk & ((~card(0,i,j)) | (~card(4,j,1)));
        j++;
    }
    nddi[i]=f;

    /* out of bounds branch exec. ind. calculation */
    if ((card(1,i,1)==1) && (card(1,i,iqs)==1)){
        switch (bct){
            case 1:
            case 2:
            case 3:
                j=f=1;
                while ((f==1) && (j<i)){
                    f=f & ife[j];
                    j++;
                }
                while ((f==1) && (j<=iqs)){
                    f=f & (iafe[j] | ife[j]);
                    j++;
                }
                noobbi[i]=oobbeif[i]=lsbmsk & f;
                break;

            case 4:
                f=1;
                j=i;
                while ((f==1) && (j<=iqs)){
                    f=f & (iafe[j] | ife[j]);
                    j++;
                }
                noobbi[i]=oobbeif[i]=1 & f;
                break;

            default:
                eicerr(13,i);
                break;
        }
    }
    else if ((i==iqs) && (oobbbf==1)){
        j=f=1;
        while ((f==1) && (j<iqs)){
            f=f & ife[j];
            j++;
        }
        noobbi[i]=oobbeif[i]=lsbmsk & f;
    }
    else if (((bct==3)||(bct==1)) && (card(2,i,1)==1) && (card(2,0,i)==1)){
        j=f=1;
        while ((f==1) && (j<i)){
            f=f & ife[j];
            j++;
        }
        while ((f==1) && (j<=iqs)){
            f=f & iafe[j];
            j++;
        }
        noobbi[i]=oobbeif[i]=1 & f;
        if ((ife[i]==0) && (oobbbno==new)) oobbbno=i;
    }
    else {
        noobbi[i]=1;
        oobbeif[i]=0;
    }

    if (bct==4){
        j=1;
        f=0;
        while ((f==0) && (j<i)){
            f=f | ((~ife[j]) & card(2,0,j));
            j++;
        }
        oobbben[i]=1 & (~f);

        if (card(2,0,i)==1){
            j=f=1;
            while ((f==1) && (j<i)){
                f=f & ife[j];
                j++;
            }
            while ((f==1) && (j<=iqs)){
```

```
                f=f & iafe[j];
                j++;
            }
        noobbi[i]=oobbeif[i]=1 & f & oobbben[i];
        }
    }

    /* calculate EI vectors, without and with resource dependancies */
    /* calc. overall EI vector, ignoring RDs */
    switch (bct){
        case 2:
            exstat=ife[i];
            break;

        case 1:
        case 3:
            if (i<=oobbbno) exstat=ife[i];
            else exstat=iafe[i];
            break;

        case 4:
            exstat=1 & (((~oobbben[i]) & iafe[i]) | (oobbben[i] & ife[i]));
            break;

        default:
            eicerr(15,i);
            break;
    }
    nrei[i]=f=nddi[i] & nfbdi[i] & nbbdi[i] & noobbi[i] & (isbmsk & (~exstat));

    /* allow for exit, etc. */
    if ((getbits(iq[i].fig,7,1)) && (ifeall==0)) nrei[i]=f=0;

    ifeal:=ifeall & ife[i];

    /* set the other nr vectors appropriately */
    switch (iq[i].opc & (~occfsmk) & (~occfcmk)){
        case occffb:
        case ocprcl01:
        case ocprret0:
            /* FB, CALL, or RETURN */
            nrasei[i]=0;
            nrfbei[i]=f;
            nrbbei[i]=0;
            break;

        case occfbb:
            nrasei[i]=0;
            nrfbei[i]=0;
            nrbbei[i]=f;
            break;

        default:
            nrasei[i]=f;
            nrfbei[i]=0;
            nrbbei[i]=0;
            break;
    }
  }
  rdf(iqs);    /* calculate final EI vectors */
}

eidetr()        /* executable independance determination for reduced */
                /*      data dependencies */
{
    int i,j,k;  /* pointers */
    int t1,t2,t3,t4;    /* temp. logical products */
    int f;      /* flag */
    int ifeall; /* all instr. fully executed till now */
    int oobbbno;        /* oob BB number */
    int iex;    /* instruction i executed */
    register int u,z,t,s;       /* indices */
    register unsigned int flag; /* indicates a sen has been set */
    register unsigned int ddve; /* logical accumulator */
    register unsigned int sent; /* temp for SEN calculation */
    register unsigned int sfst; /* temp for SFS calculation */
    register unsigned int ddeitt,ddeit; /* temps for DDEI calculation */
    register unsigned int sae;  /* to allow for super-advanced execution */
    register unsigned int vetypp; /* temp for vetyp[u] */
    register unsigned int ndcsaeu; /* temp for ~dcs[AE][u] */
    register int ru;    /* temp for row(u) */

    /* set-up */
    aelzcal();  /* calculate AE leftmost zero vector */
    aerocal();  /* calculate AE rightmost one vector */
    ifecal();   /* calculate instruction fully executed vector */
    if ((bct==1)||(bct==3)||(bct==4)){
        iafecal();      /* calculate instr. almost fully exec. vector */
        oobbbno=new;
    }
    ifeall=1;   /* init. */

    /* calc. IE matrix (cs # 4) */
    for (i=1; i<=iqs; i++){
        for (j=1; j<i; j++){
            if (aelz[j]>aelz[i]) cswr(4,i,j,1);
            else cswr(4,i,j,0);
        }
    }

    /* calculate SAEVE for procedural dependencies */
    for (s=1; s<=nm; s++){
        switch (ddct){
            case 1:
                pdsaeve[s]=1 & ((~bv[col(s)]) & (~iii[row(s)]));
                break;

            case 2:
                pdsaeve[s]=0;
                break;

            case 3:
            default:
                eicerr(21,s);
                break;
        }
    }

    /* calculate dependancies, or rather the lack of them */

    /* calc. nbbdi, nfbdi */
    switch (bct){
        case 1:
```

23 simcd54.c

```
for (u=1; u<=nm; u++){
    i=row(u);
    j=1;
    f=0;

    /* see if there is a match */
    while ((j<=(i-1)) && (f==0)){
        f=eq(iq[j].addr,iq[i].mpb);
        j++;
    }
    j--;    /* correct match pointer */

    /* no match or match executed implies
                        branch executable ind. */
    if ((f==0) || ((dcs[AE][ser(j,col(u))]==1) &&
                (dcs[AE][u]==0))) nbbdi[u]=nfbdi[u]=1;
    else nbbdi[u]=nfbdi[u]=0;

    /* make BBs dependent on their earlier iterations */
    j=col(u);
    t1=1;
    if (csrd(bbdo,i,i)==1){
        for (k=1; k<=(j-1); k++){
            t1 &= dcsrd(AE,i,k);
        }
    }
    nbbdi[u]= 1 & t1;
}
break;

case 2:
case 3:
case 4:
    /* FB EI calculation */
    for (u=1; u<=nm; u++){
        i=row(u);

        /* init. logic product accumulators */
        t1=1;
        t2=1;
        for (j=1; j<=(i-1); j++){
            t1&=1 & (dcsrd(AE,j,col(u)) | pdsaeve[ser(j,col(u))] |
                    (-csrd(fbd,j,i)));
            t2&=1 & (dcsrd(AE,j,col(u)) | pdsaeve[ser(j,col(u))] |
                    (~csrd(ofbde,j,i)));
        }
        nfbdi[u]=1 & (csrd(fbd,i,i) | t1) & t2;
        if (bct==2) nfbdi[u] |= csrd(bbdo,i,i);
    }

    /* BB EI calculation */
    /* AES calculation */
    for (i=1; i<=iqs; i++){
        t1=1;
        for (k=1; k<=aew; k++){
            t1 &= 1 & (dcsrd(AE,i,k) | pdsaeve[ser(i,k)]);
            aes[ser(i,k)]=t1;
        }
    }
    /* nbbdi calculation */
    for (u=1; u<=nm; u++){
        t1=1;
        i=row(u);
        for (j=1; j<=(i-1); j++){
            t1 &= 1 & (aes[ser(j,col(u))] | (~csrd(pbbde,j,i)));
        }
        /* make BBs dependent on their earlier iterations */
        j=col(u);
        if (csrd(bbdo,i,i)==1){
            for (k=1; k<=(j-1); k++){
                t1 &= dcsrd(AE,i,k);
            }
        }
        nbbdi[u]= 1 & t1;
    }
    break;

default:
    eicerr(20,-1);
    break;
}

/* Determine virtual execution terms for use in SEN calculations */
for (s=1; s<=nm; s++){
    switch (ddct){
        case 1:
            saeve[s]=1 & (((~bv[col(s)]) & (~ili[row(s)])) |
                        ((~bvis[col(s)]) & (bii[row(s)])));
            vet[s]= 1 & (dcs[ve][s] | saeve[s]);
            break;

        case 2:
            saeve[s]=0;
            vet[s]=dcs[ve][s];
            break;

        case 3:
        default:
            eicerr(22,s);
            break;
    }
}

/* Calculate Sink ENable pointers */
/*      calculate temps (values invariant over z, s, t) */
for (u=1; u<=nm; u++){
    t=s=u;
    vetyp[u]=1 & (~bv[col(u)]) & ili[row(u)];
    templ[s]= dcs[ve][s] | arwi[s];
    temp2[t]= dcs[re][t] & (~arwi[t]);
}

for (z=1; z<=3; z++){
    sen[z-1][1]=0;
    sfs[z-1][1]=1;
    for (u=2; u<=nm; u++){
/*          vetyp=1 & (~bv[col(u)]) & ili[row(u)]; */
            vetypp=vetyp[u];    /* assign temp to eliminate accesses */
            ndcsaeu= ~dcs[AE][u]; /* assign temp to eliminate accesses */
            ru=row(u);  /* assign temp to eliminate accesses */
            flag=0;
            sen[z-1][u]=0;
            ddve=1;
#if TEST
            for (t=u-1; t>=0; t--){
#else
        /* The following mode is not currently used (8/17/85) due to its */
        /*      slow operation; maybe someday... */
```

simcd54.c

```
            /* Normally, stop computations after a source has been found; */
            /*  to reduce execution time of the simulation. */
            for (t=u-1; ((t>=0) && (flag==0)); t--){
#endif
                /* ddve is calculated incrementally, over the values of */
                /*    t, to reduce execution time */
                s=t+1;
                if (s<=u-1){
                    ddve &= (~dd(z,row(s),ru)) | (vetypp & saeve[s]) |
                            templ[s];
                }
                sent=1 & dd(z,row(t),ru) & ndcsaeu & temp2[t] & ddve &
                        (bv[col(u)] | (~saeve[t]));
                if (z==3) sent &= 1 & arwi[u] & (~arwi[t]);

                if ((sent==1) && (t>=1)){
                    if (flag==1) elcerr(29,u);  /* more than one 1 in a SEN */
                                                /* array, so abort */
                    else flag=1;
                    sen[z-1][u]=t;    /* SEN element points to proper sink */
                }
            }
            sfst = 1 & ddve;
            if (z==3) sfst |= 1 & (~arwi[u]);
            sfs[z-1][u] = sfst;
        }
    }

    /* Sink From Storage calculation - if reinstated, check vetyp
    for (z=1; z<=3; z++){
        for (u=1; u<=nm; u++){
            vetyp=1 & (~bv[col(u)]) & iil[row(u)];
            sfst=1;
            for (s=1; s<=(u-1); s++){
                if (z==3) sfst &= (~dd(z,row(s),row(u))) | arwi[s] |
                                  (~arwi[u]) | dcs[ve][s] | (vetyp[u] & saeve[s]);
                else sfst &= (~dd(z,row(s),row(u))) | dcs[ve][s] |
                                  arwi[s] |(vetyp[u] & saeve[s]);
            }

            sfs[z-1][u]=1 & (sfst);
        }
    }
    */

    /* DD EI calculation */
    for (u=1; u<=nm; u++){
        ddeltt=1;
        for (z=1; z<=3; z++){
            if (sen[z-1][u]!=0) ddelt=1;
            else ddelt=0;
            ddeltt &= ddelt | sfs[z-1][u];
        }
        t4=1;
        for (s=1; s<=(u-1); s++){
            t3=1;
            for (z=1; z<=2; z++){
                t3 &= (~dd(z,row(s),row(u))) | dcs[ast][s];
            }
            t4 &= (~arwi[row(s)]) | t3;
        }

        nddi[u]= 1 & ddeltt & ((~arri[row(u)]) | t4) & (~dcs[AE][u]);
    }

    /* out of bounds branch exec. ind. calculation */
    for (u=1; u<=nm; u++){
        i=row(u);
        if ((csrd(1,i,1)==1) && (csrd(1,i,iqs)==1)){
            switch (bct){
                case 1:
                case 2:
                case 3:
                    j=f=1;
                    while ((f==1) && (j<i)){
                        f=f & ife[j];
                        j++;
                    }
                    while ((f==1) && (j<=iqs)){
                        f=f & (iafe[j] | ife[j]);
                        j++;
                    }
                    noobbi[u]=oobbeif[u]=isbmsk & f & bv[col(u)];
                    break;

                case 4:
                    f=1;
                    j=1;
                    while ((f==1) && (j<=iqs)){
                        f=f & (iafe[j] | ife[j]);
                        j++;
                    }
                    noobbi[u]=oobbeif[u]=1 & f;
                    break;

                default:
                    elcerr(30,u);
                    break;
            }
        }
        else if ((i==iqs) && (oobbbf==1)){
            j=f=1;
            while ((f==1) && (j<iqs)){
                f=f & ife[j];
                j++;
            }
            noobbi[u]=oobbeif[u]=isbmsk & f;
        }
        else if (((bct==3)||(bct==1)) && (csrd(2,i,1)==1) && (csrd(2,0,1)==1)){
            j=f=1;
            while ((f==1) && (j<i)){
                f=f & ife[j];
                j++;
            }
            while ((f==1) && (j<=iqs)){
                f=f & iafe[j];
                j++;
            }
            noobbi[u]=oobbeif[u]=1 & f & bv[col(u)];
            if ((ife[i]==0) && (oobbbno==new)) oobbbno=i;
        }
        else {
            noobbi[u]=1;
            oobbeif[u]=0;
        }

        if (bct==4){
            j=1;
```

simcd54.c

```
		f=0;
		while (((f==0) && (j<i)){
			f=f | ((~ife[j]) & csrd(2,0,j));
			j++;
		}
		oobbben[i]=1 & (~f);

		if (csrd(2,0,i)==1){
			j=f=1;
			while (((f==1) && (j<i)){
				f=f & ife[j];
				j++;
			}
			while (((f==1) && (j<=iqs)){
				f=f & iafe[j];
				j++;
			}

			noobbi[u]=oobbeif[u]=1 & f & oobbben[i] & bv[col(u)];
		}
	}
}

/* calculate EI vectors, without and with resource dependancies */
/* calc. overall EI vector, ignoring RDs */
for (u=1; u<=nm; u++){
	i=row(u);
	j=col(u);
	/* take care of super-advanced execution */
	switch (ddct){
		case 1:
/*			sae=1 & ife[i] & (csrd(bbdo,1,i) | saeve[u]); */
			sae=1 & (((~bv[j]) & saeve[u]) | (ife[i] & csrd(bbdo,1,i)));
			break;

		case 2:
			sae=1 & (ife[i] | (~bv[j]));
			break;

		case 3:
		default:
			elcerr(40,1);
	}

	/* calculate execution status indicators */
	switch (bct){
		case 2:
			exstatr[u]=sae;
			break;

		case 1:
		case 3:
			if (i<=oobbbno) exstatr[u]=sae;
			else exstatr[u]=(iafe[i] | (~bvis[j])) & isbmsk;
			break;

		case 4:
			exstatr[u]=1 & (((~oobbben[i]) & (iafe[i] | (~bvis[j]))) | (oobbben[i] &
sae));
			break;

		default:
			elcerr(45,1);
			break;
	}
}

/* calculate  Semantically Executably Independent Instructions */
for (u=1; u<=nm; u++){
	/* take care of restriction on super-advanced execution */
	switch (ddct){
		case 1:
			if ((b<aew) && (col(u)==aew)) t=0;
			else t=1;
			break;

		case 2:
		case 3:
			t=1;
			break;

		default:
			elcerr(35,u);
			break;
	}
	/* actual SEI calc. */
	nrei[u]=nddi[u] & nfbdi[u] & nbbdi[u] & noobbi[u] & (isbmsk & (~exstatr[u])) & t;
}

/* allow for exit, etc. */
for (i=1; i<=iqs; i++){
	if ((getbits(iq[i].flg,7,1)) && (ifeall==0)){
		for (k=i; k<=nm; k+=iqs) nrei[k]=0;
	}
	ifeall=ifeall & ife[i];
}

/* set the other nr vectors appropriately */
for (u=1; u<=nm; u++){
	switch (iq[row(u)].opc & (~occfamk) & (~occfcmk)){
		case occffb:
		case ocprcl01:
		case ocprret0:
			/* FB, CALL, or RETURN */
			nrasei[u]=0;
			nrfbei[u]=nrei[u];
			nrbbei[u]=0;
			break;

		case occfbb:
			nrasei[u]=0;
			nrfbei[u]=0;
			nrbbei[u]=nrei[u];
			break;

		default:
			nrasei[u]=nrei[u];
			nrfbei[u]=0;
			nrbbei[u]=0;
			break;
	}
}

rdf(nm);	/* calc. final EI vectors */
}


/* NOW A MACRO; LOADED IN load()
```

```
int dd(arno,r,c)
register int arno,r,c;
{
    register unsigned int out;

    switch (arno){
        case 1:

            if (r<=c) out=card(dde4,r,c);
            else out=card(dde2,c,r);
            break;

        case 2:

            if (r<=c) out=card(dde5,r,c);
            else out=card(dde3,c,r);
            break;

        case 3:

            if (r<=c) out=card(dde1,r,c);
            else out=card(dde1,c,r);
            break;

        case 4:

            if (r<c) out=card(dde2,r,c) | card(dde3,r,c);
            else out=card(dde4,c,r) | card(dde5,c,r);
            break;

        default:
            eicerr(25,-1);
            break;
    }
    return(1 & out);
}
*/


rdf(len)        /* pass SEI vectors through the resource dependency filters */
                /*      creating the final EI vectors */
int len;        /* length of vectors, normally =iqs for ddct=3 (normal), */
                /*      =nm for ddct=1 or 2 (reduced data dependencies) */
{
    int i;      /* vector index */
    int j;      /* counter */
    unsigned int iex;   /* instruction executed */
    int dumnop; /* dummy or no-op indicator */
    int histno; /* hist index */

    /* create final EI vectors, taking into account resource dependancies */
    aspec=fbpec=bbpec=tbpec=0;  /* init. counts */
    for (i=1; i<=len; i++){
        /* see if dummy or no-op */
        if ((iq[row(i)].opc==ocmisdum) || (iq[row(i)].opc==ocmisnop)) dumnop=1;
        else dumnop=0;

        if ((nrasei[i]==1) && (aspec<aspeq) && (dumnop==0)){
            aspec++;
            asei[i]=1;
        }
        else if ((nrasei[i]==1) && (dumnop==1)) asei[i]=1;  /* don't count */
            else asei[i]=0;
    }

    for (i=1; i<=len; i++){
        if ((nrbbei[i]==1) && (bbpec<bbpeq) && (tbpec<tbpeq)){
            bbpec++;
            tbpec++;
            bbei[i]=1;
        }
        else bbei[i]=0;
    }

    for (i=1; i<=len; i++){
        if ((nrfbei[i]==1) && (fbpec<fbpeq) && (tbpec<tbpeq)){
            fbpec++;
            tbpec++;
            fbei[i]=1;
        }
        else fbei[i]=0;
    }

    for (i=1; i<=len; i++) ei[i]=asei[i] | fbei[i] | bbei[i];

    if (histgram==1){
        for (i=1; i<=len; i++){
            histno=(iq[row(i)].addr-pcstart)>>2;

            /* only count those actually updated */
            iex=1 & ei[i] & (~upin[i]);
            if (hist[histno]== -1) hist[histno]=iex;
            else hist[histno]+=iex;
        }
    }

    if ((redtrc==1) && (back==0)){
        j=0;
        for (i=1; i<=len; i++){
            if ((ei[i]==1) && (upin[i]==0)){
                if (((j%10)==0) && (j!=0)) printf("\n");
                j++;
                printf("%x  ",iq[row(i)].addr);
            }
        }
        printf("\n");
    }

    /* update max. executions per cycle */
    if (aspec>asexmax) asexmax=aspec;
    if (fbpec>fbexmax) fbexmax=fbpec;
    if (bbpec>bbexmax) bbexmax=bbpec;
    if (tbpec>tbexmax) tbexmax=tbpec;
}


aelzcal()       /* calc. all AELZs */
{
    int i;      /* pointer */

    for (i=1; i<=iqs; i++) aelz[i]=lnz(i);
}


aerocal()       /* calc. all AEROs */
```

simcd54.c

```
    int i;      /* pointer */

    for (i=1; i<=iqs; i++) aero[i]=hno(i);
}


iafecal()       /* calc. all iafe elements */
{
    int i;      /* pointer */

    for (i=1; i<=iqs; i++){
        switch (ddct){
            case 1:
            case 2:
                if (aeiz[i]>=b) iafe[i]=1;
                else iafe[i]=0;
                break;

            case 3:
                if ((aero[i]==(aeiz[i]-1)) && (aero[i]==(b-1))) iafe[i]=1;
                else iafe[i]=0;
                break;

            default:
                eicerr(98,i);
                break;
        }
    }
}


ifecal()        /* calc. all ife elements */
{
    int i;      /* pointer */

    for (i=1; i<=iqs; i++) ife[i]=instex(i);
}


brex()          /* execute branch tests */
{
    int i;      /* pointer */
    int j;      /* counter */
    int f;      /* flag */
    unsigned int cond;  /* condition to be evaluated */
    unsigned int cet;   /* condition evaluation type */
    int lim;    /* loop limit */
    int u,k,s;  /* indices */
    int ind;    /* serial index */
    unsigned int tl;    /* logical accumulator */
    unsigned int upin2; /* temp for extra update inhibit for ddct=1 */

    oobbextf=0; /* init. oobb executed true flag */
    oobbexf=0;  /* init. oobb executed flag */
    oobfbexf=0; /* init. flags */
    oobbbexf=0;
    oobbbnxf=0;

    /* determine loop limit */
    switch (ddct){
        case 3:
            lim=iqs;
            break;

        case 1:
        case 2:
            lim=nm;
            break;

        default:
            exerr(3,-1);
            break;
    }

    /* calculate Branch EXecution Signs (condition tests) */
    for (u=1; u<=lim; u++){
        i=row(u);
        if (((fbei[u]==1) || (bbei[u]==1)) && (iq[i].opc!=ocprcl01) && (iq[i].opc!=c
t0)){
            if ((iq[i].flg & 0x10)==0){
                switch (ddct){
                    case 3:
                        cond=mrd(iq[i].op[0]);
                        break;

                    case 1:
                    case 2:
                        if (sfs[0][u]==0) cond=dcs[ssi][sen[0][u]];
                        else cond=mrd(iq[i].op[0]);
                        break;

                    default:
                        exerr(4,u);
                        break;
                }
            }
            else cond=iq[i].op[0];
            cet=(occfamk | occfcmk) & iq[i].opc;
            switch (cet){
                case (occfsf | occfcz):
                    if (cond!=0) bexs[u]=1;
                    else bexs[u]=0;
                    break;

                case (occfsf | occfco):
                    if (cond!=(~0)) bexs[u]=1;
                    else bexs[u]=0;
                    break;

                case (occfst | occfcz):
                    if (cond==0) bexs[u]=1;
                    else bexs[u]=0;
                    break;

                case (occfst | occfco):
                    if (cond==(~0)) bexs[u]=1;
                    else bexs[u]=0;
                    break;

                default:
                    exerr(5,u);
                    break;
            }
        }
        else if ((iq[i].opc==ocprcl01)||(iq[i].opc==ocprret0)) bexs[u]=1;
```

```c
        else bexs[u]=0;
    }

    /* take care of oobbs */
    for (u=1; u<=lim; u++) upin[u]=0;
    for (i=1; i<=iqs; i++) taen[i]=0;
    for (u=1; u<=lim; u++){
        i=row(u);
        if ((fbei[u]==1) && (oobbeif[u]==1)){
            switch (bct){
                case 1:
                case 2:
                case 3:
                    if (bexs[u]==1){
                        oobbextf=1;
                        if (iq[i].opc==ocprc101){
                            stackwr(iq[i].addr + 16);
                            stackwr(iq[i].dba);
                            oobbta=iq[i].ta;
                            if (getbits(iq[i].flg,4,1)==0) dba=mrd(iq[i].op[0]);
                            else dba=iq[i].dba+iq[i].op[0];
                        }
                        else if (iq[i].opc==ocprret0){
                            oobbta=stacklk(1,0);        /* restore pc */
                            dba=stacklk(0,2);    /* restore dba */
                        }
                        else oobbta=iq[i].ta;
                    }
                    oobbexf=1;
                    oobfbexf=1;
                    oobbcnt++;  /* update OOBB counter */
                    break;

                case 4:
                    switch (ddct){
                        case 3:
                            /* calculate target address pointer */
                            j=f=1;
                            while ((f==1) && (j<i)){
                                f=f & 1 & ((~csrd(1,j,iqs))|(~bexs[j])|(csrd(4,1,j)&(~ei
[j])));
                                j++;
                            }
                            taen[i]=1 & bexs[i] & csrd(1,i,iqs) & f;

                            /* calculate update inhibit */
                            j=1;
                            f=0;
                            while ((f==0) && (j<i)){
                                f=1 & (f | ((~csrd(4,1,j)) & (~(ei[j] & iafe[j]))));
                                j++;
                            }
                            upin[i]=1 & bexs[i] & csrd(1,i,iqs) & f;

                            break;


                        case 1:
                        case 2:
                            /* calculate TA ENable */
                            if (i<=iqs){
                                f=0;
                                for (k=1; (k<=b)&&(f==0); k++){
                                    ind=ser(i,k);
                                    f |= ei[ind] & bexs[ind];
                                }
                                f &= csrd(fbd,i,iqs);
                                for (j=1; (j<=(i-1))&&(f==1); j++){
                                    t1=1;
                                    for (k=1; (k<=b)&&(t1==1); k++){
                                        ind=ser(j,k);
                                        t1 &= 1 & ((~ei[ind]) | (~bexs[ind]) | dcsrd(AE,j
,k));
                                    }
                                    t1=1 & (t1 | (~csrd(fbd,j,iqs)));
                                    f &= t1;
                                }
                                taen[i]= 1 & f;
                            }

                            /* calculate UPdate INhibit */
                            f=0;
                            for (s=1; (s<=(u-1))&&(f==0); s++){
                                f=1 & (f | (((~ei[s]) | (bexs[s] &
                                    csrd(fbd,row(s),iqs))) & (~dcs[AE][s])));
                            }
                            upin[u]=1 & bexs[u] & csrd(fbd,row(u),iqs) &
                                    (f | (~bv[col(u)]));
                            break;

                        default:
                            exerr(8,u);
                            break;
                    }

                    /* do the oobb calculations */
                    if (taen[i]==1){
                        oobbta=iq[i].ta;
                        if (upin[u]==0){
                            oobbextf=1;
                            oobbexf=1;
                            oobfbexf=1;
                            if (iq[i].opc==ocprc101){
                                /* execute procedure call */
                                stackwr(iq[i].addr + 16);
                                stackwr(iq[i].dba);
                                if (getbits(iq[i].flg,4,1)==0) dba=mrd(iq[i].op[0]);
                                else dba=iq[i].dba+iq[i].op[0];
                            }
                            else if (iq[i].opc==ocprret0){
                                oobbta=stacklk(1,0);    /* restore pc */
                                dba=stacklk(0,2);       /* restore dba */
                            }
                            else;
                        }
                    }
                    if (upin[u]==0) oobbcnt++;
                    break;

                default:
                    exerr(9,u);
                    break;
            }
        }
        else if ((bbei[u]==1) && (oobbeif[u]==1)){
            if (bexs[u]==1){
                oobbextf=1;
```

```
                oobbta=iq[i].ta;
            }
            oobbexf=1;
            oobbbexf=1;
            if (i==iqs) oobbbnxf=1;
            oobbcnt++;
        }
        else;
    }
    oobbtcnt+=oobbextf;

    /* modify UPIN accordingly */
    if (ddct==1){
        for (u=1; u<=lim; u++){
            upin2= 1 & bexs[u] & (~bv[col(u)]) & oolfb[row(u)] & fbel[u];
            upin[u] |= upin2;
        }
    }
}


aeupd()          /* AE, b update */
{
    int i,j,k;  /* pointers */
    int aept;   /* AE pointer */
    int aeptp;  /*  "     "    plus one */
    unsigned int btmsk; /* bit test mask */

    /* as update */
    for (i=1; i<=iqs; i++){
        if (asel[i]==1) aeset(i,aelz[i]);
    }

    /* fb update */
    for (i=1; i<=iqs; i++){
        if ((fbel[i]==1) && ((bct!=4) || (upin[i]==0))){
            aept=aelz[i];
            aeset(i,aept);
            if (bexs[i]==1){
                j=i+1;
                while ((j<=iqs) && (card(1,i,j)==1)){
                    aeset(j,aept);
                    j++;
                }
            }
        }
    }

    /* BB update */
    for (i=1; i<=iqs; i++){
        if (bbel[i]==1){
            aept=lnz(i);
            if ((bexs[i]==0) || (oobbelf[i]==1)) aeset(i,aept);
            aeptp=aept+1;
            if ((bexs[i]==1) && ((aemaxflg=aemaxt(i))==0) && (oobbelf[i]==0)){
                aeset(i,aept);
                for (j=1; j<=i; j++) aesh(j,aeptp,(1 & (~card(2,j,i))));
                for (j=i+1; j<=new; j++) aesh(j,aept,1);
                b++;
                if (b>bmax) bmax=b;
            }
        }
    }

    /* remove all-ones columns from AE */
    btmsk=1;
    btmsk=btmsk<<(32-b);        /* adjust mask to point to b column */

    for (k=b; k>=1; k--){
        /* see if we can eliminate column k */
        j=0;
        i=1;
        while ((i<=iqs) && (j==0)){
            if ((iq[i].ae & btmsk)==0) j=1;
            i++;
        }

        /* if so retire (eliminate) column k */
        if ((j==0) && (b>1)){
            b--;
            remcol(k);

            /* update counters */
            aeshc++;
            aeshcc++;
        }

        btmsk=btmsk<<1; /* point btmsk at next column */
    }
}


memupd()        /* update memory with allowable sink (asl) contents */
{
    unsigned int t1;    /* logical product accumulator */
    int u,s;    /* indices */

    /* calculate Write Sink Enables */
    for (u=1; u<=nm; u++){
        t1=1;
        for (s=1; s<=(u-1); s++){
/*          t1 &= (~arri[s]) | (~dd(4,row(s),row(u))) | dcs[AE][s] | (~arwi[u]);
*/
            t1 &= (~dd(4,row(s),row(u))) | dcs[AE][s];
            t1 &= dcs[AE][s] | (~dd(3,row(s),row(u))) | dcs[ast][s];
        }
        wse[u]= 1 & t1 & (~dcs[ast][u]) & dcs[re][u] & bv[col(u)];
    }

    /* update memory and AST */
    for (u=1; u<=nm; u++){
        if (wse[u]==1){
            /* only write real sinks, ie. don't write sinks of branches */
            if ((getbits(iq[row(u)].flg,6,1)==0)&&(getbits(iq[row(u)].flg,2,1)==0)){
                mwr(dcs[isa][u],dcs[asl][u],dcs[bwl][u]);
            }
            /* always update the advanced storage matrix */
            dcs[ast][u]=1;
        }
    }
}


dcsupd()        /* dynamic concurrency structure update, primarily based */
```

30 simcd54.c

```
/*      on AE, b; for reduced data dependencies */
{
    int i,j,k;  /* pointers */
    int aept;   /* AE pointer */
    int aeptp;  /*  "     "    plus one */
    unsigned int btmsk; /* bit test mask */
    int u,t;    /* serial indices */
    int ind;    /* serial index */

    /* as update */
        /* accomplished in function asex() */

    /* fb update */
    for (u=1; u<=nm; u++){
        i=row(u);
        if ((fbe[u]==1) && ((bct!=4) || (upin[u]==0)) &&
              ((ddct!=1) || (upin[u]==0))){
            dcs[re][u]=1;
            dcs[AE][u]=1;
            dcs[ast][u]=1;
            aeset(i,col(u));
            if (bexs[u]==1){
                j=i+1;
                while ((j<=iqs) && (csrd(1,i,j)==1)){
                    ind=ser(j,col(u));
                    dcs[AE][ind]=dcs[ve][ind]=dcs[ast][ind]=1;
                    aeset(j,col(u));
                    j++;
                }
            }
        }
    }

    /* BB update - only one BB executes per row */
    for (u=1; u<=nm; u++){
        i=row(u);
        if (bbe[u]==1){
            aept=lnz(i);
            if ((bexs[u]==0) || (oobbeif[u]==1)){
                aeset(i,aept);
                ind=ser(i,aept);
                dcs[AE][ind]=dcs[re][ind]=dcs[ast][ind]=1;
            }
            aeptp=aept+1;
            if ((bexs[u]==1) && ((aemaxflg=aemaxt(i))==0) && (oobbeif[u]==0)){
                aeset(i,aept);
                ind=ser(i,aept);
                dcs[AE][ind]=dcs[re][ind]=dcs[ast][ind]=1;

                /* shift in and above BB domain */
                for (j=1; j<=i; j++){
                    switch (ddct){
                        case 1:
                            if ((iii[i]==0)||(b>aept)||(csrd(bbdo,j,i)==0)){
                                aesh(j,aeptp,(1 & (~csrd(2,j,i))));
                            }
                            else; /* dont shift, allowing use of SAE inst. */

                            /* reset dcss if outer loop executes */
                            if ((iii[i]==0)&&(iii[j]==1)&&(b<=aept)&&
                                (csrd(bbdo,j,i)==1)){
                                dcsres(j,aeptp);
                            }
                            break;
                        case 2:
                            aesh(j,aeptp,(1 & (~csrd(2,j,i))));
                            break;

                        case 3:
                        default:
                            exerr(300,u);
                    }
                }

                /* shift below BB domain */
                for (j=i+1; j<=new; j++) aesh(j,aept,1);
                bvls[b]=1;
                b++;
                bv[b]=1;
                if (b>bmax) bmax=b;
            }
        }
    }


    /* remove all-ones columns from AE, etc. */

    /* determine list of eligible columns for removal, derived from BB */
    /*  execution status */
    elcol[1]=1;
    for (j=2; j<=aew; j++) elcol[j]=0;
    for (i=1; i<=iqs; i++){
        if ((t=lnz(i))<b) elcol[t+1]=1;
    }

    for (k=b; k>=1; k--){
      if (elcol[k]==1){
        /* see if we can eliminate column k */
        j=0;
        i=1;
        while ((i<=iqs) && (j==0)){
            if (dcsrd(ast,i,k)==0) j=1;
            i++;
        }

        /* if so retire (eliminate) column k */
        if ((j==0) && (b>1)){
            bv[b]=0;
            b--;
            bvls[b]=0;
            remcol(k);

            /* update counters */
            aeshcc++;
            aeshc++;
        }
      }
    }
}


remcol(coll)    /* remove column coll from AE, shifting left */
unsigned int coll;
{
    unsigned int lmsk,hmsk;     /* low mask, high mask */
```

simcd54.c

```
    unsigned int rlc;   /* real column number */
    int i;        /* AE index */
    int j,k;      /* indices */

    rlc=32-coll;

    /* create masks */
    lmsk=hmsk=~0;
/*    lmsk=lmsk<<(rlc+1);  */ /* removed due to Sun 4/60 bug */
    lmsk=lshft(lmsk,(rlc+1));
    hmsk=hmsk>>(32-rlc);

    /* retire column, row by row */
    for (i=1; i<=new; i++){
        iq[i].ae=(iq[i].ae & lmsk) | ((iq[i].ae & hmsk)<<1);
    }
    if ((ddct==1) || (ddct==2)){
        for (k=0; k<=6; k++){
            for (i=1; i<=new; i++){
                for (j=coll; j<aew; j++){
                    if (i!=new) dcswr(k,i,j,dcsrd(k,i,j+1));
                    else dcsnew[k][j]=dcsnew[k][j+1];
                }
                if (i!=new) dcswr(k,i,aew,0);
                else dcsnew[k][aew]=0;
            }
        }
    }
}


int lshft(invar,numbits)   /* procedure to do a left shift,*/
                /* added to fix Sun 4/60 bug */
unsigned int invar;    /* number to be shifted */
unsigned int numbits;     /* number of bits to shift */
{
  int i;     /* bit counter */
  unsigned int bitclr;
  unsigned int varout;   /* variable output */

  bitclr = -1;    /* used to clear lsb */

  for (i = 1; i <= numbits; i++){
    invar = (invar << 1) & bitclr;
  }
  varout = invar;
  return(varout);
}



aeset(roww,coll)               /* set bit at AE(row,col) */
unsigned int roww,coll;
{
    iq[roww].ae=iq[roww].ae | (((unsigned) msbmsk)>>(coll-1));
}



aeclr(roww,coll)               /* clear bit at AE(row,col) */
unsigned int roww,coll;
{
    iq[roww].ae=iq[roww].ae & (~(((unsigned) msbmsk)>>(coll-1)));
}



aesh(roww,coll,val)     /* shift val into AE(roww) at coll to right */
unsigned int roww,coll;
unsigned int val;
{
    unsigned int t;     /* temp AE row */
    unsigned int ones;  /* allo */
    int k,j;    /* pointers */

    ones=allo;
    t=iq[roww].ae;
    iq[roww].ae=(t & (ones<<(33-coll))) | (val<<(32-coll)) | ((t>>1) & (ones>>coll))
    if ((ddct==1) || (ddct==2)){
        for (k=0; k<=6; k++){
            for (j=(aew-1); j>=coll; j--){
                if (roww!=new) dcswr(k,roww,(j+1),dcsrd(k,roww,j));
                else dcsnew[k][j+1]=dcsnew[k][j];
            }
            switch (k){
                case AE:
                case ve:
                case ast:
                    if (roww!=new) dcswr(k,roww,coll,val);
                    else dcsnew[k][coll]=val;
                    break;

                case re:
                case isa:
                case ssi:
                case bwi:
                    if (roww!=new) dcswr(k,roww,coll,0);
                    else dcsnew[k][coll]=0;
                    break;

                default:
                    exerr(42,-1);
                    break;
            }
        }
    }
}



dcsres(r,startcol)      /* clear all dcs in row r from startcol(umn) to m */
int r,startcol;
{
    int j;      /* column index */

    for (j=startcol; j<=aew; j++){
        aeclr(r,j);
        dcswr(AE,r,j,0);
        dcswr(ve,r,j,0);
        dcswr(ast,r,j,0);
        dcswr(re,r,j,0);
        dcswr(isa,r,j,0);
        dcswr(ssi,r,j,0);
        dcswr(bwi,r,j,0);
    }
```

simcd54.c

```
}


int aemaxt(roww) /* return 1 iff AE at max. (one or more 1s in last AE */
                 /* column) OR [(one or more previous unexecuted in bounds */
                 /* BBs) AND (one or more 1s in second to last AE column)] */
int roww;        /* BB to check for execution */
{
    int i;       /* pointer */
    int f;       /* flag, one or more ones in last AE column */
    int f2;      /* flag, one or more ones in next to last AE column */
    int unexbb;  /* unexecuted in-bounds BB */
    int bn;      /* bit number */

    i=1;
    f=0;
    bn=32-aew;

    while ((i<=new) && (f==0)){
        f=getbits(iq[i].ae,bn,1);
        i++;
    }

    i=1;
    f2=0;
    bn+=1;

    while ((i<=new) && (f2==0)){
        f2=getbits(iq[i].ae,bn,1);
        i++;
    }

    i=1;
    unexbb=0;
    while ((i<roww) && (unexbb==0)){
        unexbb=1 & (~ife[i]) & csrd(2,1,i) & (~csrd(2,0,i));
        i++;
    }

    return(1 & (f | (f2 & unexbb)));
}



asex()           /* execute assignment statements */
{
    int i;       /* pointer */
    unsigned int aval,bval,cval;       /* actual values of A,B,C */
    unsigned int tval;                 /* total value; normally an address */
    unsigned int aaddr;                /* address of A */
    unsigned int tflg;                 /* temp IQ flag */
    int ic,isc;                        /* instr. class, sub-class */
    int sisb,isb;                      /* (sub-)instr. switch base */
    unsigned int t;                    /* temp. */
    int bival,cival;                   /* integer versions of B,C */
    int it;                            /* integer versions of t */
    int opcode;                        /* guess */
    int lim;                           /* loop limit */
    int u;                             /* loop (serial iteration) counter */

    /* determine limit */
    switch (ddct){
        case 3:
            lim=iqs;
            break;

        case 1:
        case 2:
            lim=nm;
            break;

        default:
            exerr(5,-1);
            break;
    }

    /* execute all instructions i such that they are EI */
    for (u=1; u<=lim; u++){
        i=row(u);
        if (asel[u]==1){

            /* get A,B,C */
            aaddr=iq[i].res;
            tflg=iq[i].flg;
            switch (ddct){
                case 3:
                    if (getbits(tflg,4,1)==0) bval=mrd(iq[i].op[0]);
                    else bval=iq[i].op[0];
                    if (getbits(tflg,5,1)==0) cval=mrd(iq[i].op[1]);
                    else cval=iq[i].op[1];
                    if (arwi[u]==1){
                        if (getbits(tflg,6,1)==0) aval=mrd(iq[i].res);
                        else aval=iq[i].res;
                    }
                    break;

                case 1:
                case 2:
                    /* partial update (only for assignment statements) */
                    dcs[re][u]=dcs[AE][u]=1;
                    aeset(i,col[u]);

                    /* get source 1 */
                    if (getbits(tflg,4,1)==0){
                        if (sfs[0][u]==0) bval=dcs[ssi][sen[0][u]];
                        else bval=mrd(iq[i].op[0]);
                    }
                    else bval=iq[i].op[0];

                    /* get source 2 */
                    if (getbits(tflg,5,1)==0){
                        if (sfs[1][u]==0) cval=dcs[ssi][sen[1][u]];
                        else cval=mrd(iq[i].op[1]);
                    }
                    else cval=iq[i].op[1];

                    /* get sink */
                    if (arwi[i]==1){
                        if (getbits(tflg,6,1)==0){
                            if (sfs[2][u]==0) aval=dcs[ssi][sen[2][u]];
                            else aval=mrd(iq[i].res);
                        }
                        else aval=iq[i].res;
                    }
                    break;
```

simcd54.c

```
        default:
            exerr(7,u);
            break;
}

/* calculate opcode parts */
opcode=iq[i].opc & 0x7f;
ic=opcode & ocidmsk;
isc=opcode & ocscidmk;

/* execute instruction (we made it!) */
/* first switch level: class */
switch (ic){
    case oclog:
        if ((isc & oclognb)!=0) bval=~bval;
        if ((isc & oclognc)!=0) cval=~cval;
        isb=opcode & (oclogmsk | ocidmsk);
        switch (isb){
            case ocloagand:
                t=bval & cval;
                break;

            case oclogorl:
                t=bval | cval;
                break;

            case oclogore:
                t=bval ^ cval;
                break;

            case oclogneg:
                t=bval;
                break;

            default:
                exerr(10,u);
                break;
        }
        skwr(u,aaddr,t,0); /* write result */
        break;

    /* arithmetic ops */
    case oca:
        isb=opcode & (ocamsk | ocidmsk);
        sisb=opcode & ocaopmsk;
        bival=uti(bval);
        cival=uti(cval);
        switch (sisb){
            case ocaintn:
                switch (isb){
                    case ocaplus:
                        it=bival+cival;
                        break;

                    case ocaminus:
                        it=bival-cival;
                        break;

                    case ocatimes:
                        it=bival*cival;
                        break;

                    case ocadiv:
                        it=bival/cival;
                        break;

                    default:
                        exerr(20,u);
                        break;
                }
                skwr(u,aaddr,itu(it),0);
                break;

            case ocainta:
                switch (isb){
                    case ocadiv:
                        it=bival%cival;
                        break;

                    default:
                        exerr(30,u);
                        break;
                }
                skwr(u,aaddr,itu(it),0);
                break;

            default:
                exerr(40,u);
                break;
        }
        break;

    /* comparison (relational) ops */
    case ocrl:
        isb=opcode & (ocrlmsk | ocidmsk);
        bival=uti(bval);
        cival=uti(cval);
        switch (isb){
            case ocrlgt:
                if (bival>cival) t=allo;
                else t=allz;
                break;

            case ocrleq:
                if (bival==cival) t=allo;
                else t=allz;
                break;

            case ocrlgteq:
                if (bival>=cival) t=allo;
                else t=allz;
                break;

            case ocrllt:
                if (bival<cival) t=allo;
                else t=allz;
                break;

            case ocrlne:
                if (bival!=cival) t=allo;
                else t=allz;
                break;

            case ocrllteq:
                if (bival<=cival) t=allo;
                else t=allz;
                break;
```

```
            default:
                exerr(50,u);
                break;
        }
        skwr(u,aaddr,t,0);
        break;

    /* shift ops */
    case ocsh:
        lsb=opcode & (ocshmsk | ocidmsk);
        switch (lsb){
            case ocshl:
                t=bval<<cval;
                break;

            case ocshr:
                t=bval>>cval;
                break;

            default:
                exerr(60,u);
                break;
        }
        skwr(u,aaddr,t,0);
        break;

    /* simple assignment (move) ops */
    case ocass:
        lsb=opcode & (ocamsk | ocidmsk);
        slsb=opcode & ocasslmk;
        switch (lsb){
            /* A=B */
            case ocassb:
                switch (slsb){
                    /* byte op */
                    case ocasslby:
                        /* mwr(aaddr,bval,1); */
                        /* illegal as of Version 4.1 */
                        exerr(60,u);
                        break;

                    /* 32-bit word op */
                    case ocasslls:
                        skwr(u,aaddr,bval,0);
                        break;

                    default:
                        exerr(70,u);
                        break;
                }
                break;

            /* A=B(C) */
            case ocassarf:
                switch (slsb){
                    case ocasslby:
                        tval=bval+cval;  /* compute address */
                        t=mrd(tval & (~0x3));  /* get word */
                        t=getbits(t,(((4-(tval & 0x3))*8)-1),8); /* get byte from word */

                        skwr(u,aaddr,t,0);
                        tmbrdc++;   /* update access counter */
                        break;

                    case ocasslls:
                        t=mrd(bval+(cval<<2)); /* read source */
                        skwr(u,aaddr,t,0);
                        break;

                    default:
                        exerr(80,u);
                        break;
                }
                break;

            /* A(B)=C */
            case ocassart:
                switch (slsb){
                    case ocasslby:
                        t=bval+aval;   /* calc. addr. of sink */
                        skwr(u,t,cval,1);
                        tmbwrc++;   /* update access counter */
                        break;

                    case ocasslls:
                        t=aval+(bval<<2); /* calc. addr. of sink*/
                        skwr(u,t,cval,0);
                        break;

                    default:
                        exerr(90,u);
                        break;
                }
                break;

            default:
                exerr(100,u);
                break;
        }
        break;

    /* misc. ops */
    case ocmis:
        lsb=opcode;
        switch (lsb){
            case ocmisdum:
                /* dummy instr., ignore operands, treat as */
                /* no-op normally; treat as A=B where A and B */
                /* point to the same location if using reduced */
                /* data dependencies */
                switch (ddct){
                    case 3:
                        /* do nothing */
                        break;

                    case 1:
                    case 2:
                        if ((getbits(tflg,4,1)==1) ||
                          (getbits(tflg,6,1)==1) ||
                          (iq[i].op[0]!=iq[i].res)) {
                            fprintf(stderr,"simcd: Illegal dummy instruction at row %d.\n",row(u));

                            abort();
                        }
                        else skwr(u,aaddr,bval,0);
                        break;
```

```
                        default:
                            exerr(105,u);
                    }
                    break;

                case ocmisnop:
                    /* no-op */
                    break;

                default:
                    exerr(110,u);
                    break;
            }
            break;

        /* procedural ops */
        case ocpr:
            isb=opcode;
            switch (isb){
                case ocprcl01:
                    exerr(113,u);
                    break;

                case ocprcl02:
                    break;

                case ocprret0:
                    exerr(116,u);
                    break;

                case ocprret1:
                    break;

                case ocprex:
                    endsimf=1;  /* signal end of simulation */
                    break;

                default:
                    exerr(120,u);
                    break;
            }
            break;

        default:
            exerr(130,u);
            break;
        }
      }
    }
}


skwr(u,addr,data,size)  /* sink write */
int u;                  /* serial index */
unsigned int addr;      /* data address */
unsigned int data;      /* data to be written */
int size;               /* data size 0-word, 1-byte */
{
    switch (ddct){
        case 3:
            mwr(addr,data,size);        /* always written to memory */
            break;
        case 1:
        case 2:
            /* only the dynamic concurrency structures are affected */
            dcs[isa][u]=addr;
            dcs[ssi][u]=data;
            dcs[bwi][u]=size;
            break;

        default:
            exerr(140,u);
            break;
    }
}


int uti(u)      /* unsigned to int */
unsigned int u;
{
    int i,ii;

    i=u>>1;
    ii=u & 1;
    i=(i<<1) | ii;
    return(i);
}


int itu(i)      /* integer to unsigned */
int i;
{
    int u,uu;

    u=(i>>1) & (~msbmsk);
    uu=i & 1;
    u=(u<<1) | uu;
    return(u);
}


mtout(fp)       /* output medium trace; normally called once per cycle */
FILE *fp;       /* file pointer */
{
    int i,j;    /* row, column indices */
    int lim;    /* column limit */

    switch (ddct){
        case 1:
        case 2:
            lim=aew;
            break;

        case 3:
            lim=1;
            break;

        default:
            fprintf(stderr,"simcd: Error during medium trace output.\n");
            abortnt();
    }

    /* output arrays */
    for (i=1; i<=iqs; i++){
```

```
        fprintf(fp,"%x ",iq[i].addr);
        for (j=1; j<=lim; j++) fprintf(fp,"%1x",el[ser(i,j)]);
        fprintf(fp," ");
        for (j=1; j<=lim; j++) fprintf(fp,"%1x",upin[ser(i,j)]);
        fprintf(fp," ");
        for (j=1; j<=lim; j++) fprintf(fp,"%1x",wse[ser(i,j)]);
        fprintf(fp," ");
        for (j=1; j<=lim; j++) fprintf(fp,"%1x",bexs[ser(i,j)]);
        fprintf(fp,"\n");
    }
    fprintf(fp,"\n");

    /* output per cycle counter values */
    fprintf(fp,"%d %d %d %d\n",tmemrdcc,tmemwrcc,memrdcc,memwrcc);
    fprintf(fp,"%d %d %d %d\n",regrdcc,regwrcc,ldacntac,aeshcc);
    fprintf(fp,"%d %d %d %d\n",ifmrcc,b,callexcc,retexcc);
    fprintf(fp,"\n\n");
}


tout(fp)          /* output trace */
FILE *fp;         /* file pointer */
{
    int i,j,k;  /* pointers */
    int llt,ult;         /* temp. m limits for dump */
    int mlim;   /* limited AE width used, <= 14 */

    fprintf(fp,"%s %d%s%d %s %s/%s\n","simcd Version Number:",simver1,".",simver2,"Input
 File:",cdp,ifnp);
    fprintf(fp,"%70s %d\n","Trace, cycle number:",cno);
    fprintf(fp,"%60s\n","Instruction Queue contents:");
    fprintf(fp,"%-5s%-10s%-10s%-10s%-10s%-10s","row","address","DBA","opcode","sink(A)",
"src1(B)");
    fprintf(fp,"%-10s%-10s%-10s%-10s%20s\n","src2(C)","flags","TA","MPB","AE(in binary)"
);

    for (i=0; i<=iqs; i++){
        fprintf(fp,"%2d  %08x  %08x  %08x  %08x",i,iq[i].addr,iq[i].dba,iq[i].opc,iq[i].
res);
        fprintf(fp,"  %08x  %08x  %08x  %08x  %08x  ",iq[i].op[0],iq[i].op[1],iq[i].flg,
iq[i].ta,iq[i].mpb);
        prbits(fp,iq[i].ae,1,aew);      /* print bits of AE */
        fprintf(fp,"\n");
    }

    fprintf(fp,"\n");

  if (iqs<=19){
    fprintf(fp,"%60s\n","Concurrency Structures:");
    fprintf(fp,"%-4s%-24s%-24s%-24s%-24s%-24s\n","row","DD","FBD","BBDO","PBBDE","CBB");
    for (i=0; i<=iqs; i++){
        fprintf(fp,"%2d  ",i);
        for (j=0; j<=5; j++){
            if (j!=4){
                prbits(fp,cs[j][i][0],1,new);
                prc(fp,(24-new),' ');
            }
        }
        fprintf(fp,"\n");
    }
  }
    fprintf(fp,"\f");
        if ((ddct==1) || (ddct==2)){
            /* print extra data */
            if (iqs<=19){
                fprintf(fp,"%60s\n","Concurrency Structures:");
                fprintf(fp,"%-4s%-24s%-24s%-24s%-24s%-24s\n","row","DDE1","DDE2","DDE3","DDE4
","DDE5");
                for (i=0; i<=iqs; i++){
                    fprintf(fp,"%2d  ",i);
                    for (j=7; j<=11; j++){
                        prbits(fp,cs[j][i][0],1,new);
                        prc(fp,(24-new),' ');
                    }
                    fprintf(fp,"\n");
                }
            }

            fprintf(fp,"\n");

            if (iqs<=19){
                fprintf(fp,"%60s\n","Concurrency Structures:");
                fprintf(fp,"%-4s%-24s%-24s%-24s%-24s%-24s\n","row","DD1","DD2","DD3","DD4","O
FBDE");
                for (i=0; i<=iqs; i++){
                    fprintf(fp,"%2d  ",i);
                    for (j=1; j<=4; j++){
                        for (k=1; k<=new; k++){
                            fprintf(fp,"%01x",dd(j,i,k));
                        }
                        prc(fp,(24-new),' ');
                    }
                    prbits(fp,cs[ofbde][i][0],1,new);
                    prc(fp,(24-new),' ');
                    fprintf(fp,"\n");
                }
            }
            fprintf(fp,"\f");

            if (aew>14){
                fprintf(fp,"\tWarning: only the lowest 14 columns of m width structures are s
hown.\n\n");
                mlim=14;
            }
            else mlim=aew;


            /* Print the dynamic concurrency structures */
            fprintf(fp,"%60s\n","Dynamic Concurrency Structures-Binary; Source pointers:");
            fprintf(fp,"%-4s%-16s%-16s%-16s%-16s","row","AE","RE","VE","AST");
            fprintf(fp,"%-16s%-16s%-16s%-16s\n","BWI","SFS-source1","SFS-source2","SFS-sink")
;
            for (i=1; i<=iqs; i++){
                fprintf(fp,"%2d  ",i);
                for (j=0; j<=6; j++){
                    if ((j!=4) && (j!=5)){
                        prdcsr(fp,dcs[j],i,mlim);
                        prc(fp,(16-mlim),' ');
                    }
                }
                for (j=0; j<=2; j++){
                    prdcsr(fp,sfs[j],i,mlim);
                    prc(fp,(16-mlim),' ');
                }
                fprintf(fp,"\n");
            }
```

```
fprintf(fp,"\n");


/* Print misc. logic structures */
fprintf(fp,"%60s\n","Miscellaneous Logic Stuctures:");
fprintf(fp,"%-4s%-16s%-16s%-16s","row","NDDI-(DDEI)","NFBDI-(FBEI)","NBBDI-(BBEI
)");
fprintf(fp,"%-16s%-16s%-16s%-16s%-16s\n","NOOBBI","NREI-(SEI)","EI","WSE","SAEVE
");
for (i=1; i<=iqs; i++){
    fprintf(fp,"%2d  ",i);
    prdcsr(fp,nddi,i,mlim);
    prc(fp,(16-mlim),' ');
    prdcsr(fp,nfbdi,i,mlim);
    prc(fp,(16-mlim),' ');
    prdcsr(fp,nbbdi,i,mlim);
    prc(fp,(16-mlim),' ');
    prdcsr(fp,noobbi,i,mlim);
    prc(fp,(16-mlim),' ');
    prdcsr(fp,nrei,i,mlim);
    prc(fp,(16-mlim),' ');
    prdcsr(fp,ei,i,mlim);
    prc(fp,(16-mlim),' ');
    prdcsr(fp,wse,i,mlim);
    prc(fp,(16-mlim),' ');
    prdcsr(fp,saeve,i,mlim);
    prc(fp,(16-mlim),' ');
    fprintf(fp,"\n");
}
fprintf(fp,"\f");


/* Print integer dynamic concurrency structures. */
fprintf(fp,"%60s\n","ISA-Iteration Sink Addresses:");
fprintf(fp,"%-4s\n","row");
prdcsint(fp,isa,mlim);

fprintf(fp,"\n%60s\n","SSI-Shadow Sinks:");
fprintf(fp,"%-4s\n","row");
prdcsint(fp,ssi,mlim);
fprintf(fp,"\f");


/* Print Sink Enable arrays (integer versions) */
fprintf(fp,"    %-56s","SEN1 - Sink ENable source 1:");
fprintf(fp,"     %-56s\n","SEN2 - Sink ENable source 2:");
fprintf(fp,"%-4s\n","row");
for (i=1; i<=iqs; i++){
    /* print a line */
    fprintf(fp,"%2d  ",i);
    prsenr(fp,0,i,mlim);
    prc(fp,(5+((14-mlim)*4)),' ');
    prsenr(fp,1,i,mlim);
    fprintf(fp,"\n");
}
fprintf(fp,"\n");

fprintf(fp,"    %-56s\n","SEN3 - Sink ENable sink:");
fprintf(fp,"%-4s\n","row");
for (i=1; i<=iqs; i++){
    /* print a line */
    fprintf(fp,"%2d  ",i);
    prsenr(fp,2,i,mlim);
    fprintf(fp,"\n");
```

```
        }
        fprintf(fp,"\f");
    }


  if (ddct==3){
    /* output IE, misc. vectors */
    fprintf(fp,"%60s\n","Miscellaneous Structures and Indicators:");
    fprintf(fp,"%-4s%-23s%-7s%-7s%-7s%-7s%-7s","row","IE","AELZ","IFE","NDDI","NFBDI","NB
BDI");
    fprintf(fp,"%-7s%-7s%-7s%-7s%-7s","NOOBBI","NREI","NRASEI","NRFBEI","NRBBEI");
    fprintf(fp,"%-7s%-7s%-6s%-5s%-7s\n","ASEI","FBEI","BBEI","BEXS","OOBBEIF");

    for (i=0; i<=iqs; i++){
        fprintf(fp,"%2d  ",i);
        if (iqs<=19){
            prbits(fp,cs[4][i][0],1,new);
            prc(fp,(24-new),' ');
        }
        else prc(fp,24,' ');
        fprintf(fp,"%-7.1x%-7.1x%-7.1x%-7.1x%-7.1x",aelz[i],ife[i],nddi[i],nfbdi[i],nbbdi
[i]);
        fprintf(fp,"%-7.1x%-7.1x%-7.1x%-7.1x%-7.1x",noobbi[i],nrei[i],nrasei[i],nrfbei[i]
,nrbbei[i]);
        fprintf(fp,"%-7.1x%-7.1x%-7.1x%-1.1x",asei[i],fbei[i],bbei[i],bexs[i],oobbe
if[i]);
        fprintf(fp,"\n");
    }
    fprintf(fp,"\n");
  }


    /* output stats */
    stats(0,fp);
    fprintf(fp,"\f");

    /* output register, memory dumps */
    llt=mdll;   /* save limits */
    ult=mdul;
    mdll=dbastart;      /* set up for dumping registers */
    mdul=regno<<2;

    dump(fp,8); /* dump registers, 8 words per line */

    if (mdump==1){
        mdll=llt;       /* restore limits */
        mdul=ult;

        fprintf(fp,"\n");

        dump(fp,8);     /* dump memory */
    }
    fprintf(fp,"\f");
}


prbits(fp,wd,lb,rb)     /* print bits lb thru rb of wd in file at fp */
int wd,lb,rb;
FILE *fp;
{
    int i,j;    /* counters, etc. */
    unsigned int bit;   /* bit to be printed */
    char s;     /* character to be printed */
```

```
    j=32-lb;
    for (i=lb; i<=rb; i++){
        bit=getbits(wd,j,1);
        s=bit+'0';
        fprintf(fp,"%c",s);
        j--;
    }
}


prc(fp,q,s)     /* print character s q times to file at fp */
FILE *fp;
int q;
char s;
{
    int i;      /* counter */

    for (i=1; i<=q; i++) fprintf(fp,"%c",s);
}


prdcsint(fp,k,mlim)     /* print dcs(k) as hex integers, mlim ints to a line */
FILE *fp;
int k,mlim;
{
    int i,j;    /* indices */

    for (i=1; i<=iqs; i++){
        /* print a line */
        fprintf(fp,"%2d  ",i);
        for (j=1; j<=mlim; j++){
            fprintf(fp,"%08x ",dcs[k][ser(i,j)]);
        }
        fprintf(fp,"\n");
    }
}


prsenr(fp,senno,r,w)    /* print row r of width w of sen[senno] to file fp */
FILE *fp;
int senno,r,w;
{
    int i;      /* counter */

    for (i=1; i<=w; i++){
        fprintf(fp," %3d",sen[senno][ser(r,i)]);
    }
}


prdcsr(fp,ar,r,w)       /* print row r of width w of array ar in file fp */
                        /*   assumes only the lsb is valid */
FILE *fp;
unsigned int ar[];
int r,w;
{
    int i;      /* counter */

    for (i=1; i<=w; i++){
        fprintf(fp,"%01x",(ar[ser(r,i)] & lsbmsk));
    }
}


stats(flg,fp)   /* print parameters and results */
int flg;        /* 0-for trace output; 1-for normal output */
FILE *fp;
{
    struct rusage *rusage;      /* timing data structure */
    long usert,syst;    /* user time, system time */
    int i;      /* counter */

    /* allocate storage for timing data */
    for (i=1;
        ((rusage = (struct rusage *) malloc (sizeof (struct rusage)))==NULL)
        && (i<1000); i++);

    /* get simulation times */
    getrusage(RUSAGE_SELF,rusage);
    usert=rusage->ru_utime.tv_sec;
    syst=rusage->ru_stime.tv_sec;

    /* Output data */
    if (flg==0) fprintf(fp,"%60s\n","Simulation Parameters and Counters");
    else {
        fprintf(fp,"%s %d%s","Cumulative Stats of simcd Version Number:",simver1,".");
        fprintf(fp,"%d\n\t%s %s/%s\n",simver2,"Input File:",cdp,ifnp);
        fprintf(fp,"\tSimulation start time: %s",timday);
        fprintf(fp,"\tUser time= %ld\t\tSystem time= %ld\n",usert,syst);
        fprintf(fp,"\n");
    }

    /* print input parameters */
    fprintf(fp,"Input Parameters:\n");
    fprintf(fp,"\tIQ length (n)= %-5d\t\tAE width= %-5d\n",iqs,aew);
    fprintf(fp,"\tFBs exec./cycle= %-5d\t\tBBs exec./cycle= %-5d\n",fbpeq,bbpeq);
    fprintf(fp,"\tASs exec./cycle= %-5d\t\tBs exec./cycle= %-5d\n",aspeq,tbpeq);
    fprintf(fp,"\tPD check type (1-std., 2-SC conc., 3-UC conc., 4-UC ext.)= %-2d\n",bct)
;
    fprintf(fp,"\tDD check type (3-std., 2-red. DD w/o SAE, 1-red. DD w/SAE)= %-2d\r
t);
    fprintf(fp,"\tIQ load type (1-std., 2-BB domains not held)= %-2d\n",ldt);
    fprintf(fp,"\tNo. of registers= %-5d\n",regno);
    fprintf(fp,"\n");

    /* print stats */
    if (flg==0){
        fprintf(fp,"Cycle dependant counter values:\n");
        fprintf(fp,"\tLoad sub-cycles= %-5d\t\tAS PEs used= %-5d\n",ldscntsc,aspec);
        fprintf(fp,"\tFB PEs used= %-5d\t\tBB PEs used= %-5d\n",fbpec,bbpec);
        fprintf(fp,"\tCurrent b= %-5d\t\tB PEs used= %-5d\n",b,tbpec);
        fprintf(fp,"\n");
    }

    /* print cumulative stats */
    fprintf(fp,"Cumulative Counts, Stats:\n");
    fprintf(fp,"\tExecution cycles= %-9d\tLoad cycles= %-9d\n",cno,ldcnt);
    fprintf(fp,"\tLoad sub-cycles= %-9d\tAE left shifts= %-9d\n",ldscnt,aeshc);
/*  fprintf(fp,"\tAE width reached (0-no, 1-yes)= %-2d\n",aemaxflg); */
    fprintf(fp,"\tMax. b value= %-9d\n",bmax);
    fprintf(fp,"\tStack reads= %-9d\t\tStack pops= %-9d\n",stacklkc,tpopc);
    fprintf(fp,"\tTot. mem. wd. reads= %-9d\tTot. mem. wd. writes= %-9d\n",tmemrdc,tmemwr
```

```
c);
    if (flg==1){
        fprintf(fp,"\t Peak  \"  per cycle= %-9d\t Peak  \"   per cycle= %-9d\n",tmemrdc
p,tmemwrcp);
    }
    fprintf(fp,"\tTot. mem. by. reads= %-9d\tTot. mem. by. writes= %-9d\n",tmbrdc,tmbwrc
);
    fprintf(fp,"\tMain memory reads= %-9d\tMain memory writes= %-9d\n",memrdc,memwrc);
    if (flg==1){
        fprintf(fp,"\t Peak \" per cycle= %-9d\t Peak  \" per cycle= %-9d\n",memrdcp,mem
wrcp);
    }
    fprintf(fp,"\tRegister reads= %-9d\tRegister writes= %-9d\n",regrdc,regwrc);
    if (flg==1){
        fprintf(fp,"\t Peak \" /cycle= %-9d\t Peak \"  /cycle= %-9d\n",regrdcp,regwrcp);
    }
    fprintf(fp,"\tMax. ASs exec./cycle= %-5d\tMax. FBs exec./cycle= %-5d\n",asexmax,fbex
max);
    fprintf(fp,"\tMax. BBs exec./cycle= %-5d\tMax. Bs exec./cycle= %-5d\n",bbexmax,tbexm
ax);
    fprintf(fp,"\tTot. OOBBs executed= %-9d\tTot. OOBBs exec. true= %-9d\n",oobbcnt,oobb
tcnt);
    fprintf(fp,"\tInstr. fetch count= %-9d\tI.F. memory reads= %-9d\n",ifc,ifmrc);
    if (flg==1){
        fprintf(fp,"\t\t\t\t\t Peak \" per cycle= %-9d\n",ifmrcp);
    }
    fprintf(fp,"\tCALLs expanded= %-9d\tRETURNs expanded= %-9d\n",
            callexc,retexc);
}


dump(fp,w)      /* dump memory (m), w words per line */
FILE *fp;
int w;
{
    int i,j,k;  /* pointers */
    int ll,ul;  /* filtered limits */
    int la,ua;  /* lower, upper addresses */

    la=mdll & (~0x3);   /* set-up */
    ua=mdul & (~0x3);
    ll=la>>2;
    ul=ua>>2;

    fprintf(fp,"Memory dump; start= %08x, end about= %08x:\n",la,ua);

    i=la;
    k=ll;
    while (i<ua){
        /* print a line */
        fprintf(fp,"\t  %08x:",i);
        for (j=1; j<=w; j++){
            if (k<=mmax){
                fprintf(fp,"  %08x",m[k]);
                i+=4;
                k++;
            }
        }
        fprintf(fp,"\n");
    }
}

histout(fp)     /* output histogram of instruction execution */
FILE *fp;
{
    int i;      /* index */
    int exitflg;        /* set when exit instruction encountered */
    int addrs;  /* address */

    fprintf(fp,"Histogram of input file: %s\n\n",ifnp);

    for (i=0; exitflg==0; i++){
        addrs=(i<<2)+pcstart;
        if (hist[i]!=(-1)){
            fprintf(fp,"%08x  %8d\n",addrs,hist[i]);
        }
        if ((addrs>=pcmax) || (i>mmax)) exitflg=1;
    }
}
```

APPENDIX 4

Brief Description of the "simcd" Simulator Program and Documentation

The simcd program is a simulator of the hardware embodiment described in the specification. With appropriate input switch settings (described below), and a suitably encoded test program, the execution of the simulator causes the internal actions of the hardware to be mimicked, and the test program to be executed. The simulator program is written in "C", the test programs are written in a machine language.

The file simcd.doc contains descriptions of the switch settings and input parameters of the simulator. For the hardware embodiment described in the specification, dct=1, bct=4, n=32 (typically), parameters 5-8=32 or greater, IQ load type=1. The specification of the input code has not been included.

The basic operation of the simulator program is now described. Page numbers will refer to those numbers on the pages of the simcd54.c program listing. The first few pages contain descriptions of the data structures, in particular the dynamic concurrently structures of the hardware are declared on page 2 right; the name is dcs. Much of the main ( ) routine, starting on page 4 left, is concerned with initialization of the simulated memory and other data structures.

The major execution loop of the simulator starts on page 6 5 right, 12th line down (the while loop). Each iteration of the loop corresponds to one hardware machine cycle. The first function executed in the loop is the load ( ) function which loads instructions into the Instruction Queue, and also sets corresponding entries of the static concurrency structures. In many, if not most, cases, no instructions will be loaded, and the load ( ) function will take 0 time (otherwise, the current cycle may have to be effectively lengthened). Continuing to refer to page 5 right, the next relevant code is in the section in case 1: of the switch (ddct) {construct. The next five function calls are the heart of the machine cycle simulation; the rest of the while loop consists of output specification statements, which are not relevant to the application claims. In hardware, the actions of these functions would be overlapped in time, keeping the cycle time reasonable.

The first function, eidetr ( ), is one of the most relevant sections of code; it starts on page 22 right. Its primary functions are to determine those instruction instances (iteration) eligible for execution in the current cycle, and for assignment instructions, to determine the inputs to each instruction instance. The first code in the function page 22 right to page 23 right top, determines whether procedural dependencies have been resolved or not. The next small piece of code on page 23 right determines saeve terms for use in the SEN (Sink ENable) calculations, allowing the super advanced execution by the hardware. The for loop at the bottom of page 23 right, continuing on to page 24 left, computes the SEN pointers in an incremental fashion, to reduce simulation time. Next is the DD EI calculation, which determines the final data dependency executable independence of the instructions instances. There are some further relatively minor calculations on pages 24 right through 25 right, including the final determination of semantic executable independence, and the function ends.

The next function in the main loop is asex ( ). In this function, those assignment instruction instances found to be ready for execution in eidetr ( ) are actually executed, with their results being written into the Shadow Sink matrix. The Advanced Execution matrix is also updated, indicating those instances which have executed.

The next major function is memupd ( ), which is contained on page 29 right. First, a determination is made of which Shadow Sink registers are eligible for writing to main memory, i.e., the WSE calculations are made using the Advanced Storage matrix. Next, memory is updated with the eligible Shadow Sink values, using the addresses in Instruction Sin Address; and the Advanced Storage matrix is updated.

The next function is brex ( ) beginning on page 27 left. In this code, the appropriate branch tests are made (very possibly more than one per cycle), and branches out of the Instruction Queue are handled.

The last major function is the dcsupd ( ) function, which starts on page 29 right bottom. The dynamic concurrency structures are updated as indicated by branch executions. Also, fully executed iterations, in which the Advanced Execution and Advanced Storage matrix columns corresponding to that iteration and all those earlier that have all ones in them, are retired, making room for new iterations to be executed.

We have described all the major functions in the primary loop of the simcd54.c simulator program. The loop continues until a special "end-of-simulation" instruction is encountered in the test program.

I claim:

1. A central processing unit for executing a series of instructions in a computing machine having a memory for storing instructions and data elements, the central processing unit comprising:

an instruction queue for storing at least a subset of the series of instructions;

a plurality of processing elements coupled to said instruction queue for receiving signals indicating operations to be performed by said processing elements and for executing instructions by performing the indicated operations;

loader means coupled to said instruction queue and to the memory for loading instructions from the memory to said instruction queue and for generating signals indicating relationships between the instructions stored in said instruction queue;

relational matrix means coupled to said loader means for receiving an storing the signals indicating relationships between the instructions stored in said instruction queue;

a branch unit, said branch unit including execution matrix means for storing signals representing the execution state of a set of iterations of each instruction stored in said instruction queue;

identifying means coupled to said relational matrix means and to said execution matrix means for identifying a plurality of executable instructions from the subset of instructions in said instruction queue in response to the signals stored in the relational matrix means and the signals stored in the execution matrix means;

means for coupling said identifying means to said instruction queue and to said branch unit for transmitting signals to said instruction queue and to said branch unit in response to the identified plurality of instructions;

said instructions queue including means responsive to said signals from said coupling means for transmitting signals to said processing elements indicating the operations to be performed by said processing elements;

said branch unit including means responsive to said signals from said coupling means for updating the execution matrix means to indicate that an instruction iteration has really executed;

said branch unit including means for updating the execution matrix means in response to execution of a branch instruction to indicate that at least one instruction iteration has virtually executed;

sink storage means for storing result data elements generated by the execution of instructions by said processing elements;

interconnect means coupled to said instruction queue, to said processing elements, to said sink storage means, and to the memory, for transmitting data elements to and from said processing elements; and sink enable means coupled to said identifying means and to said sink storage means for generating signals for coupling selected result data elements to said interconnect means for transmission to a processing element.

2. The central processing unit of claim 1 wherein said coupling means is a resource filter.

3. The central processing unit of claim 1 wherein the identifying means comprises:

means for identifying a set of procedurally executably independent instruction iterations;

means for identifying at set of data executably independent instruction iterations; and means for identifying a set of instruction iterations which are both data executably independent and procedurally executably independent.

4. The central processing unit of claim 3 wherein said means for identifying a set of procedurally executably independent instructions and said means for identifying a set of data executably independent instructions function concurrently.

5. The central processing unit of claim 3 wherein:

said instruction queue comprises means for storing n instructions at locations IQ(i), where i is an integer greater than zero and less than or equal to n;

said sink storage means comprises a plurality of addressable register means for storing, in register location SSI(k,l), the result values generated by the execution of instruction IQ(i) in iteration (1);

said relational matrix means comprises at least two data dependency matrices, each data dependency matrix DDz corresponding to a separate instruction source data element z and having a plurality of binary elements DDz(i,j) for indicating whether instruction IQ(j) is data dependent on instruction IQ(i); and said execution matrix means comprises:

a real execution matrix having a plurality of binary elements RE(i,j) for indicating whether iteration (j) of instruction IQ(i) has really executed; and a virtual execution matrix having a plurality of binary elements VE(i,j) for indicating whether iteration (j) of instruction IQ(i) has virtually executed.

6. The central processing unit of claim 5 further comprising:

memory update means coupled to said sink storage means, said relational matrix means, said execution matrix means, and said memory for copying data elements from said sink storage means to the memory.

7. The central processing unit of claim 6 wherein said memory update means comprises:

instruction sink address means for storing a memory address for each of the data elements stored in said sink storage means; and memory update enable means for enabling the writing of a selected data element in said sink storage means to the memory at the stored memory address for the selected data element.

8. The central processing unit of claim 7 wherein said means for identifying a set of procedurally executably independent instruction iterations comprises means for identifying an instruction iteration beyond an unexecuted conditional branch instruction as procedurally executably independent.

9. The central processing unit of claim 8 wherein said means for identifying instruction iterations beyond unevaluated conditional branch instructions comprises means for identifying a set of instructions within an innermost loop.

10. The central processing unit of claim 5 wherein said means for identifying a set of data executably independent instructions comprises:

means for determining, for each iteration j of each instruction IQ(i), whether a source data element z of instruction iteration (i,j) is in said memory; and means for determining, for each iteration j of each instruction IQ(i), whether a source data element z of instruction iteration (i,j) is in said sink storage means;

the instruction iteration (i,j) being identified as data executably independent if all source data elements of instruction iteration (i,j) are either in the memory or in said sink storage means.

11. The central processing unit of claim 10 wherein said means for determining whether a source data element z of instruction iteration (i,j) is in said sink storage means comprises means for determining whether there is a location SSI(k,l) in said sink storage means satisfying the following conditions:

SSI(k,l) has been generated by the real execution of instruction IQ(k) in iteration l;

instruction IQ(i) is data dependent upon instruction IQ(k) for source data element d; and for all instruction iterations (e,f) serially between instruction iteration (k,l) and instruction iteration (i,j), either instruction IQ(i) is not data dependent on instruction IQ(e) for source data element z or instruction iteration (e,f) has virtually executed.

12. The central processing unit of claim 11 wherein said means for determining whether a source data element z for instruction iteration (i,j) is in said memory comprises means for determining whether, for all instruction iterations (e,f) serially prior to instruction iteration (i,j), either instruction IQ(i) is not data dependent on instruction IQ(e) for source data element z or instruction iteration (e,f) has virtually executed.

13. The central processing unit of claim 10 wherein said means for determining whether a source data element z for instruction iteration (i,j) is in said sink storage means comprises means for determining whether there is a location SSI(k,l) in said sink storage means satisfying the following conditions:

$RE(k,l)=1;$ $DDz(k,i)=1;$ and for all instruction iteration (e,f) serially between instruction iteration (k,l) and instruction iteration (i,j), either DDz(e,i)=0 or VE(e,f)=1.

14. The central processing unit of claim 13 wherein said means for determining whether a source data element z for instruction iteration (i,j) is in said memory comprises means for determining whether, for all instruction iterations (e,f) serially prior to instruction iteration (i,j), either DDz(e,i)=0 or VE(e,f)=1.

15. The central processing unit of claim 10 wherein said means for determining whether a source data element is in said memory and said means for determining whether a source data element is in said sink storage means function concurrently.

16. The central processing unit of claim 15 wherein said means for determining whether a source data element is in said memory is operative to concurrently make such determination for each iteration of each instruction; and said means for determining whether a source data element is in said sink storage means is operative to concurrently make such determination for each iteration of each instruction.

17. The central processing unit of claim 10 wherein said means for identifying a set of data executably independent instructions comprises:

means for concurrently determining, for each instruction iteration (i,j), and each source data element z, whether all source data elements of instruction iteration (i,j) are either in the memory or in said sink storage means.

18. A method for concurrently executing a series of instructions in a computing machine having a central processing unit and a memory for storing instructions and data elements, comprising the steps of:

loading at least a subset of the series of instructions from the memory in an instruction queue;

substantially concurrently with said loading steps:

generating signals indicating relationships between the instructions loaded in said instruction queue;

storing in a relational matrix means the signals indicating relationships between the instructions stored in said instruction queue;

storing in an execution matrix means signals representing the execution state of a set of iterations of each instruction stored in said instruction queue;

identifying a first plurality of executable instructions from the subset of instructions in said instruction queue in response to the signals stored in said relational matrix means and said execution matrix means;

thereafter concurrently executing a selected subset of the first plurality of identified instructions using a plurality of processing elements;

updating the execution matrix means to indicate that the instructions executed by the plurality of processing elements have really executed and to indicate, in response to the execution of a branch instruction, that some instructions have virtually executed;

storing in a sink storage matrix result data elements generated by the execution of instructions by the plurality of processing elements;

using the updated execution matrix means to repeat the identifying step to identify a second plurality of executable instructions; and concurrently executing a selected subset of the identified second plurality of instructions using at least one of the data elements stored in the sink storage matrix.

19. The method of claim 18 wherein the identifying step comprises:

identifying a set of procedurally executably independent instruction iterations;

identifying a set of data executably independent instruction iterations; and identifying a set of instruction iterations which are both data executably independent and procedurally executably independent.

20. The method of claim 19 wherein:

said loading step comprises the step of storing in said instruction queue n instructions at locations IQ(i), where i is an integer greater than zero and less than or equal to n;

said step of storing date elements in the sink storage matrix comprises the step of storing, in location SSI(k,l), the result values generated by the execution of instruction IQ(k) in iteration (l);

said step of storing signals in the relational matrix means comprises the step of storing a plurality of binary elements DDz(i,j) indicating whether instruction IQ(j) is data dependent on instruction IQ(i) for source data element z; and said step of storing signals in the execution matrix means comprises the steps of:

storing in a real execution matrix a plurality of binary elements RE(i,j) indicating whether iteration (j) of instruction IQ(i) has really executed; and storing in a virtual execution matrix a plurality of binary elements VE(i,j) indicating whether iteration (j) of instruction IQ(i) has virtually executed.

21. The method of claim 20 wherein said step of identifying a set of procedurally executably independent instructions and said step of identifying a set of data executably independent instructions are performed concurrently.

22. The method of claim 20 further comprising the step of:

copying selected data elements from said sink storage matrix to the memory.

23. The method of claim 22 wherein said step of copying selected data elements to memory comprises the steps of:

storing a memory address for each of the data elements stored in said sink storage matrix; and enabling selected data elements in said sink storage matrix to be copied to the memory.

24. The method of claim 23 wherein said step of identifying a set of procedurally executably independent instruction iterations comprises the step of identifying an instruction iteration beyond an unexecuted conditional branch instruction as procedurally executably independent.

25. The method of claim 24 wherein said step of identifying instruction iterations beyond unevaluated conditional branch instructions comprises the step of identifying a set of instructions within a innermost loop.

26. The method of claim 20 wherein said step of identifying a set of data executably independent instruction iterations comprises:

determining, for each iteration j of each instruction IQ(i), whether a source data element z of instruction iteration (i,j) is in said sink storage matrix; and identifying the instruction iteration (i,j) as data executably independent if all source data elements of instruction iteration (i,j) are either in said memory or in said sink storage matrix.

27. The method of claim 26 wherein said step of identifying a set of data executably independent instructions comprises:

concurrently determining, for each instruction iteration (i,j) and each source data element z, whether all source data elements of instruction iteration (i,j) are either in the memory or in said sink storage matrix.

28. The method of claim 26 wherein said step of determining whether a source data element z for iteration j of instruction IQ(i) is in said sink storage matrix comprises the step of determining whether there is a location SSI(k,l) in said sink storage matrix satisfying the following conditions:

SSI(k,l) has been generated by the real execution of instruction IQ(k) in iteration l;

instruction IQ(i) is data dependent upon instruction IQ(k) for source data element d; and for all instruction iterations (e,f) serially between instruction iteration (k,l) and instruction iteration (i,j), either instruction IQ(i) is not data dependent on instruction IQ(e) for source data element z or instruction iteration (e,f) has virtually executed.

29. The method of claim 28 wherein said step of determining whether a source data element z for instruction iteration (i,j) is in the memory comprises the step of determining whether, for all instruction iterations (e,f) serially prior to instruction iteration (i,j), either instruction IQ(i) is not data dependent on instruction IQ(e) for source data element z or instruction iteration (e,f) has virtually executed.

30. The method of claim 6 wherein the step of determining whether a source data element z for instruction iteration (i,j) is in said sink storage matrix comprises the step of determining whether there is a location SSI(k,l) in said sink storage matrix satisfying the following conditions:

$RE(k,l)=1$;

$DDz(k,i)=1$;

and for all instruction iterations (e,f) serially between instruction iteration (k,l) and instruction iteration (i,j), either DDz(e,i)=0 or VE(e,f)=1.

31. The method of claim 30 wherein the step of determining whether a source data element z for instruction iteration (i,j) is in said memory comprises the step of determining whether, for all instruction iterations (e,f) serially prior to instruction iteration (i,j), either DDz(e,i)=0 or VE(e,f)=1.

32. The method of claim 26 wherein said step of determining whether a source data element is in said and said step of determining whether a source data element is in sink storage matrix are performed concurrently.

33. The method of claim 32 wherein said step of determining whether a source data element is in said is performed concurrently for each iteration of each instruction; and said step of determining whether a source data element is in sink storage matrix is performed for each iteration of each instruction.

* * * * *